United States Patent [19]

Alpert et al.

[11] Patent Number: 5,249,286
[45] Date of Patent: Sep. 28, 1993

[54] SELECTIVELY LOCKING MEMORY LOCATIONS WITHIN A MICROPROCESSOR'S ON-CHIP CACHE

[75] Inventors: Donald B. Alpert, Santa Clara, Calif.; Oved Oz, Saba, Israel; Gideon Intrater, Ramat-Gan, Israel; Reuven Marko, Natanya, Israel; Alon Shacham, Tel-Aviv, Israel

[73] Assignee: National Semiconductor Corporation, Santa Clara, Calif.

[21] Appl. No.: 982,031

[22] Filed: Nov. 24, 1992

Related U.S. Application Data

[63] Continuation of Ser. No. 529,866, May 29, 1990, abandoned.

[51] Int. Cl.⁵ .............................. G06F 12/00
[52] U.S. Cl. .................. 395/425; 395/400; 364/DIG. 1; 364/243.4; 364/243.41; 364/246.6; 364/246.8
[58] Field of Search .................. 395/400, 425; 364/200 MS File, 900 MS File

[56] References Cited

U.S. PATENT DOCUMENTS

| 4,277,826 | 7/1981 | Collins et al. | 364/200 |
|---|---|---|---|
| 4,513,367 | 4/1985 | Chan et al. | 395/425 |
| 4,733,352 | 3/1988 | Nakamura et al. | 395/425 |
| 4,802,085 | 1/1989 | Levy et al. | 395/375 |
| 4,811,215 | 3/1989 | Smith | 395/375 |
| 4,912,630 | 3/1990 | Cochcroft et al. | 395/425 |
| 4,926,317 | 5/1990 | Wallach et al. | 395/400 |
| 4,933,835 | 6/1990 | Sachs et al. | 395/425 |
| 4,939,641 | 7/1990 | Schwartz et al. | 395/425 |
| 5,003,465 | 3/1991 | Chisolm et al. | 395/275 |
| 5,029,072 | 7/1991 | Moyer et al. | 395/425 |

FOREIGN PATENT DOCUMENTS 0203601 3/1986 European Pat. Off. .

OTHER PUBLICATIONS

U.S. Pat. Appl. 07/006015, Shacham et al., "Maintaining Coherence Between a Microprocessor's Integrated Cache and External Memory". Jan. 1987.
National Semiconductor Corp., "NS32532-20/NS325-32-25/NS32332-30 High-Performance 32 Bit Microprocessor", Oct. 1987, pp. 1-91.
C. I. Serrano; Introducing the MC68020: Performance and Flexibility Improvement Through Redesigned Hardware and Software Enhancements; AFIPS Conference Proceedings, Ju. 1985, pp. 233-240.

Primary Examiner—Joseph L. Dixon
Assistant Examiner—Frank J. Asta
Attorney, Agent, or Firm—Limbach & Limbach

[57] ABSTRACT

A microprocessor architecture that includes capabilities for locking individual entries into its integrated instruction cache and data cache while leaving the remainder of the cache unlocked and available for use in capturing the microprocessor's dynamic locality of reference. The microprocessor also includes the capability for locking instruction cache entries without requiring that the instructions be executed during the locking process.

22 Claims, 3 Drawing Sheets

SELECTIVELY LOCKING MEMORY LOCATIONS WITHIN A MICROPROCESSOR'S ON-CHIP CACHE

This is a continuation of co-pending application Ser. No. 529,866 filed on May 29, 1990, now abandoned.

APPENDIX TO SPECIFICATION

This specification includes an Appendix A titled "Swordfish Microprocessor Architecture Specification, REvision 2.0, February 1990". Appendix A may be found at the end of the Detailed Description of the Invention section of this document. Appendix A is hereby incorporated by reference as an integral part of this patent specification.

BACKGROUND OF THE INVENTION

1. Field of the Invention

The present invention relates to microprocessor architectures and, in particular, to a method and apparatus for locking individual selected entries in integrated cache memory.

2. Discussion of the Prior Art

In a conventional single-chip microprocessor architecture, the central processing unit processes instructions and operands which it retrieves from main memory via an external interface bus. Because the central processing unit can execute its functions at a rate much faster than the rate at which the instructions and operands can be retrieved from external main memory, a small high-speed cache memory is often located on-chip between the central processing unit and main memory to minimize the time spent by the central processing unit waiting for instructions and data.

A cache memory is typically organized as a number of blocks of data or instruction information. Each cache block has an associated address tag that uniquely identifies the corresponding block of main memory of which it is a copy. Each time the central processing unit makes an external memory reference, an address tag comparison is made to determine whether the requested data or referenced instruction is stored in the integrated cache. If it is stored in the cache (a "hit"), then the information is provided to the processor from the cache. If it is not stored in the cache (a "miss"), then the information is retrieved from main memory for use by the processor and to replace a block presently stored in the cache in accordance with a replacement algorithm.

Cache memories may be organized into groups of smaller associative memories called sets, each set containing a number of storage locations, referred to as the set size. Thus, for a cache size m, divided into L sets, there are s=m/L storage locations in each set. When an address in main memory is mapped into the cache, it can appear in any of the L sets. For a cache of a given size, searching of the cache sets in parallel for a "hit" can improve access time by a factor of L.

In earlier microprocessor architectures, the cache, while located in the microprocessor's computing cluster, was not integrated on the same semiconductor "microchip" with the central processing unit. Presently available microprocessors utilize a cache memory which is integrated "on-chip" to provide the advantage of further reducing the time delay inherent in going "off-chip" for information. Integrated cache is essential for achieving top microprocessor performance.

An advanced microprocessor architecture that incorporates "on-chip" cache memory is the National Semiconductor Corporation 32-bit NS32532 microprocessor. The on-chip cache of the NS32532 device includes a 512-byte instruction cache and a separate 1024-byte data cache.

The instruction cache of the NS32532 microprocessor stores 512-bytes in a direct-map organization. That is, five-bits of a reference instruction's virtual address select 1 of 32 instruction cache sets. Each set contains 16-bytes of code and a log that holds address tags comprising the 23 most-significant bits of the physical address for the locations stored in that set.

The instruction cache of the NS32532 device also includes a 16-byte instruction buffer from which it can transfer 32-bits of code per cycle to the loader of the microprocessor's instruction pipeline. If the reference instruction is found in the instruction cache, then the instruction buffer is loaded directly from the selected instruction cache set. If the reference instruction is not found in the instruction cache, then the instruction cache transfers the virtual address of the reference to the memory management unit which translates the virtual address to a corresponding physical address for a bus interface unit. The bus interface unit then initiates a read cycle to load the reference instruction from main memory via the external bus. The pipeline's instruction buffer is then written to one of the sets of the instruction cache in accordance with the replacement algorithm.

The data cache of the NS32532 device stores 1024-bytes of data in a two-way set associative organization. That is, each set of the data cache includes two entries containing 16-bytes and two address tags that hold the 23 most-significant bits of the physical address for locations stored in the two entries. Five-bits of the virtual address of the reference are used to select the appropriate set within the data cache from which to read the two entries. Simultaneously, the integrated memory management unit of the NS32532 device is translating the virtual address and transferring the resultant physical address to the data cache and to the bus interface unit. The data cache compares the two address tags with the physical address while the bus interface unit initiates an external bus cycle to read the data from main memory. If the cache reference is a hit, then the selected data is aligned by the data cache and transferred to the execution unit while the bus interface unit cancels the external bus cycle. If the cache reference is a miss, then the bus interface unit completes the external bus cycle and transfers data from main memory to the execution unit and to the data cache, which updates its cache entry in accordance with its replacement algorithm.

Both the instruction cache and the data cache of the NS32532 microprocessor support an operating mode to lock their contents. This feature can be used in real-time systems to allow faster on-chip access to the most critical subroutines and data.

While providing a highly desirable cache locking feature, the NS32532 microprocessor requires locking of the entire cache contents. In many applications, however, only a portion of the cache is required to store time-critical code and data. Consequently, it is inefficient to require that the entire cache be locked.

SUMMARY OF THE INVENTION

The present invention provides a microprocessor architecture that includes capabilities for locking individual entries of its integrated instruction cache and data cache while leaving the remainder of the cache unlocked and available for use in capturing the microprocessor's dynamic locality of reference. The microprocessor also includes the capability for locking instruction cache entries without requiring that the instructions be executed during the locking process.

Other features and advantages of the present invention will be appreciated by reference to the detailed description of the invention provided below, which should be considered in conjunction with the accompanying drawings.

DETAILED DESCRIPTION OF THE INVENTION

Figure 1:
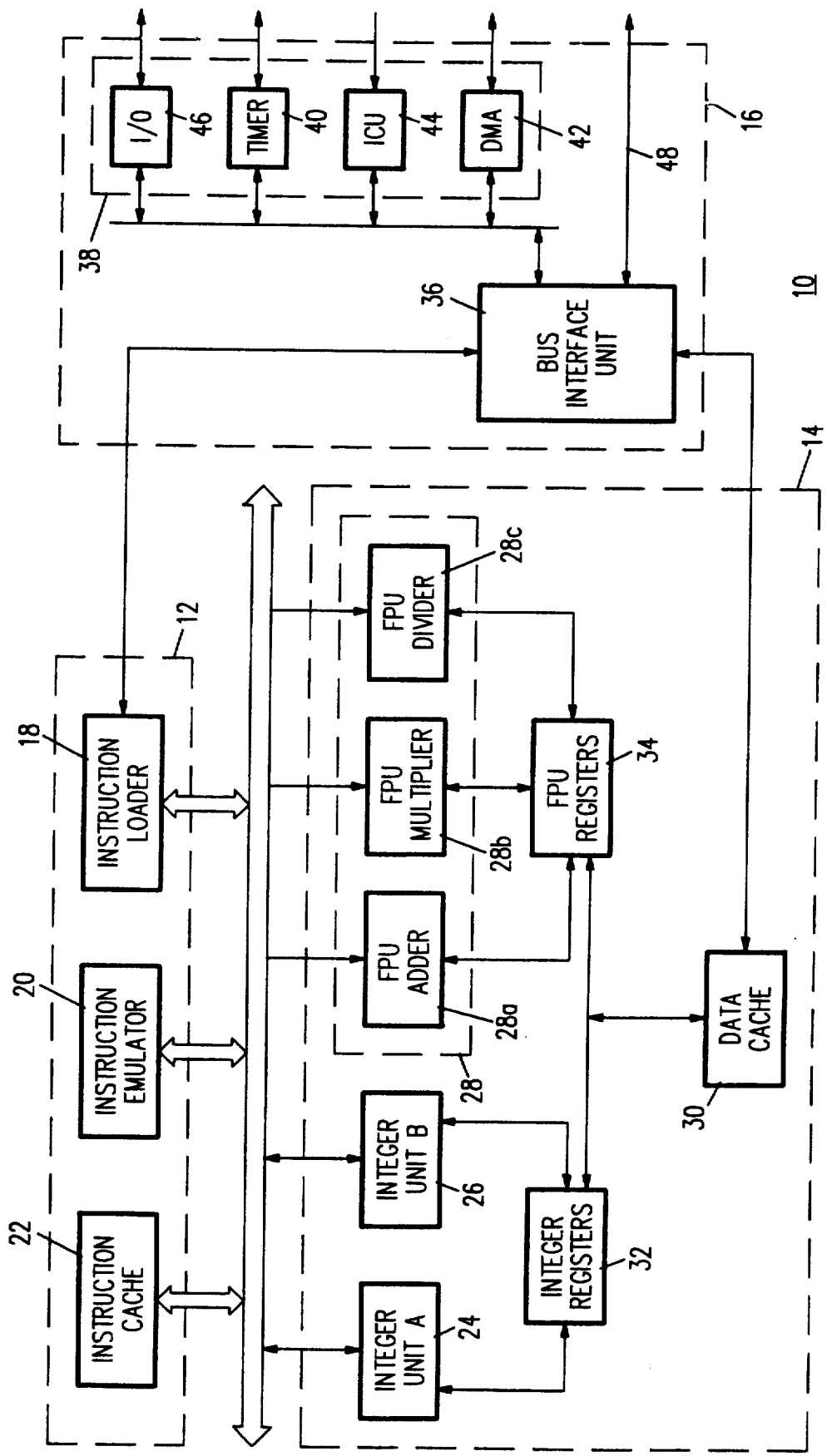
FIG. 1 is a block diagram illustrating a microprocessor architecture that incorporates the concepts of the present invention.

FIG. 1 shows the architecture of a microprocessor 10 that includes multiple, pipelined functional units capable of executing two instructions in parallel.

The microprocessor 10 includes three main sections: an instruction processor 12, an execution processor 14 and a bus interface processor 16.

The instruction processor 12 includes three modules: an instruction loader 18, an instruction emulator 20 and an instruction cache 22. These modules load instructions from the external system through the bus interface processor 16, store the instructions in the instruction cache 22 and provide pairs of instructions to the execution processor 14 for execution.

The execution processor 14 includes two 4-stage pipelined integer execution units 24 and 26, a double-precision 5-stage pipelined floating point execution unit 28, and a 1024 byte data cache 30. A set of integer registers 32 services the two integer units 24 and 26; similarly, a set of floating point registers 34 services the floating point execution unit 28.

The bus interface processor 16 includes a bus interface unit 36 and a number of system modules 38. The bus interface unit 36 controls the bus accesses requested by both the instruction processor 12 and the execution processor 14. In the illustrated embodiment, the system modules 38 include a timer 40, a direct memory access (DMA) controller 42, an interrupt control unit (ICU) 44 and I/O buffers 46.

The instruction loader 18 partially decodes instructions retrieved from main memory and places the partially decoded instructions in the instruction cache 22. That is, the instruction loader 18 translates an instruction stored in main memory (not shown) into the partially decoded format of the instruction cache 22. The instruction loader 18 is also responsible for checking whether any dependencies exist between consecutive instructions that are paired in a single instruction cache entry.

The instruction cache 22 contains 512 entries for partially decoded instructions.

Each entry in the instruction cache 22 contains either one or two instructions stored in a partially decoded format for efficient control of the various functional units of the microprocessor 10.

Each entry in instruction cache 22 also contains auxiliary information that indicates whether the two instructions stored in that entry are independent, so that they can be executed in parallel, or dependent, so that they must be executed sequentially Further information relating to the architecture of microprocessor 10 and its partially decoded instruction cache is provided in commonly-assigned and copending application Ser. No. 07/529,869, filed by Alpert et al. on the same date as this application and titled PARTIALLY DECODED INSTRUCTION CACHE; the just-referenced application Ser. No. 07/529,869, is hereby incorporated by reference to provide further background information regarding the present invention.

The instruction emulator 20 executes special instructions defined in the instruction set of the microprocessor 10. When the instruction loader 18 encounters such an instruction, it transfers control to the emulator 20. The emulator is responsible for generating a sequence of core instructions that perform the function of a single complex instruction. In this regard, the emulator 20 provides ROM-resident microcode. The emulator 20 also controls exception processing and self-test operations.

The two 4-stage integer pipelines 24 and 26 perform basic arithmetic/logical operations and data memory references. Each integer pipeline 24,26 can execute instructions at a throughput of one instruction per system clock cycle.

The floating point execution unit 28 includes three sub-units that perform single-precision and double-precision operations. An FPU adder sub-unit 28a is responsible for add and convert operations, a second sub-unit 28b is responsible for multiply operations and a third sub-unit 28c is responsible for divide operations.

When add and multiply operations are alternately executed, the floating point execution unit 28 can execute instructions at a throughput of one instruction per system clock cycle.

Memory references for the floating point execution unit 28 are controlled by one of the integer pipelines 24,26 and can be performed in parallel to floating-point operations.

Data memory references are performed using the 1-Kbyte data cache 30. The data cache 30 provides fast on-chip access to frequently used data. In the event that referenced data are not located in the data cache 30, then off-chip references are performed by the bus interface unit (BIU) 36 using the pipelined system bus 48.

The data cache 30 employs a load scheduling technique so that it does not necessarily stall on misses. This means that the two execution pipelines 24,26 can continue processing instructions and initiating additional memory references while data is being read from main memory.

The bus interface unit 36 can receive requests for main memory accesses from either the instruction processor 12 or the execution processor 14. These requests are sent to the external pipelined bus 48. The external bus can be programmed to operate at half the frequency of the microprocessor 10; this allows for a simple instruction interface at a relatively low frequency while the microprocessor 10 executes a pair of instructions at full rate.

The instruction set of the microprocessor 10 is partitioned into a core part and a non-core part. The core part of the instruction set consists of performance critical instructions and addressing modes, together with some special-function instructions for essential system operations. The non-core part consists of the remainder of the instruction set. Performance critical instructions and addressing modes were selected based on an analysis and evaluation of the operating system (UNIX in this case) workload and various engineering, scientific and embedded controller applications. These instructions are executed directly as part of the RISC architecture of microprocessor 10.

More detailed information regarding both architecture of the microprocessor 10 and its instruction set is provided in Appendix A at the end of this Detailed Description of the Invention.

Many systems, like laser-beam printers digital signal processors, can deliver high performance with relatively slow external memory by scheduling memory loads in advance of processing the information. Thus, in accordance with the present invention, and as described in greater detail below, selected individual entries of each of the Data Cache 30 and Instruction Cache 22 can be locked on-chip for fast access to critical locations in real-time applications.

These locking features are implemented through the Configuration Register (CFG) that is included in the internal register file of microprocessor 10.

The microprocessor 10 includes seventy-five internal registers grouped in internal register file according to functions as follows: thirty-two general-purpose registers, thirty-two single-precision floating-point data registers, three dedicated address registers, one Processor Status Register (PSR), one Configuration Register (CFG), one Floating-Point Status Register (FSR), and six debug registers. The Configuration Register (CFG) is used to enable or disable various operating modes of the microprocessor 10, including the locking of selective entries in the Data Cache 28 and Instruction Cache 32. The format of the Configuration Register (CFG) is as follows:

| 31       | 9 7 | 6   | 5   | 4  | 3   | 2  | 1 | 0 |
|----------|-----|-----|-----|----|-----|----|---|---|
| Reserved | PS  | ISR | LIC | IC | LDC | DC | O | F |

The various control bits of the Configuration Register (CFG) are described below:

F : Floating-Point Instruction Set. This bit enables the execution of floating point instructions.

DC : Data Cache Enable. This bit enables the Data Cache 30 to be accessed for data reads and writes.

LDC : Lock Data Cache. This bit controls whether a missing line that is placed in the Data Cache 30 will be locked into the cache. Locked lines are not subject to replacement from the Data Cache 30.

IC : Instruction Cache Enable. This bit enables the Instruction Cache 22 to be accessed for instruction fetches.

LIC : Lock Instruction Cache. This bit controls whether a missing instruction that is placed in the Instruction Cache 22 will be locked into the cache. Locked lines are not subject to replacement from the Instruction Cache 22.

ISR : Interrupt Service Registers. While this bit is 1, access to specific general-purpose registers is restricted and a trap occurs when an attempt is made to access these registers in user-mode.

PS : This field specifies the page size used for the PAGE mechanism of microprocessor 10.

At Reset, Configuration Register bits 0 through 9 are cleared to 0.

Figure 2:
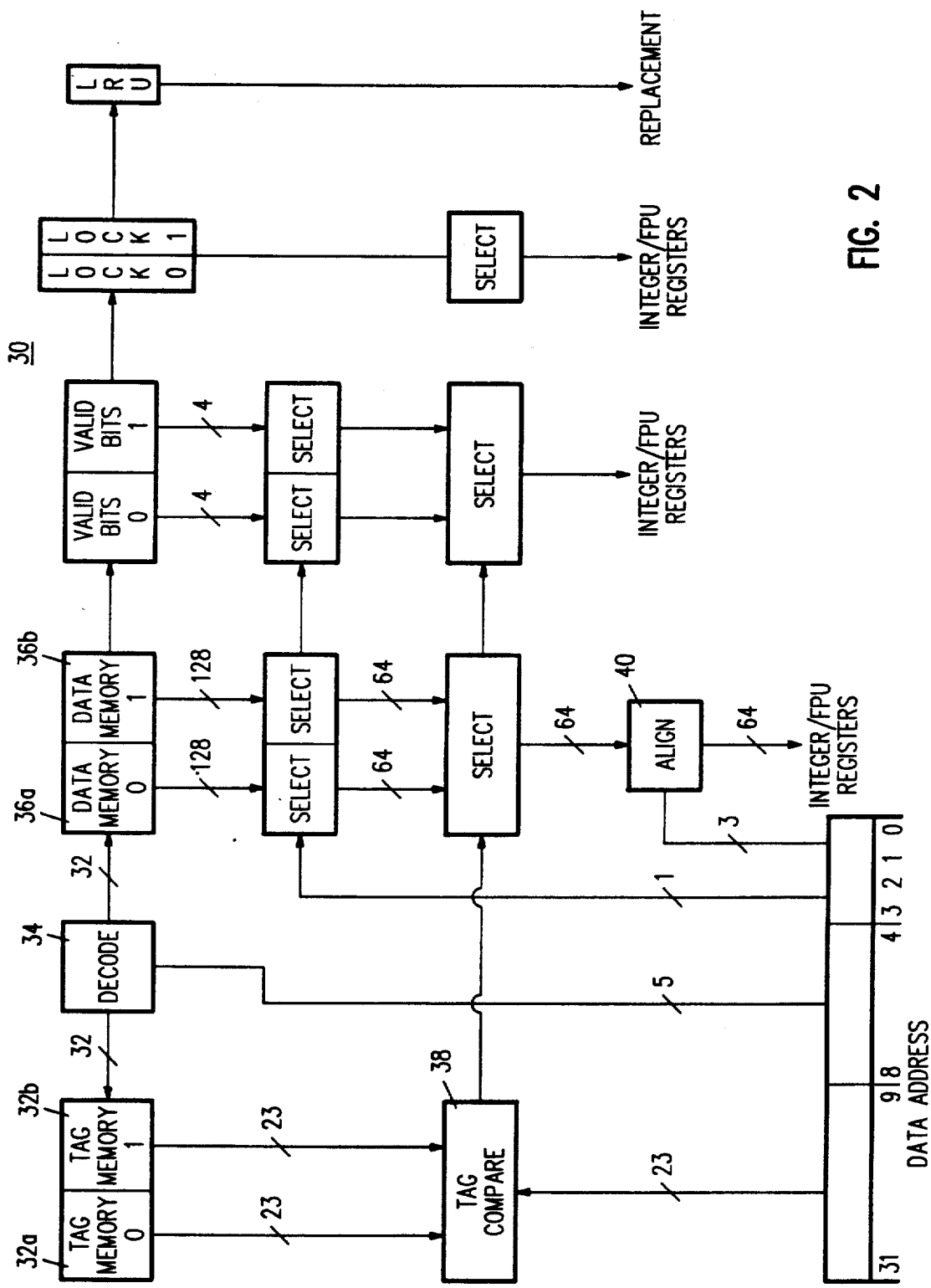
FIG. 2 is a block diagram illustrating the structure of a data utilizable in the FIG. 1 architecture.

FIG. 2 shows one possible embodiment of Data Cache 30. The 1-Kbyte Data Cache 30 utilizes a 2-way, set-associative organization with 64 lines. ("2-way, set associative" means that for each memory address there are two lines in the cache where the address can be placed. The two lines are collectively called a "set".) Each line contains a 23-bit tag 32a, 32b which holds the most-significant bits of the address of the data stored in the line, along with four double-words of data, four validity bits, and a lock-bit. (There is one validity bit for each double-word of data.) For each set there is an additional bit that indicates which line has been more recently used for purposes of implementing least-recently-used (LRU) replacement.

The Data Cache 30 is enabled for a data read if all of the following are true: bit CFG.DC of the Configuration Register is 1; the reference is not to read the semaphore while executing an MBITI instruction; and the reference (See Appendix) is neither Interrupt-Acknowledge nor End-of-Interrupt bus cycle.

If the Data Cache 30 is disabled, then the data read bypasses the Data Cache 30 and the contents of the Data Cache 30 are unaffected; the data is read directly from external memory. The data is then aligned and used to execute the instruction.

If the Data Cache 30 is enabled for a data read, then address bits 4–8, as shown in FIG. 2, of the data address are decoded by decoder 34, to select the set, either data memory 0 (36a) or data memory 1 (36b), where the data may be stored. The two lines of the selected set are read and both tags are compared by tag compare module 38 with the 23 most-significant bits of the data's physical address. As further shown in FIG. 2, either a double-word or quad-word is read from the cache, depending on the operand's length. For a double-word reference, bits 2 and 3 of the data's address select the double-word (64 bit) and the corresponding validity bit from each line of the selected set. For a quad-word (128 bit) reference, two double-words and their corresponding validity bits are accessed. If a tag in one of the lines matches and the selected double-word(s) of that line is valid, then the data is aligned by align module 40 and used to execute the instruction. Otherwise, the missing data is read from external memory, as explained above.

If the referenced data is missing from Data Cache 30 and the contents of both lines in the selected set are locked to fixed locations and neither tag matches the referenced data's address, then the handling of the reference is identical to that described above for the case when the Data Cache 30 is disabled.

If the referenced data is missing from the Data Cache 30 and either one of the tags in the selected set matches the data's address or at least one of the lines is not locked, the following actions are taken. First, if the tag of either line in the set matches the data's address, then that line is selected for updating. If neither tag matches and one of the lines is locked, then the unlocked line is selected for replacement. If neither tag matches and both lines are unlocked, then the less recently used (LVR) line is selected for replacement. Then, regardless of whether the selected line is replaced or merely updated, the missing data is read from external memory. Either a double-word or quad-word is read depending on the length of the operand and the bus width. After being read from memory, the missing data is aligned and used to execute the instruction.

If the Cache Inhibit Input (CIIN) (See Appendix A) to microprocessor 10 is not asserted (low) during the bus cycle to read the missing data and the access was not to one of the registers of the on-chip peripherals, and the access was not initiated by a LOADNi, LOADNf or LOADNuf instruction (See Appendix A), then the Data Cache is updated as follows. If the tag in the line matched the data's address at the time the miss was detected, then the double-word or quad-word read from the system bus is written to the Data Cache 30 and the corresponding validity bits are set. If the tag in the line did not match the data's address at the time the miss was detected, then the tag of the line selected for replacement is loaded with the 23 most significant bits of the data's address, the line becomes locked if bit CFG.LDC of the Configuration Register is 1, the double-word or quad-word read from the system bus is written to the Data Cache 30, the corresponding validity bits are set, and the remaining validity bits are cleared.

The Data Cache 30 is enabled for a data write whenever bit CFG.DC of the Configuration Register is 1, including references for MBITI instructions. Address bits 4-8 of the data address are decoded to select the Data Cache 30 set where the data may be stored. The two lines of the selected set are read and both tags are compared with the 23 most-significant bits of the data's physical address. Either a double-word or quad-word can be written, word reference, bits 2 and 3 of the data's address select the double-word and the corresponding validity bit from each line of the selected set. For a quad-word reference, two double-words and their corresponding validity bits are accessed. If a tag in one of the lines matches and the selected double-word(s) of that line is valid, then the data is aligned and used to update the double-word(s) in the Data Cache 30. If one of the double-words for the quad-word reference is valid but the other is not, then only the valid double-word is updated. If the data is not located in the Data Cache 30, then its contents are unaffected. The data is always written through to external memory.

The contents of the Data Cache 30 can be invalidated by either software or hardware.

The Data Cache 30 is invalidated by software as follows: The entire Data Cache contents, including locked lines, are invalidated while bit CFG.DC of the Configuration Register is 0. The LRU selection bit for each Data Cache set is also initialized to 0 while bit CFG.DC is 0. The CINV instruction (See Appendix A) can be executed to invalidate the entire Data Cache contents of Data Cache 30. Executing CINV invalidates either the entire cache or only unlocked lines, according to the instruction's U-option.

The Data Cache 30 is invalidated in hardware as follows: The entire Data Cache contents, including locked lines, are invalidated when the Invalidate Data Cache input (INVDC) (See Appendix A) is asserted while the Invalidate Block input (INVBLK) (See Appendix A) is high. When INVDC is asserted while INVBLK is low, the microprocessor 10 reads an address from the Address Bus and searches to determine whether a copy of the 16-byte block specified by the address is found in one line of the Data Cache 30. If the search is successful, then the line is invalidated regardless of whether it is locked. Invalidation of a single block can only be performed when the microprocessor 10 has relinquished its Address Bus in response to a Hold Request input (HOLD) (See Appendix A) or an extended bus retry.

When a locked line is invalidated it also becomes unlocked.

Depending on the system configuration, either of two techniques for maintaining coherence between the Data Cache 30 and external memory may be implemented.

Whenever a location in memory is modified by a bus master other than microprocessor 10 itself, the address can be presented to the microprocessor 10 along with a request to invalidate the 16-byte block. For example, this technique is appropriate for a single-processor system with a low-rate of I/O transfers to memory.

Systems that use an external cache memory can maintain coherence between the on-chip Data Cache 30 and the external cache by requiring that the contents of the Data Cache 30 are always a subset of the external cache. The system can then freely employ any technique to maintain coherence between the external cache and main memory. To enforce the requirement that the Data Cache 30 contains only lines that are also in the external cache, it is necessary for external hardware to request that the microprocessor 10 invalidate a block whenever the status of that block changes in the external cache. For example, an external Cache Control Unit can implement this requirement by invalidating one or more blocks (depending on the line size of the external cache) whenever a line in the external cache is replaced, invalidated, or updated.

Figure 3:
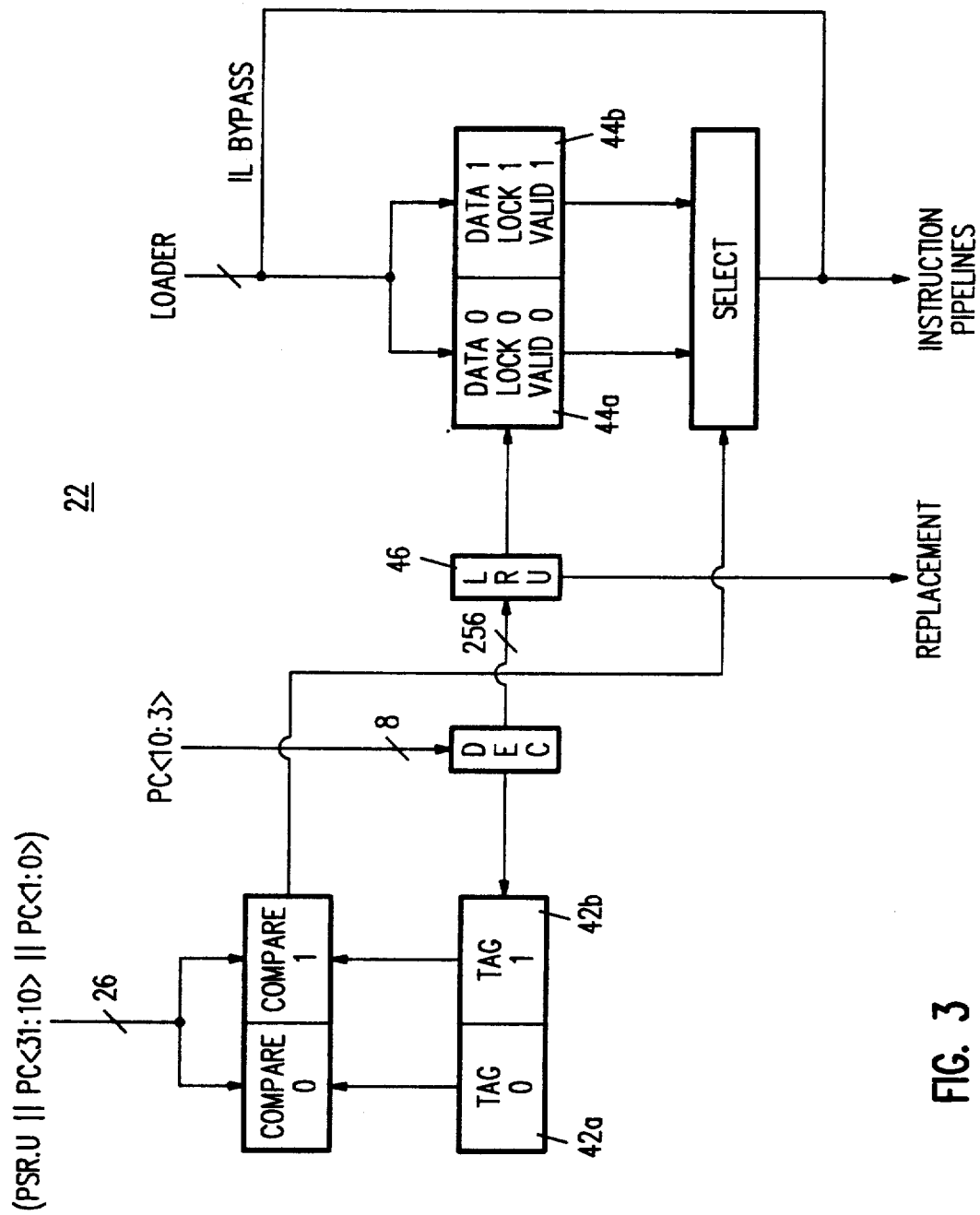
FIG. 3 is a block diagram illustrating the structure of an instruction cache utilizable in the FIG. 1 architecture.

FIG. 3 shows the structure of the Instruction Cache 22. The Instruction Cache 22 utilizes a 2-way, set-associative organization with 512 entries for partially decoded instructions. ("2-way, set associative" means that for each memory address there are two entries in the Instruction Cache 2 where the instruction located at that address can be placed. The two entries are called a set.) Each entry contains one or two partially-decoded instructions that are represented with fixed fields for opcode, source and destination register numbers, and immediate values. The entry also includes auxiliary information used to control the sequence of instruction execution, including a bit to indicate whether the entry contains two consecutive instructions that can be executed in parallel, another bit to indicate whether the entry is for a complex instruction that is emulated, and additional information representing the length of the instruction(s) in a form that allows fast calculation of the next instruction's address.

Associated with each entry in the Instruction Cache 22 is a 24-bit tag 42a, 42b which holds PSR.U (See Appendix A) along with the 22 most-significant bits and bit 2 of the address of the instruction stored in the entry. (Note that address bit 10 of the instruction stored in the tag is only significant when operating with half the Instruction Cache 22). In the event that two consecutive instructions are paired in an entry, the tag corresponds to the instruction at the lower address. Along with the tag are 2 bits 44a, 44b that indicate whether the entry is valid and whether it is locked. For each set there is an additional bit 46 that indicates which entry has been most recently used for purposes of Least-Recently-Used (LRU) replacement.

The Instruction Cache 22 is enabled for an instruction fetch if bit CFG.IC of the Configuration Register is 1.

If the Instruction Cache 22 is disabled, then the instruction fetch bypasses the Instruction Cache 22 and the contents of the Instruction Cache 22 are unaffected. The instruction is read directly from external memory, partially decoded by the Loader 18 to form an entry (which may contain two partially decoded instructions), and transferred to the execution pipelines.

If the Instruction Cache 22 is enabled for an instruction fetch, then the address bits 3-10 of the instruction's address are decoded to select the set of lines where the instruction may be stored. The selected set of two entries is read and the associated tags 42a, 42b are compared with PSR.U along with the 22 most-significant bits and bit 2 of the instruction address. If one tag matches and the matching entry is valid, then the entry is transferred to the instruction pipelines for execution. Otherwise, the missing instruction is read directly from external memory and partially decoded.

If the referenced instruction is missing from the Instruction Cache 22 and the contents of the selected set are all locked, then the handling of the reference is identical to that described above for the case when the Instruction Cache 22 is disabled.

If the referenced instruction is missing from the Instruction Cache 22 and at least one of the entries in the selected set is not locked, then the following actions are taken. One of the entries is selected for replacement. Otherwise, entries are unlocked, then the least recently used entry is selected for replacement. The missing instruction is then read directly from external memory and partially decoded by Loader 18 to form an entry (that may contain two partially decoded instructions) which is transferred to the instruction pipelines for execution. If CIIN is not asserted (low) during the bus cycles to read the missing instruction, then the partially decoded instruction is also written into the Instruction Cache entry selected for replacement, the associated valid bit is set, and the entry is locked if bit CFG.LIC in the Configuration Register is 1. If CIIN is asserted (high) during the bus cycle to read the missing instruction, then the contents of the entry for replacement is unaffected.

After the microprocessor 10 has completed fetching a missing instruction from external memory, it continues prefetching sequential instructions. For subsequent sequential instruction fetches, the microprocessor 10 searches the Instruction Cache 22 to determine whether the instruction is located on-chip. If the search is successful or a non-sequential instruction fetch occurs, the microprocessor 10 ceases prefetching. Otherwise, the prefetched instructions are rapidly available to decode and execute. The microprocessor 10 initiates instruction prefetches only during bus cycles that would otherwise be idle because no off-chip data references are required.

It is possible to fetch an instruction and lock it into the Instruction Cache 22 without having to execute the instruction. This can be accomplished by enabling a Debug Trap (DBG) (See Appendix A) for a Program Counter value that matches two instruction's address. The instruction will be fetched and placed onto the Instruction Cache 22 before the trap is processed. If the instruction can be paired with the following instruction, then the entry containing the pair of instructions becomes locked in the Instruction Cache 22.

If an entry contains a pair of instructions, then the tag corresponds to the address of the first instruction (the one at the lower address). If a non-sequential fetch is made to the second instruction, then that instruction will not be found in the paired entry. That instruction can, however, be located in another entry that has a tag corresponding to that instruction's address.

The contents of the Instruction Cache 22 can be invalidated by software or hardware.

The Instruction Cache 22 is invalidated by software as follows: The entire Instruction Cache contents, including locked entries, are invalidated while bit CFG.IC of the Configuration Register is 0. The LRU selection bit is also initialized to 0 while bit CFG.IC is 0. The CINV instruction can be executed to invalidate the entire Instruction Cache contents. Executing CINV invalidates either the entire cache or only unlocked lines according the instruction's Y-option.

The entire Instruction Cache 22 is invalidated in hardware by asserting (low) the $\overline{INVIC}$ input signal.

When a locked entry is invalidated, it also becomes unlocked.

It should be understood that various alternatives to the embodiments of the invention described herein may be employed in practicing the invention. For example, some microprocessor architectures include an integrated translation lookaside buffer that provides direct virtual to physical address mapping for recently used external memory references; the selective locking concepts of the present invention would be applicable to this type of internal storage element. Thus, it is intended that the following claims define the scope of the invention and that structures and methods within the scope of these claims and their equivalents be covered thereby. Appendix A, a copy of which is enclosed herewith.

Inventors: Donald B. Alpert et al.

Title: SELECTIVELY LOCKING MEMORY LOCATIONS WITHIN A MICROPROCESSOR'S ON-CHIP CACHE

APPENDIX A

U.S. Appl. Serial No. 07/529,866

SWORDFISH MICROPROCESSOR ARCHITECTURE SPECIFICATION

Revision 2.0
February 1990

National Semiconductor Corporation

SWORDFISH ARCHITECTURE SPECIFICATION          Rev. 2.0, February 1990

PREFACE

This document specifies the architecture of the Swordfish Microprocessor, a high end in National Semiconductor Corporation's 32000/EP™ family. The purpose of this specification is to define the CPU's programming model and system interface for use by NSC system programmers, application programmers, system hardware designers, and the microprocessor's circuit designers. This document will also be released to selected customers in a controlled distribution. The scope of the specification does not include a detailed description of the engineering design, although an overview of the design's internal organization is presented in an appendix that explains performance evaluation.

The reader is referred to two documents that supplement this specification to completely define the functionality and electrical characteristics of the Swordfish. The full definition of instructions and addressing modes (described also in "Instruction Set and Data Types" in Chapter 4) can be found in *Swordfish Instruction Set Reference Manual*. The *Swordfish Device Specification Book* specifies the CPU's packaging and electrical characteristics.

This revision is issued before the end of the design cycle, and might be changed without notice.

---

[1] 32000/EP is a registered trademark of National Semiconductor Corporation.

SWORDFISH ARCHITECTURE SPECIFICATION    Rev. 2.0, February 1990

1. INTRODUCTION

1.1 GENERAL DESCRIPTION

The Swordfish is an advanced 64-bit Microprocessor that provides the performance and simplicity of a Superscalar computer along with programming model compatibility to other members of National Semiconductor Corporation's 32000/EP™ family. The microprocessor's outstanding performance results from the implementation of a pipelined and parallel architecture with state of the art VLSI CMOS technology. More than 1,000,000 transistors are integrated to incorporate pipelined Integer and Floating-Point units, an Instruction Cache, a Data Cache, a Clock Generator, an Interrupt Control Unit, a Direct Memory Access (DMA) unit, a Timer/Counter and an advanced Bus Interface Unit.

At 25 MHz bus frequency (50 MHz internal frequency), the Swordfish delivers a peak performance of 100 Million Instructions Per Second (MIPS) and 50 Million Double Precision Floating-Point Operations Per Second (MFLOPS). The Swordfish supports a peak execution speed of two instructions each internal cycle, incorporating an Instruction Cache, a Data Cache, and a 200 MByte/Sec pipelined system bus. In addition, the system bus provides optimal support for applications that span a broad range from cost-sensitive real-time controllers to highly sophisticated multiprocessing systems.

BLOCK DIAGRAM

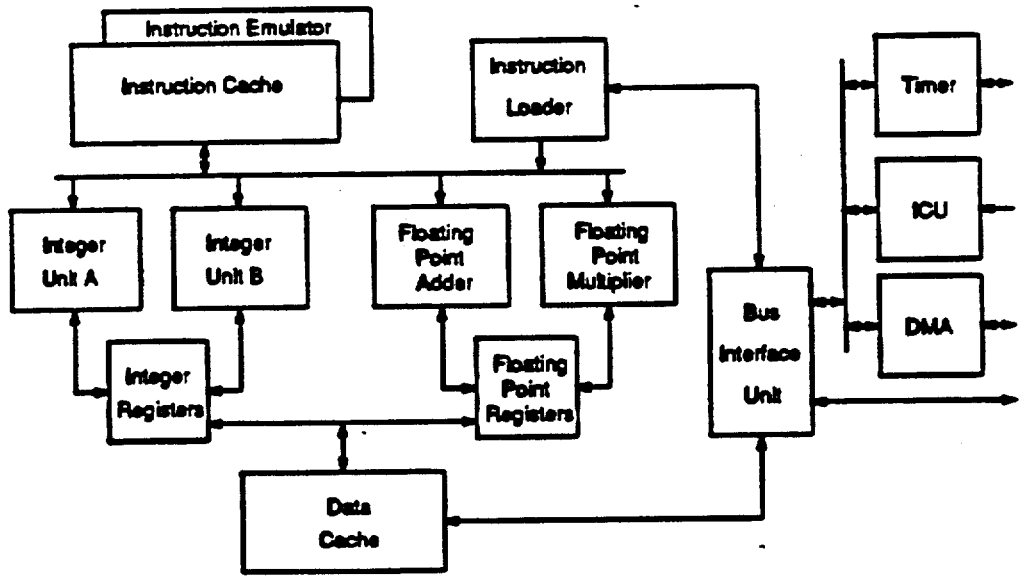

SWORDFISH ARCHITECTURE SPECIFICATION        Rev. 2.0, February 1990

FEATURES

- Superscalar performance
- Software compatibility with the NSC 32000/EP family
- 4-GByte uniform address space
- Two 4-stage pipelined Integer Units
- On-chip double-precision 5-stage pipelined Floating-Point unit
- Parallel instruction execution
- On-chip Decoded Instruction Cache for 1024 instructions (4Kbyte capacity)
- On-chip Data Cache for 1024 bytes
- On-chip 15-level Interrupt Control Unit
- On-chip 2 channel Direct Memory Access (DMA) controller
- On-chip Timer/Counter Unit
- High-performance bus
  - 32-bit address bus
  - 64-bit data bus with dynamic sizing to 8, 16 and 32 bits
  - Pipelined or sequential address/data transfers
  - Optional support for 2-way interleaved memory
  - Full or half frequency bus clocking
  - Support for page-mode and static-column DRAM
- Ideal for computation-intensive embedded control applications
- External cache support
- Multiprocessing support
- Built-in self-test
- Shadow-mode operation for fault-detection
- Supports In-System Emulation and software debugging

1.2 SWORDFISH ARCHITECTURE

The Swordfish architecture has been defined to obtain the highest performance from Very-Large-Scale Integration (VLSI), pipelining, cache memory, and optimizing compilers. The architecture combines the advantages of Superscalar performance along with software compatibility to other members of National Semiconductor Corporation's 32000/EP family. These apparently conflicting goals have been accomplished by carefully analyzing the complete 32000/EP instruction set and partitioning it into two classes. The first class includes those instructions that are used frequently by an optimizing compiler and can be implemented efficiently in a simple, hardwired pipeline. These instructions form the "Core" of the 32000/EP architecture. The remainder of the instructions can be emulated using sequences of Core instructions. Additionally, the Core was thoroughly analyzed to determine whether a variety of extensions to the architecture would benefit performance. The Swordfish instruction set is completely defined in SWORDFISH ARCHITECTURE SPECIFICATION          Rev. 2.0, February 1990

"Instruction Set and Data Types" in Chapter 4.

1.3 SWORDFISH MICROARCHITECTURE

The Swordfish microarchitecture includes multiple pipelined functional units that are capable of executing two instructions in parallel. The internal organization of the Swordfish is explained more fully in "Performance Evaluation" in Appendix C. A brief overview of the microarchitecture is presented below. See "General Description" in Section 1.1 for a block diagram.

The Swordfish has three main parts: Instruction Processor, Execution Processor, and a Bus Interface Processor. The Instruction Processor consists of three blocks: Instruction Loader, Instruction Emulator and an Instruction Cache. These modules load instructions from the external system through the Bus Interface Processor, store the instructions in an Instruction Cache, and provide pairs of instructions to the Execution Processor for execution. The Execution Processor consists of two 4-stage pipelined integer execution units, a double-precision 5-stage pipelined Floating-Point execution unit, and a 1024 bytes Data Cache. The Bus Interface Processor consists of a Bus Interface Unit and System Modules. The Bus Interface Unit controls the bus accesses requested by both the Instruction Processor and the Execution Units. The System Modules are Timer, DMA controller, ICU and I/O buffers.

Instructions are decoded and placed in the IC by an Instruction Loader unit. The Loader translates the instructions stored in memory into the decoded format of the IC. The Loader is also responsible for checking whether any dependencies exist between consecutive instructions that are paired in a single IC entry.

The on-chip Instruction Cache (IC) contains 512 entries for decoded instructions. Each entry contains either one or two instructions stored in a simple format for efficient control of the various functional units. Selected entries of the IC can be locked on-chip for fast access to critical locations in real-time applications.

An Emulation Unit executes some of the special instructions defined in the Swordfish instruction set. When the Loader encounters such an instruction it transfers control to the Emulator. The Emulator is responsible for generating a sequence of Core instructions that perform the function of the single complex instruction. In this regard, the Emulator is a ROM resident code. The Emulator additionally controls exception processing and self-test operations.

Two 4-stage integer pipelines perform basic arithmetic/logical operations and data memory references. Each pipeline can execute instructions at a throughput of 1 per clock cycle, resulting in a peak performance of 100 MIPS (million instructions per second) at 50 MHz.

The Floating-Point Unit (FPU) is composed of three sub-units that perform single-precision and double-precision operations. One sub-unit is responsible for Add and Convert operations, a second sub-unit is responsible for Multiply operations, and a third sub-unit is responsible for Divide operations. The data paths within the FPU and between the FPU and memory are 64 bits wide. When Add and Multiply operations are alternately executed, the FPU can execute instructions at a throughput of 1 per clock cycle, resulting in a peak performance of 50 MFLOPS (millions of single-precision or double-precision Floating-Point operations per second) at 50 MHz. Memory references for the FPU are controlled by one of the integer pipelines, and can be performed in parallel to Floating-Point operations. Consequently, the Swordfish can deliver low-cost, vector-processor performance in computation-intensive engineering, scientific, and embedded-control applications.

SWORDFISH ARCHITECTURE SPECIFICATION  Rev. 2.0, February 1990

Data memory references are performed using a 1-KByte on-chip Data Cache (DC). The DC provides fast on-chip access to frequently used data. In the event that data are not located in the DC, off-chip references are performed by the Bus Interface Unit (BIU) using the pipelined system bus. The DC employs a load-scheduling technique (also called "scoreboarding") so that it does not necessarily stall on misses. This means that the pipelines can continue processing instructions and initiating additional memory references while data is being read from off-chip memory. The pipeline implements scoreboarding techniques to detect when the source operand for an instruction has not yet been loaded from memory. Many applications, like laser-beam printers and signal processors, can deliver high performance with relatively slow external memory by scheduling memory loads in advance of processing the data. Selected entries of the DC can be locked on-chip for fast access to critical locations in real-time applications.

The Bus Interface Unit receives requests for memory accesses from the Instruction Processor and the Execution Unit. These requests are sent to the external 64-bit pipelined bus. The external bus can be programmed to operate at half the frequency of the Swordfish. This allows for a simple interface at a relatively low frequency (25 MHz) while the Swordfish executes pairs of instructions at the full rate of 50 MHz.

The On-Chip two channel DMA controller supports two types of DMA cycles: FlyBy, and memory to memory. Each of these cycles can be performed while in Single Transfer, Double Buffer or Auto-Initialize operation modes. The Interrupt Control Unit manages 15 levels of vectored interrupts. Maskable interrupts are encoded as 4-bit priority levels. The On-Chip Timer supports three modes of operations: PWM, External Event Counter and Input Capture modes.

The Swordfish supports a variety of debugging and self test features. It has three programmable hardware breakpoints for instruction and data, and an on-chip counter that provides support for performance analysis. The Swordfish provides a special mode of operation for ISE equipment to trace the sequence of instruction execution. Another feature provided for ISE systems, is a serial-link to unload and reload all its registers. The main self test features are support for fault detection through a Shadow mode, internal self test upon reset, and bus self test.

The capabilities of the powerful Swordfish microarchitecture are exploited by a highly optimizing compiler. The compiler selects instructions and places them in sequence to minimize pipeline delays and to maximize parallel execution. Refer to "Performance Evaluation" in Appendix C for additional information on Swordfish internal organization and its effect on instruction execution timing.

1.4 EMBEDDED CONTROL APPLICATIONS

The Swordfish is designed to deliver the full performance of its multiple pipelined functional units to computation-intensive control applications, such as laser-beam printers, 3-dimensional graphic terminals, and communication protocol processors. The microprocessor also supports a variety of features that serve to save system cost in such embedded control applications.

The on-chip Instruction and Data Caches provide the microprocessor with up to 2 instruction fetches and 1 data reference per clock cycle at 50 MHz without placing any demand on the external memory. The microprocessor's caches can optionally be locked to store the most critical code and data, thereby serving as fixed on-chip memory.

For data structures that are too large to fit effectively on-chip, the Swordfish allows references on its pipelined bus to overlap with instruction execution. Use of the load scheduling can be combined with the microprocessor's support for interleaved memories and page-mode access to construct high-

SWORDFISH ARCHITECTURE SPECIFICATION  Rev. 2.0, February 1990 performance, high-bandwidth memory systems from relatively low-cost memory components.

The Swordfish is designed specifically to interface easily to inexpensive storage devices. Wait states have a limited effect on Swordfish performance because of its caches. Special signals allow easy interface to Static Column or Page Mode DRAM devices to achieve fast access time at a low system cost. The dynamic bus sizing enables the use of 8, 16 and 32 bit devices on the 64 bit bus of the Swordfish without the need for special hardware.

1.5 MULTIPROCESSING AND PARALLEL PROCESSING

The Swordfish is an ideal microprocessor for multiprocessing and parallel processing systems. In such systems, several microprocessors refer to a common shared memory either to execute several independent tasks (Multiprocessing) or to execute concurrently threads of a single task (Parallel Processing). One of the biggest challenges in designing such systems is to present a coherent view of the shared memory to all the processors, while providing each microprocessor with its necessary memory bandwidth. Both on-chip and external caches can be used to supply the memory bandwidth to each microprocessor, but the microprocessor must have hardware facilities to ensure that copies of shared memory locations in its on-chip cache have values consistent with copies located in caches of other microprocessors and with the common memory.

The Data Cache of the Swordfish is designed to preserve coherence among copies of data values that are shared by multiple microprocessors. The on-chip Data Cache employs write-through policy for updating external memory, and supports invalidation of individual blocks by external hardware.

The Swordfish also provides a set of instructions for interlocked operations on shared data. Semaphores can be manipulated with interlocked operations to Set and Clear individual bits.

1.6 SUMMARY

The Swordfish combines a highly advanced architecture with sub-micron double-metal CMOS technology to deliver unprecedented performance in microprocessor systems. The architecture offers the best advantages of a RISC processor, while maintaining full 32000/EP software compatibility. The bus supports features that enable system designers to develop economical, high-performance, fault-tolerant systems for a broad spectrum of applications. The following chapters specify the programming model, instruction set, exception processing, and system bus interface of the Swordfish. Several appendices provide performance considerations, and the bus access sequences.

SWORDFISH ARCHITECTURE SPECIFICATION       Rev. 2.0, February 1990

2. PROGRAMMING MODEL

2.1 REGISTER SET

The Swordfish has 75 internal registers grouped according to functions as follows: 32 general-purpose registers, 32 single-precision (alternatively, 16 double-precision) floating-point data registers, 3 dedicated address registers, 1 Processor Status Register (PSR), 1 Configuration Register (CFG), 1 Floating-Point Status Register (FSR), and 5 debug registers. All registers are 32-bit wide.

This section describes the general-purpose, floating-point data, dedicated address, Processor Status, Configuration, and Floating-Point Status registers. For the format and functionality of the remaining registers refer to "Debug Registers" in Section 8.1.2.

2.1.1 General-Purpose Registers

There are 32 registers, referred to as R0 through R30 and C0, used for satisfying high-speed general storage requirements, such as holding temporary variables, addresses, or index values. The C0 register has a constant zero value.

Access to registers R16 through R30 can be restricted to Supervisor-mode by setting the CFG.ISR bit to 1 (see "Configuration Register" in Section 2.1.5). In this manner, 16 of the general-purpose registers can be dedicated to the handling of high-priority interrupts, thereby speeding interrupt service time by eliminating the need to save and restore registers. Refer to "Trap Conditions" in Section 5.4.2.2 for more information.

2.1.2 Floating-Point Data Registers

The floating-point data registers provide a high-speed workspace for floating-point operations. There are 32 single-precision floating-point data registers, referred to as F0 through F31. Alternatively, these registers can be accessed as double-precision register pairs, referred to as L0 through L30 (even-numbered). Figure 2-1 shows the organization of the floating-point data registers.

2.1.3 Dedicated Address Registers

Three dedicated address registers are used by the Swordfish to implement specific address functions, as described below:

PC      Program Counter. The PC is a pointer to the first byte of the instruction currently being executed. The PC can be used as a base address, relative to which memory in the program code section can be referenced. At Reset, the PC is initialized to 0, and the PC value prior to reset is saved in the BPC0 debug register.

SP      Stack Pointer. The SP register points to the lowest address of the last item stored on the Interrupt Stack, which is normally used only by the operating system for holding return information for interrupt and trap service routines.

INTBASE Interrupt Base Register. The INTBASE register holds the base address of the dispatch table for interrupts and traps. Refer to "Calling the Exception Service Procedure" in Section 5.4.2.3 for more information.

| <— 32 bits —> | <— 32 bits —> |
|---|---|
| F1/L0 MSW | F0/L0 LSW |
| F3/L2 MSW | F2/L2 LSW |
| F5/L4 MSW | F4/L4 LSW |
| F7/L6 MSW | F6/L6 LSW |
| F9/L8 MSW | F8/L8 LSW |
| F11/L10 MSW | F10/L10 LSW |
| F13/L12 MSW | F12/L12 LSW |
| F15/L14 MSW | F14/L14 LSW |
| F17/L16 MSW | F16/L16 LSW |
| F19/L18 MSW | F18/L18 LSW |
| F21/L20 MSW | F20/L20 LSW |
| F23/L22 MSW | F22/L22 LSW |
| F25/L24 MSW | F24/L24 LSW |
| F27/L26 MSW | F26/L26 LSW |
| F29/L28 MSW | F28/L28 LSW |
| F31/L30 MSW | F30/L30 LSW |

Figure 2-1. Floating-Point Data Registers Format

2.1.4 Processor Status Register

The Processor Status Register (PSR) holds status information and selects operating modes for the Swordfish. It is 32-bit wide, divided into User and Supervisor parts. The least-significant byte is accessible to both User-mode and Supervisor-mode programs, the remaining bits are accessible only to Supervisor-mode programs. Figure 2-2 shows the format of the PSR.

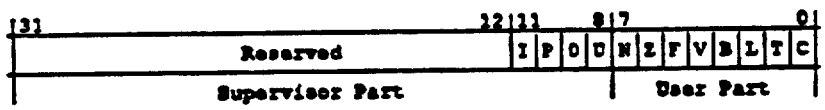

Figure 2-2: Program Status Register Format

Bit 9 has a constant value of 0. Bits 12 through 31 of the PSR are reserved. The various PSR fields are described below:

C    Carry Flag. Signals that a carry or borrow occurred after an addition or subtraction instruction. Refer to "Integer/Logical Instructions" in Section 4.2.3 for more information.

T    Trace Bit. While this bit is 1, a Trace Trap (TRC) occurs after every instruction execution. Refer to "Instruction Tracing" in Section 5.4.3 for more information. This bit is automatically cleared to 0 on occurrence of a trap or interrupt.

L    Low Flag. Signals the result of comparison operations. In integer comparison it is set to 1 if the second operand is less than the first operand as an unsigned integer, cleared to 0 otherwise. In floating-point comparison it is set to 1 if the operands are "unordered", cleared to 0 otherwise. Refer to the specific Compare instruction in "Instruction Definitions" in Section 4.2.9 for details.

B    Byte-Order Bit. While this bit is 0, data in memory is referenced using Little-Endian byte order. While this bit is 1, data in memory is referenced using Big-Endian byte order. Refer to "Byte Order for Data References" in Section 2.2.1 for more information. This bit is automatically cleared to 0 on occurrence of a trap or interrupt.

V    Integer Overflow Enable Bit. While this bit is 1, Integer Overflow Trap (OVF) is enabled, and this trap occurs in case an integer overflow condition is detected. While this bit is 0, this trap does not occur. Refer to "Integer Overflow" in Section 5.4.2.2.9 for a list of integer overflow conditions. This bit is automatically cleared to 0 on occurrence of a trap or interrupt.

F    F Flag. This is a general condition flag, used by various instructions to signal exceptional conditions (like integer overflow from addition or subtraction, see "Integer/Logical Instructions" in Section 4.2.3), or to distinguish among different possible outcomes.

Z    Zero Flag. Signals the result of comparison operations. In integer comparison it is set to 1 if the two operands are equal, cleared to 0 otherwise. In floating-point comparison it is set to 1 if the two operands are normalized numbers and equal, cleared to 0 otherwise. Refer to the specific Compare instruction in "Instruction Definitions" in Section 4.2.9 for details.

N    Negative Flag. Signals the result of comparison operations. In integer comparison it is set to 1 if the second operand is less than the first operand as a signed integer, cleared to 0 otherwise. In floating-point comparison it is set to 1 if both operands are normalized numbers and the second operand is less than the first operand, cleared to 0 otherwise. Refer to the specific Compare instruction in "Instruction Definitions" in Section 4.2.9 for details.

U    User-mode bit. While this bit is 1, the Swordfish is in User-mode, and no privileged instructions may be executed. While this bit is 0, the Swordfish is in Supervisor-mode, and any instruction can be executed. Refer to "Instruction Formats" in Appendix A for a list of privileged instructions. This bit is automatically cleared to 0 on occurrence of a trap or interrupt.

P    Trace Trap Pending Bit. This bit is used together with the PSR.T bit to ensure that a Trace Trap (TRC) occurs exactly once for each instruction executed. Refer to "Instruction Tracing" in Section 5.4.3 form more information.

I    Maskable Interrupt Enable Bit. While this bit is 1, all Maskable Interrupts will be accepted. While this bit is 0, only the Non-Maskable Interrupt is accepted. Refer to "Maskable Interrupts" in Section 5.4.2.1.2 for more information. This bit is automatically cleared to 0 on occurrence of a trap or non-prioritized interrupt.

At Reset, bits 0 through 11 and bits 16 through 23 of the PSR are cleared to 0, and the PSR value prior to reset is saved in the BPC1 debug register.

2.1.5 Configuration Register

The Configuration Register (CFG) is used to enable or disable various operating modes for the Swordfish, including vectoring of interrupts, execution of floating-point and memory management instructions, and control of the on-chip caches. Figure 2-3 shows the format of the CFG register.

SWORDFISH ARCHITECTURE SPECIFICATION          Rev. 2.0, February 1990

| 31 | | 9 | 7 | 6 | 5 | 4 | 3 | 2 | 1 | 0 |
|---|---|---|---|---|---|---|---|---|---|---|
| Reserved | | PS | | ISR | LIC | IC | LDC | DC | 0 | F |

Figure 2-3. Configuration Register Format

Bits 8 through 31 of the CFG are reserved. The value of bit 2 is always 0. The various CFG control bits are described below:

F     Floating-Point Instruction Set. This bit enables the execution of floating-point instructions. If this bit is 0 when the Swordfish executes a floating-point instruction, then Undefined Instruction Trap (UND) occurs. Otherwise, if this bit is 1, then the Swordfish executes the instruction using the on-chip Floating-Point Unit.

DC     Data Cache Enable. This bit enables the on-chip Data Cache to be accessed for data reads and writes. Refer to "Data Cache" in Section 6.3 for more information.

LDC     Lock Data Cache. This bit controls whether a missing line that is placed in the Data Cache will be locked into the cache. Locked lines are not subject to replacement from the Data Cache. Refer to "Data Cache" in Section 6.3 for more information.

IC     Instruction Cache Enable. This bit enables the on-chip Instruction Cache to be accessed for Instruction fetches. Refer to "Instruction Cache" in Section 6.2 for more information.

LIC     Lock Instruction Cache. This bit controls whether a missing instruction that is placed in the Instruction Cache will be locked into the cache. Locked lines are not subject to replacement from the Instruction Cache. Refer to "Instruction Cache" in Section 6.2 for more information.

ISR     Interrupt Service Registers. While this bit is 1, access to general-purpose registers R16 through R30 is restricted to Supervisor-mode, and Illegal Operation Trap (ILL) occurs when an attempt is made to access these registers in User-mode. While this bit is 0, registers R16 through R30 can be accessed in both User and Supervisor modes. Setting the CFG.ISR bit to 1 enables 11 of the general-purpose registers to be dedicated to the handling of high-priority interrupts, thereby speeding interrupt service time by eliminating the need to save and restore registers.

PS     Page Size. This field specifies the page size used for the PAGE mechanism.

000    512 Bytes
         001    1024 Bytes
         010    2048 Bytes
         011    4096 Bytes
         100    8192 Bytes
         101    16384 Bytes
         110    32768 Bytes
         111    65536 Bytes See "Support for Dynamic Ram" in Section 7.5.3.9 for more information At Reset, CFG bits 0 through 9 are cleared to 0.

SWORDFISH ARCHITECTURE SPECIFICATION          Rev. 2.0, February 1990

2.1.6 Floating-Point Status Register

The Floating-Point Status Register (FSR) selects operating modes and records any exceptional conditions encountered during execution of a floating-point instructions. Figure 2-4 shows the format of the FSR.

| 31      27 | 26 | 25 | 24 | 23 | 22 | 21 | 20 | 19 | 18 | 17 | 16  15    9 | 8 7 | 6 | 5 | 4 | 3 | 2  0 |
|---|---|---|---|---|---|---|---|---|---|---|---|---|---|---|---|---|---|
| Reserved | IOF | OVF | DZF | IVF | 0 | IOE | OVE | DZE | IVE | 0 | 1 | SWT | RM | IF | IEN | UF | UEN | TT |

Figure 2-4. Floating-Point Status Register Format

Bits 27 through 31 are reserved. The various FSR control and status fields are described below. For a full explanation of the function of these fields, refer to "Floating-Point Exceptional Conditions" in Section 4.2.4.1.

TT     Trap Type. This field indicates the cause of a floating-point exceptional condition. The TT field is cleared to 0 whenever any floating-point instruction except LPR FSR or SPR FSR completes without exception. It is also cleared to 0 by a Reset, or by writing 0 into it with the LPR FSR instruction. The TT field is updated regardless of the setting of the FSR Trap Enable bits. Exceptional conditions are reported by the following encoding:

000    No exceptional condition occurred
        001    Underflow
        010    Overflow
        011    Floating-point division by zero
        100    Reserved
        101    Invalid Operation
        110    Inexact result
        111    Integer Overflow UEN    Underflow Trap Enable. Refer to "Underflow" in Section 4.2.4.1.1 for more information.

UF     Underflow Flag. Refer to "Underflow" in Section 4.2.4.1.1 for more information.

IEN    Inexact Result Trap Enable. Refer to "Inexact Result" in Section 4.2.4.1.6 for more information.

IF     Inexact Result Flag. Refer to "Inexact Result" in Section 4.2.4.1.6 for more information.

RM    Rounding Mode. This field selects the rounding method. Floating-point results are rounded whenever they cannot be represented exactly. The rounding modes are:

00    Round to Nearest Value. The value that is nearest to the exact result is returned. If the result is exactly halfway between the two nearest values, then the even value is returned (least-significant bit is 0).

01    Round toward Zero. The nearest value that is closer to zero or equal to the exact result is returned.

10    Round toward Positive Infinity. The nearest value that is greater than or equal to the exact result is returned.

11    Round toward Negative Infinity. The nearest value that is less than or equal to the exact result is returned.

SWF  Software Field. This field holds any information written to it by LPR FSR instructions, to be retrieved by subsequent SPR FSR instructions. It is not otherwise used by the Swordfish. This field is reserved for use by National Semiconductor's floating-point extension software.

IVE  Invalid Operation Enable. Refer to "Invalid Operation" in Section 4.2.4.1.5 for more information.

DZE  Divide by Zero Trap Enable. Refer to "Floating-Point Division by Zero" in Section 4.2.4.1.3 for more information.

OVE  Overflow Trap Enable. Refer to "Floating-Point Overflow" in Section 4.2.4.1.2 for more information.

IOE  Integer Overflow Enable. Refer to "Integer Conversion Overflow" in Section 4.2.4.1.7 for more information.

IVF  Invalid Operation Flag. Refer to "Invalid Operation" in Section 4.2.4.1.5 for more information.

DZF  Divide by Zero Flag. Refer to "Floating-Point Division by Zero" in Section 4.2.4.1.3 for more information.

OVF  Overflow Flag. Refer to "Floating-Point Overflow" in Section 4.2.4.1.2 for more information.

IOF  Integer Overflow Flag. Refer to "Integer Conversion Overflow" in Section 4.2.4.1.7 for more information.

at Reset, FSR bits 0 through 26 are cleared to 0.

2.2 MEMORY ADDRESSING

Programs refer to memory using 32-bit addresses to specify one of 4,294,967,296 byte (4-GByte) locations. Instructions and data can be located at any byte address except for the upper-most 16-MByte, which are dedicated (see Figure 2-5). Refer to "Input and Output" in Section 2.2.2 for more information.

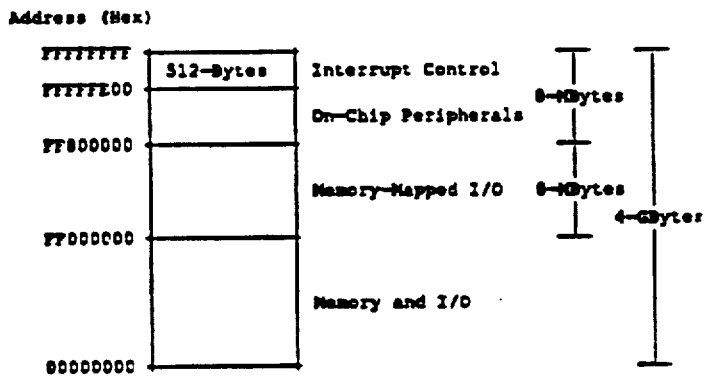

Figure 2-5. Memory Organization

SWORDFISH ARCHITECTURE SPECIFICATION       Rev. 2.0, February 1990

2.2.1 Byte Order for Data References

The Swordfish refers to bytes, words, double-words, and quad-words of data in memory. When referring to a byte of data in memory, the data is simply located at the specified address. When referring to a word, double-word, or quad-word of data in memory, the data is located at consecutive bytes beginning with the byte at the specified address.

The Swordfish supports memory data that is stored in either of two orders: from least-significant byte to most-significant byte (Little-Endian), or from most-significant byte to least-significant byte (Big-Endian). The mode for byte ordering is selected by the PSR.B bit, as explained in the following sections.

2.2.1.1 Little-Endian Byte Order

While PSR.B is 0, the Swordfish refers to data in memory using Little-Endian byte order. The address of a word, double-word, or quad-word of data specifies the least-significant byte of the data value; more significant bytes are located at higher addresses. Figure 2-6 shows the memory representation for data values with Little-Endian byte order.

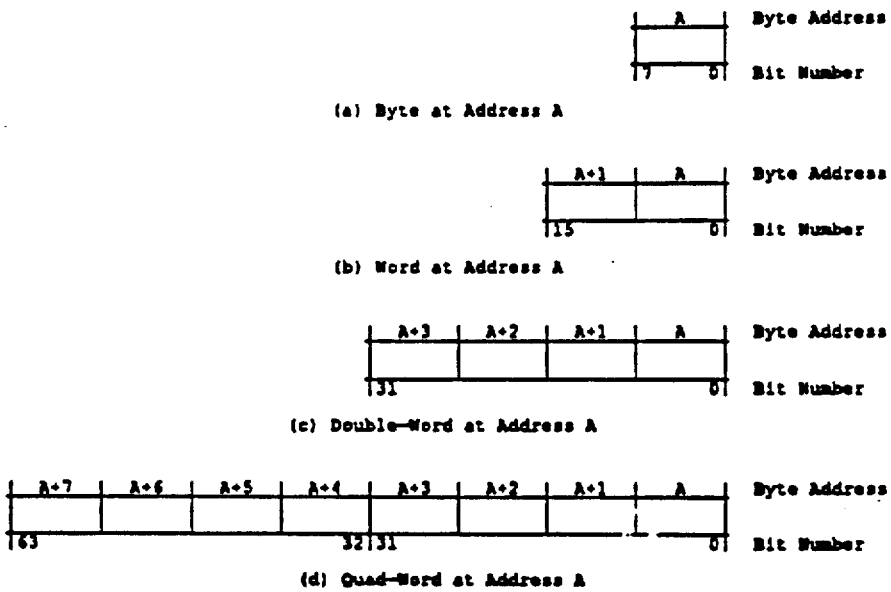

Figure 2-6. Data Representation in Little-Endian Byte Order

2.2.1.2 Big-Endian Byte Order

While PSR.B is 1, the Swordfish refers to data in memory using Big-Endian byte order. The address of a word, double-word, or quad-word of data specifies the most-significant byte of the data value; less significant bytes are located at higher addresses. Figure 2-7 shows the memory representation for data values with Big-Endian byte order.

SWORDFISH ARCHITECTURE SPECIFICATION  Rev. 2.0, February 1990

Notes:

1. The format of instructions in memory is not affected by the PSR.B bit.

2. Memory references for both single-precision and double-precision floating-point data values are affected by the PSR.B bit. Refer to the representation of double-words for single-precision data values and the representation of quad-words for double-precision data values.

3. References to the Interrupt Stack and Interrupt Dispatch Table while the Swordfish is processing an exception are performed in Little-Endian byte order. Refer to "Calling the Exception Service Procedure" in Section 5.4.2.3 for more information.

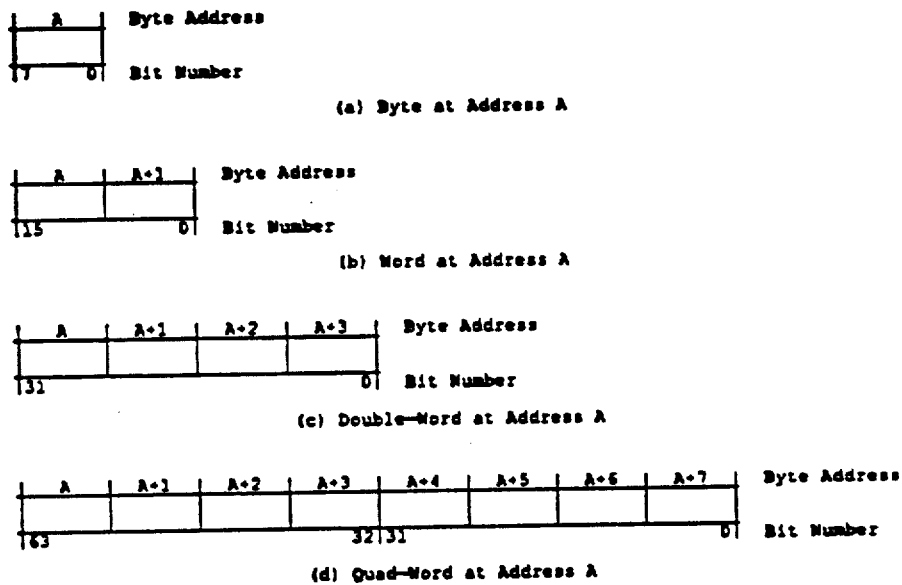

Figure 2-7. Data Representation in Big-Endian Byte Order

2.2.2 Input and Output

The Swordfish supports the use of memory-mapped peripheral devices and coprocessors. Such memory-mapped devices can be located at arbitrary locations in the address space except for the upper-most 8-MBytes of memory (addresses between FF800000 (hex) and FFFFFFFF (hex), inclusive), which are reserved for National Semiconductor Corporation. Nevertheless, it is recommended that peripheral devices and coprocessors be located in a specific 8-MByte region of memory (addresses between FF000000 (hex) and FF7FFFFF (hex), inclusive), that is dedicated for memory-mapped I/O. This is because the Swordfish detects references to the dedicated locations and applies special handling on its bus interface that simplifies system logic required for I/O references. When making I/O references to addresses outside the dedicated region, more complex support is required from the external system logic. Refer to "Memory-Mapped I/O" in Section 5.3.2.1 and "Peripheral Bus Cycles" in Section 7.5.3.7 for more information.

3.

This section was left intentionally blank

SWORDFISH ARCHITECTURE SPECIFICATION     Rev. 2.0, February 1990

4. INSTRUCTION SET AND DATA TYPES

4.1 SWORDFISH ARCHITECTURE PARTITIONING

The Swordfish architecture consists of performance-critical (Core) instructions and addressing modes, together with some special-function instructions for essential system operations.

Performance-critical instructions and addressing modes were selected based on an analysis and evaluation of embedded controller applications. These instructions are executed directly by the Swordfish RISC implementation. Special-function instructions are emulated in the Swordfish by microcoded routines, using sequences of Core instructions. Refer to "" in Section and to "Swordfish Architecture" in Section 1.2 for more information on considerations that led to the Core definition.

Table 4-1 shows the Swordfish instruction set.

| Instruction Set ||||
|---|---|---|---|
| Performance-Critical |||Special-Function|
| ABSi  EXCP   MOVLF   STORi | | | CINV |
| ABSUi FLOORi MOVULF  SUBCi | | | EOI |
| ADDCi FLOORUi MOVXGD SUBi  | | | LPR |
| ADDi  JUMP   MOVZiD  SUBUi | | | MBTI |
| ADDUi LOADi  MOVi    SUBi  | | | RETX |
| ADDi  LOADUi MOVUi   SUBLi | | | SPR |
| ADDUi LOADi  MULi    TBIT  | | | WAIT |
| ANDi  LOADNi MULUi   TRDF  | | | |
| ASHUi LOADNUi MULi   TRUDF | | | |
| Bcond LOADNi MULUi   TRFD  | | | |
| BAL   LSHi   NEGi    TRUFD | | | |
| BICi  MHHD   NEGUi   TRUNCi| | | |
| CMPCHD MLHD , ORi    TRUNCUi| | | |
| CMPi  MLLD   ROUNDi  UCMPi | | | |
| CMPUi MOVDL  ROUNDUi UCMPUi| | | |
| CMPi  MOVUDL Bcond   XORi  | | | |
| DIVi  MOVFL  STORi          | | | |
| DIVUi MOVUFL STORUi         | | | |

TABLE 4-1. Instruction Set

4.2 ARCHITECTURE DESCRIPTION

This section describes the functionality of the Swordfish architecture. For information on instruction execution timing calculation refer to "Performance Evaluation" in Appendix C.

The Core is designed as a load/store architecture: computational performance-critical instructions operate on registers, while memory access is confined to explicit LOAD and STORE instructions.

4.2.1 Instruction Format

Instructions employ 0-, 1-, 2-, and 3-operand fixed-length encoding of 4 or 8 bytes long. 4-byte instructions must be double-word aligned. 8-byte instructions must be quad-word aligned. Non used

SWORDFISH ARCHITECTURE SPECIFICATION  Rev. 2.0, February 1990 codes as well as misaligned instructions will cause Trap(UND). The basic instruction structure contains an Opcode and three specifier fields. Two of the specifier fields specify register numbers, and the third specifies either a third register or an immediate value. General-purpose register encoding is as specified in Table 4-5. Dedicated processor registers and instruction options are encoded in the Rs1-field.

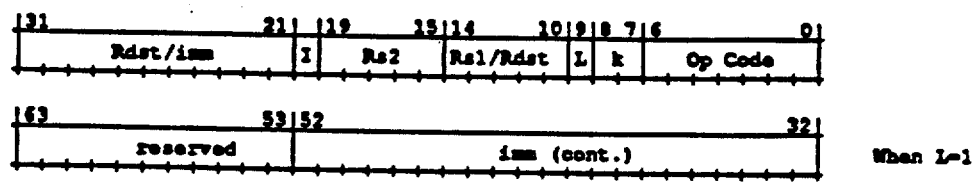

Figure 4-1. Instruction Format

The Op-code field consists of 7 bits. The k-field encodes the operation length for integer instructions or the operation length and unchanged FSR options for floating point instructions. In integer instructions the k-field is determined by the l-field of the instruction. In floating point instructions k-field is determined by both f and u-fields of the instruction. The L-field specifies whether the instruction format is short (4 bytes) or long (8 bytes). The I-field specifies whether the third operand is immediate.

| k-field | Integer Instructions |
|---|---|
| l-field | Operation Length |
| 00 | Byte (8-bit) |
| 01 | Word (16-bit) |
| 10 | reserved |
| 11 | Double Word (32-bit) |

| k-field | | Floating Point Instructions | |
|---|---|---|---|
| f-field | u-field | Operation Length | FSR |
| 0 | 0 | Long (64-bit) | Unaffected |
| 0 | 1 | Long (64-bit) | Affected |
| 1 | 0 | Float (32-bit) | Unaffected |
| 1 | 1 | Float (32-bit) | Affected |

TABLE 4-2. k-field Encoding

4.2.1.1 Three Operand Instructions

Basic three operand instruction has two source operands (Rs1 and Rs2) and one destination operand (Rdst). All of the instructions can have three register operands. Some of these instructions can have one immediate value as one of the source operands (Rs1). The immediate value can be encoded either in a short field of 11 bits, or in a long field of 32 bits.

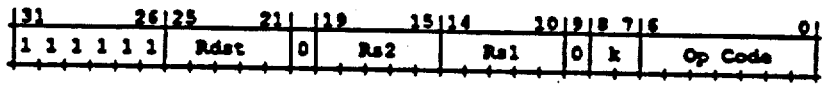

Figure 4-2. Register-Register-Register Format

The following instructions have a Register-Register-Register format:

| | | | | | | | |
|---|---|---|---|---|---|---|---|
| ADDi | Rs1, | Rs2, | Rdst | MHLD | Rs1, | Rs2, | Rdst |
| ADDUi | Rs1, | Rs2, | Rdst | MLHD | Rs1, | Rs2, | Rdst |
| ADDi | Rs1, | Rs2, | Rdst | MULi | Rs1, | Rs2, | Rdst |
| ADDUi | Rs1, | Rs2, | Rdst | MULUi | Rs1, | Rs2, | Rdst |
| ADDCi | Rs1, | Rs2, | Rdst | MULi | Rs1, | Rs2, | Rdst |
| ANDi | Rs1, | Rs2, | Rdst | MULUi | Rs1, | Rs2, | Rdst |
| ASHUi | Rs1, | Rs2, | Rdst | ORi | Rs1, | Rs2, | Rdst |
| BICi | Rs1, | Rs2, | Rdst | SUBi | Rs1, | Rs2, | Rdst |
| CMPi | Rs1, | Rs2, | Rdst | SUBUi | Rs1, | Rs2, | Rdst |
| DIVi | Rs1, | Rs2, | Rdst | SUBi | Rs1, | Rs2, | Rdst |
| DIVUi | Rs1, | Rs2, | Rdst | SUBUi | Rs1, | Rs2, | Rdst |
| LSHi | Rs1, | Rs2, | Rdst | SUBCi | Rs1, | Rs2, | Rdst |
| MLLD | Rs1, | Rs2, | Rdst | XORi | Rs1, | Rs2, | Rdst |

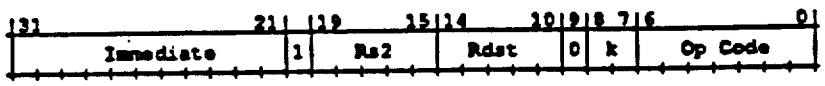

Figure 4-3. Short-Immediate-Register-Register Format

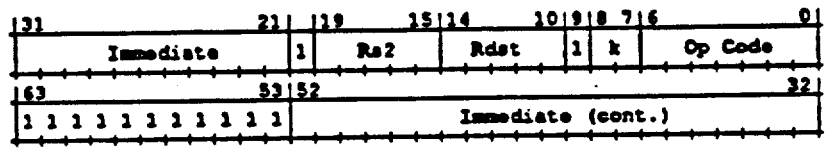

Figure 4-4. Long-Immediate-Register-Register Format

The following instructions have an Immediate-Register-Register format:

| | | | | | | | |
|---|---|---|---|---|---|---|---|
| ADDi | imm, | Rs2, | Rdst | LSHi | imm, | Rs2, | Rdst |
| ADDUi | imm, | Rs2, | Rdst | MBTi | imm, | Rs2, | Rdst |
| ADDCi | imm, | Rs2, | Rdst | ORi | imm, | Rs2, | Rdst |
| ANDi | imm, | Rs2, | Rdst | SUBi | imm, | Rs2, | Rdst |
| ASHUi | imm, | Rs2, | Rdst | SUBUi | imm, | Rs2, | Rdst |
| BICi | imm, | Rs2, | Rdst | SUBCi | imm, | Rs2, | Rdst |
| CMPi | imm, | Rs2, | Rdst | XORi | imm, | Rs2, | Rdst |

4.2.1.2 Source-Destination Two Operand Instructions

Basic two operand instructions with source and a destination operands have one source operand (Rs1) and one destination operand (Rdst). All of the instructions can have two register operands. Some of these instructions can have one immediate value as the source operands. The immediate value can be encoded either in a short field of 11 bits, or in a long field of 32 bits.

SWORDFISH ARCHITECTURE SPECIFICATION       Rev. 2.0, February 1990

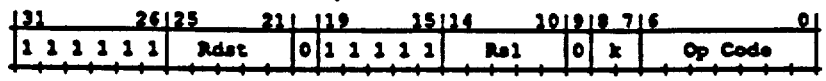

Figure 4-5. Source-Register-Dest-Register Format

The following instructions have a Source-Register-Dest-Register format:

| | | | | |
|---|---|---|---|---|
| ABSI | Rs1, Rdst | | MOVXID | Rs1, Rdst |
| ABSUI | Rs1, Rdst | | MOVZID | Rs1, Rdst |
| FLOORI | Rs1, Rdst | | NEGI | Rs1, Rdst |
| FLOORUI | Rs1, Rdst | | NEGUI | Rs1, Rdst |
| LPR | Rs1, Rdst | | ROUNDI | Rs1, Rdst |
| MOVI | Rs1, Rdst | | ROUNDUI | Rs1, Rdst |
| MOVUI | Rs1, Rdst | | SPR | Rs1, Rdst |
| MOVDL | Rs1, Rdst | | TRDF | Rs1, Rdst |
| MOVUDL | Rs1, Rdst | | TRUDF | Rs1, Rdst |
| MOVFL | Rs1, Rdst | | TRFD | Rs1, Rdst |
| MOVUFL | Rs1, Rdst | | TRUFD | Rs1, Rdst |
| MOVLF | Rs1, Rdst | | TRUNCI | Rs1, Rdst |
| MOVULF | Rs1, Rdst | | TRUNCUI | Rs1, Rdst |

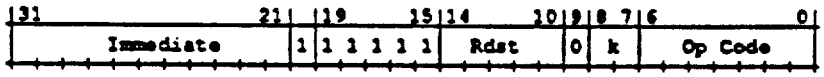

Figure 4-6. Short-Immediate-Dest-Register Format

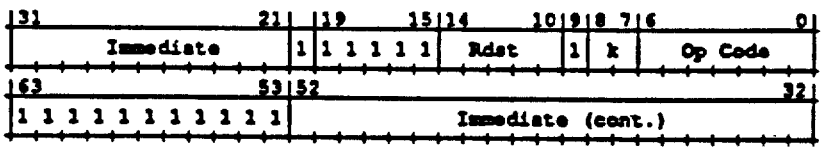

Figure 4-7. Long-Immediate-Dest-Register Format

The following instructions have an Immediate-Dest-Register format:

MOVXID  Imm, Rdst        MOVZID  Imm, Rdst

4.2.1.3 Source-Source Two Operand Instructions

Basic two operand instructions with two source operands have two source operands (Rs1 and Rs2). All of the instructions can have two register operands. Some of these instructions can have one immediate value as the source operands. The immediate value can be encoded either in a short field of 11 bits, or in a long field of 32 bits.

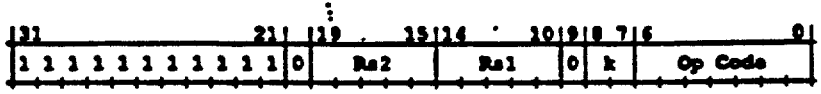

Figure 4-8. Source-Register-Source-Register Format

The following instructions have a Source-Register-Source-Register format:

| CMPI | Rs1, Rs2 | TBIT | Rs1, Rs2 |
| CMPUI | Rs1, Rs2 | UCMPI | Rs1, Rs2 |
| CMPCHD | Rs1, Rs2 | UCMPUI | Rs1, Rs2 |

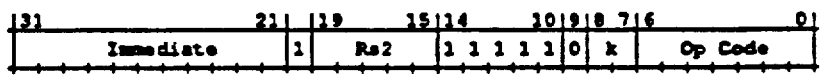

Figure 4-9. Short-Immediate-Source-Register Format

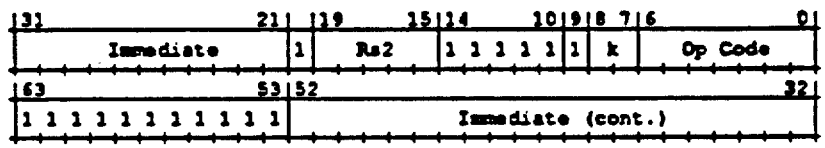

Figure 4-10. Long-Immediate-Source-Register Format

The following instructions have an Immediate-Source-Register format:

| CMPCHD | Imm, Rs2 | TBIT | Imm, Rs2 |

4.2.1.4 LOAD and STORE Instructions

LOAD instructions have two basic addressing modes: Indexed and Relative. In Indexed addressing mode, the address is calculated by adding the values specified in the base and index register operands. In Relative addressing mode the address is calculated by adding the displacement value to the base register operand.

STOR instructions have one basic addressing mode: Relative. In Relative addressing mode the address is calculated by adding the displacement value to the base register operand.

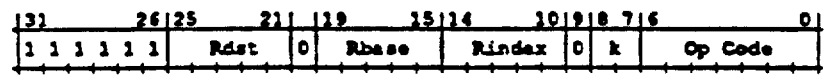

Figure 4-11. Indexed Format

SWORDFISH ARCHITECTURE SPECIFICATION          Rev. 2.0, February 1990

The following instructions have an indexed format:

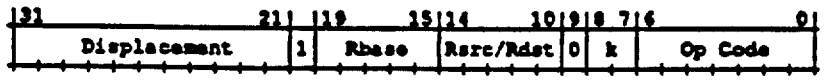

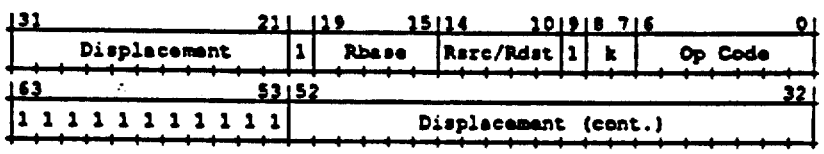

Figure 4-12. Short-Relative Format

Figure 4-13. Long-Relative Format

The following instructions have a Relative format:

| | | | | |
|---|---|---|---|---|
| LOADf | disp(Rbase), Rdst | | LOADNi | disp(Rbase), Rdst |
| LOADUf | disp(Rbase), Rdst | | STORf | Rsrc, disp(Rbase) |
| LOADi | disp(Rbase), Rdst | | STORUf | Rsrc, disp(Rbase) |
| LOADNf | disp(Rbase), Rdst | | STORi | Rsrc, disp(Rbase) |
| LOADNUf | disp(Rbase), Rdst | | | |

4.2.1.5 Branch Instructions

The two instructions Bcond (BR included as special case of Bcond) and BAL specify the branch target address as a displacement from the current PC. The displacement is encoded either in short-form (17 bits) or in long-form (30-bits). In order to calculate the branch target, the displacement is shifted left by two, and the result is added to the PC. In the Bcond instruction, the cond-field in bits 10 through 14 encodes a 5-bit condition code (cond). In BAL instruction, the same field specifies the link register (Rlnk).

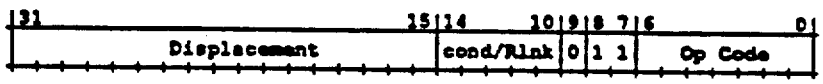

Figure 4-14. Short-Branch Format

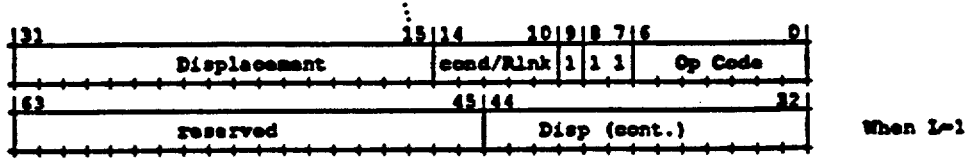

Figure 4-15. Long-Branch Format

The following instructions have a Branch format:

BAL　　Rlnk　disp　　　　Bcond　disp

4.2.1.6 One-Operand Instructions

CINV, JUMP, and EXCP instructions are one-operand instructions. In CINV instruction, the options are specified in the Rs1 field. In JUMP instruction, the register operand is specified in the Rs1 field. In EXCP instruction, the vector is specified in the Rs1 field.

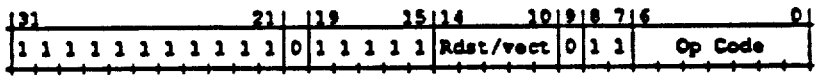

Figure 4-16. One-Operand Format

The following instructions have a One-Operand format:

CINV　options　　　　EXCP　vector
　　　　　　　　JUMP　Rdst

4.2.1.7 Zero-Operands Instructions

RETX and WAIT instructions are zero-operand instructions.

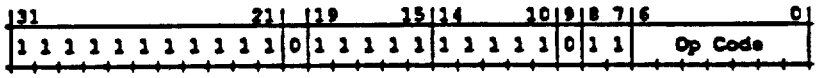

Figure 4-17. Zero-Operand Format

The following instructions have a Zero-Operand format:

EOI　　　　RETX　　　　WAIT

4.2.2 Core Addressing Modes

Core instructions use as operands one, two, or three registers from the Swordfish extended register set. Some instructions may also replace one read operand by an immediate value. Memory access is

SWORDFISH ARCHITECTURE SPECIFICATION                    Rev. 2.0, February 1990 confined to the load/store instructions, in which it is specified using either relative, or indexed addressing mode.

The following performance-critical addressing modes are available:

Register   The operand is available in a register R0 through R30, or C0 or in a floating-point data register F0 through F31, or L0 through L30 (even-numbered), according to the Opcode field. Register C0 has a constant zero value.

Immediate  The operand is specified within the instruction. This addressing mode is permitted only for a single integer read operand (except MULI, MULUI, MLLD, MLHD and MHHD instructions).

Relative   The operand is located in memory. Its address is obtained by adding the content of a Base Register in the range R0 through R30 or C0 to the value in the displacement field encoded in the instruction. Absolute address can be obtained by using the Constant-Zero (C0) register.

Indexed    The operand is located in memory. Its address is obtained by adding the content of a Base Register in the range R0 through R30 or C0 to the content of an Index Register in that range.

Some Core instructions require additional operands apart from those associated with addressing modes, whose attributes are implied from the specific instruction's Opcode. These operands fall into the following types:

Displacement  The operand is a signed-integer encoded in the displacement field following the basic instruction encoding. It is used for calculating the next instruction address for branching operations.

Options    The operand is an unsigned 5-bit field. It is used for encoding options in some instructions.

Register operands encoding are as shown in Table 4-5.

| Encoding | Register | | |
|---|---|---|---|
| | Integer | Float | Long |
| 00000 | R0 | F0 | L0 |
| 00001 | R1 | F1 | (reserved) |
| 00010 | R2 | F2 | L2 |
| ⋮ | ⋮ | ⋮ | ⋮ |
| 10010 | R26 | F26 | L26 |
| 11011 | R27 | F27 | (reserved) |
| 11100 | R28 | F28 | L28 |
| 11101 | R29 | F29 | (reserved) |
| 11110 | R30 | F30 | L30 |
| 11111 | C0 | F31 | (reserved) |

TABLE 4-5. Register Number Encoding

4.2.3 Integer/Logical Instructions

The integer data type is used to represent integer numbers. Integers may be signed or unsigned. Three integer sizes are available: 8-bit (byte), 16-bit (word), and 32-bit (double-word). Signed integers are represented as binary two's complement numbers and have values in the range $-2^7$ to $2^7-1$, $-2^{15}$ to $2^{15}-1$, and $-2^{31}$ to $2^{31}-1$. Unsigned numbers have values in the range 0 to $2^8-1$, 0 to $2^{16}-1$, and 0 to $2^{32}-1$. Integers stored in memory are referenced according to the state of the PSR.B bit, as described in "Byte Order for Data References" in Section 2.2.1 Note that all the Integer/Logical Instructions have register operands (see "Three Operand Instructions" in Section 4.2.1.1 and "Source-Destination Two Operand Instructions" in Section 4.2.1.2 ).

An integer value can be converted to double-word length while being moved. The MOVXID instruction interprets its operands as signed integers and performs sign-extension. The MOVZID instruction interprets its operands as unsigned integers and performs zero-extension.

Integer arithmetic is performed to the length specified by the instruction's Opcode field (except MHHD, MHLD and MLLD, see below). The ADDi and ADDUi instructions add two operands, leaving the result in the third operand. The ADDCi instruction adds also the contents of the PSR.C flag (indicating a carry from a previous addition). The SUBi and SUBUi instructions subtract the first operand from the second operand, leaving the result in the third operand. The SUBCi instructions subtracts also the contents of the PSR.C flag (indicating a borrow from a previous subtraction). The MULi and MULUi instruction multiplies two signed integer operands, leaving the result in the third operand.

Three special multiply instructions MHHD, MHLD, and MLLD take two word operands and return a double word result. These instructions take the High or Low word from the first/second operand according to the opcode. These instructions are useful when two word integers are kept in a double word, for example, if the double word contains the real and imaginary part of a complex number. Note that during this instructions Overflow cannot occur.

Carry and overflow events are signaled in the PSR.C and PSR.F flags, respectively. When an addition instruction is executed, the occurrence of a carry out of the most-significant bit position is indicated by setting the PSR.C flag to 1. When a subtraction instruction is executed, the occurrence of a borrow into the most-significant bit position is indicated by setting the PSR.C flag to 1. An overflow condition occurs in addition or subtraction when the carry into the sign bit position and the carry out of the sign bit position do not agree, indicating that the correct result would be too large to be represented as a signed integer according to the selected operation length. This condition is signaled by setting the PSR.F flag to 1. ADDUi and SUBUi does alter the PSR flags.

An Integer Overflow Trap(OVF) occurs when the PSR.V bit is 1 and an integer overflow condition is detected following an instruction execution. If the product resulting for a MULi instruction is too large to be represented in the destination according to the selected operation length, the PSR.F flag is not affected, but an Integer Overflow Trap(OVF) occurs when the PSR.V bit is 1. Refer to "Integer Overflow" in Section 5.4.2.2.9 for a list of integer overflow conditions. An overflow during the execution of ADDUi, SUBUi and MULUi does not cause a Trap.

The CMPi instructions compare two operands and set the PSR.Z, PSR.N, and PSR.L flags to form a condition code. This condition code can be tested by subsequent instructions for program flow control, or saved to generate operands for boolean computations. The PSR.Z flag indicates equality when set to 1. The PSR.N flag, when set to 1, indicates that the first operand is greater than the second operand as signed integers. The PSR.L flag, when set to 1, indicates that the first operand is greater than the second operand as unsigned integers. CMPCHD compares each byte in its two double word operands

SWORDFISH ARCHITECTURE SPECIFICATION  Rev. 2.0, February 1990 and sets PSR.Z to indicate equality in any one of the byte comparisons.

The ANDI, ORI, XORI, and BICI instructions perform bitwise boolean arithmetic on two byte, word, or double-word operands, leaving the result in the third operand. The LSHI instruction performs a logical shift of the second operand in the direction and count specified by the first operand. The ASHLI instruction performs an arithmetic shift (with no overflow checking). The TBIT instruction copies a single bit of its second operand into the PSR.F flag, from a bit position specified by the first operand. The Scondi instructions generates a boolean operand (0 or 1) according to a condition code test of a previous comparison instruction.

4.2.4 Floating-Point Instructions

The Floating-Point data type is used to represent real numbers. Floating-point numbers are represented and manipulated according to the IEEE Standard 754-1985 for Binary Floating-Point Arithmetic. Two floating-point sizes are available: 32-bit single-precision (float), and 64-bit double-precision (long). Floating-point data stored in memory are referenced according to the state of the PSR.B bit, as described in "Byte Order for Data References" in Section 2.2.1. Figure 4-18 shows the format of floating-point operands.

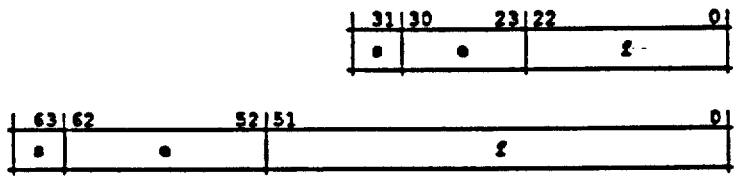

Figure 4-18. Floating-Point Operand Formats

The $s$ bit indicates the sign of the operand: 0 for positive, 1 for negative. The $e$ field holds an unsigned biased exponent, that is, a constant bias value must be subtracted from it in order to obtain the true exponent. The bias value is 011...11 (binary), which is either 127 for single-precision operands or 1023 for double-precision operands.

Two forms of the $e$ field represent special values, and are not interpreted as binary exponent values. If $e$ is 00...00 and the $f$ field is also all zeroes, the represented value is (positive or negative) Zero; otherwise, if $f$ is not all zeroes, then the represented value is an operand called a Denormalized Number, and the value represented is $(-1)^s \cdot 2^{-126} \cdot (0.f)$, for single-precision, and $(-1)^s \cdot 2^{-1022} \cdot (0.f)$, for double-precision. If $e$ is 11...11 and $f$ is all zeroes, then the represented value is (positive or negative) Infinity; otherwise, if $f$ is not all zeroes, then the represented value is a special operand called Not-a-Number (NaN). There are two distinguished NaN values called Quiet NaN, they are represented by $s=0$ or 1, all ones $e$ field, and all ones $f$ field. Otherwise, a NaN value is called a Signaling NaN. Refer to "Operation with Special Floating-Point Operands" in Section 4.2.4.2 for more information on these special operands.

If the $e$ field is not all zeroes or all ones, then the represented value is a Normalized Number, and the $f$ field is the fractional part. The binary point is assumed to be immediately to the left of the most-significant bit of the $f$ field. An implied "1" bit is assumed to the left of the binary point. Thus, the $f$ field may hold values in the range 1.0 (inclusive) through 2.0 (exclusive). The range of single-precision Normalized Numbers is $-2^{127} \cdot (2-2^{-23})$ through $-2^{-126}$ for negative numbers, and $2^{-126}$ through $2^{127} \cdot (2-2^{-23})$ for positive numbers. The range of double-precision Normalized Numbers is

SWORDFISH ARCHITECTURE SPECIFICATION  Rev. 2.0, February 1990

$-2^{1023} \cdot (2-2^{-52})$ through $-2^{-1022}$ for negative numbers, and $2^{-1022}$ through $2^{1023} \cdot (2-2^{-52})$ for positive numbers. The range of single-precision Denormalized numbers is $(2^{-23}-1) \cdot 2^{-126}$ through $-2^{-149}$ for negative numbers, and $2^{-149}$ through $(1-2^{-23}) \cdot 2^{-126}$ for positive numbers. The range of double-precision Denormalized numbers is $(2^{-52}-1) \cdot 2^{-1022}$ through $-(2^{-1074})$ for negative numbers, and $2^{-1074}$ through $(1-2^{-52}) \cdot 2^{-1022}$ for positive numbers.

Table 4-6 shows the interpretation of floating-point operands:

Single-Precision

| s | e | f | Value | Name |
|---|---|---|-------|------|
| any | 1–254 | any | $(-1)^s \cdot 2^{e-127} \cdot (1.f)$ | Normalized Number |
| any | 0 | all 0 | $(-1)^s \cdot 0$ | ± Zero |
| any | 255 | all 0 | $(-1)^s \cdot \infty$ | ± Infinity |
| any | 255 | all 1 | Not-a-Number | Quiet NaN |
| any | 255 | not 0 | Not-a-Number | Signaling NaN |
| any | 0 | not 0 | $(-1)^s \cdot 2^{-126} \cdot (0.f)$ | Denormalized Number |

Double-Precision

| s | e | f | Value | Name |
|---|---|---|-------|------|
| any | 1–2046 | any | $(-1)^s \cdot 2^{e-1023} \cdot (1.f)$ | Normalized Number |
| any | 0 | all 0 | $(-1)^s \cdot 0$ | ± Zero |
| any | 2047 | all 0 | $(-1)^s \cdot \infty$ | ± Infinity |
| any | 2047 | all 1 | Not-a-Number | Quiet NaN |
| any | 2047 | not 0 | Not-a-Number | Signaling NaN |
| any | 0 | not 0 | $(-1)^s \cdot 2^{-1022} \cdot (0.f)$ | Denormalized Number |

TABLE 4-6. Floating-Point Operands

The MOVI and MOVUI instructions move the first operand into the second. Operands may be converted between the float and long formats by the MOVFL, MOVUFL, MOVLF, and MOVULF instructions. Conversion of integers to floating-point long format is done by the MOVDL and MOVUDL instructions. Conversion from floating-point to integer format is done by the TRUNCI, TRUNCUI, ROUNDI, ROUNDUI, FLOORI and FLOORUI instructions. Operands may be transferred from an integer register to a floating-point register and from a floating-point register to an integer register without any conversion using the TRDF, TRUDF, TRFD, and TRUFD instructions.

Floating-point arithmetic is performed by the ADDI, ADDUI, SUBI, SUBUI, NEGI, NEGUI, ABSI, ABSUI, MULI, MULUI, DIVI, and DIVUI instructions. The CMPI, CMPUI, UCMPI, and UCMPUI instructions compare two floating-point values, setting the PSR condition codes as per the CMPi (Compare Integer) instruction. Accessing the Floating-Point Status Register (FSR) is done by the LPR FSR and SPR FSR instructions.

4.2.4.1 Floating-Point Exceptional Conditions

Swordfish exceptional conditions are detected and handled according to the IEEE standard 754-1985 for Floating-Point Arithmetic. Any exceptional condition encountered during the execution of a floating-point instruction is reported in the FSR.TT (Trap Type) field and in the FSR "sticky" flag corresponding to that SWORDFISH ARCHITECTURE SPECIFICATION          Rev. 2.0, February 1990 condition. A sticky FSR flag is cleared to 0 only by Reset, or by loading 0 into it with the LPR FSR instruction. An exceptional condition can also cause a Floating-Point Trap (FPU) to occur, provided that its corresponding Trap Enable bit in the FSR is enabled, in which case no result is returned. In some traps (as required by the IEEE 745-1985 standard) the result computed by the FPU (sometimes with bias adjust) is delivered to the trap handler. Two special registers are used by the FPU for the delivery FTRH and FTRL (see "Register Set" in Section 2.1 ). These registers can be read and written to using LPR and SPR instructions, refer to "" in Section. If the Trap Enable bit is disabled, then no trap occurs, FTRH and FTRL are unaffected, and the returned result is as defined in IEEE standard 754-1985. See details for each exceptional condition below.

Each Floating-Point Instruction has two versions, one with U option and one without it. Instructions without the U option may alter the FSR and may cause Floating-Point Trap (FPU) as specified below. When U is specified in the instruction op-code, it will not alter the FSR and will not cause any Floating-Point Trap (FPU), the exceptional conditions detection and the returned result will be identical to these specified when the FPU traps are disabled.

4.2.4.1.1 Underflow

Underflow occurs when two different condition are true, depending on the Underflow trap enable flag (FSR.UEN). If the trap is enabled, Underflow occurs if a non-zero floating point result (with an unbounded exponent range) is too small in absolute value to be represented as a normalized number in the format of the destination operand. If the trap is disabled, then Underflow occurs whenever the result cannot be represented accurately as a denormalized number, in the destination format.

If the Underflow trap is enabled (FSR.UEN = 1) then Underflow occurs if the result magnitude after rounding is smaller than $2^{-126}$ in single-precision, and $2^{-1022}$ in double-precision. In this case a Floating-Point Trap (FPU) occurs and no result is written to the destination register. If the instruction is not a conversion instruction then the original precise result multiplied by $2^{192}$ in the single-precision case, and by $2^{1536}$ in the double-precision case, is delivered to the trap handler. If the operand is single precision the result is returned in FTRH, otherwise the most significant 32 bits are returned in FTRH, and the least significant in FTRL.

If Underflow Trap is disabled (FSR.UEN = 0) then Underflow will be detected only if the result cannot be represented as a Denormalized number without an accuracy loss, the FSR.UF and the FSR.TT field will be set to 1. In this case no trap occurs, and the returned result can be either a Denormalized number representing the result, 0, or the smallest normalized number (in absolute value).

The only case in which Underflow is detected during conversion instructions, is MOVLF. If the Underflow trap (PSR.UEN = 1) is enabled, then the result calculated so far, in double precision-format, and single precision rounding, is delivered to the trap handler in FTRH and FTRL. The setting of the PSR.TT and PSR.UF is as above. If the Underflow trap is disabled (PSR.UEN = 0), then the result can be either a Denormalized number representing the result, 0, or the smallest normalized number (in absolute value).

Note:

It is possible for both Underflow and Inexact Result conditions to occur simultaneously in the same instruction, in this case the FSR.UF and FSR.IF are set. If the Underflow Trap is enabled, (FSR.UEN = 1), then a Floating-Point Trap (FPU) occurs, the FSR.TT is set to 1, and no result is written to the destination register. If the Underflow trap is disabled (FSR.UEN = 0), and the Inexact Result trap is enabled (FSR.IEN = 1) then the Inexact Result Trap occurs, and the FSR.TT is set to 6. Otherwise, no trap occurs, and the FSR.TT is set to 0.

SWORDFISH ARCHITECTURE SPECIFICATION          Rev. 2.0, February 1990

4.2.4.1.2 Floating-Point Overflow

This condition occurs whenever a floating-point result is too large in absolute value to be represented as a normalized number in the format of the destination operand. This condition is reported by setting the FSR.TT field to 2, and setting the FSR.OVF flag to 1.

If Floating-Point Overflow Trap is enabled (FSR.OVE=0) while this condition is detected, then a Floating-Point Trap (FPU) occurs and no result is returned. If the instruction is not a conversion instruction then a result obtained by dividing the original precise result by $2^{192}$ in case of single precision operation, and by $2^{1536}$ in case of double-precision, is passed to the trap handler, via FTRH and FTRL. Otherwise, if the instruction is a conversion instruction, Overflow condition can be detected only when executing MOVLF instruction. In which case, in a similar way to Underflow, the result calculated so far, in double-precision format, with fraction rounded to single-precision, is delivered to the trap handler in FTRH and FTRL.

If Floating-Point Overflow Trap is disabled (FSR.OVE=0) while this condition is detected, then no trap occurs, and the returned result is either $\pm\infty$ or $\pm Max$ (Maximal Normalized Number). The returned result is determined according to the sign of the true result and the currently selected Rounding Mode as determined by the FSR.RM field, as follows:

| Rounding | Result | |
| Mode | Positive | Negative |
|---|---|---|
| To Nearest | $+\infty$ | $-\infty$ |
| Toward 0 | $+Max$ | $-Max$ |
| Toward $+\infty$ | $+\infty$ | $-Max$ |
| Toward $-\infty$ | $+Max$ | $-\infty$ |

Note:

It is possible for Floating-Point occurs and Inexact Result exceptional conditions to occur simultaneously in the same instruction. In this case, if the Floating-Point Overflow Trap is enabled (FSR.OVE=0), then a Floating-Point Trap (FPU) occurs, the FSR.TT field is set to 2, the FSR.OVF and FSR.IF flags are set to 1, and no result is written to the destination register. Otherwise, if the Floating-Point Overflow Trap is disabled (FSR.OVE=1) and the Inexact Result Trap is enabled (FSR.IEN=1), then a Floating-Point Trap (FPU) occurs, the FSR.TT field is set to 6, both FSR.OVF and FSR.IF flags are set to 1, and no result is written to the destination register. Otherwise, if both the Floating-Point Overflow and Inexact Result Traps are disabled (FSR.OVE=1 and FSR.IEN=0), then both FSR.OVF and FSR.IF flags are set to 1 and a $\pm\infty$ or $\pm Max$ is returned, as described above, and the FSR.TT is set to 2.

4.2.4.1.3 Floating-Point Division by Zero

This condition occurs whenever an attempt is made to divide a non-zero normalized or denormalized number by zero. This condition is reported by setting the FSR.TT field to 3, and the FSR.DZF flag to 1.

If Floating-Point Division by Zero Trap is enabled (FSR.DZE=0) while this condition is detected, then a Floating-Point Trap (FPU) occurs and no result is returned. If Floating-Point Division by Zero Trap is disabled (FSR.DZE=1) while this condition is detected, then no trap occurs, and the returned result is $\pm\infty$, signed with the Exclusive-OR of the two operands' signs.

SWORDFISH ARCHITECTURE SPECIFICATION          Rev. 2.0, February 1990

4.2.4.1.4 Invalid Operation

This condition occurs whenever the operands of a floating-point instruction are not consistent with the operation. Refer to "Operation with Special Floating-Point Operands" in Section 4.2.4.2 for information on which operand/instruction combinations lead to this condition. This condition is reported by setting the FSR.TT field to 5, and the FSR.IVF flag to 1.

If Invalid Operation Trap is enabled (FSR.IVE = 0) while this condition is detected, then a Floating-Point Trap (FPU) occurs and no result is returned. If Invalid Operation Trap is disabled (FSR.IVE = 1) while this condition is detected, then no trap occurs, if the destination has a Floating-Point format, then the negative Quiet NaN is returned. The FLOORI, FLOORUI, ROUNDI, ROUNDUI, TRUNCI and TRUNCUI return *Max Int* in that case.

Invalid Operation occurs in the following cases :

- Operation on Signaling NaN (Except : LOADI, LOADUI, LOADNI, LOADNUI, MOVI, MOVUI, TRDF, TRUDF, TRFD, TRUFD, ABSI, NEGI, STORI, STORUI, UCMPI and UCMPUI instructions)
- Addition of Infinities with opposite signs.
- Subtraction of infinities with the equal signs.
- Multiplication of zero by Infinity.
- Division of zero by zero, or infinity by infinity.
- Ordered comparison when one of the operands is a NaN.
- Conversion to integer, when the operand is a NaN or Infinity.

4.2.4.1.5 Inexact Result

This condition occurs whenever the result of a floating-point or an integer to floating-point conversion operation cannot be represented exactly in the format of the destination operand, or when Floating Point Overflow occurs, and the Overflow trap is disabled. Unless another exceptional condition is detected in the same instruction, this condition is reported by setting the FSR.TT field to 6, and the FSR.IF flag to 1.

If Inexact Result Trap is enabled (FSR.IEN = 1) while this condition is detected and no other exceptional condition is detected, then a Floating-Point Trap (FPU) occurs and no result is written to the destination register, the correctly rounded result is passed to the trap handler via the FTRH and FTRL registers. If Inexact Result Trap is disabled (FSR.IEN = 0) while this condition is detected and no other exceptional condition is detected, then no trap occurs, and the true result is rounded and returned.

Note:

If a Floating-Point Inexact Result occurs and the appropriate trap is disabled, then FSR.IF is set to 1, and FSR.TT to 6, if FSR.IEN = 1 than an Inexact Result Trap occurs. Moreover it is possible for the Inexact Result condition to occur simultaneously with Underflow or Overflow condition in the same instruction. Refer to the appropriate exceptional condition section for information in this case.

4.2.4.1.6 Integer Conversion Overflow

This condition occurs whenever the result of an integer conversion operation is too large in absolute value to be represented as an integer in the format of the destination operand. This condition is reported by setting the FSR.TT field to 7 and the FSR.IOF flag to 1.

SWORDFISH ARCHITECTURE SPECIFICATION  Rev. 2.0, February 1990

If Integer Overflow Trap is enabled (FSR.IOE = 0) while this condition is detected, then a Floating-Point Trap (FPU) occurs and no result is written to the destination register. If Integer Overflow Trap is disabled (FSR.IOE = 1) while this condition is detected then the returned result is the maximal or minimal integer value (according to the sign).

4.2.4.2 Operation with Special Floating-Point Operands

This section describes the result of floating-point operations in certain special cases when it is not uniquely defined mathematically. The following cases require special treatment: ±0, ±∞, Signaling NaNs, Quiet NaN.

Quite NaNs are legal operands. Any operation with a Quite NaN operand returns this Quiet NaN as a result. If both operands are Quiet NaNs than the one with the larger sign bit is returned. Signaling NaN cause an Invalid Operation Condition for all operations except MOVI, MOVUI, STORI, STORUI, LOADI, LOADUI, LOADNI, LOADNUI, TRDF, TRUDF, TRFD, TRUFD, UCMPI and UCMPUI. Infinities are legal operands except conditions specified in "Invalid Operation" in Section 4.2.4.1.5

4.2.4.2.1 Additions and Subtractions

Addition or subtraction of ±0 to a non-zero value do not change it. Addition of equally signed zeroes returns zero with the sign of the operands. Subtraction of differently signed zeroes returns zero with the sign of the subtrahend. The result of adding differently signed operands with the same absolute value, or subtraction of equally signed operands with the same absolute value, returns ±0 where the sign is determined by the Rounding Mode as follows: If Round Toward −∞ is selected, then −0 is returned; in all other rounding mode cases, +0 is returned.

Addition of ±∞ to a finite value return ±∞ with the same sign. Subtraction of +∞ from a finite value, or subtraction of a finite value from −∞, return −∞. Subtraction of −∞ from a finite value, or subtraction of a finite value from +∞, return +∞. Addition of equally signed infinity returns ±∞ with the sign of the operands. Subtraction of differently signed infinity returns ±∞ with the sign of the subtrahend. Addition of differently signed infinity or subtraction of equally signed infinity cause an Invalid Operation exceptional condition.

4.2.4.2.2 Multiplication and Division

Multiplication of zero by a finite value returns zero. Multiplication of infinity by a non-zero value returns infinity. The sign of the result is the Exclusive-OR of the two operands' signs. Multiplication of zero by infinity causes an Invalid Operation exceptional condition.

Division of zero by a non-zero value returns zero. Division of infinity by a finite value returns infinity. The sign of the result is the Exclusive-OR of the two operands' signs. Division of zero by zero, or division of infinity by infinity causes an Invalid Operation exceptional condition. Division of any finite non-zero value by zero causes a Floating-Point Division by Zero exceptional condition.

4.2.4.2.3 Negation and Absolute Value

Negation simply inverts the sign of its operand. Taking absolute value forces it to be positive. Any value, including Signaling and Quiet NaNs, is permitted in negation and absolute value operations.

SWORDFISH ARCHITECTURE SPECIFICATION          Rev. 2.0, February 1990

4.2.4.2.4 Comparison

Both NaNs are permitted only in unordered comparison operation (i.e UCMPI and UCMPUI instructions). If any operand is a NaN, then the result is "unordered": the PSR.Z and PSR.N flag are cleared to 0, and the PSR.L flag is set to 1. If any operand in CMPI or CMPUI instructions is a NaN, then if the Invalid Operation trap is enabled, the FSR.IVF flag is set, the trap occurs, and the FSR is not changed. Otherwise, the FSR.IVF flag is set.

If none of the operand is a NaN, then the result is "ordered". The PSR.L flag is cleared to 0, the PSR.Z is set to 1 in case the operands are equal (cleared to 0 otherwise), and the PSR.N is set to 1 in case the second operand is less than the first operand (cleared to 0 otherwise).

The ordering of ordered values is as follows: $-\infty$ < negative finite non-zero values < $-0$ = $+0$ < positive finite non-zero values < $+\infty$.

4.2.4.2.5 Move

The MOVI, MOVUI, TRDF, TRUDF, TRFD, TRUFD, instruction simply moves its operand as a bit pattern without checking its format. Any value, including Signaling NaNs, is permitted in those instruction.

The MOVFL and MOVLF instructions convert zero and infinity to zero and infinity with the same sign, respectively.

4.2.4.2.6 Conversion to Integer

Conversion of ±0 to integer returns the (unsigned) integer zero. Conversion of infinity or Quiet NaN to integer, causes an Invalid Operation exceptional condition.

4.2.5 Load/Store Instructions

These instructions are used for memory access. Data may be loaded from memory into any register in the Swordfish extended register set, or stored from such a register out to memory. The LOADi and STORi instructions operate on integer operands. It is possible to convert integer values to double-word size upon loading them from memory. The LOADf, LOADUf, LOADNf, LOADNUf, STORf, and STORUf instructions operate on floating-point operands.

Data that should not reside in the Data Cache (for example, an array larger than the DC size), can be loaded from memory using the Non-cacheable version of the Load instructions. The LOADNi, LOADNUi, LOADNf and LOADNUf load non-cacheable data from memory to a register (refer to "Data Cache" in Section 6.3 ).

Load/store instruction may use the relative Core addressing modes for specifying the memory operand. The load instructions can also specify indexed addressing mode. The distinction between relative and indexed form is done according to the instruction's Opcode. Refer to "Instruction Formats" in Appendix A for details.

4.2.6 Branch/Linkage Instructions

These instructions are used to control the sequence of program execution. The Bcond, and JUMP instructions transfer control to an instruction non-sequentially. JUMP is unconditional, it uses a register operand in which the absolute address of the target instruction is held. Bcond is a conditional branch, SWORDFISH ARCHITECTURE SPECIFICATION          Rev. 2.0, February 1990 depending on the state of the PSR flags and the specified condition (BR which is an unconditional branch is a special case of Bcond). The BAL instruction is used to link to a subroutine by first saving the address of the next sequential instruction onto a register, and branching as in the BR case. Returning from a subroutine can be done by using the JUMP instruction with the register containing the return address as operand.

The RETX instruction returns control from a trap handler, and an interrupt service routine, and restores the PSR. Refer to "Exception Service Procedures" in Section 5.4.5 for more information.

The EXCP instruction is provided for causing a deliberate trap. The trap can be specified as Breakpoint Trap (BPT), Supervisor Call Trap (SVC), Flag Trap (FLG), Undefined Instruction Trap (UND), Floating-Point Trap (FPU), Illegal Operation Trap (ILL), or Division by Zero Trap (DVZ).

4.2.7 Service Instructions

These instructions provide general housekeeping functions and services. The LPR and SPR instructions are used for accessing dedicated processor registers. The WAIT instruction causes the Swordfish to suspend instruction execution until an interrupt occurs. The EOI instruction performs an End-of-Interrupt bus cycle in order to inform external ICU that the interrupt service is ending. The CINV instruction is used for invalidating the Instruction Cache or Data Cache or both.

4.2.8 Parallel and Multiprocessing Support Instructions

The Swordfish provides an instruction to support interlocked operations on shared data. The MBITI instruction allows testing and modification of shared semaphores in an indivisible manner. Refer to the specific instruction definition in "Instruction Definitions" in Section 4.2.9 and to "Interlocked Bus Cycles" in Section 7.5.3.4 for more information.

4.2.9 Instruction Definitions

This section contains the definitions of all the Core Instructions. Each instruction is presented by listing its name, syntax, valid mnemonic forms, operand attributes, binary encoding format, detailed description, flags affected, and possible trap conditions.

Operand attributes consist of valid addressing modes and operand access class. Valid combinations for core addressing modes are specified as: "reg", "reg/imm", "ref", and "rel/idx" (see "Core Addressing Modes" in Section 4.2.2). Operand access classes are specified as: "read", "write", and "addr" (address). Access class specification is followed by the operand length specifier.

Instruction: Absolute Value Floating

| Syntax: | ABSf | src, | dest | | ABSF |
|---|---|---|---|---|---|
| | | reg | reg | | ABSL |
| | | read.f | write.f | | |

| Syntax: | ABSUf | src, | dest | | ABSUF |
|---|---|---|---|---|---|
| | | reg | reg | | ABSUL |
| | | read.f | write.f | | |

Format:

```
|31                                          10|9|8|7|6         0|
|          Addressing Mode                   | 0|f|u|0 1 0 1 0 1 1|
```

The ABSf instruction computes the absolute value of the *src* operand and places the result in the *dest* operand. Refer to "Floating-Point Instructions" in Section 4.2.4 for more information on floating-point operand formats and operations.

Flags: No PSR flags are affected. No FSR flags are affected, and the FSR.TT is cleared to 0. Refer to "Floating-Point Exceptional Conditions" in Section 4.2.4.1 for more information.

Traps: Undefined Instruction Trap (UND) occurs if the CFG.F bit is 0. No Floating-Point (FPU) traps occur on the ABSf and ABSUf instructions.

Instruction: Add Floating

| Syntax: | ADDf | src1, | src2, | dest | ADDF |
|---|---|---|---|---|---|
| | | reg | reg | reg | ADDL |
| | | read.f | read.f | write.f | |

| Syntax: | ADDUf | src1, | src2, | dest | ADDUF |
|---|---|---|---|---|---|
| | | reg | reg | reg | ADDUL |
| | | read.f | read.f | write.f | |

Format:

```
|31                                          10|9|8|7|6         0|
|          Addressing Mode                   | 0|f|u|0 1 0 0 1 0 1|
```

The ADDf instruction adds the *src1* and *src2* operands, and places the result in the *dest* operand. Refer to "Floating-Point Instructions" in Section 4.2.4 for more information on floating-point operand formats

SWORDFISH ARCHITECTURE SPECIFICATION  Rev. 2.0, February 1990 and operations.

Flags: No PSR flags are affected. On ADDI instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the ADDUi instruction.

Traps: Undefined Instruction Trap (UND) occurs if the CFG.F bit is 0. On ADDi instruction Floating-Point Trap (FPU) occurs if a floating-point exception is detected. Refer to "Floating-Point Exceptional Conditions" in Section 4.2.4.1. No Floating-Point (FPU) traps occur on the ADDUi instruction.

Instruction: Add Integer

| Syntax: | ADDI | src1,    | src2,  | dest    | ADDB |
|         |      | reg/imm  | reg    | reg     | ADDW |
|         |      | read.i   | read.i | write.i | ADDD |

| Syntax: | ADDUI | src1,    | src2,  | dest    | ADDUB |
|         |       | reg/imm  | reg    | reg     | ADDUW |
|         |       | read.i   | read.i | write.i | ADDUD |

Format:

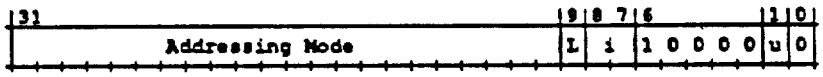

Note: when L=1 the Addressing Mode field is in bits 10:63

The ADDi instruction adds the *src1* and *src2* operands, and places the result in the *dest* operand.

Flags: On ADDi instruction, PSR.C is set to 1 on a carry from addition, cleared to 0 if no carry. PSR.F is set to 1 on an overflow from addition, cleared to 0 if no overflow. Refer to "Integer/Logical Instructions" in Section 4.2.3 for more information on integer carry and overflow conditions. No PSR flags are affected on the ADDUi instruction.

Traps: On ADDi instruction Integer Overflow Trap (OVF) occurs if the PSR.V bit is 1 and the PSR.F flag is set to 1 following the execution of this instruction. While CFG.ISR is 1 and PSR.U is 1, an Illegal Operation Trap (ILL) occurs if ADDi or ADDUi attempts to access one of the registers R16 through R30. No Overflow Trap (OVF) on the ADDUi instruction.

Instruction: Add Integer with Carry

| Syntax: | ADDCI | src1,    | src2,  | dest    | ADDCB |
|         |       | reg/imm  | reg    | reg     | ADDCW |
|         |       | read.i   | read.i | write.i | ADDCD |

Format:

SWORDFISH ARCHITECTURE SPECIFICATION       Rev. 2.0, February 1990

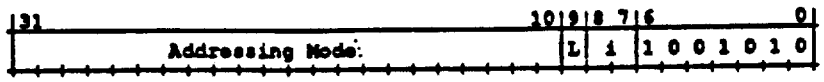

Note: when L=1 the Addressing Mode field is in bits 10:63

The ADDCi instruction adds the *src1* operand, *src2* operand, and the PSR.C flag, and places the sum in the *dest* operand.

Flags: PSR.C is set to 1 on a carry from addition, cleared to 0 if no carry. PSR.F is set to 1 on an overflow from addition, cleared to 0 if no overflow. Refer to "Integer/Logical Instructions" in Section 4.2.3 for more information on integer carry and overflow conditions.

Traps: Integer Overflow Trap (OVF) occurs if the PSR.V bit is 1 and the PSR.F flag is set to 1 following the execution of this instruction. While CFG.ISR is 1 and PSR.U is 1, an Illegal Operation Trap (ILL) occurs when ADDCi attempts to access one of the registers R16 through R30.

Instruction: Bitwise Logical And

Syntax:  ANDi   src1,    src2,   dest            ANDB
                reg/imm  reg     reg             ANDW
                read.i   read.i  write.i         ANDD Format:

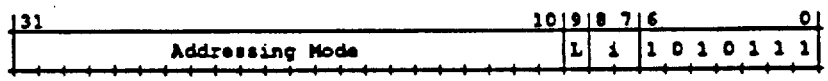

Note: when L=1 the Addressing Mode field is in bits 10:63

The ANDi instruction performs a bitwise logical AND operation on the *src1* and *src2* operands, and places the result in the *dest* operand.

Flags: None

Traps: While CFG.ISR is 1 and PSR.U is 1, an Illegal Operation Trap (ILL) occurs if ANDi attempts to access one of the registers R16 through R30.

Instruction: Arithmetic Shift

Syntax:  ASHUi  count,   src,    dest            ASHUB
                reg/imm  reg     reg             ASHUW
                read.B   read.i  write.i         ASHUD Format:

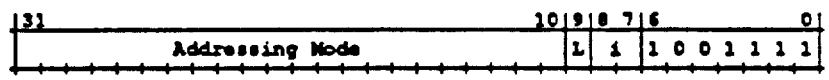

Note: when L=1 the Addressing Mode field is in bits 10:63

The ASHUi instruction performs an arithmetic shift on the *src* operand in the manner specified by the *count* operand, and places the result in the *dest* operand. Both operands are interpreted as signed integers.

SWORDFISH ARCHITECTURE SPECIFICATION         Rev. 2.0, February 1990

The sign of *count* determines the direction of the shift. A positive *count* specifies a left shift; a negative *count* specifies a right shift. The absolute value of the *count* gives the number of bit positions to shift the *src* operand. The *count* operand value must be within the range -7 to +7 for the ASHUB form, -15 to +15 for the ASHUW form, and -31 to +31 for the ASHUD form; otherwise, the result is unpredictable. In an arithmetic left shift, high-order bits (including the sign bit) shifted out of *src* are lost, and low-order bit positions emptied by the shift are zero-filled. In an arithmetic right shift, low-order bits shifted out of *src* are lost, and all high-order bit positions emptied by the shift are filled from the original sign bit of *src*.

Flags: None

Traps: While CFG.ISR is 1 and PSR.U is 1, an Illegal Operation Trap (ILL) occurs if ASHUi attempts to access one of the registers R16 through R30.

Instruction: Conditional Branch

Syntax:    Bcond    *dest*
                    *disp*

Format:

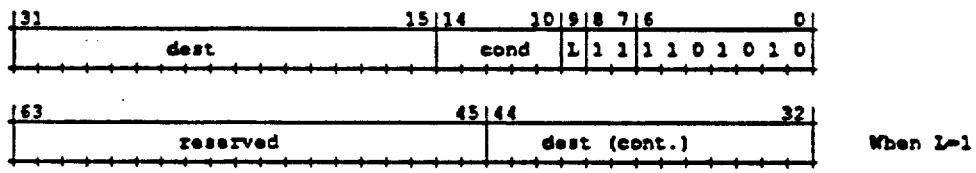

The Bcond instruction branches to the location specified as *dest* shifted left by 2, plus the current content of the Program Counter, if the condition specified by *cond* is true. If the condition is false, execution continues with the next sequential instruction.

*dest* is specified as a displacement relative to the address of the Bcond instruction itself. *Cond* is a two character condition name that specifies the state of a flag or flags in the PSR. If the flag(s) have the specified state, the condition is true; otherwise, the condition is false. *Cond* is specified according to the following encoding:

SWORDFISH ARCHITECTURE SPECIFICATION   Rev. 2.0, February 1990

| Condition | Symbol | True State | Cond Field |
|---|---|---|---|
| Equal | EQ | Z flag is 1 | 10000 |
| Not Equal | NE | Z flag is 0 | 10001 |
| Carry Set | CS | C flag is 1 | 10010 |
| Carry Clear | CC | C flag is 0 | 10011 |
| Higher | HI | L flag is 1 | 10100 |
| Lower or Same | LS | L flag is 0 | 10101 |
| Greater Than | GT | N flag is 1 | 10110 |
| Less Than or Equal | LE | N flag is 0 | 10111 |
| Flag Set | FS | F flag is 1 | 11000 |
| Flag Clear | FC | F flag is 0 | 11001 |
| Lower | LO | Z and L flags are 0 | 11010 |
| Higher or Same | HS | Z or L flag is 1 | 11011 |
| Less Than | LT | Z and N flags are 0 | 11100 |
| Greater Than or Equal | GE | Z or N flag is 1 | 11101 |
| Unconditional | R | Always | 11110 |
| Unconditional | N | Never | 11111 |

Flags: None

Traps: None

Instruction: Branch and Link

Syntax:  BAL  *link,  dest*
  reg  disp
  write.D

Format:

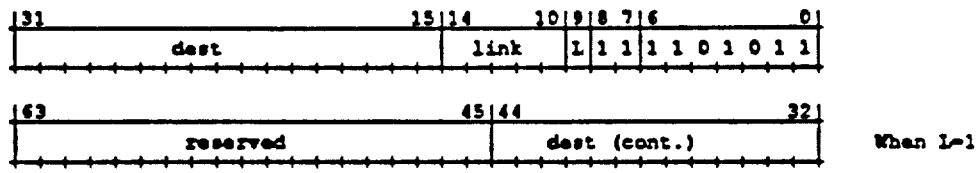

The BAL instruction calls the subroutine at the address specified as *dest* shifted left by 2, plus the current content of the Program Counter. It does so by storing the address of the next sequential instruction in the register specified as the *link* operand. *dest* is specified as a displacement relative to the address of the BAL instruction itself.

Flags: None

Traps: While CFG.ISR is 1 and PSR.U is 1, an Illegal Operation Trap (ILL) occurs if BAL attempts to access one of the registers R16 through R30.

SWORDFISH ARCHITECTURE SPECIFICATION          Rev. 2.0, February 1990

Instruction: Bitwise Bit Clear

Syntax:   BICi   src1,    src2,    dest                                    BICB
                reg/imm  reg     reg                                       BICW
                read.i   read.i  write.i                                   BICD Format:

```
|31                                    10|9|8 7|6        0|
| Addressing Mode                       |L|i|1 0 1 0 1 1 0|
```

Note: when L=1 the Addressing Mode field is in bits 30:63

The BICi instruction copies *src2* to *dest* and clears to 0 those bits in the *dest* operand that correspond to the "1" bits in the *src1* operand.

Flags: None

Traps: While CFG.ISR is 1 and PSR.U is 1, an Illegal Operation Trap (ILL) occurs if BICi attempts to access one of the registers R16 through R30.

Instruction: Cache Invalidate

Syntax:   CINV   *options*

Format:   (Special-Function)

```
|31                 21| |19      15|14     10|9|8 7|6        0|
|1 1 1 1 1 1 1 1 1 1|0|1 1 1 1 1|0|0|0|I|D|0|1 1|1 1 1 0 1 1 0|
```

The CINV instruction invalidates the content of the on-chip Instruction Cache and/or Data Cache. The instruction can be used to invalidate either the entire content of the on-chip caches or only the unlocked entries in the caches.

*Options* are specified by listing the letters I, D, and U. These options are independent. If I is specified then the Instruction Cache is affected. If D is specified then the Data Cache is affected. If both I and D are specified then both caches are affected. If U is specified, then only the unlocked entries in the affected cache(s) are invalidated; otherwise, the entire cache(s) is invalidated. In the instruction encoding, the specified options are represented by setting to 1 the corresponding I, D, and U fields, and the unspecified options are represented by clearing to 0 the corresponding fields.

Flags: None

Traps: Illegal Operation Trap (ILL) occurs if an attempt is made to execute this instruction while the PSR.U flag is 1.

SWORDFISH ARCHITECTURE SPECIFICATION     Rev. 2.0, February 1990

Instruction: Compare Floating

| Syntax: | CMPI | src1, | src2 | | CMPF |
|---|---|---|---|---|---|
| | | reg | reg | | CMPL |
| | | read.f | read.f | | |

| Syntax: | CMPUI | src1, | src2 | | CMPUF |
|---|---|---|---|---|---|
| | | reg | reg | | CMPUL |
| | | read.f | read.f | | |

Format:

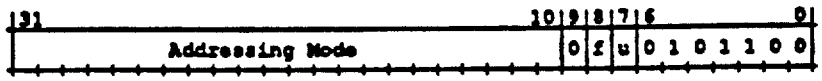

The CMPI instruction compares the *src1* and *src2* operands and sets the PSR.Z, PSR.N, and PSR.L flags to indicate the comparison result. Positive and negative zero are regarded as equal. Refer to "Floating-Point Instructions" in Section 4.2.4 for more information on floating-point operand formats and operations.

Flags: On CMPI instruction PSR.Z is set to 1 if *src1* equals *src2*, cleared to 0 otherwise. PSR.N is set to 1 if *src1* is greater than *src2*, cleared to 0 otherwise. PSR.L is set to 1 if the operands are unordered, cleared to 0 otherwise. The appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. None of the FSR flags are affected on the CMPUI instruction.

Traps: Undefined Instruction Trap (UND) occurs if the CFG.F bit is 0. On CMPI instruction Floating-Point Trap (FPU) occurs if a floating-point exception is detected. Refer to "Floating-Point Exceptional Conditions" in Section 4.2.4.1. No Floating-Point (FPU) traps occur on the CMPUI instruction.

Instruction: Compare Integer

| Syntax: | CMPI | src1, | src2, | dest | CMPB |
|---|---|---|---|---|---|
| | | reg/imm | reg | reg | CMPW |
| | | read.i | read.i | write.i | CMPD |

Format:

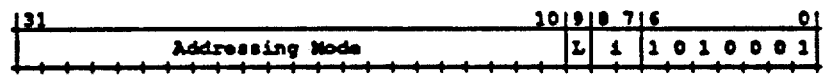

Note: when L=1 the Addressing Mode field is in bits 10:63

The CMPI instruction subtracts the *src1* operand from the *src2* operand, places the result in the *dest* operand, and sets the PSR.Z, PSR.N, and PSR.L flags to indicate the comparison result. The PSR.N flag indicates the result of a signed integer comparison; the PSR.L flag indicates the result of an unsigned comparison. Both types of comparison are performed.

Flags: PSR.Z is set to 1 if *src1* equals *src2*, cleared to 0 otherwise. PSR.N is set to 1 if *src1* is greater than *src2* (signed comparison), cleared to 0 otherwise. PSR.L is set to 1 if *src1* is greater than *src2* (unsigned comparison), cleared to 0 otherwise.

SWORDFISH ARCHITECTURE SPECIFICATION          Rev. 2.0, February 1990

Traps: While CFG.ISR is 1 and PSR.U is 1, an Illegal Operation Trap (ILL) occurs if CMPi attempts to access one of the registers R16 through R30.

Instruction: Compare Characters in Double-Word

Syntax:     CMPCHD    src1,    src2
                        reg/imm   reg
                        read.D    read.D

Format:

```
|31                                    10|9|8 7|6              0|
|         Addressing Mode                |L|1 1|1 0 1 0 1 0 1   |
```

Note: when L=1 the Addressing Mode field is in bits 10:63

The CMPCHD instruction compares each byte in the src1 operand against the corresponding byte in the src2 operand, and sets the PSR.Z to 1 if equality results in any one of these comparisons.

Flags: PSR.Z is set to 1 if equality results in any one of the byte comparisons, cleared to 0 otherwise. PSR.N and PSR.L are cleared to 0.

Traps: While CFG.ISR is 1 and PSR.U is 1, an Illegal Operation Trap (ILL) occurs if CMPCHD attempts to access one of the registers R16 through R30.

Instruction: Divide Floating

Syntax:    DIVf    src1,    src2,    dest                                           DIVF
                      reg     reg     reg                                             DIVL
                      read.f   read.f   write.f

Syntax:    DIVUf    src1,    src2,    dest                                     DIVUF
                      reg     reg     reg                                     DIVUL
                      read.f   read.f   write.f

Format:

```
|31                                    10|9|8|7|6              0|
|         Addressing Mode                |0|f|u|0 1 0 1 0 0 1   |
```

The DIVf instruction divides the src2 operand by the src1 operand, and places the result in the dest operand. Refer to "Floating-Point Instructions" in Section 4.2.4 for more information on floating-point operand formats and operations.

Flags: No PSR flags are affected. On DIVf instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the DIVUf instruction.

Traps: Undefined Instruction Trap (UND) occurs if the CFG.F bit is 0. On DIVf instruction Floating-Point Trap (FPU) occurs if a floating-point exception is detected. Refer to "Floating-Point Exceptional Conditions" in Section 4.2.4.1. No Floating-Point (FPU) traps occur on the DIVUf instruction.

SWORDFISH ARCHITECTURE SPECIFICATION          Rev. 2.0, February 1990

Instruction: End of Interrupt

Syntax:  EOI

Format:   (Special-Function)

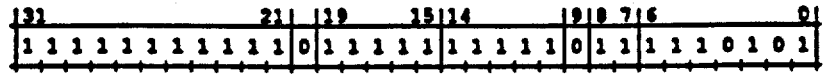

The EOI instruction performs an End-of-Interrupt bus cycle in order to inform the on-chip Interrupt Control Unit that the interrupt service is ending. Refer to "Instruction Execution and Exceptions" in Section 5 for more information on interrupt handling.

Flags: None

Traps: None

Instruction: Exception

Syntax:  EXCP  *vector*

Format:

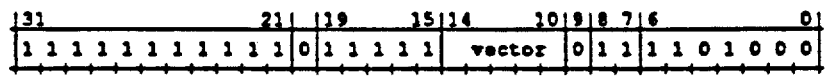

The EXCP instruction activates a trap according to the *vector* operand. The return address pushed on the Stack is the address of the EXCP instruction itself. Refer to "Trap Conditions" in Section 5.4.2.2 for more information on handling exceptions.

| Vector | Name | Trap |
|---|---|---|
| 3 | Floating-Point Trap | FPU |
| 4 | Illegal Instruction Trap | ILL |
| 5 | Supervisor Call Trap | SVC |
| 6 | Division by Zero Trap | DVZ |
| 7 | Flag Trap | FLG |
| 8 | Breakpoint Trap | BPT |
| 10 | Undefined Instruction Trap | UND |
| otherwise | (reserved) | UND |

TABLE 5-1. EXCP options

Flags: None

Traps: A trap will occur according to the above table.

SWORDFISH ARCHITECTURE SPECIFICATION  Rev. 2.0, February 1990

Instruction: Floor Floating to Integer

| Syntax: | FLOORf | src, | dest | | FLOORF |
|---|---|---|---|---|---|
| | | reg | reg | | FLOORL |
| | | read.f | write.D | | |

| Syntax: | FLOORUf | src, | dest | | FLOORUF |
|---|---|---|---|---|---|
| | | reg | reg | | FLOORUL |
| | | read.f | write.D | | |

Format:

```
|31                                        10|9|8|7|6         0|
| Addressing Mode                           |0|f|u|0 1 0 1 1 1 1|
```

The FLOORf instruction rounds the *src* operand to the nearest integer which is less than or equal to it (towards negative infinity), and places the result in the *dest* operand as a signed double-word integer. Refer to "Floating-Point Instructions" in Section 4.2.4 for more information on floating-point operand formats and operations.

Flags: No PSR flags are affected. On FLOORf instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the FLOORUf instruction.

Traps: Undefined Instruction Trap (UND) occurs if the CFG.F bit is 0. On FLOORf instruction Floating-Point Trap (FPU) occurs if a floating-point exception is detected. Refer to "Floating-Point Exceptional Conditions" in Section 4.2.4.1. No Floating-Point (FPU) traps occur on the FLOORUf instruction. While CFG.ISR is 1 and PSR.U is 1, an Illegal Operation Trap (ILL) occurs if FLOORf or FLOORUf attempts to write to one of the registers R16 through R30.

Instruction: Jump

| Syntax: | JUMP | dest |
|---|---|---|
| | | reg |
| | | addr |

Format:

```
|31              21|19    15|14         10|9|8 7|6         0|
|1 1 1 1 1 1 1 1 1 1|0|1 1 1 1 1|    dest    |0|1 1|1 1 0 1 0 0 1|
```

The JUMP instruction jumps to the address specified in the *dest* register, by loading its 30 most-significant bits into the PC register.

Flags: None

Traps: While CFG.ISR is 1 and PSR.U is 1, an Illegal Operation Trap (ILL) occurs if JUMP attempts to access one of the registers R16 through R30.

SWORDFISH ARCHITECTURE SPECIFICATION          Rev. 2.0, February 1990

Instruction: Load Floating

Syntax:   LOADf   src,    dest                                          LOADF
                 rel/idx  reg                                           LOADL
                 read.f   write.f Syntax:   LOADUf  src,    dest                                          LOADUF
                 rel/idx  reg                                           LOADUL
                 read.f   write.f Format:

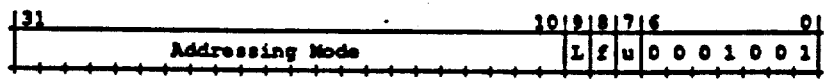

Note: when L=1 the Addressing Mode field is in bits 10:63

The LOADf instruction loads the floating-point *src* operand from memory, and places it in the *dest* floating-point data register operand.

Flags:   On LOADf, FSR.TT is set to 0. No FSR flags are affected on the LOADUf instruction.

Traps:   Undefined Instruction Trap (UND) occurs if the CFG.F bit is 0. While CFG.ISR is 1 and PSR.U is 1, an Illegal Operation Trap (ILL) occurs if LOADf or LOADUf attempts to read from one of the registers R16 through R30.

Instruction: Load Integer

Syntax:   LOADi   src,    dest                                          LOADB
                 rel/idx  reg                                           LOADW
                 read.i   write.i                                       LOADD Format:

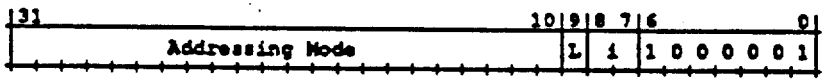

Note: when L=1 the Addressing Mode field is in bits 10:63

The LOADi instruction loads the *src* operand from memory, and places it in the *dest* register operand.

Flags:   None

Traps:   While CFG.ISR is 1 and PSR.U is 1, an Illegal Operation Trap (ILL) occurs if LOADi attempts to access one of the registers R16 through R30.

Instruction: Load Non-Cacheable Floating

Syntax:  LOADNf  src,     dest                                              LOADNF
                 rel/idx  reg                                               LOADNL
                 read.f   write.f Syntax:  LOADNUf src,     dest                                              LOADNUF
                 rel/idx  reg                                               LOADNUL
                 read.f   write.f Format:

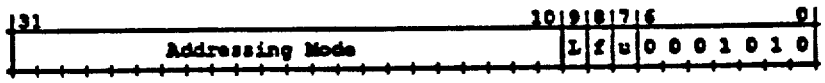

Note: when L=1 the Addressing Mode field is in bits 10:63

The LOADNf instruction loads the floating-point *src* operand from memory, and places it in the *dest* floating-point data register operand without changing the contents of the Data Cache. Note that if the *src* operand resides in the cache, it is read from the cache and an external memory reference is not issued.

Flags:  On LOADNf, FSR.TT is set to 0. No FSR flags are affected on the LOADNUf instruction.

Traps:  Undefined Instruction Trap (UND) occurs if the CFG.F bit is 0. While CFG.ISR is 1 and PSR.U is 1, an Illegal Operation Trap (ILL) occurs if LOADNf or LOADNUf attempts to read from one of the registers R16 through R30.

Instruction: Load Non-Cacheable Integer

Syntax:  LOADNi  src,     dest                                              LOADNB
                 rel/idx  reg                                               LOADNW
                 read.i   write.i                                           LOADND Format:

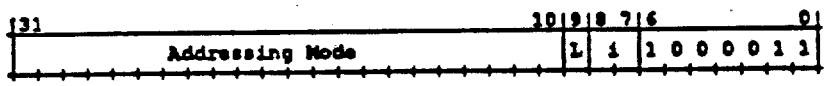

Note: when L=1 the Addressing Mode field is in bits 10:63

The LOADNi instruction loads the *src* operand from memory, and places it in the *dest* register operand without changing the contents of the Data Cache. Note that if the *src* operand resides in the cache, it is read from the cache and an external memory reference is not issued.

Flags: None

Traps: While CFG.ISR is 1 and PSR.U is 1, an Illegal Operation Trap (ILL) occurs if LOADNi attempts to access one of the registers R16 through R30.

SWORDFISH ARCHITECTURE SPECIFICATION                    Rev. 2.0, February 1990

Instruction: Load Processor Register

Syntax:   LPR   src,     dest
                reg      procreg
                read.D   write.D Format:   (Special-Function)

```
 31        26 25      21   19       15 14       10 9  8 7 6         0
|1 1 1 1 1 1| dest    |0 1 1 1 1 1|  src    |0 1 1|1 1 1 0 0 0 0|
```

The LPR instruction copies the *src* operand to the dedicated register specified by *dest*. Refer to "Register Set" in Section 2.1 for more information on the format of dedicated processor registers. If *dest* size is less the 32 bits, then *src* is truncated.

The following processor registers may be loaded:

| Register | Symbol | procreg | Privileged |
|---|---|---|---|
| Stack Pointer | SP | 00000 | Yes |
| Configuration Register | CFG | 00010 | Yes |
| Interrupt Base Register | INTBASE | 00011 | Yes |
| Debug Condition Register | DCR | 00101 | Yes |
| Debug Status Register | DSR | 00110 | Yes |
| Compare Address Register | CAR | 01000 | Yes |
| Address Mask Register | AMR | 01001 | Yes |
| Breakpoint Program Counter Register 0 | BPC0 | 01010 | Yes |
| Breakpoint Program Counter Register 1 | BPC1 | 01011 | Yes |
| FP Status Register | FSR | 01100 | No |
| FP Trap Result Low register | FTRL | 01110 | No |
| FP Trap Result High register | FTRH | 01111 | No |
| Low-order byte of PSR (User flags) | UPSR | 10110 | No |
| Processor Status Register | PSR | 10111 | Yes |

Note:

If PSR is specified, the instruction is privileged regardless of the operation length specified. If UPSR is specified, only the low-order byte of the PSR is loaded. In this case, the rest of the PSR is unaffected, and the instruction is not privileged.

Flags:   PSR and FSR flags are affected by values loaded into them. Otherwise, no PSR or FSR flags are affected.

Traps:   Undefined Instruction Trap (UND) occurs if FSR, FTRH or FTRL are specified and the CFG.F bit is 0. Illegal Operation Trap (ILL) occurs if DCR, BPC0, DSR, CAR, BPC1, SP, CFG, PSR, or INTBASE is specified, and the PSR.U flag is 1. While CFG.ISR is 1 and PSR.U is 1, an Illegal Operation Trap (ILL) occurs if LPR attempts to access one of the registers R16 through R30.

SWORDFISH ARCHITECTURE SPECIFICATION       Rev. 2.0, February 1990

Instruction: Logical Shift

| Syntax: | LSHi | count, | src, | dest | | LSHB |
|---|---|---|---|---|---|---|
| | | reg/imm | reg | reg | | LSHW |
| | | read.B | read.l | write.l | | LSHD |

Format:

```
|31                                    10|9|8 7|6         0|
| Addressing Mode                       |L|1|1 0 0 1 1 0 0|
```

Note: when L=1 the Addressing Mode field is in bits 10:63

The LSHi instruction performs a logical shift on the src operand in the manner specified by the *count* operand, and places the result in the *dest* operand.

The *count* operand is interpreted as a signed integer, the *src* operand is interpreted as an unsigned integer. The sign of *count* determines the direction of the shift. A positive *count* specifies a left shift; a negative *count* specifies a right shift. The absolute value of the *count* gives the number of bit positions to shift the *src* operand. The *count* operand value must be within the range -7 to +7 for the LSHB form, -15 to +15 for the LSHW form, and -31 to +31 for the LSHD form; otherwise, the result is unpredictable. In logical shift, all bits shifted out of *src* are lost, and bit positions emptied by the shift are zero-filled.

Flags: None

Traps: While CFG.ISR is 1 and PSR.U is 1, an Illegal Operation Trap (ILL) occurs if LSHi attempts to access one of the registers R16 through R30.

Instruction: Move Bit Interlocked

| Syntax: | MBITI | src, | offset, | base |
|---|---|---|---|---|
| | | imm | reg | reg |
| | | | read.D | addr |

Format:    (Special-Function)

```
|31              21|19        15|14     10|9|8 7|6         0|
|       src        |1|  offset  |  base   |0|1 1|1 1 0 0 0 1|
```

The MBITI instruction moves the *src* operand to the memory bit specified by *base* and *offset* after copying the original bit value to the PSR.F flag. In addition, the instruction activates the Interlocked Operation ILO signal, which may be used in multiprocessing systems to interlock access to semaphore bits. Refer to "Parallel and Multiprocessing Support Instructions" in Section 4.2.8 and to "Interlocked Bus Cycles" in Section 7.5.3.4 for more information on Swordfish interlocked access handling.

The location of the bit is determined from *offset* and *base*. *Offset* is a register operand, whose length is given by the operation length suffix. It is interpreted as a signed integer. *Base* is a memory addressing expression, giving a byte address from which *offset* is specified as a bit position. The bit is at position *offset* MOD 8, within the memory byte whose address is ADDR(*base*) + (*offset* DIV 8), where DIV is division with rounding to integer toward negative infinity, and MOD is the corresponding remainder.

The value of the *src* operand is specified in the least-significant bit of the immediate field.

SWORDFISH ARCHITECTURE SPECIFICATION   Rev. 2.0, February 1990

Flags: PSR.F is set to the original value of the specified bit.

Traps: While CFG.ISR is 1 and PSR.U is 1, an Illegal Operation Trap (ILL) occurs if MBITI attempts to access one of the registers R16 through R30.

Instruction: Multiply High-Word by High-Word

Syntax:   MHHD   src1,   src2,   dest
                    reg      reg      reg
                    read.W   read.W   write.D

Format:

```
|31                                              |9|8 7|6         0|
|            Addressing Mode                     |0|0 1|0 1 1 0 0 0 1|
```

The MHHD instruction multiplies the high order word of src1 by the high order word of src2 and places the double-word result in the dest operand. Both the src1 and src2 operands are interpreted as signed integers.

Flags: None

Traps: While CFG.ISR is 1 and PSR.U is 1, an Illegal Operation Trap (ILL) occurs if MHHD attempts to access one of the registers R16 through R30.

Instruction: Multiply Low-Word by High-Word

Syntax:   MLHD   src1,   src2,   dest
                    reg      reg      reg
                    read.W   read.W   write.D

Format:

```
|31                                              |9|8 7|6         0|
|            Addressing Mode                     |0|0 1|0 1 1 0 1 0 1|
```

The MLHD instruction multiplies the low order word of src1 by the high order word of src2 and places the double-word result in the dest operand. Both the src1 and src2 operands are interpreted as signed integers.

Flags: None

Traps: While CFG.ISR is 1 and PSR.U is 1, an Illegal Operation Trap (ILL) occurs if MLHD attempts to access one of the registers R16 through R30.

SWORDFISH ARCHITECTURE SPECIFICATION          Rev. 2.0, February 1990

Instruction: Multiply Low-Word by Low-Word

Syntax:  MLLD   src1,   src2,   dest
                reg     reg     reg
                read.W  read.W  write.D Format:

| 31                     | 9 8 7 6 | 0 |
|------------------------|---------|---|
| Addressing Mode        | 0 0 1   | 0 1 1 0 1 0 0 |

The MLLD instruction multiplies the low order word of *src1* by the low order word of *src2* and places the double-word result in the *dest* operand. Both the *src1* and *src2* operands are interpreted as signed integers.

Flags: None

Traps: While CFG.ISR is 1 and PSR.U is 1, an Illegal Operation Trap (ILL) occurs if MLLD attempts to access one of the registers R16 through R30.

Instruction: Move Floating

Syntax:  MOVI   src,    dest                                              MOVF
                reg     reg                                               MOVL
                read.f  write.f Syntax:  MOVUI  src,    dest                                              MOVUF
                reg     reg                                               MOVUL
                read.f  write.f Format:

| 31              | 10 9 8 7 6 | 0 |
|-----------------|------------|---|
| Addressing Mode | 0 f u      | 0 0 0 1 0 0 0 |

The MOVI instruction copies the *src* operand to the *dest* operand.

Flags: No PSR flags are affected. On MOVI instruction the FSR.TT field is cleared to 0. No FSR flags are affected on the MOVUI instruction.

Traps: Undefined Instruction Trap (UND) occurs if the CFG.F bit is 0.

Instruction: Move Converting Integer to Long

Syntax:  MOVDL  src,    dest
                reg     reg
                read.D  write.L Syntax:  MOVUDL src,    dest
                reg     reg
                read.D  write.L SWORDFISH ARCHITECTURE SPECIFICATION          Rev. 2.0, February 1990

Format:

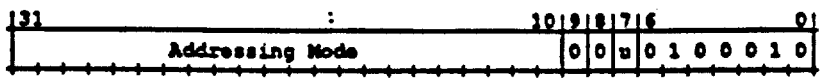

The MOVDL instruction converts the double-word signed integer operand src to a double-precision floating-point number, and places the result in the dest operand. Refer to "Floating-Point Instructions" in Section 4.2.4 for more information on floating-point operand formats and operations.

Flags: No PSR flags are affected. On MOVDL instruction FSR.TT is cleared to 0. Refer to "Floating-Point Exceptional Conditions" in Section 4.2.4.1 for more information. No FSR flags are affected on the MOVUDL instruction.

Traps: Undefined Instruction Trap (UND) occurs if the CFG.F bit is 0. While CFG.ISR is 1 and PSR.U is 1, an Illegal Operation Trap (ILL) occurs if MOVDL or MOVUDL attempts to access one of the registers R16 through R30.

Instruction:  Move Floating to Long Floating

Syntax:    MOVFL    src,      dest
                    reg       reg
                    read.F    write.L Syntax:    MOVUFL   src,      dest
                    reg       reg
                    read.F    write.L Format:

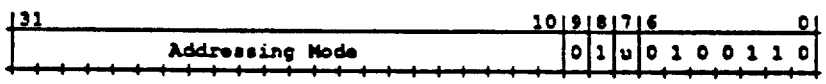

The MOVFL instruction converts the single-precision src operand to a double-precision format, and places the result in the dest operand. Refer to "Floating-Point Instructions" in Section 4.2.4 for more information on floating-point operand formats and operations.

Flags: No PSR flags are affected. On MOVFL instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the MOVUFL instruction.

Traps: Undefined Instruction Trap (UND) occurs if the CFG.F bit is 0. On MOVUFL instruction Floating-Point Trap (FPU) occurs if a floating-point exception is detected. Refer to "Floating-Point Exceptional Conditions" in Section 4.2.4.1. No Floating-Point (FPU) traps occur on the MOVUFL instruction.

SWORDFISH ARCHITECTURE SPECIFICATION          Rev. 2.0, February 1990

Instruction: Move Long Floating to Floating

Syntax:    MOVLF    src,     dest
                    reg      reg
                    read.L   write.F Syntax:    MOVULF   src,     dest
                    reg      reg
                    read.L   write.F Format:

| 31                              | 10 | 9 | 8 | 7 | 6 |   |   |   |   | 0 |
|---------------------------------|----|---|---|---|---|---|---|---|---|---|
| Addressing Mode                 | 0  | 0 | u | 0 | 1 | 0 | 1 | 0 | 1 | 0 |

The MOVLF instruction converts the double-precision src operand to a single-precision format, and places the result in the dest operand. Rounding is performed, if necessary, according to the FSR.RM field. Refer to "Floating-Point Instructions" in Section 4.2.4 for more information on floating-point operand formats and operations.

Flags: No PSR flags are affected. On MOVLF instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the MOVULF instruction.

Traps: Undefined Instruction Trap (UND) occurs if the CFG.F bit is 0. On MOVLF instruction Floating-Point Trap (FPU) occurs if a floating-point exception is detected. Refer to "Floating-Point Exceptional Conditions" in Section 4.2.4.1. No Floating-Point (FPU) traps occur on the MOVULF instruction.

Instruction: Move with Sign-Extension Integer to Double

Syntax:    MOVXID   src,     dest                                    MOVXBD
                    reg/imm  reg                                     MOVXWD
                    read.i   write.D Format:

| 31                              | 10 | 9 | 8 | 7 | 6 |   |   |   |   | 0 |
|---------------------------------|----|---|---|---|---|---|---|---|---|---|
| Addressing Mode                 |    | L | i | 1 | 0 | 0 | 0 | 1 | 1 | 0 |

Note: when L=1 the Addressing Mode field is in bits 10:6 3

The MOVXID instruction converts the src operand as a signed-integer to the double-word dest operand, preserving its sign through sign-extension.

Flags: None

Traps: While CFG.ISR is 1 and PSR.U is 1, an Illegal Operation Trap (ILL) occurs if MOVXID attempts to access one of the registers R16 through R30.

SWORDFISH ARCHITECTURE SPECIFICATION        Rev. 2.0, February 1990

Instruction: Move with Zero-Extension Integer to Double

Syntax:    MOVZID   src,     dest                                      MOVZBD
                    reg/imm  reg                                        MOVZWD
                    read.i   write.D Format:

```
|31                                    10|9|8 7|6           0|
| Addressing Mode                       |L|i|1 0 0 1 1 1|
```

Note: when L=1 the Addressing Mode field is in bits 10:63

The MOVZID instruction converts the *src* operand as an unsigned-integer to the unsigned double-word *dest* operand, by zero-filling the high-order bits.

Flags: None

Traps: While CFG.ISR is 1 and PSR.U is 1, an Illegal Operation Trap (ILL) occurs if MOVZID attempts to access one of the registers R16 through R30.

Instruction: Multiply Floating

Syntax:    MULf    src1,    src2,    dest                              MULF
                   reg      reg      reg                                MULL
                   read.f   read.f   write.f Syntax:    MULUf   src1,    src2,    dest                              MULUF
                   reg      reg      reg                                MULUL
                   read.f   read.f   write.f Format:

```
|31                                10|9|8|7|6           0|
| Addressing Mode                   |0|f|u|0 1 0 0 1 0 0|
```

The MULf instruction multiplies the *src1* and *src2* operands and places the result in the *dest* operand. Refer to "Floating-Point Instructions" in Section 4.2.4 for more information on floating-point operand formats and operations.

Flags: No PSR flags are affected. On MULf instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the MULUf instruction.

Traps: Undefined Instruction Trap (UND) occurs if the CFG.F bit is 0. On MULf instruction Floating-Point Trap (FPU) occurs if a floating-point exception is detected. Refer to "Floating-Point Exceptional Conditions" in Section 4.2.4.1. No Floating-Point (FPU) traps occur on the MULUf instruction.

SWORDFISH ARCHITECTURE SPECIFICATION          Rev. 2.0, February 1990

Instruction: Multiply Integer

Syntax:  MULi  src1,  src2,  dest                                    MULB
               reg    reg    reg                                     MULW
               read.i read.i write.i                                 MULD Syntax:  MULUi src1,  src2,  dest                                    MULUB
               reg    reg    reg                                     MULUW
               read.i read.i write.i                                 MULUD Format:

```
|31                                          |9|8 7|6 5|4|3      0|
|           Addressing Mode                  |0|1 0 1|u|0 0 0 0   |
```

The MULi instruction multiplies the *src1* and *src2* operands and places the result in the *dest* operand. Both the *src1* and *src2* operands are interpreted as signed integers. If the resulting product cannot be represented exactly in the *dest* operand, then the high-order bits are truncated.

Flags: None

Traps: On MULi instruction Integer Overflow Trap (OVF) occurs if the PSR.V bit is 1 and the resulting product cannot be represented exactly in the *dest* operand. No Overflow Trap (OVF) occurs on the MULUi instruction. While CFG.ISR is 1 and PSR.U is 1, an Illegal Operation Trap (ILL) occurs if MULi or MULUi attempts to access one of the registers R16 through R30.

Instruction: Negate Floating

Syntax:  NEGf  src,   dest                                           NEGF
               reg    reg                                            NEGL
               read.f write.f Syntax:  NEGUf src,   dest                                           NEGUF
               reg    reg                                            NEGUL
               read.f write.f Format:

```
|31                                  10|9|8|7|6              0|
|           Addressing Mode           |0|f|u|0 1 0 1 1 1 0     |
```

The NEGf instruction complements the sign bit of the *src* operand and places the result in the *dest* operand. Refer to "Floating-Point Instructions" in Section 4.2.4 for more information on floating-point operand formats and operations.

Flags: No PSR flags are affected. No FSR flags are affected, and the FSR.TT is cleared to 0. Refer to "Floating-Point Exceptional Conditions" in Section 4.2.4.1 for more information.

Traps: Undefined Instruction Trap (UND) occurs if the CFG.F bit is 0. No Floating-Point (FPU) traps occur on the NEGf and NEGUf instructions.

SWORDFISH ARCHITECTURE SPECIFICATION          Rev. 2.0, February 1990

Instruction: Bitwise Logical Or

Syntax:   ORi   src1,    src2,   dest                                ORB
                    reg/imm  reg     reg                                 ORW
                    read.l   read.l  write.l                             ORD

Format:

```
|31                                    10|9|8 7|6        0|
| Addressing Mode                       |L|1|1 0 1 0 0 1 1|
```

Note: when L=1 the Addressing Mode field is in bits 10:63

The ORi instruction performs a bitwise logical OR operation on the *src1* and *src2* operands, and places the result in the *dest* operand.

Flags: None

Traps: While CFG.ISR is 1 and PSR.U is 1, an Illegal Operation Trap (ILL) occurs if ORi attempts to access one of the registers R16 through R30.

Instruction: Return from Exception

Syntax: RETX

Format: (Special-Function)

```
|31              21| |19       15|14        10|9|8 7|6         0|
|1 1 1 1 1 1 1 1 1 1|0|1 1 1 1 1 |1 1 1 1 1 |0|1 1|1 1 1 0 0 1 0|
```

The RETX instruction returns control from a trap service procedure. The following steps are done:

1. The instruction pops a 32-bit Return Address from the Stack into the PC register.
2. The instruction then pops a 32-bit PSR value from the Stack into the PSR.

Flags: All PSR flag states are restored from the Stack.

Traps: Illegal Operation Trap (ILL) occurs if an attempt is made to execute this instruction while the PSR.U flag is 1.

Instruction: Round Floating to Integer

Syntax:   ROUNDi   src,    dest                                     ROUNDF
                      reg     reg                                       ROUNDL
                      read.f  write.D

Syntax:   ROUNDUi  src,    dest                                     ROUNDUF
                      reg     reg                                       ROUNDUL
                      read.f  write.D

Format:

```
|31                                    10|9|8|7|6          0|
|      Addressing Mode                  |0|f|u|0 1 0 0 1 1 1|
```

The ROUNDf instruction rounds the *src* operand to the nearest double-word integer and places the result in the *dest* operand as a signed integer. Refer to "Floating-Point Instructions" in Section 4.2.4 for more information on floating-point operand formats and operations.

Flags: No PSR flags are affected. On ROUNDf instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the ROUNDUf instruction.

Traps: Undefined Instruction Trap (UND) occurs if the CFG.F bit is 0. On ROUNDf instruction Floating-Point Trap (FPU) occurs if a floating-point exception is detected. Refer to "Floating-Point Exceptional Conditions" in Section 4.2.4.1. No Floating-Point (FPU) traps occurs on the ROUNDUf instruction. While CFG.ISR is 1 and PSR.U is 1, an Illegal Operation Trap (ILL) occurs if ROUNDf or ROUNDUf attempts to write to one of the registers R16 through R30.

Instruction: Save Condition as Boolean

Syntax:    Scondi    *dest*                                       ScondB
                     reg                                          ScondW
                     write.i                                      ScondD Format:
```
|31        26|25      21||19      15|14        10|9|8 7|6          0|
|1 1 1 1 1 1 |   dest    |0 1 1 1 1 1|    cond    |0|1 1|1 0 0 1 1 0|
```

The Scondi instruction sets the *dest* operand to the integer value 1 if the condition specified in *cond* is true, and clears it to 0 if it is false.

*Cond* is a two character condition name that specifies the state of a flag or flags in the PSR. If the flag(s) have the specified state, the condition is true; otherwise, the condition is false. *Cond* is specified according to the following encoding:

SWORDFISH ARCHITECTURE SPECIFICATION  Rev. 2.0, February 1990

| Condition | Symbol | True State | Cond Field |
|---|---|---|---|
| Equal | EQ | Z flag is 1 | 10000 |
| Not Equal | NE | Z flag is 0 | 10001 |
| Carry Set | CS | C flag is 1 | 10010 |
| Carry Clear | CC | C flag is 0 | 10011 |
| Higher | HI | L flag is 1 | 10100 |
| Lower or Same | LS | L flag is 0 | 10101 |
| Greater Than | GT | N flag is 1 | 10110 |
| Less Than or Equal | LE | N flag is 0 | 10111 |
| Flag Set | FS | F flag is 1 | 11000 |
| Flag Clear | FC | F flag is 0 | 11001 |
| Lower | LO | Z and L flags are 0 | 11010 |
| Higher or Same | HS | Z or L flag is 1 | 11011 |
| Less Than | LT | Z and N flags are 0 | 11100 |
| Greater Than or Equal | GE | Z or N flag is 1 | 11101 |
| Unconditional | R | Always | 11110 |
| Unconditional | N | Never | 11111 |

Flags: None

Traps: While CFG.ISR is 1 and PSR.U is 1, an Illegal Operation Trap (ILL) occurs if Scondi attempts to access one of the registers R16 through R30.

Instruction: Store Processor Register

Syntax:  SPR  *src*,  *dest*
             procreg  reg
             read.D   write.D

Format:  (Special-Function)

| 31   26 | 25   21 | 19   15 | 14   10 | 9 8 7 6 |   0 |
|---|---|---|---|---|---|
| 1 1 1 1 1 1 | dest | 0 1 1 1 1 | src | 0 1 1 | 1 1 0 0 1 1 |

The SPR instruction stores the dedicated register specified by *src* in the *dest* operand. Refer to "Programming Model" in Chapter 2 for more information on the format of dedicated processor registers.

The *src* operand value is placed right-justified in the *dest* operand. If *src* is longer than *dest*, then *src* is truncated. High-order bits are zero-filled if *src* is shorter than *dest*.

The following processor registers may be stored:

SWORDFISH ARCHITECTURE SPECIFICATION          Rev. 2.0, February 1990

| Register | Symbol | procreg | Privileged |
|---|---|---|---|
| Stack Pointer | SP | 00000 | Yes |
| Configuration Register | CFG | 00010 | Yes |
| Interrupt Base Register | INTBASE | 00011 | Yes |
| Debug Condition Register | DCR | 00101 | Yes |
| Debug Status Register | DSR | 00110 | Yes |
| Compare Address Register | CAR | 01000 | Yes |
| Address Mask Register | AMR | 01001 | Yes |
| Breakpoint Program Counter Register 0 | BPC0 | 01010 | Yes |
| Breakpoint Program Counter Register 1 | BPC1 | 01011 | Yes |
| FP Status Register | FSR | 01100 | No |
| FP Trap Result Low register | FTRL | 01110 | No |
| FP Trap Result High register | FTRH | 01111 | No |
| Low-order byte of PSR (User flags) | UPSR | 10110 | No |
| Processor Status Register | PSR | 10111 | Yes |

Note:

If PSR is specified, the instruction is privileged regardless of the operation length specified. If UPSR is specified, only the low-order byte of the PSR is stored. In this case, the byte is zero-extended to a Double Word to match the dest length, and the instruction is not privileged.

Flags: None

Traps: Undefined Instruction Trap (UND) occurs if FSR, FTRH or FTRL are specified while the CFG.F bit is 0. Illegal Operation Trap (ILL) occurs if DCR, BPC0, DSR, CAR, BPC1, SP, CFG, PSR, INTBASE is specified, while the PSR.U flag is 1. While CFG.ISR is 1 and PSR.U is 1, an Illegal Operation Trap (ILL) occurs if SPR attempts to access one of the registers R16 through R30.

Instruction: Store Floating

| Syntax: | STORf | src, | dest | | STORF |
| | | reg | rel | | STORL |
| | | read.f | write.f | | |

| Syntax: | STORUf | src, | dest | | STORUF |
| | | reg | rel | | STORUL |
| | | read.f | write.f | | |

Format:

Note: when L=1 the Addressing Mode field is in bits 10:63

The STORf instruction stores the floating-point data register src operand in the memory dest operand.

Flags: On STORf FSR.TT is set to 0. No FSR flags are affected on the STORUf instruction.

SWORDFISH ARCHITECTURE SPECIFICATION  Rev. 2.0, February 1990

Traps: Undefined Instruction Trap (UND) occurs if the CFG.F bit is 0. While CFG.ISR is 1 and PSR.U is 1, an Illegal Operation Trap (ILL) occurs if STORi or STORUi attempts to read from one of the registers R16 through R30.

Instruction: Store Integer

| Syntax: | STORi | src, | dest | | STORB |
|---|---|---|---|---|---|
| | | reg | rel | | STORW |
| | | read.i | write.i | | STORD |

Format:

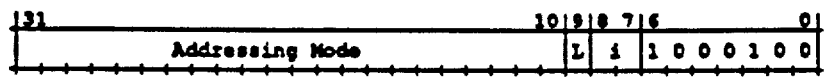

Note: when L=1 the Addressing Mode field is in bits 10:63

The STORi instruction stores the *src* register operand in the *dest* memory operand.

Flags: None

Traps: While CFG.ISR is 1 and PSR.U is 1, an Illegal Operation Trap (ILL) occurs if STORi attempts to access one of the registers R16 through R30.

Instruction: Subtract Floating

| Syntax: | SUBf | src1, | src2, | dest | | SUBF |
|---|---|---|---|---|---|---|
| | | reg | reg | reg | | SUBL |
| | | read.f | read.f | write.f | | |

| Syntax: | SUBUf | src1, | src2, | dest | | SUBUF |
|---|---|---|---|---|---|---|
| | | reg | reg | reg | | SUBUL |
| | | read.f | read.f | write.f | | |

Format:

The SUBf instruction subtracts the *src1* operand from the *src2* operand, and places the result in the *dest* operand. Refer to "Floating-Point Instructions" in Section 4.2.4 for more information on floating-point operand formats and operations.

Flags: No PSR flags are affected. On SUBf instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the SUBUf instruction.

Traps: Undefined Instruction Trap (UND) occurs if the CFG.F bit is 0. On SUBf instruction Floating-Point Trap (FPU) occurs if a floating-point exception is detected. Refer to "Floating-Point Exceptional Conditions" in Section 4.2.4.1. No Floating-Point (FPU) traps occur on the SUBUf instruction.

SWORDFISH ARCHITECTURE SPECIFICATION    Rev. 2.0, February 1990

Instruction: Subtract Integer

| Syntax: | SUBi | src1, | src2, | dest | | SUBB |
| | | reg/imm | reg | reg | | SUBW |
| | | read.i | read.i | write.i | | SUBD |

| Syntax: | SUBUi | src1, | src2, | dest | | SUBUB |
| | | reg/imm | reg | reg | | SUBUW |
| | | read.i | read.i | write.i | | SUBUD |

Format:

```
|31                                    |9|8 7|6         |1|0|
|         Addressing Mode              |L|1|1 0 1 0 0|u|0|
```

Note: when L=1 the Addressing Mode field is in bits 10:63

The SUBi instruction subtracts the *src1* operand from the *src2* operand, and places the result in the *dest* operand.

Flags: On SUBi instruction, PSR.C is set to 1 on a borrow from subtraction, cleared to 0 if no borrow. PSR.F is set to 1 on an overflow from subtraction, cleared to 0 if no overflow. Refer to "Integer/Logical Instructions" in Section 4.2.3 for more information on integer borrow and overflow conditions. No PSR flags are affected on the SUBUi instruction.

Traps: On SUBi Instruction Integer Overflow Trap (OVF) occurs if the PSR.V bit is 1 and the PSR.F flag is set to 1 following the execution of this instruction. No Overflow Trap (OVF) on the SUBUi instruction. While CFG.ISR is 1 and PSR.U is 1, an Illegal Operation Trap (ILL) occurs if SUBi or SUBUi attempts to access one of the registers R16 through R30.

Instruction: Subtract Integer with Carry

| Syntax: | SUBCi | src1, | src2, | dest | | SUBCB |
| | | reg/imm | reg | reg | | SUBCW |
| | | read.i | read.i | write.i | | SUBCD |

Format:

```
|31                                 10|9|8 7|6           0|
|         Addressing Mode            |L|1|1 0 0 1 0 1 1|
```

Note: when L=1 the Addressing Mode field is in bits 10:63

The SUBCi instruction subtracts the sum of the *src1* operand and the PSR.C flag from the *src2* operand, and places the result in the *dest* operand.

Flags: PSR.C is set to 1 on a borrow from subtraction, cleared to 0 if no borrow. PSR.F is set to 1 on an overflow from subtraction, cleared to 0 if no overflow. Refer to "Integer/Logical Instructions" in Section 4.2.3 for more information on integer borrow and overflow conditions.

Traps: Integer Overflow Trap (OVF) occurs if the PSR.V bit is 1 and the PSR.F flag is set to 1 following the execution of this instruction. While CFG.ISR is 1 and PSR.U is 1, an Illegal Operation Trap (ILL) occurs if SUBCi attempts to access one of the registers R16 through R30.

SWORDFISH ARCHITECTURE SPECIFICATION          Rev. 2.0, February 1990

Instruction: Test Bit

Syntax:   TBIT   *offset,   base*
                 reg/imm   reg
                 read.D    read.D Format:

```
|31                                    |9|8 7|6           0|
|         Addressing Mode              |L|1 1|1 0 0 1 1 0 1|
```

Note: when L=1 the Addressing Mode field is in bits 10:63

The TBIT instruction copies the bit located in register *base* at bit position specified by *offset*, to the PSR.F flag. The *offset* value must be in the range 0 through 31; otherwise, the result is unpredictable.

Flags:   PSR.F is set to the original value of the specified bit.

Traps:   While CFG.ISR is 1 and PSR.U is 1, an Illegal Operation Trap (ILL) occurs if TBIT attempts to access one of the registers R16 through R30.

Instruction: Transfer Integer to Floating

Syntax:   TRDF    *src,     dest*
                  reg       reg
                  read.D    write.F Syntax:   TRUDF   *src,     dest*
                  reg       reg
                  read.D    write.F Format:

```
|31                              10|9|8|7|6           0|
|        Addressing Mode           |0|1|u|0 0 0 1 0 1 1|
```

The TRDF instruction moves the *src* operand from the integer register to the *dest* single-precision floating-point register without any conversion. Refer to "Floating-Point Instructions" in Section 4.2.4 for more information on floating-point operand formats and operations.

Flags:   On TRDF, FSR.TT is set to 0. No FSR flags are affected on the TRUDF instruction.

Traps:   Undefined Instruction Trap (UND) occurs if the CFG.F bit is 0. While CFG.ISR is 1 and PSR.U is 1, an Illegal Operation Trap (ILL) occurs if TRDF or TRUDF attempts to read from one of the registers R16 through R30.

SWORDFISH ARCHITECTURE SPECIFICATION          Rev. 2.0, February 1990

Instruction: Transfer Floating to Integer

Syntax:   TRFD   *src,*   *dest*
                 reg      reg
                 read.F   write.D Syntax:   TRUFD  *src,*   *dest*
                 reg      reg
                 read.F   write.D Format:

```
|31                              10|9|8|7|6         0|
|      Addressing Mode            |0|1|u|0 0 0 1 1 0 1|
```

The TRFD instruction moves the *src* operand from the single-precision floating-point register to the *dest* integer register without any conversion. Refer to "Floating-Point Instructions" in Section 4.2.4 for more information on floating-point operand formats and operations.

Flags: On TRFD, FSR.TT is set to 0. No FSR flags are affected on the TRUFD instruction.

Traps: Undefined Instruction Trap (UND) occurs if the CFG.F bit is 0. While CFG.ISR is 1 and PSR.U is 1, an Illegal Operation Trap (ILL) occurs if TRFD or TRUFD attempts to write to one of the registers R16 through R30.

Instruction: Truncate Floating to Integer

Syntax:   TRUNCf  *src,*   *dest*                              TRUNCF
                  reg      reg                                 TRUNCL
                  read.f   write.D Syntax:   TRUNCUf *src,*   *dest*                              TRUNCUF
                  reg      reg                                 TRUNCUL
                  read.f   write.D Format:

```
|31                              10|9|8|7|6         0|
|      Addressing Mode            |0|f|u|0 1 1 0 1 1 1|
```

The TRUNCf instruction truncates the *src* operand to the nearest integer which is less than or equal to it in absolute value, and places the result in the *dest* operand as a signed integer. Refer to "Floating-Point Instructions" in Section 4.2.4 for more information on floating-point operand formats and operations.

Flags: No PSR flags are affected. On TRUNCf instruction the appropriate FSR fields are set to reflect any exceptional condition encountered in executing the instruction. If none is encountered, FSR.TT is cleared to 0. Refer to "Floating-Point Exceptional Conditions" in Section 4.2.4.1 for more information. No FSR flags are affected on the TRUNCUf instruction.

Traps: Undefined Instruction Trap (UND) occurs if the CFG.F bit is 0. On TRUNCf instruction Floating-Point Trap (FPU) occurs if a floating-point exception is detected. Refer to "Floating-Point SWORDFISH ARCHITECTURE SPECIFICATION          Rev. 2.0, February 1990

Exceptional Conditions" in Section 4.2.4.1. No Floating-Point (FPU) traps occur on the TRUNCUI instruction. While CFG:ISR is 1 and PSR.U is 1, an Illegal Operation Trap (ILL) occurs if TRUNCI or TRUNCUI attempts to write to one of the registers R16 through R30.

Instruction: Unordered Compare Floating

| Syntax: | UCMPI | src1, | src2 | UCMPF |
|---|---|---|---|---|
| | | reg | reg | UCMPL |
| | | read.f | read.f | |

| Syntax: | UCMPUI | src1, | src2 | UCMPUF |
|---|---|---|---|---|
| | | reg | reg | UCMPUL |
| | | read.f | read.f | |

Format:

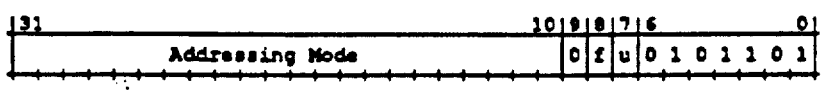

The UCMPI instruction compares the *src1* and *src2* operands and sets the PSR.Z, PSR.N and PSR.L flags to indicate the comparison result. Positive and negative zero are regarded as equal. Refer to "Floating-Point Instructions" in Section 4.2.4 for more information on floating-point operand formats and operations.

Flags: On UCMPI and UCMPUI instructions PSR.Z is set to 1 if *src1* equals *src2*, cleared to 0 otherwise. PSR.N is set to 1 if *src1* is greater than *src2*, cleared to 0 otherwise. PSR.L is set to 1 if the operands are unordered, cleared to 0 otherwise. When any of the operands is NaN PSR.L is set to 1, PSR.Z and PSR.N are set to 0.

Flags: No PSR flags are affected. No FSR flags are affected, and the FSR.TT is cleared to 0. Refer to "Floating-Point Exceptional Conditions" in Section 4.2.4.1 for more information.

Traps: Undefined Instruction Trap (UND) occurs if the CFG.F bit is 0. No Floating-Point (FPU) traps occur on the UCMPI and UCMPUI instructions.

Instruction: Wait for Interrupt

Syntax:  WAIT

Format:  (Special-Function)

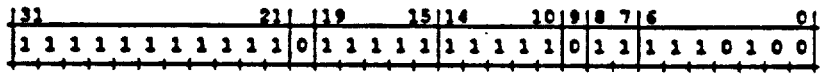

The WAIT instruction suspends program execution until an interrupt occurs. An interrupt restores program execution by passing it to an interrupt service procedure. When the WAIT instruction is interrupted, the return address saved on the Stack is the address of the instruction following the WAIT instruction. Refer to "Interrupts" in Section 5.4.2.1 for more information.

Flags: None

SWORDFISH ARCHITECTURE SPECIFICATION  Rev. 2.0, February 1990

Traps: None

Instruction: Bitwise Logical Exclusive Or

| Syntax: | XORi | src1, | src2, | dest | XORB |
| | | reg/imm | reg | reg | XORW |
| | | read.i | read.i | write.i | XORD |

Format:

```
 31                                  10 9 8 7 6            0
+------------------------------------+--+-+-+-------------+
|         Addressing Mode            |L |1|1|1 0 1 0 1 0 0|
+------------------------------------+--+-+-+-------------+
```

Note: when L=1 the Addressing Mode field is in bits 10:63

The XORi instruction performs a bitwise logical Exclusive-OR operation on the *src1* and *src2* operands, and places the result in the *dest* operand.

Flags: None

Traps: While CFG.ISR is 1 and PSR.U is 1, an Illegal Operation Trap (ILL) occurs if XORi attempts to access one of the registers R16 through R30.

SWORDFISH ARCHITECTURE SPECIFICATION        Rev. 2.0, February 1990

5. INSTRUCTION EXECUTION AND EXCEPTIONS

5.1 INTRODUCTION

To execute an instruction, the Swordfish first fetches the instruction whose address is contained in the PC, and then performs the operations for that particular instruction as specified in "Instruction Set and Data Types" in Chapter 4. After executing the instruction, the PC is updated to contain the address of the next instruction to execute. Either the current instruction explicitly loads the PC (like JUMP), or else the PC is incremented by the length of the current instruction.

Exceptions are conditions, events, and errors that alter the sequence of instruction execution. The Swordfish recognizes three types of exception: Reset, Interrupts, and Traps. A Reset exception occurs when the $\overline{\text{RST}}$ signal is asserted; Reset is used to initialize the Swordfish. An Interrupt exception occurs in response to an event signalled by asserting the $\overline{\text{NMI}}$, or $\overline{\text{IR0-IR3}}$ signals; interrupts are typically requested by peripheral devices that require the Swordfish's attention. A Trap exception occurs when certain conditions, such as division by zero, are detected by the Swordfish during execution of an instruction.

While executing an instruction, if the Swordfish recognizes an exception, it saves the PC, and PSR contents, then begins executing an exception service procedure. This chapter explains how the Swordfish executes instructions and processes exceptions.

5.2 OPERATING STATES

The Swordfish has five operating states regarding the execution of instructions and the processing of exceptions: Reset, Executing Instructions, Processing an Exception, Waiting and for an Interrupt, and Freeze. The various states and transitions between them are shown in Figure 5-1.

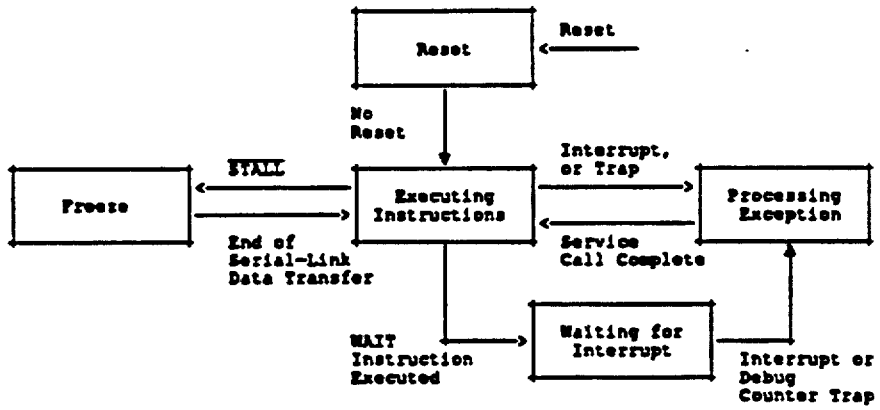

Figure 5-1. Swordfish Operating States

Whenever the $\overline{\text{RST}}$ signal is asserted (low), the Swordfish enters the Reset state. The Swordfish remains in the Reset state until the $\overline{\text{RST}}$ signal is driven high, at which time it enters the state of Executing Instructions. While in the Reset state, the contents of certain dedicated registers are SWORDFISH ARCHITECTURE SPECIFICATION          Rev. 2.0, February 1990 initialized, as specified in "Reset Exception" in Section 5.4.1. The timing requirements of the RST signal and the behavior of the Swordfish's system interface in the Reset state are specified in "Resetting" in Section 7.4.

While in the state of Executing Instructions, the Swordfish continues to execute instructions until an exception is recognized or the WAIT instruction is executed. When an exception other than Reset is recognized, the Swordfish enters the state of Processing an Exception. Following a detection of an active STALL input signal, the Swordfish enters to Freeze mode. While in this mode, the contents of all the registers can be examined and updated through a serial link. When the serial link data transfers are completed, the Swordfish returns to its Executing Instructions state. Refer to "" in Null for more information on the Freeze mode.

Following execution of the WAIT instruction, the Swordfish enters the state of Waiting for an interrupt. In this state the Swordfish is idle. A special status identifying this state is presented on the system interface (see "Bus Status" in Section 7.5.1). When an interrupt or a debug counter trap (refer to "Debug Conditions" in Section 8.1.1) is detected, the Swordfish enters the state of Processing an Exception.

While in the state of Processing an Exception, the Swordfish saves the PC, and the PSR contents. The Swordfish reads an absolute address from the Interrupt Dispatch Table and branches accordingly to the exception service procedure. Refer to "Calling the Exception Service Procedure" in Section 5.4.2.3 for more information. For processing certain interrupts, the Swordfish additionally reads a vector value from the on-chip Interrupt Control Unit (ICU). Following the successful completion of all data references required to process an exception, the Swordfish enters the state of Executing Instructions.

5.3 INSTRUCTION EXECUTION

The Swordfish performs the following operations to execute an instruction:

1. Fetch the instruction
2. Read source operands, if any
3. Calculate results
4. Write result operands, if any
5. Modify flags, if necessary
6. Update the PC Under most circumstances, the Swordfish can be conceived to execute instructions by completing the operations above in strict sequence for one instruction and then beginning the sequence of operations for the next instruction. Exceptions, however, can alter the sequence of operations to execute an instruction or to advance from one instruction to the next. Also, the Swordfish enhances performance by overlapping the operations for executing several instructions in both pipelined and parallel manners. The following sections explain the effects of exceptions and the pipeline on instruction execution.

5.3.1 Instruction Endings

The Swordfish checks for exceptions at various points while executing instructions. Certain exceptions, like interrupts, are recognized between instructions. Other exceptions, like a Floating-Point Trap (FPU), are recognized during execution of an instruction. When an exception is recognized during execution of an instruction, the instruction ends in one of three possible ways: it is Completed, Suspended, or Terminated. Each type of exception causes a particular ending, as specified in the detailed description of the specific exception (see "Exceptions" in Section 5.4).

5.3.1.1 Completed Instructions

When an exception is recognized after an instruction is Completed, the Swordfish has performed all of the operations for that instruction and for all other instructions executed since the last serializing operation (see "Serializing Operations" in Section 5.3.3). Result operands have been written, flags have been modified, and the PC saved on the Interrupt Stack contains the address of the next instruction to execute. The exception service procedure can, at its conclusion, execute the RETX instruction (preceded by EOI instruction for Maskable Vectored Interrupts), and the Swordfish will begin executing the instruction following the Completed instruction.

5.3.1.2 Suspended Instructions

An instruction is Suspended when one of several trap conditions is detected during execution of the instruction. A Suspended instruction has not been completed, but all other instructions executed since the last serializing operation have been issued. Result operands and flags (except for the PSR.P bit on some traps) are not affected. The PC saved on the Interrupt Stack contains the address of the Suspended instruction.

To complete a Suspended instruction, the exception service procedure takes either of two actions:

1. The service procedure can simulate the Suspended instruction's execution. After calculating and writing the instruction's results, the flags in the PSR copy saved on the Interrupt Stack should be modified, and the PC saved on the Interrupt Stack should be updated to point to the next instruction to execute. The service procedure can then execute the RETX instruction, and the Swordfish begins executing the instruction following the Suspended instruction. This is the action taken when floating-point instructions are simulated by software, when the Floating-Point Unit is disabled by clearing the CFG.F bit to 0.

2. The Suspended instruction can be retried after the service procedure has eliminated the trap condition that caused the instruction to be Suspended. The service procedure should execute the RETX instruction at its conclusion; then the Swordfish retries the Suspended instruction. This is the action taken by a debugger when it encounters an EXCP BPT instruction that was temporarily placed in another instruction's location in order to set a breakpoint.

5.3.1.3 Terminated Instructions

An instruction being executed is Terminated when Reset exception occurs. Any result operands and flags due to be affected by the instruction are unpredictable, as is the contents of the PC. The result operands of other instructions executed since the last serializing operation may not have been written to memory. A Terminated instruction cannot be completed.

5.3.2 Instruction Pipeline and Parallel Execution

Rather than performing each instruction's operations in strict sequence before beginning the next instruction, the performance of the Swordfish is enhanced by overlapping the operations of several instructions simultaneously in both pipelined and parallel manners. Pipelined execution means that while the Swordfish is fetching one instruction, it can simultaneously be reading source operands for a second instruction, calculating results for a third instruction, and writing results for a fourth instruction. Parallel execution means that the Swordfish can initiate the operations for two independent instructions simultaneously in separate functional units.

Under almost all circumstances, pipelined and parallel instruction execution simply serve to improve performance, and produce no different effect than strictly sequential instruction execution. Under certain circumstances, however, the effects of these performance enhancements can be visible to system software and hardware. More specifically, the order of memory references performed by the Swordfish may appear to differ, as explained below.

The Swordfish begins fetching an instruction only after all previous instructions have been completely fetched, but it may begin fetching an instruction before all of the source operands have been read and results written for previous instructions. The Swordfish begins reading the source operands for an instruction only after all memory references (including instruction fetches, data reads, and data writes) of previous instructions have been completed. The description above is summarized in Figure 5-2, which shows the precedence of memory references for two consecutive instructions. An arrow from one reference to another indicates that the first reference always precedes the second.

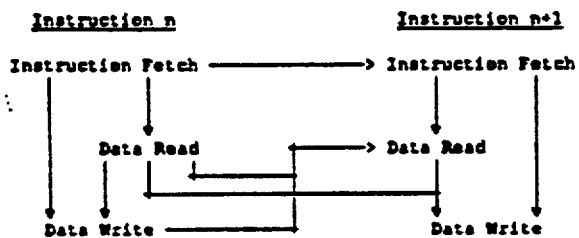

Figure 5-2. Memory References for Consecutive Instructions

Note:

1. As a consequence of overlapping the operations for several instructions, the Swordfish may fetch an instruction, although the instruction is not executed (for example, if the previous instruction causes a trap). The Swordfish reads source operands and writes destination operands only for executed instructions.

2. When the Swordfish reads data from external memory to load a register, then the memory references for subsequent instructions may be performed before the load is completed. The Swordfish checks for any dependency between the access to the loaded location and subsequent memory references performed before the load is complete. If a dependency is detected, the subsequent memory references are delayed until the load is complete. Data memory references on the system interface always appear in the same order as instructions are executed. Refer to "Data Cache Misses and Load-Scheduling" in Section C.5.1 for more information.

3. The Swordfish does not check for dependencies between the fetching of an instruction and the writing of previous instructions' results. Therefore, special care is required when executing self-modifying code. Refer to "" in Appendix for more information about self-modifying code.

5.3.2.1 Memory-Mapped I/O

The characteristics of certain peripheral devices require that special handling be applied for memory-mapped I/O references by a pipelined CPU. I/O references differ from memory references in the following two ways:

1. Reading from a peripheral port can alter the value read on the next reference to the same port or another port in the same device. This characteristic is called here "destructive-reading". Serial communication controllers and FIFO buffers commonly operate in this manner. For example, after the Line Status Register has been read from the NS16450 Asynchronous Communication Element, SWORDFISH ARCHITECTURE SPECIFICATION          Rev. 2.0, February 1990 certain bits in the register are automatically cleared.

2. Writing to a peripheral port can alter the value read from another port of the same device. This characteristic is called here "side-effects of writing". For example, writing to a Control (CTL0 or CTL1) register of the on-chip DMA controller may start DMA operation and thus change the value of the Status (STAT) register.

The Swordfish recognizes that addresses between FF000000 (hex) and FFFFFFFF (hex), inclusive, are dedicated for memory-mapped I/O. On references to dedicated I/O locations the Swordfish handles all requirements automatically. The Swordfish initiates an off-chip reference to a dedicated I/O location only after it has completed all references for previous instructions and after it has determined that all previous instructions have completed without exception. Consequently, no problems arise on references to a peripheral device that exhibits either destructive-reading or side-effects of writing.

The Swordfish supports references to memory-mapped peripheral devices at locations other than those dedicated for I/O, but special considerations are required in the design of the external system hardware to handle certain uncommon cases where the Swordfish cancels bus cycles in progress. Refer to "Peripheral Bus Cycles" in Section 7.5.3.7 for more information.

5.3.3 Serializing Operations

After executing certain instructions or processing an exception, the Swordfish serializes instruction execution. Serializing instruction execution means that the Swordfish completes writing all previous instructions' results to memory, then begins fetching and executing the next instruction. Thus, when a new value is loaded into the PSR by executing an LPR instruction, the new PSR value determines the privilege state (User-mode or Supervisor-mode) used to fetch and execute the next instruction.

The Swordfish serializes instruction execution after executing one of the following instructions: LPR (only on CFG, INTBASE, PSR, UPSR, DCR, BPC0, BPC1, DSR, and CAR), and RETX.

Notes:

1. To serialize instruction execution in User-mode, the LPR instruction can be used on UPSR.
2. When Reset exception occurs, the Swordfish discards any results that have not yet been written to memory.

5.4 EXCEPTIONS

The Swordfish recognizes three types of exception: Reset, Interrupts, and Traps. When the Swordfish recognizes an exception, it saves the PC, and the PSR contents, then transfers control to an exception service procedure. Table 5-1 summarizes exception processing.

TABLE 5-1. Exception Processing

5.4.1 Reset Exception

A Reset exception occurs when the RST signal is asserted. Reset must be used at power-up to initialize the Swordfish. When Reset is recognized, the instruction being executed (if any) is terminated.

In response to a Reset exception, the Swordfish stores the PC value in BPC0 and the PSR value in BPC1. Then the PC is cleared to 0, as are all the non-reserved bits in the PSR, FSR, and CFG registers. In addition, the DCR.DEN bit is cleared to 0. After Reset, the remaining non-reserved bits in the DCR and the contents of all other registers are unpredictable. The Swordfish begins executing the Reset SWORDFISH ARCHITECTURE SPECIFICATION          Rev. 2.0, February 1990

| Exception | Instruction Ending | PC saved | Cleared Before Saving PSR | Cleared After Saving PSR |
|---|---|---|---|---|
| Reset | Terminated | Unpredictable | Unpredictable | All |
| Interrupt | Before Instruction | Next | None | I P U V B T |
| BPT, DVZ, FLG, FPU ILL, SVC, UND | Suspended | Current | None | P U V B T |
| OVF | Completed | Next | None | P U V B T |
| TRC | Before Instruction | Next | P | P U V B T |
| DBG (Counter Trap) | Before Instruction | Next | None | I P U V B T |
| DBG (Condition) | Suspended | Current | None | I P U V B T | service procedure at location 0.

5.4.2 Interrupts, and Traps

In response to Interrupt, and Trap exceptions, the Swordfish performs the following sequences of operations. First, the Swordfish saves internally a copy of the current PSR to be pushed later on the Interrupt Stack. The Swordfish then alters the PSR by clearing certain control bits. Next, the Swordfish determines the vector number for the exception, which is used later to call a service procedure through the Interrupt Dispatch Table. The following sections specify how the Swordfish modifies the PSR contents to derive the saved and new PSR values for each exception cause, as well as how the vector number is determined. Once the saved PSR, new PSR, and vector number are determined, on exceptions other than interrupts the Swordfish displays information on the system bus interface to indicate the type of exception encountered. Then, on all exceptions, the Swordfish saves the PC, and the PSR contents on the Interrupt Stack as explained in "Calling the Exception Service Procedure" in Section 5.4.2.3, and transfers control to the service procedure.

5.4.2.1 Interrupts

The Swordfish recognizes Non-Maskable, and Maskable Interrupt requests. The Swordfish checks for enabled interrupt requests before executing each instruction. Refer to "Exception Requests" in Section 7.7 for more information about requesting and acknowledging interrupts on the system interface bus.

5.4.2.1.1 Non-Maskable Interrupts

The Swordfish recognizes a Non-Maskable Interrupt whenever the $\overline{\text{NMI}}$ signal is asserted (high-to-low transition). In response to a Non-Maskable Interrupt, the Swordfish saves a copy of the current PSR and then forms a new PSR by clearing the T, B, V, U, P, and I bits. The Swordfish then performs an Interrupt-Acknowledge bus cycle on the system interface using address FFFFFF00 (hex), discarding the byte that is read during the bus cycle. The vector number for Non-Maskable Interrupts is 1.

SWORDFISH ARCHITECTURE SPECIFICATION          Rev. 2.0, February 1990

5.4.2.1.2 Maskable Interrupts

The Swordfish recognizes a Maskable Interrupt when the on-chip Interrupt Controller unit signals an interrupt, while PSR.I bit is 1. Maskable Interrupts are disabled while PSR.I is 0.

The Swordfish respond to interrupts requested by the on-chip Interrupt Control Unit (ICU), as follows. The Swordfish first saves a copy of the current PSR and then forms a new PSR by clearing the T, B, V, U, P, and I flags. The Swordfish then performs an Interrupt-Acknowledge cycle on the system interface using address FFFFFE00 (hex), reading the interrupt vector from the on-chip ICU while using the Internal-Reference mechanism (see "Accesses to the On-Chip Peripherals" in Section 7.5.3.11). The vector numbers for Vectored Interrupts are 16-31.

5.4.2.2 Trap Conditions

The Swordfish recognizes ten Trap Conditions, as explained below.

5.4.2.2.1 Floating-Point

A Floating-Point Trap (FPU) occurs when one or more of certain conditions are detected while executing a floating-point instruction, or when an EXCP FPU instruction is executed. Refer to "Floating-Point Exceptional Conditions" in Section 4.2.4.1 for more information about the detected conditions. In response to a Floating-Point Trap, the Swordfish saves the current PSR and then forms a new PSR by clearing the T, B, V, U, and I flags. The specific condition that caused the Floating-Point Trap is indicated in FSR.TT field. The vector number for Floating-Point Trap is 3.

5.4.2.2.2 Illegal Operation

An Illegal Operation Trap (ILL) occurs when an attempt is made to execute a privileged instruction while in User-mode, or when an EXCP ILL instruction is executed. In addition, while CFG.ISR is 1, Illegal Operation Trap occurs whenever an attempt is made to execute an instruction in User-mode that accesses one of the registers R16 through R30. The instruction being executed is suspended. In response to an Illegal Operation Trap, the Swordfish forms a new PSR by clearing the T, B, V, U, and P flags. The vector number for Illegal Operation Trap is 4.

5.4.2.2.3 Supervisor Call

A Supervisor Call Trap (SVC) occurs when an EXCP SVC instruction is executed. The EXCP SVC instruction is suspended. In response to a Supervisor Call Trap, the Swordfish saves the current PSR and then forms a new PSR by clearing the T, B, V, U, and P flags. The vector number for Supervisor-Call Trap is 5.

5.4.2.2.4 Division by Zero

A Division by Zero Trap (DVZ) occurs when an EXCP DVZ instruction is executed. The instruction is suspended. In response to a Division by Zero Trap, the Swordfish saves the current PSR and then forms a new PSR by clearing the T, B, V, U, and P flags. The vector number for Division by Zero Trap is 6.

5.4.2.2.5 Flag

A Flag Trap (FLG) occurs when a EXCP FLG instruction is executed and PSR.F is 1. The EXCP FLG instruction is suspended. In response to a Flag Trap, the Swordfish saves the current PSR and then forms a new PSR by clearing the T, B, V, U, and P flags. The vector number for Flag Trap is 7.

5.4.2.2.6 Breakpoint

A Breakpoint Trap (BPT) occurs when a EXCP BPT instruction is executed. The EXCP BPT instruction is suspended. In response to a Breakpoint Trap, the Swordfish saves the current PSR and then forms a new PSR by clearing the T, B, V, U, and P flags. The vector number for Breakpoint Trap is 8.

5.4.2.2.7 Trace

A Trace Trap (TRC) occurs before an instruction is executed when PSR.P is 1. In response to a Trace Trap, the Swordfish clears PSR.P before saving a copy of the current PSR and then forms a new PSR by clearing the T, B, V, U, and P flags. The vector number for Trace Trap is 9. Refer to "Instruction Tracing" in Section 5.4.3 for an explanation of how PSR.T and PSR.P are used to control instruction tracing.

5.4.2.2.8 Undefined Instruction

An Undefined Instruction Trap (UND) occurs when an attempt is made to execute an instruction and one or more of the following conditions is detected:

1. The instruction is undefined. Refer to "Instruction Formats" in Appendix A for a description of the codes that the Swordfish recognizes to be undefined.
2. The instruction is a floating-point instruction and CFG.F is 0.
3. The instruction is EXCP, and the vector specified is either UND, or a reserved value.
4. The instruction is in a long format, and it is not quad-word aligned The undefined instruction is suspended. In response to an Undefined Instruction Trap, the Swordfish forms a new PSR by clearing the T, B, V, U, and P flags. The vector number for Undefined-Instruction Trap is 10.

5.4.2.2.9 Integer Overflow

An Integer Overflow Trap (OVF) occurs when PSR.V is 1 and an integer overflow condition is detected following execution of an instruction. Integer overflow trap is disabled while PSR.V is 0.

An integer overflow condition is detected in the following cases:

1. PSR.F is 1 following execution of an ADDi, ADDCi, SUBi, or SUBCi instruction.
2. The product resulting for a MULi instruction cannot be represented exactly in the destination operand's location.

The instruction that caused the trap is completed. In response to an Integer-Overflow Trap, the Swordfish saves the current PSR and then forms a new PSR by clearing the T, B, V, U, and P flags. The vector number for Integer-Overflow Trap is 13.

SWORDFISH ARCHITECTURE SPECIFICATION          Rev. 2.0, February 1990

5.4.2.2.10 Debug

A Debug Trap (DBG) occurs when one or more enabled debug conditions selected by the DCR is detected while executing an instruction or processing an exception. Debug Trap is enabled for PC-Match and Address-Compare conditions while DCR.TR is 1; the trap is disabled for PC-Match and Address-Compare conditions while DCR.TR is 0. Debug Trap is enabled for the Debug Counter terminal count while the DCR.TCE is 1; the trap is disabled while DCR.TCE is 0. Debug conditions are detected and cause Debug Trap before an instruction is executed.

In response to a Debug Trap, the Swordfish saves the current PSR and then forms a new PSR by clearing the T, B, V, U, P, and I flags. The vector number for Debug Trap is 14. Refer to "Debug Conditions" in Section 8.1.1 for more information about the detection and processing of debug traps.

5.4.2.3 Calling the Exception Service Procedure

The Swordfish saves internally a copy of the PSR, forms a new PSR value, and determines the vector number. Next, for exceptions other than interrupts, it indicates on its bus that an exception has occurred and displays the value of the vector (see "Internal Status" in Section 7.9) Then the Swordfish performs a sequence that is common to processing all Interrupt, and Trap exceptions.

To process an exception, the Swordfish first pushes the saved PSR copy along with the contents of the PC register on the Interrupt Stack (see Figure 5-3). The Swordfish then reads the double-word entry from the Interrupt Dispatch Table (IDT) at address (INTBASE + vector*4). Table 5-2 shows the format of the IDT. The Swordfish uses the IDT entry to call the exception service procedure, interpreting the entry as a pointer that is simply loaded into the PC.

| Vector   | Mnemonic   | Name                     |
|----------|------------|--------------------------|
| 0        | (reserved) |                          |
| 1        | NMI        | Non-Maskable Interrupt   |
| 2        | (reserved) |                          |
| 3        | FPU        | Floating-Point Trap      |
| 4        | ILL        | Illegal Instruction Trap |
| 5        | SVC        | Supervisor Call Trap     |
| 6        | DVZ        | Division by Zero Trap    |
| 7        | FLG        | Flag Trap                |
| 8        | BPT        | Breakpoint Trap          |
| 9        | TRC        | Trace Trap               |
| 10       | UND        | Undefined Instruction Trap |
| 11       | (reserved) |                          |
| 12       | (reserved) |                          |
| 13       | OVF        | Integer Overflow Trap    |
| 14       | DBG        | Debug Trap               |
| 15       | (reserved) |                          |
| 16 to 31 | VI         | Vectored Interrupts      |

TABLE 5-2. Interrupt Dispatch Table

SWORDFISH ARCHITECTURE SPECIFICATION     Rev. 2.0, February 1990

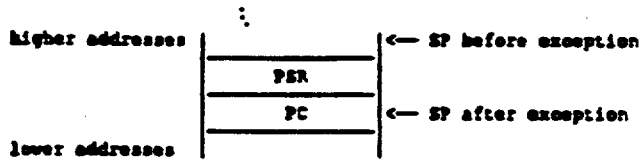

Figure 5-3. Interrupt Stack After Exception Processing

Notes:

1. The memory references and interrupt acknowledge bus cycles performed by the Swordfish while processing an exception may occur in any order, not only in the order described above.

2. References to the Interrupt Stack, and Interrupt Dispatch Table while the Swordfish is processing an exception are performed in Little-Endian byte order.

3. References to the Stack during execution of a RETX instruction are performed using the mode of byte order selected by PSR.B at the beginning of instruction execution. Refer to "Exception Service Procedures" in Section 5.4.5 for more information about the effect of byte order on exception service procedures.

5.4.3 Instruction Tracing

The Swordfish uses two bits in the PSR to enable and generate trace traps. While PSR.T is 1, instruction tracing is enabled. During each instruction's execution, the Swordfish copies PSR.T to PSR.P. Before beginning the next instruction, the Swordfish checks PSR.P to determine whether a Trace Trap (TRC) is pending: if PSR.P is 1, then a Trace Trap (TRC) occurs.

The use of the T and P bits in this manner makes it possible for the Swordfish to generate a Trace Trap (TRC) before each executed instruction, and after other traps have been serviced. For example, if a Division by Zero Trap (DVZ) is recognized while instruction tracing is enabled, then the Trace Trap (TRC) occurs after the Division by Zero service procedure executes RETX at its conclusion. While the Division by Zero service procedure is executing, it can examine the PC value saved on top of the Interrupt Stack to determine the location of the instruction that caused the trap, without concern that instruction tracing was enabled.

Notes:

1. The following privileged instructions cannot be reliably traced because they can alter PSR.P during their execution: LPR (on PSR), and RETX.

2. Because certain non-privileged instructions, such as LPR UPSR, can alter PSR.T during their execution, the Trace Trap (TRC) service procedure should ensure that PSR.T is set to 1 in the PSR copy saved on the Interrupt Stack before executing RETX at its conclusion in order to continue tracing instructions.

3. If instruction tracing is enabled while the WAIT instruction is executed, the Trace Trap (TRC) occurs after the next interrupt, when the interrupt service procedure has returned.

5.4.4 Priority Among Exceptions

Swordfish checks for specific exceptions at various points while executing an instruction (see Figure 5-4). It is possible that several exceptions occur simultaneously. In this event, the Swordfish responds to the exception with highest priority.

SWORDFISH ARCHITECTURE SPECIFICATION    Rev. 2.0, February 1990

Whenever a Reset exception is detected, the Swordfish responds immediately. Any instruction being executed is terminated; any results that have not yet been written to memory are discarded; and any pending interrupts, and traps are eliminated. The internal latch for the edge-sensitive NMI signal is cleared.

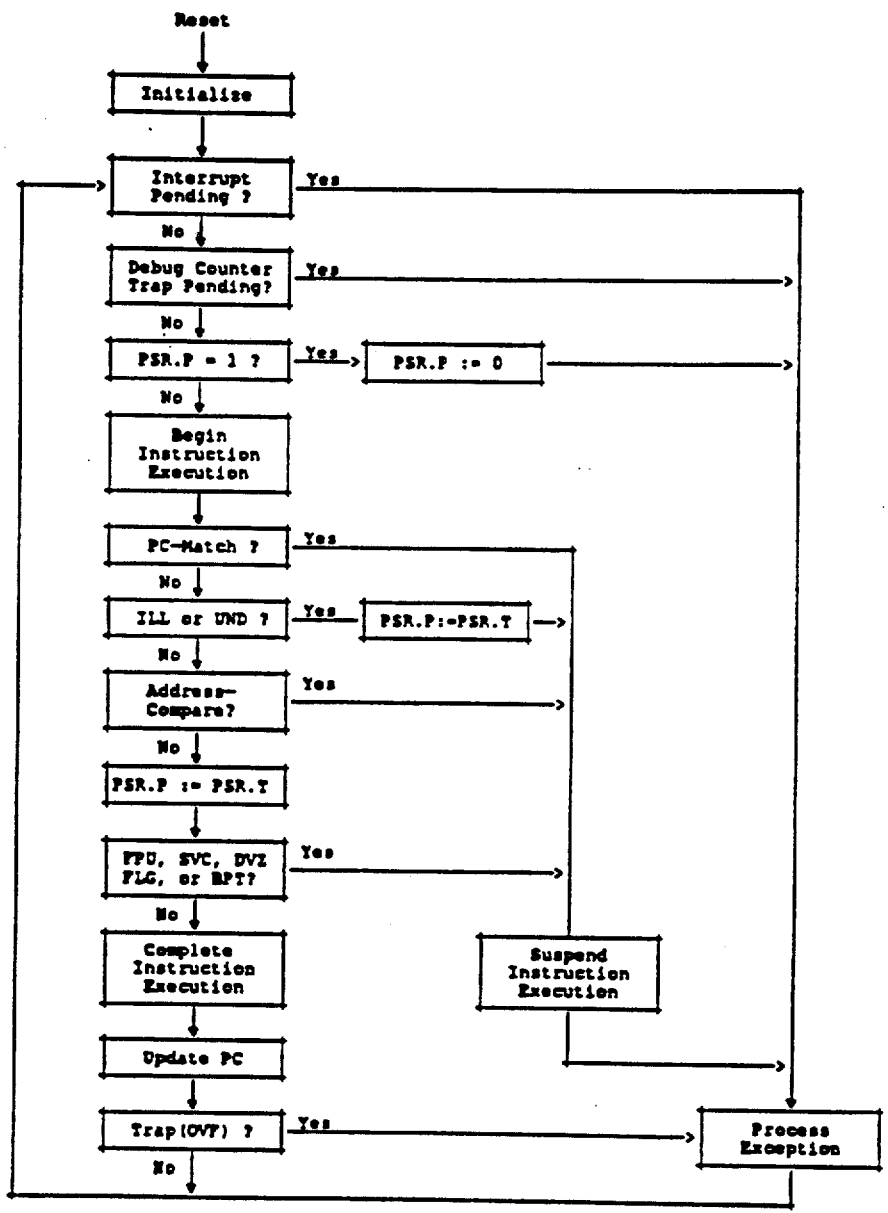

Figure 5-4. Exception Processing Flowchart

SWORDFISH ARCHITECTURE SPECIFICATION  Rev. 2.0, February 1990

Before executing an instruction, the Swordfish checks for pending interrupts, Debug Counter Trap (DBG), and Trace Trap (TRC), in that order. The Swordfish checks for pending interrupts. At this point, the Swordfish responds to any pending interrupt requests. Interrupt requests are recognized in the following order of decreasing priority: Non-Maskable, and Maskable. Otherwise, if a Debug Counter Trap (DBG) is pending, then the Swordfish begins to process that exception. If no interrupts are pending, then the Swordfish checks PSR.P to determine whether a Trace Trap (TRC) is pending. If PSR.P is 1, then the Swordfish clears PSR.P and processes a Trace Trap (TRC).

If no Debug Counter Trap (DBG), interrupt, or Trace Trap (TRC) is pending, then the Swordfish begins executing the instruction. While executing an instruction, the Swordfish may detect a PC-Match, Address-compare or one of seven mutually exclusive traps: FPU, ILL, SVC, DVZ, FLG, BPT, UND. If a PC-match occurs the instruction is suspended, and the exception is processed. If the instruction in Undefined or Illegal, The Swordfish copies PSR.T to PSR.P and starts to execute the corresponding Trap. Otherwise, if an Address-Compare occurs, the Swordfish responds to this trap. If none of the above traps is detected, the Swordfish copies PSR.T to PSR.P and checks for any of the listed trap conditions, and responds to the first one detected. If one of the trap conditions listed above is detected, the instruction is suspended, and the exception is processed.

If no exception is detected while the instruction is executing, then the instruction is completed and the PC is updated to point to the next instruction. If an Integer Overflow Trap (OVF) is detected, then it is processed at this time.

Notes:

1. For traps other than Debug Counter Trap (DBG), TRC, and OVF, the PC value saved on the Interrupt Stack is the address of the instruction that caused the exception. For interrupts, Debug Counter Trap (DBG), Trace Trap (TRC), and Integer Overflow Trap (OVF), the PC value saved on the Interrupt Stack is the address of the next instruction to execute. For Reset, the PC value saved is unpredictable.

2. If an Undefined Instruction or Illegal Operation is detected, then no data references are performed for the instruction.

3. Following execution of the WAIT instruction, then a Debug Trap (DBG) can be pending for a PC-Match condition on the next instruction. In such an event, the Debug Trap (DBG) occurs after the next interrupt, when the interrupt service procedure has returned.

4. An Address-Compare debug condition can be detected while processing an interrupt, or trap. In this event, the debug condition is ignored.

5. The Swordfish does not respond to an interrupt between consecutive instructions that are paired in a single instruction Cache entry. Refer to "Instruction Cache" in Section 6.2 for more information.

5.4.5 Exception Service Procedures

After the Swordfish processes an exception, control is transferred to the appropriate exception service procedure. The service procedure begins executing in Supervisor-mode using the Interrupt Stack. Trace Trap (TRC) and Integer Overflow Trap (OVF) are disabled. The mode for byte order on data memory references is set to Little-Endian. Maskable interrupts are also disabled for a service procedure called in response to an Interrupt, or Debug Trap (DBG).

The service procedure begins executing in Little-Endian mode for byte order. It is possible for the service procedure to change to Big-Endian byte order by modifying PSR.B. In such a case, it is recommended that the service procedure reverse the byte order of the PSR and PC values saved on the Interrupt Stack. In this way, the saved PC can be used by the exception service procedure correctly as a pointer

SWORDFISH ARCHITECTURE SPECIFICATION   Rev. 2.0, February 1990

(if necessary), and returning at the conclusion of the exception service procedure can be accomplished without having to modify PSR.B again.

Service procedures perform actions appropriate for the type of exception recognized. At their conclusion, service procedures for Non-Maskable Interrupts, and traps, execute the RETX instruction to resume executing instructions at the point where the exception was recognized. Service procedures for Maskable Vectored Interrupts execute the EOI and RETX instruction at their conclusion, as described below. Service procedures for Reset cannot resume executing instructions from the point where the exception was recognized.

The EOI instruction is executed at the conclusion of service for a Vectored interrupt to inform the on-chip Interrupt Control Unit that the interrupt's service is complete. While executing EOI, the Swordfish performs an End-of-Interrupt bus cycle on the system interface using address FFFFFE00 (hex), reading a signed byte value from the on-chip ICU.

SWORDFISH ARCHITECTURE SPECIFICATION        Rev. 2.0, February 1990

6. CACHE ORGANIZATION

6.1 INTRODUCTION

The Swordfish integrates two storage buffers that hold copies of frequently used memory locations for fast on-chip access: the Instruction Cache (IC) and the Data Cache (DC). The contents of the IC and DC are automatically loaded by the Swordfish to maintain copies of recently used instructions and data values. The contents of the IC and DC can optionally be locked to hold copies of selected memory locations. This chapter explains the organization and operation of the IC and the DC.

Note that the size and organization of the IC and DC are specific to the Swordfish. For improved performance, future microprocessors in the 32000/EP family may have different characteristics for their on-chip storage buffers. Such differences do not affect software compatibility.

6.2 INSTRUCTION CACHE

Figure 6-1 shows the structure of the IC. The IC has a 2-way, set-associative organization with 512 entries for partially decoded instructions. ("2-way, set associative" means that for each memory address there are 2 entries in the IC where the instruction located at that address can be placed. The 2 entries are called a set.) Each entry contains one or two partially-decoded instructions that are represented with fixed fields for Opcode, source and destination register numbers, and immediate values. The entry also includes auxiliary information representing the length of the instruction(s) in a form that allows fast calculation of the next instruction's address. Refer to "Performance Evaluation" in Appendix C for more information about the placement and pairing of instructions in the IC. The following description explains operation for the full Instruction Cache; considerations for operating with half the Instruction Cache are explained at the end of this section.

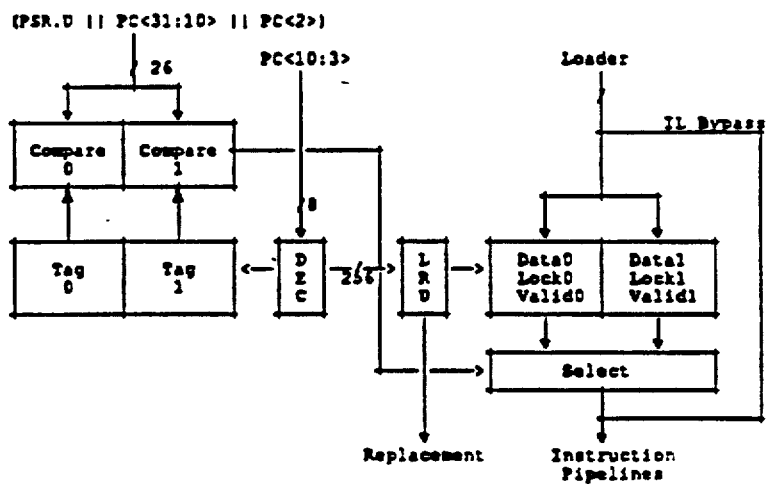

Figure 6-1. Instruction Cache Organization

SWORDFISH ARCHITECTURE SPECIFICATION        Rev. 2.0, February 1990

Associated with each entry in the IC is a 24-bit tag, which holds PSR.U along with the 22 most-significant bits and bit 2 of the address of the instruction stored in the entry. (Note that address bit 10 of the instruction stored in the tag is only significant when operating with half the IC.) In the event that 2 consecutive instructions are paired in an entry, the tag corresponds to the instruction at the lower address. Along with the tag are 2 bits that indicate whether the entry is valid and whether it is locked. For each set there is an additional bit that indicates which entry has been more recently used for purposes of implementing LRU (least-recently used) replacement.

The IC is enabled for an instruction fetch if CFG.IC is 1.

If the IC is disabled, then the instruction fetch bypasses the IC, and the contents of the IC are unaffected. The instruction is read directly from external memory, partially decoded by the Instruction Loader to form an entry (which can contain 2 partially decoded instructions), and transferred to the execution pipelines.

If the IC is enabled for an instruction fetch, then address bits 3 through 10 of the instruction's address are decoded to select the set of lines where the instruction may be stored. The selected set of 2 entries is read and the associated tags are compared with PSR.U along with the 22 most-significant bits and bit 2 of the instruction's address. If one of the tags matches and the matching entry is valid, then the entry is transferred to the instruction pipelines for execution. Otherwise, the missing instruction is read directly from external memory and partially decoded, as explained below.

In case the instruction is missing and the contents of the selected set are both locked, the handling is identical to that described above for the IC being disabled.

In case the instruction is missing and at least one of the entries in the selected set is not locked, the following actions are taken. If one of the entries is locked, then the unlocked entry is selected for replacement. Otherwise, if both entries are unlocked, then the less recently used entry is selected for replacement. The missing instruction is then read directly from external memory and partially decoded by the Loader to form an entry (that may contain 2 partially decoded instructions), which is transferred to the instruction pipelines for execution. If CIIN is not asserted (low) during the bus cycles to read the missing instruction, then the partially decoded instruction is also written into the IC entry selected for replacement, the associated valid bit is set, and the entry is locked if CFG.LIC is 1. If CIIN is asserted (high) during the bus cycle to read the missing instruction, then the contents of the entry for replacement is unaffected.

After the Swordfish has completed fetching a missing instruction from external memory, it continues prefetching sequential instructions. For subsequent sequential instruction fetches, the Swordfish searches the IC to determine whether the instruction is located on-chip. If the search is successful or a non-sequential instruction fetch occurs, the Swordfish ceases prefetching; otherwise, the prefetched instructions are rapidly available to decode and execute. The Swordfish initiates instruction prefetches only during bus cycles that would otherwise be idle because no off-chip data references are required.

6.2.1 Instruction Cache Invalidation

The contents of the IC can be invalidated by software or hardware. The IC is invalidated by software as follows:

1. The entire IC contents, including locked entries, are invalidated while CFG.IC is 0. The LRU selection bit is also initialized to 0 while CFG.IC is 0.

2. The CINV instruction can be executed to invalidate the entire IC contents. Executing CINV invalidates either the entire cache or only unlocked entries according to the instruction's U-option.

SWORDFISH ARCHITECTURE SPECIFICATION          Rev. 2.0, February 1990

The entire IC is invalidated in hardware by asserting (low) the INVIC input signal. When a locked entry is invalidated, it also becomes unlocked.

In most systems it is necessary for the operating system to invalidate the IC whenever a program modifies itself in order to maintain coherence between the IC and external memory.

Notes:

1. It is possible to fetch an instruction and lock it into the IC without having to execute the instruction. This can be accomplished by enabling a Debug Trap (DBG) for a PC that matches the instruction's address. The instruction will be fetched and placed into the IC before the trap is processed. If the instruction can be paired with the following instruction, then the entry containing the pair of instructions becomes locked in the IC.

2. If an entry contains a pair of instructions, then the tag corresponds to the address of the first instruction (the one at lower address). If a nonsequential fetch is made to the second instruction, then that instruction will not be found in the paired entry. That instruction can, however, be located in another entry that has a tag corresponding to that instruction's address.

6.3 DATA CACHE

Figure 6-2 shows the structure of the DC. The 1-Kbyte DC has a 2-way, set-associative organization with 64 lines. Each line contains a 23-bit tag, which holds the most-significant bits of the address of the data stored in the line, along with 4 double-words of data, 4 validity bits, and a lock-bit. (There is 1 validity bit for each double-word of data.) For each set there is an additional bit that indicates which line has been more recently used for purposes of implementing LRU (least-recently used) replacement.

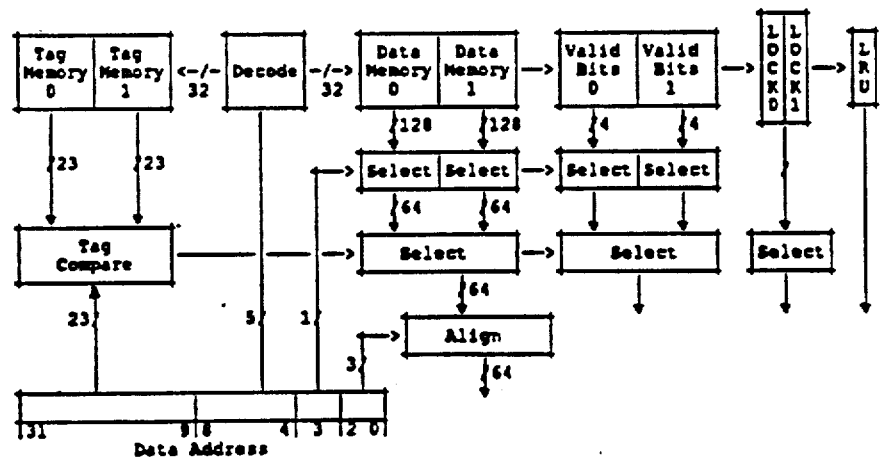

Figure 6-2. Data Cache Organization

6.3.1 Data Read

The DC is enabled for a data read if all of the following are true:

SWORDFISH ARCHITECTURE SPECIFICATION          Rev. 2.0, February 1990

1. CFG.DC is 1.
2. The reference is not to read the semaphore while executing an MBITI instruction.
3. The reference is neither Interrupt-Acknowledge nor End-of-Interrupt bus cycle.

If the DC is disabled, then the data read bypasses the DC, and the contents of the DC are unaffected. The data is read directly from external memory. The data is then aligned and used to execute the instruction.

If the DC is enabled for a data read, then address bits 4 through 8 of the data address are decoded to select the set where the data may be stored. The 2 lines of the selected set are read and both tags are compared with the 23 most-significant bits of the data's address. Either a double-word or quad-word is read from the cache, depending on the operand's length. For a double-word reference bits 2 and 3 of the data's address select the double-word and the corresponding validity bit from each line of the selected set. For a quad-word reference, 2 double-words and their corresponding validity bits are accessed. If a tag in one of the lines matches and the selected double-word(s) of that line is valid, then the data is aligned and used to execute the instruction. Otherwise, the missing data is read from external memory, as explained below.

In case the data is missing and the contents of both lines in the selected set are locked to fixed locations and neither tag matches the data's address, the handling is identical to that described above for the DC being disabled.

In case the data is missing and either one of the tags in the selected set matches the data's address or at least one of the lines is not locked, the following actions are taken. First, if the tag of either line in the set matches the data's address, then that line is selected for updating. Otherwise, if neither tag matches and one of the lines is locked, then the unlocked line is selected for replacement; if neither tag matches and both lines are unlocked, then the less recently used line is selected for replacement. Then, regardless of whether the selected line is replaced or merely updated, the missing data is read from external memory. Either a double-word or quad-word is read depending on the length of the operand and the bus width (see "Bus Access Sequences" in Section D). After being read from memory, the missing data is aligned and used to execute the instruction. If CIIN is not asserted (low) during the bus cycle to read the missing data, and the access was not to one of the registers of the on-chip peripherals (DMA, ICU, Debug Counter and Timer), and the access was not initiated by a LOADNi, LOADNf, or LOADNUf instructions then the DC is updated as follows. If the tag in the line matched the data's address at the time the miss was detected, then the double-word or quad-word read from the system bus is written to the DC memory and the corresponding validity bits are set. If the tag in the line did not match the data's address at the time the miss was detected, then the tag of the line selected for replacement is loaded with the 23 most-significant bits of the data's address, the line becomes locked if CFG.LDC is 1, the double-word or quad-word read from the system bus is written to the DC memory, the corresponding validity bits are set, and the remaining validity bits are cleared.

6.3.2 Data Write

The DC is enabled for a data write whenever CFG.DC is 1, including references for MBITI instructions. Address bits 4 through 8 of the data address are decoded to select the set where the data may be stored. The 2 lines of the selected set are read and both tags are compared with the 23 most-significant bits of the data's address. Either a double-word or quad-word can be written, depending on the operand's length. For a double-word reference, bits 2 and 3 of the data's address select the double-word and the corresponding validity bit from each line of the selected set. For a quad-word reference, two SWORDFISH ARCHITECTURE SPECIFICATION          Rev. 2.0, February 1990 double-words and their corresponding validity bits are accessed. If a tag in one of the lines matches and the selected double-word(s) of that line is valid, then the data is aligned and used to update the double-word(s) in the DC memory. If one of the double-words for a quad-word reference is valid but the other is not, then only the valid double-word is updated. Otherwise, if the data is not located in the DC, then the contents of the DC are unaffected. The data is always written through to external memory.

6.3.3 Data Cache Invalidation

The contents of the DC can be invalidated by software or hardware. The DC is invalidated by software as follows:

1. The entire DC contents, including locked lines, are invalidated while CFG.DC is 0. The LRU selection bit for each set is also initialized to 0 while CFG.DC is 0.

2. The CINV instruction can be executed to invalidate the entire DC contents. Executing CINV invalidates either the entire cache or only unlocked lines, according to the instruction's U-option.

The DC is invalidated in hardware as follows:

1. The entire DC contents, including locked lines, are invalidated when $\overline{INVDC}$ is asserted while $\overline{INVBLK}$ is High.

2. When $\overline{INVDC}$ is asserted while $\overline{INVBLK}$ is Low, the Swordfish reads an address from the Address Bus and searches to determine whether a copy of the 16-byte block specified on A4 through A31 is found in any line of the DC. If the search is successful, the line is invalidated regardless of whether it is locked. Invalidation of a single block must only be performed when the Swordfish has relinquished its Address Bus in response to $\overline{HOLD}$ or extended bus retry.

When a locked line is invalidated, it also becomes unlocked.

In many systems it is necessary to use hardware techniques to maintain coherence between the DC and external memory. Software techniques are inadequate for systems with multiple CPUs and I/O devices that share and dynamically modify data values. Depending on the system configuration, either of two techniques for maintaining coherence between the DC and external memory is recommended:

1. Whenever a location in memory is modified by a bus master other than the Swordfish itself, the address can be presented to the Swordfish along with a request to invalidate that 16-byte block. For example, this technique is appropriate for a single-processor system with a low-rate of I/O transfers to memory.

2. Systems that use an external cache memory can maintain coherence between the on-chip DC and the external cache by enforcing that the contents of the DC are always a subset of the external cache. The system can freely employ any technique to maintain coherence between the external cache and main memory. In order to enforce that the DC contains only lines that are also in the external cache, it is necessary for external hardware to request that the Swordfish invalidate a block whenever the status of that block changes in the external cache. For example, an external Cache Control Unit can implement this approach of enforcing that the contents of the DC are subset of the external cache by invalidating 1 or more blocks (depending on line size of the external cache) whenever a line in the external cache is replaced, invalidated, or updated.

SWORDFISH ARCHITECTURE SPECIFICATION                Rev. 2.0, February 1990

6.3.4 Data Cache Monitoring

It is possible to maintain an external copy of the valid contents of the on-chip DC by observing the Swordfish's system bus. Data reads from external memory are distinguished by special Bus Status codes. It is possible to determine which line is being updated during a data read: A4 through A8 indicate the set, and CASEC indicates the line within the set if at least one of the lines is not locked. The tag value can be determined from A9 through A31. Whenever an instruction that alters the CFG register is executed, the Opcode and operand appear on the system bus (see "Internal Status" in Section 7.9). In this way, it is possible to monitor externally whether the DC is enabled and whether locking is enabled. Whenever a CINV instruction is executed, the Opcode and operand appear on the system bus. Thus, invalidations of the DC by software can be monitored externally.

Note that the contents of the DC maintained externally include copies of all valid entries in the on-chip DC, but the external copy may include some entries that are invalid in the on-chip DC. For example, when a bus cycle is initiated to read an operand missing from the DC, then the data read from external memory may not be updated in the DC if an exception occurs. Nevertheless, the Swordfish's design ensures that when a DC miss causes a line to be replaced, then the old contents of the line are invalidated if the bus cycle to read the missing data completes the T2 state without a non-cacheable indication on CIIN. Thus, the external DC copy should be updated following the T2-state of the read bus cycle if no such condition occurs. Then if an exception occurs, the external copy will indicate the contents of the line to be valid, but the line will be invalid on-chip.

6.3.5 Load Scheduling

The Swordfish implements a mechanism called Load Scheduling, that enables additional references to be initiated to the DC and system bus while a bus cycle to read missing data is in progress. Load Scheduling allows processing by the instruction pipelines to overlap external memory accesses and also allows a sequence of data memory references to be pipelined on the system bus. "Performance Evaluation" in Appendix C explains how Load Scheduling can be exploited to keep the pipeline and system bus highly utilized for graphics and vector operations, as well as other applications.

The Load Scheduling mechanism implemented by the Swordfish has the following characteristics to ensure correct instruction execution and cache coherence:

1. While a scheduled load is in progress and a second reference (either read or write) is performed to a location in the same set (that is, address bits 4 through 8 are the same for the scheduled load and the second reference), then the second reference is delayed until the data for the scheduled load has been read and the DC updated. This restriction applies only if the DC is enabled for both the scheduled load and the second reference.

2. While a scheduled load is in progress and a cache invalidation request is received on the system bus that applies to the address of the scheduled load (either the entire DC is invalidated or only the block of the scheduled load), then the DC is not updated when the scheduled load completes. In such a case, the DC line for which the scheduled load was destined is invalidated in order to permit external monitoring of the DC contents.

SWORDFISH ARCHITECTURE SPECIFICATION            Rev. 2.0, February 1990

7. SYSTEM INTERFACE

7.1 INTRODUCTION

This chapter describes the interface between the Swordfish and other devices in its surrounding system, including memory, peripherals, cache controllers, and Direct Memory Access (DMA) controllers. The main features of the bus are:

1. Bus clocking is optionally at half or full frequency of the Swordfish
2. 64-bit data bus with dynamic bus sizing to 8, 16 and 32 bits.
3. Support for pipelined address and data transfers
4. Support for 2-way interleaved memory
5. On-Chip 15 level Interrupt Control Unit (ICU)
6. On-Chip 2-channel Direct Memory Access controller (DMA)
7. On-Chip Timer
8. Support for page-mode and static-column DRAM
9. Support for slow peripherals
10. Support for Shadow and In-System Emulation (ISE) operating modes The Swordfish communicates with other devices in the system using a bus composed of address, data, and control signals, by performing a sequence of actions called a "bus cycle". External DMA controllers can request control of the bus from the Swordfish in order to initiate their own data transfers. The Swordfish uses a 2-wire handshake to receive and acknowledge such bus requests.

The Swordfish receives and responds to external requests for exceptions, including interrupts, and Reset. The Swordfish also displays information concerning its internal activity, such as whether it is operating in User or Supervisor mode.

7.2 CLOCKING

The Swordfish's clocking is designed for easy synchronization of multiple CPUs, including the synchronization of two Swordfish microprocessors working in a master/shadow configuration (refer to "Shadow Mode" in Section 7.12 for more information). The Swordfish requires a single-phase input clock signal, CLK, with frequency equal to the Swordfish's bus operating frequency. The CLK input signal is used to generate the internal clock which times the operation of the Swordfish. The Swordfish's bus timing is specified relative to the CLK input. Every rising edge of CLK defines a transition in the timing state ("T-State") of the Swordfish bus. When the bus is configured to work at full frequency (see "Bus Frequency" in Section 7.5.2.1), internal clock is generated from CLK. When the bus is configured to work at half frequency, internal clock is generated from the output of an on-chip frequency multiplier fed by CLK.

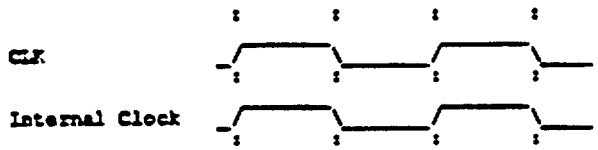

Figure 7-1. Swordfish Clocks while in Full Frequency Bus Mode

SWORDFISH ARCHITECTURE SPECIFICATION          Rev. 2.0, February 1990

The Swordfish also provides one single-phase output signal, DCLK. DCLK is in the same frequency as CLK with a delay of 1/4 bus clock cycle (see Figure 7-42). during reset time DCLK is not active, it's value is held 'high' until the on-chip PLL synchronizes.

Figure 7-2. Swordfish Clocks while in Half Frequncy Bus Mode

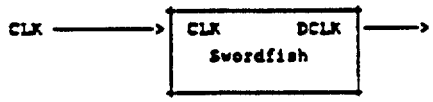

Figure 7-3. Bus Clock Connections

Figure 7-3 shows the basic bus clock connections. Multiple Swordfish microprocessors can be synchronized by connecting to a common CLK input (Figure 7-4). The clock synchronization takes place during Reset.

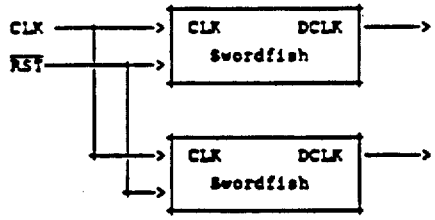

Figure 7-4. Multiple Swordfish Synchronization

7.3 PIN DESCRIPTION

A brief description of the interface signals for the Swordfish is given in the following sections. Table 7-1 shows a summary of the signals in alphabetical order. Refer to the "Swordfish Device Specification Book" for a specification of the Swordfish's packaging and electrical characteristics.

SWORDFISH ARCHITECTURE SPECIFICATION          Rev. 2.0, February 1990

| Symbol | Pins | Signal Name | I/O | Active | Tri-State |
|---|---|---|---|---|---|
| A | 32 | Address Bus | I/O | – | Yes |
| ADS0 | 1 | Address Strobe | Output | High | No |
| ADS1 | 1 | Address Strobe | Output | High | No |
| BE | 8 | Byte Enable (0-7) | Output | Low | Yes |
| BP | 1 | Break Point | Output | Low | No |
| BRT | 1 | Bus Retry | Input | Low | |
| BW | 2 | Bus Width (0-1) | Input | Encode | |
| CASEC BW64 | 1 | Cache Section 64 Bit Default Bus (Sampled at Reset) | Output Strap | Encode Encode | Yes |
| CBE | 1 | Configuration Buffer Enable | Output | Low | No |
| CIIN | 1 | Cache Inhibit In | Input | High | |
| CLK | 1 | Bus Clock | Input | – | |
| D | 64 | Data Bus (0-63) | I/O | – | Yes |
| DAK0 | 1 | DMA Acknowledge 0 | Output | Low | No |
| DAK1 | 1 | DMA Acknowledge 1 | Output | Low | No |
| DCLK | 1 | Delayed Bus Clock | Output | – | No |
| DDIN TST | 1 | Data Direction In Self Test Enable (Sampled at Reset) | Output Strap | Low Low | Yes |
| DRD | 1 | Data Read | Output | Low | Yes |
| DRQ0 | 1 | DMA Request 0 | Input | Low | |
| DRQ1 | 1 | DMA Request 1 | Input | Low | |
| DSEL | 1 | Data Select | Output | Encode | Yes |
| DWR0 | 1 | Data Write Strobe | Output | Low | Yes |
| DWR1 | 1 | Data Write Strobe | Output | Low | Yes |
| EOT | 1 | End Of DMA Transfer | Input | Low | |
| ERR | 1 | Error | Output | Low | No |
| FFRQ | 1 | Full Frequency Bus | Input | Encode | |
| HLDA | 1 | Hold Acknowledge | Output | Low | No |
| HOLD | 1 | Hold Request | Input | Low | |
| IDLE | 1 | Idle Cycle Request | Input | Low | |

TABLE 7-1. Table of Interface Signals

Notes:

1. All of the output signals Swordfish, except for ERR, are Tri-State while in Shadow Mode. The 'Tri-State' column of Table 7-1 refers only to the state of the signal during hold, extended-retry and reset.
2. During reset SDIO is also in Tri-State.

SWORDFISH ARCHITECTURE SPECIFICATION          Rev. 2.0, February 1990

| Symbol | Pins | Signal Name | I/O | Active | Tri-State |
|--------|------|-------------|-----|--------|-----------|
| ILO | 1 | Interlocked Bus Cycle | Output | Low | No |
| INVBLK | 1 | Invalidate Block | Input | Low | |
| INVDC | 1 | Invalidate Data Cache | Input | Low | |
| INVIC | 1 | Invalidate Inst. Cache | Input | Low | |
| IR | 4 | Vectored Interrupt (0-3) | Input | Encode | |
| IREF | 1 | Internal Reference | Output | Low | No |
| ISE | 1 | In System Emulation (Sampled at Reset) | Input | High | |
| NMI | 1 | Non-maskable Interrupt | Input | Edge | |
| PAGE | 1 | Same Page | Output | Low | Yes |
| PFSA | 1 | Program Flow Status (Pipe - A) | Output | Low | No |
| PFSB | 1 | Program Flow Status (Pipe - B) | Output | Low | No |
| PIPEN | 1 | Pipelined Bus Enable | Input | High | |
| PLAT | 1 | Page Latch Enable | Input | Low | |
| RDY | 1 | Ready | Input | Low | |
| RST | 1 | Reset | Input | Low | |
| SCLK | 1 | Serial Link Clock | Input | Edge | - |
| SDIO | 1 | Serial Data I/O | I/O | - | No |
| SDDIN | 1 | Serial Link Data Direction In | Output | Low | No |
| SHDW | 1 | Shadow Mode | Input | Low | |
| ST | 4 | Status (0-3) | Output | Encode | No |
| STALL | 1 | Stall | Input | Low | |
| TA | 1 | Timer Control | I/O | High | No |
| TB | 1 | Timer Trigger | Input | High | |
| TRIS | 1 | TriState all Outputs | Input | Low | |
| T2 | 1 | T2 Bus Cycle | Output | Low | Yes |
| U/S ILVD | 1 | User/Supervisor Mode Interleaved Memory (Sampled at Reset) | Output Strap | Encode Encode | Yes |
| WAIT | 1 | Wait | Input | High | |
| XBRTA | 1 | Extended Bus Retry Acknowledge | Output | Low | No |

TABLE 7-1. Table of Interface Signals (Continued)

Notes:

1. All of the output signals Swordfish, except for ERR, are Tri-State while in Shadow Mode. The 'Tri-State' column of Table 7-1 refers only to the state of the signal during hold, extended-retry and reset.
2. During reset SDIO is also in Tri-State.

SWORDFISH ARCHITECTURE SPECIFICATION          Rev. 2.0, February 1990

7.3.1 Input Signals

BRT  Bus Retry. When asserted (low), the Swordfish executes the previously completed bus cycle, as well as any pending bus cycles when pipelining is enabled. Sampled by the Swordfish at the end of the bus cycle (together with RDY).

BW0-BW1  Bus Width. These lines define the bus width for each data transfer according to the following encoding:

| BW1  | BW0  | Bus Width                   |
|------|------|-----------------------------|
| Low  | Low  | 8 bits                      |
| Low  | High | 16 bits                     |
| High | Low  | 32 bits                     |
| High | High | Default bus width (64 or 32 bits) |

CIIN  Cache Inhibit Input. When asserted (high), indicates that the location accessed in the current bus cycle is not cacheable.

CLK  Input Bus Clock. All internal Swordfish clocks are synchronized by means of Phase-Lock Loop (PLL) to this clock. The Swordfish timing is specified relative to the CLK input.

DRQ0  DMA Request for Channel 0. When asserted (low), requests the on-chip DMA controller to perform a DMA transfer on channel 0. DRQ0 is sampled at each rising edge of CLK. In order to avoid multiple DMA cycles, DRQ0 must be removed before the end of each DMA cycle.

DRQ1  DMA Request for Channel 1. When asserted (low), requests the on-chip DMA controller to perform a DMA transfer on channel 1. DRQ1 is sampled at each rising edge of CLK. In order to avoid multiple DMA cycles, DRQ1 must be removed before the end of each DMA cycle.

EOT  End of DMA Transfer. When asserted (low) at the last T2 of a DMA transfer, causes the on-chip DMA controller to halt DMA transfers on the currently active channel.

FFRQ  This signal is used by the Swordfish in order to determine whether the bus clock frequency is the same as the Swordfish's internal clock frequency (FFRQ low) or half this frequency (FFRQ high). This signal should be changed only during reset.

HOLD  Hold Request. When asserted (low), causes the Swordfish to release its buses.

IDLE  Idle Cycle Request. When asserted (low) at the last T2 of a non-pipelined bus cycle, the Swordfish adds idle cycles as long as IDLE is asserted. During these idle cycles some of the Swordfish output pins hold the values from the last T2 (see "Support for Slow Devices" in Section 7.5.3.8 for more details).

INVBLK  Invalidate Block. Indicates whether a 16-byte block of the on-chip data cache (INVBLK low) or the entire on-chip data cache (INVBLK high) is to be invalidated. When only a block is invalidated, the Swordfish reads the block's address on A4-A31.

INVDC  Invalidate Data Cache. When asserted (low), the data cache contents are invalidated. INVBLK determines whether a single block or the entire data cache is invalidated.

INVIC  Invalidate Instruction Cache. When asserted (low), the entire instruction cache contents are invalidated.

| | |
|---|---|
| | access has begun (regardless of the addressed memory bank) and a valid address is on the address bus. |
| ADS1 | Address Strobe for Memory Bank 1. When interleaved memory mode is enabled, the Swordfish asserts ADS1 (high) to indicate that a memory access to memory bank 1 has begun and a valid address to that bank is on the address bus. When interleaved memory mode is disabled, the Swordfish asserts ADS1 (high) to indicate that a memory access has begun (regardless of the addressed memory bank) and a valid address is on the address bus. |
| $\overline{BE0}$-$\overline{BE7}$ | Byte Enables. When asserted (low), selectively enables data transfers on bytes 0 through 7 of the data bus. |
| $\overline{BP}$ | Break Point. This signal is asserted (low) when the Swordfish detects an enabled debug condition. |
| CASEC/BW64 | Cache Section / 64-bit Default Bus Width. This signal is sampled by the Swordfish at the end of Reset in order to determine whether the default bus width is 64 bits (BW64 high) or 32 bits (BW64 low). After Reset, this signal indicates, for cacheable data read bus cycles, the section of the on-chip data cache where the data is to be placed. It can be used for external monitoring of the data cache contents. |
| $\overline{CBE}$ | Configuration Buffer Enable. Asserted (low) to enable the configuration buffer (see "Resetting" in Section 7.4). |
| $\overline{DAK0}$ | DMA Acknowledge for Channel 0. Activated by the on-chip DMA controller in response to the $\overline{DRQ0}$ signal to indicate that the DMA is performing a transfer on channel 0. |
| $\overline{DAK1}$ | DMA Acknowledge for Channel 1. Activated by the on-chip DMA controller in response to the $\overline{DRQ1}$ signal to indicate that the DMA is performing a transfer on channel 1. |
| DCLK | Delayed Clock. A clock in the same frequency as CLK with a delay of 1/4 bus clock cycle. Can be used for timing write signals to memory circuits. |
| DDIN/$\overline{TST}$ | Data Direction / Self-Test Enable. This signal is sampled by the Swordfish at the end of Reset in order to determine whether the Swordfish executes an extensive self-test operation before being initialized. The self-test is performed if $\overline{TST}$ is sampled low. After Reset, indicates the direction of the data transfer requested by the Swordfish (low for reads, high for writes). Issued together with the address. |
| $\overline{DRD}$ | Data Read. Indicates the direction of the data transfer on the data bus (low for reads, high for writes). |
| DSEL | Data Select. DSEL indicates the memory bank using the data bus (low for memory bank 0, high for memory bank 1). When interleaved mode is enabled, it can be used during read cycles as the data select signal of the multiplexor for an interleaved memory. |
| $\overline{DWR0}$ | Data Write to Memory Bank 0. When interleaved memory mode is enabled, $\overline{DWR0}$ is asserted (low) to indicate that a memory write to memory bank 0 has begun and valid data to that bank is on the data bus. When interleaved memory mode is disabled, $\overline{DWR0}$ is asserted (low) to indicate that a memory write has begun (regardless of the addressed memory bank) and a valid data is on the data bus. |

SWORDFISH ARCHITECTURE SPECIFICATION        Rev. 2.0, February 1990

DWR1        Data Write to Memory Bank 1. When interleaved memory mode is enabled, DWR1 is asserted (low) to indicate that a memory write to memory bank 1 has begun and a valid data to that bank is on the data bus. When interleaved memory mode is disabled, DWR1 is asserted (low) to indicate that a memory write has begun (regardless of the addressed memory bank) and a valid data is on the data bus.

ERR         Error. When the SHDW input is high (Swordfish in master-mode), this signal is asserted (low) to indicate that a faulty Swordfish pad (driver) or a short-circuit has been detected on one of the output pins. When the SHDW input is low (Swordfish in shadow-mode), this signal is asserted (low) to indicate that the shadow Swordfish and the master Swordfish disagree.

HLDA        Hold Acknowledge. Asserted (low) by the Swordfish in response to the HOLD input, to indicate that the Swordfish has released the bus.

ILO         Interlocked Bus Cycle. This signal is asserted (low) to indicate that interlocked bus cycles are being performed.

IREF        Internal Reference. This signal is asserted (low) to indicate an internal reference to one of the registers of the on-chip ICU, Timer, Debug Counter or DMA controller.

PAGE        Same Page. This signal is asserted (low), to indicate that the address on A0-31 is within the same page as the last valid latched address (see "Support for Dynamic Ram" in Section 7.5.3.9 for more information).

PFSA        Program Flow Status A. This signal is asserted (low) to indicate that pipeline A has completed executing an instruction.

PFSB        Program Flow Status B. This signal is asserted (low) to indicate that pipeline B has completed executing an instruction.

SDDIN       Serial Link Data Direction In. Used by ISE equipment to determine whether the Serial Link is in output or input mode. When in output mode SDDIN is not asserted (high), and when in input mode SDDIN is asserted (low)

ST0-ST3     Bus Cycle Status. These signals encode the status that indicates the type of bus cycle.

T2          T2 Bus Cycle. When asserted (low), indicates that the Swordfish is in a data transfer cycle (T2).

U/S/ILVD    User/Supervisor/Interleaved Memory Support. This signal is sampled by the Swordfish at the end of Reset in order to determine whether if the Swordfish provides support for interleaved memory implementation (ILVD low) or not (ILVD high). This support consists of detecting and serializing consecutive accesses to the same memory bank. After reset indicates whether the current bus cycle is for a reference in User-mode (high), or Supervisor-mode (low).

XBRTA       Extended Bus Retry Acknowledge. Asserted (low) by the Swordfish to indicate that the Swordfish has released the bus due to an Extended Bus Retry Request.

7.3.3 Bidirectional Signals

A0-A31      Address Bus. Driven by the Swordfish to output an address at the beginning of a bus cycle (A0 is the least-significant bit). A4-A31 serve as inputs by the Swordfish to read the

SWORDFISH ARCHITECTURE SPECIFICATION   Rev. 2.0, February 1990 address of a block to invalidate in the on-chip data cache.

D0-D63   Data Bus. Used by the Swordfish to input during a read bus cycle or to output data during a write cycle. Note that signals D0 through D7 lines correspond to the byte with the lowest address regardless of the mode for byte order selected by the PSR.B bit.

SDIO   Serial Data Input/Output. Used by ISE equipment to shift the contents of the internal registers into or out of the Swordfish.

TA   Timer Control. This signal is used either to output the timer waveforms or to signal a trigger event.

7.4 RESETTING

The RST input pin is used to reset the Swordfish. The Swordfish samples RST synchronously on the rising edge of CLK. When RST is asserted (low), any instruction being executed is terminated, any results that have not yet been written to memory are discarded, and any pending interrupts and traps are eliminated. The internal latches for the edge-sensitive NMI signal is cleared. On application of power, RST must be held low for at least 500 uSec after Vcc, CLK and FFRQ are stable (see Figure 7-5). This is to ensure that all on-chip voltages and clocks are completely stable before operation. Whenever a RST is applied, it must remain active for at least 500 uSec after FFRQ is stable.

In case more than one Swordfish need to run in lock-step (i.e. ISE or Shadow mode) the rising edge of RST must be within the specified time before the rising edge of CLK.

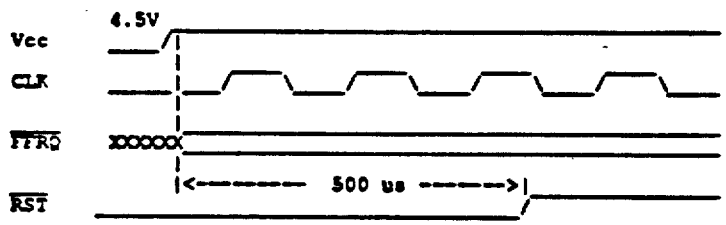

Figure 7-5. Power-On Reset Requirements

Several of the Swordfish bus characteristics are determined during Reset time. The system designer configures the following characteristics: interleaved memory mode enabled or disabled and default bus width of 32 bits or 64 bits by using the input pins: ILVD and BW64 respectively. These pins have different functions during Reset than their bus cycle functions. In order to sample these signals the Swordfish provides the CBE signal. This pin is asserted (low) by the Swordfish to enable the strap pin buffer. On reset the Swordfish asserts the CBE after the detection of RST high. CBE is asserted (low) for several thousands bus cycles. The strap pins are sampled by the Swordfish while CBE is asserted (low) (see Figure 7-41).

One example of using these pins in a system is represented in Figure 7-6. The 74AS244 buffer is enabled by the CBE signal, enabling the Swordfish to configure its bus characteristics. The DDIN, U/S, and CASEC outputs are Tri-Stated during Reset.

The processor mode: master, Shadow or ISE mode is set upon reset using ISE and SHDW pins. Another option configured at reset time is whether to execute self test or not. The configuration is done using the TST strap pin.

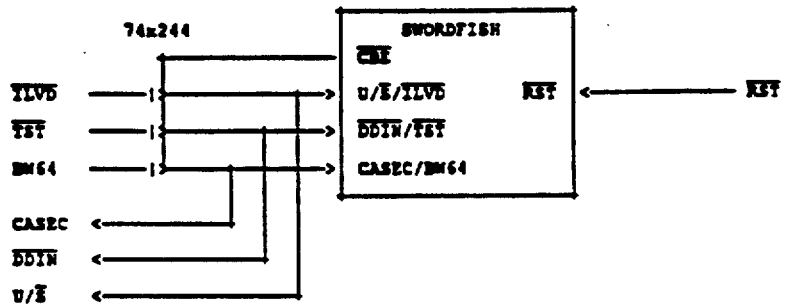

Figure 7-6. Swordfish Bus Configuration

7.5 BUS CYCLES

7.5.1 Bus Status

The Swordfish performs bus cycles for one of the following reasons:

1. To fetch instructions from memory.

2. To write or read data to or from memory or peripheral devices. Peripheral input and output are memory-mapped in the Swordfish architecture. Some of the peripheral devices are located on-chip.

3. To acknowledge an interrupt and allow the on-chip ICU to provide a vector number.

The only external difference between these cases is the 4-bit code placed on the Bus Status pins (ST0-ST3). The various combinations on these pins indicate why the Swordfish is performing a bus cycle, or, if it is idle on the bus, then why is it idle. The Bus Status pins are interpreted as a 4-bit value (ST0 the least-significant bit). Their value are encoded as follows:

0000 The bus is idle because the Swordfish does not yet need to access the bus.

0001 The bus is idle because the Swordfish is waiting for an interrupt following execution of the WAIT instruction.

0010 The bus is idle because the Swordfish has sampled an asserted (low) STALL input.

0011 The bus is idle because the Swordfish is executing self-test.

0100 Interrupt Acknowledge. The Swordfish is performing a read cycle to acknowledge an interrupt request.

0110 End of Interrupt. The Swordfish is performing a read cycle, to indicate that it is executing a End of Interrupt (EOI) instruction.

1000 Sequential Instruction Fetch. The Swordfish is fetching the next instructions in sequence from the instruction stream.

SWORDFISH ARCHITECTURE SPECIFICATION          Rev. 2.0, February 1990

1001 Non-Sequential Instruction Fetch. The Swordfish is performing a non sequential fetch of a new sequence of instructions. This occurs as a result of a Jump or Branch instruction, an exception, and also after the execution of certain other instructions.

1010 Data Transfer. The Swordfish is reading or writing an operand for an instruction, or it is referring to memory while processing an exception.

7.5.2 Bus Modes of Operation

The Swordfish bus offers several options, which allows the system designer to choose the bus protocol that best fits the application. These options are:

- Full/Half Frequency Bus
- Interleaved Memory Support Enabled/Disabled
- 64-bit/32-bit Default Bus Width In addition, the system designer can select dynamically the data bus width and between pipelined and sequential bus operation on each bus cycle.

7.5.2.1 Bus Frequency

The Swordfish can be configured to work internally either at a frequency equal to the bus frequency, or at twice that frequency. The bus frequency is always equal to the frequency of the CLK input. The ratio between the bus clock frequency and the internal clock frequency is selected during Reset by driving the $\overline{FFRQ}$ input either low (full frequency bus), or high (half frequency bus). This signal should be changed only during reset. Whenever a $\overline{RST}$ is applied, $\overline{RST}$ must remain active for at least 500-uSec after $\overline{FFRQ}$ is stable.

7.5.2.2 Interleaved Memory Support Enabled/Disabled

Using a 2-way interleaved memory together with the pipelined bus helps the Swordfish achieve high memory bandwidth from an economical memory system. In order to simplify the implementation of an interleaved memory controller, the Swordfish offers:

- An internal mechanism that avoids issuing a new request to a memory bank before the previous request to the same bank is completed

- Control signals (DSEL, ADS0-ADS1, $\overline{DWR0}$, $\overline{DWR1}$) that simplify the interleaved memory design By issuing one request at a time to each memory bank, the Swordfish simplifies interleaved memory design by eliminating the input FIFO queues that would be necessary otherwise. The Swordfish is configured during Reset to support interleaved memory by setting the $\overline{ILVD}$ line either low (interleaved memory support enabled), or high (interleaved memory support disabled). When the interleaved memory support is disabled, bus cycles are issued without checking for which memory bank they are directed.

7.5.2.3 64-bit/32-bit Default Bus Width

The Swordfish can be configured to work with a default bus width of 64 bits or 32 bits. The default bus width is configured during Reset by setting the BW64 line either high (64-bit default bus width), or low (32-bit default bus width). No 64-bit bus transactions are issued by the Swordfish when the default bus width is set to 32 bits. When the interleaved memory support is enabled, the Swordfish differentiates SWORDFISH ARCHITECTURE SPECIFICATION          Rev. 2.0, February 1990 between the memory banks by checking:

1. Address bit A3, if the default bus width is 64 bits
2. Address bit A2, if the default bus width is 32 bits

7.5.3 Memory and Peripheral Bus Cycles

7.5.3.1 Bus T-States

The basic bus cycles performed by the Swordfish to read from and write to memory and peripheral devices occur during two cycles of the bus clock, T1 and T2. The basic bus cycles can be extended by adding additional wait cycles, T2w, in order to wait for slow memory and peripheral devices. When no request for the bus is pending, the bus state is called Idle state, Ti. Figure 7-7 presents a simplified bus state diagram (it does not show the effect of some events, like internal references and asserted HOLD, BRT, etc.). In the case of a pipelined bus, the T1 state of a bus cycle might overlap with T2 and/or T2w states of the previous bus cycle.

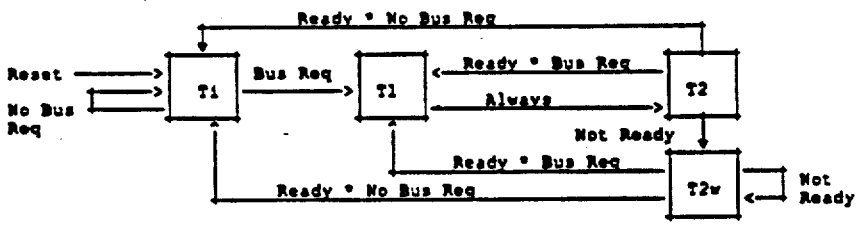

Figure 7-7. Simplified Bus State Diagram

7.5.3.2 Basic Read and Write Cycles

The Swordfish bus can operate with either sequential or pipelined bus. When pipelined bus is disabled, the Swordfish does not start a new bus cycle until the previous bus cycle has completed. When pipelined bus is enabled, the Swordfish can start a new bus cycle before the previous bus cycle is completed. The bus cycles must complete in the same order they were issued by the Swordfish. If two previously issued bus cycles are pending, the Swordfish does not start new bus cycles until the first pending bus cycle is completed. When accessing external memory (internal cache misses or non-cacheable data), the Swordfish can achieve high memory bandwidth by using its pipelined bus, together with an interleaved or pipelined memory. The system designer can dynamically switch the Swordfish from sequential bus to pipelined bus and back, by controlling the Swordfish's PIPEN input.

7.5.3.2.1 Sequential Bus Cycles With Interleaved Memory Disabled

The sequential bus timing (interleaved memory support disabled) for basic read and write cycles with no wait states are shown on Figure 7-16. The Swordfish performs only sequential bus cycles when the PIPEN input is asserted low. The PIPEN input is sampled by the Swordfish at the end of T1. When the PIPEN input is connected permanently to ground (low), all the Swordfish's bus cycles are executed sequentially.

SWORDFISH ARCHITECTURE SPECIFICATION  Rev. 2.0, February 1990

For both read and write bus cycles the Swordfish asserts ADS0 and ADS1 during the first half of T1, indicating the beginning of the bus cycle. From the beginning of T1 until the completion of the bus cycle the Swordfish drives the address bus, as well as control signals for ST0-ST3, $\overline{BE0}$-$\overline{BE7}$, $\overline{DDIN}$, $\overline{PAGE}$, and U/$\overline{S}$. For cacheable read cycles, the Swordfish also drives CASEC.

At the end of T2 the Swordfish checks if $\overline{RDY}$ is asserted (low) and $\overline{WAIT}$ is not asserted (low). If these conditions are true, the current bus cycle ends. If $\overline{IDLE}$ is asserted (low) the Swordfish does not issue a new T1 until $\overline{IDLE}$ is sampled high, some of the Swordfish output pins hold the values from the last T2 (see "Support for Slow Devices" in Section 7.5.3.8 for more details). If $\overline{IDLE}$ is not active (high) the next cycle can either be T1 for the next bus cycle, or Ti, in case the Swordfish has no bus cycles to perform. For read bus cycles, the Swordfish samples the data at the end of T2. For cacheable read bus cycles, the Swordfish also samples the CIIN input at the end of T2.

The Data Bus is Tri-Stated during read bus cycles and idle T-states following a read cycle. For write bus cycles, valid data is driven on the Data Bus during T2 and on the following idle cycles. The $\overline{DRD}$ signal is asserted by the Swordfish during T2 of the read bus cycles. For write bus cycles, the Swordfish asserts (low) $\overline{DWR0}$ and $\overline{DWR1}$ at the beginning of T2 and deactivates them after the end of T2 or of the last T2w of the bus cycle.

7.5.3.2.2 Sequential Bus Cycles With Interleaved Memory Enabled

The sequential bus timing (interleaved memory support enabled) for basic read and write cycles with no wait states are shown on Figure 7-17. The Swordfish performs only sequential bus (interleaved memory support enabled) cycles when the PIPEN input is asserted low. The Swordfish asserts ADS0 to indicate the beginning of a bus cycle accessing memory bank 0, and ADS1 to indicate the beginning of a bus cycle accessing memory bank 1. For both read and write bus cycles, the Swordfish asserts ADS0 or ADS1 during the the first half of T1, indicating the beginning of the bus cycle. From the beginning of T1 until the completion of the bus cycle the Swordfish drives the address bus, as well as control signals for ST0-ST3, $\overline{BE0}$-$\overline{BE7}$, $\overline{DDIN}$, $\overline{PAGE}$, and U/$\overline{S}$. For cacheable read cycles, the Swordfish also drives CASEC.

At the end of T2 the Swordfish checks if $\overline{RDY}$ is asserted (low) and $\overline{WAIT}$ is not asserted (low). If these conditions are true, the current bus cycle ends. If $\overline{IDLE}$ is asserted (low) the Swordfish does not issue a new T1 until $\overline{IDLE}$ is sampled high, some of the Swordfish output pins hold the values from the last T2 (see "Support for Slow Devices" in Section 7.5.3.8 for more details). If $\overline{IDLE}$ is not active (high) the next cycle can either be T1 for the next bus cycle, or Ti, in case the Swordfish has no bus cycles to perform. For read bus cycles, the Swordfish samples the data at the end of T2. For cacheable data read bus cycles, the Swordfish also samples the CIIN input at the end of T2.

The Data Bus is Tri-Stated during read bus cycles and idle T-states following a read cycle. For write bus cycles, valid data is driven on the Data Bus during T2 and on the following idle states. The $\overline{DRD}$ and DSEL signals are asserted by the Swordfish during T2 of the read bus cycles, DSEL indicates which memory bank is selected. During T2 of write bus cycles, the Swordfish asserts (low) $\overline{DWR0}$ if write to memory bank 0 or $\overline{DWR1}$ if write to memory bank 1. For cacheable data read bus cycles, the Swordfish also samples the CIIN input at the end of T2.

7.5.3.2.3 Pipelined Bus With Interleaved Memory Disabled

The pipelined bus timing (no interleaved memory support) for basic read and write bus cycles with no wait states are shown on Figure 7-18. The Swordfish can perform pipelined bus cycles when the PIPEN SWORDFISH ARCHITECTURE SPECIFICATION          Rev. 2.0, February 1990 input is asserted high. The PIPEN input is sampled by the Swordfish at the end of T1. When the PIPEN input is permanently high, the Swordfish uses pipelined bus cycles whenever possible.

For both read and write bus cycles, the Swordfish asserts ADS0 and ADS1 during the first half of T1, indicating the beginning of the bus cycle. During T1 the Swordfish drives the address bus, as well as control signals for ST0-ST3, $\overline{BE0\text{-}BE7}$, $\overline{DDIN}$, $\overline{PAGE}$, and U/$\overline{S}$. For cacheable data read cycles, the Swordfish also drives $\overline{CASEC}$.

At the end of T2 the Swordfish checks if $\overline{RDY}$ is asserted (low) and $\overline{WAIT}$ is not asserted (low). If these conditions are true, the current bus cycle is completed. Unlike the sequential bus, the pipelined bus allows different T-states of concurrently executing bus cycles to overlap. In Figure 7-18, for instance, T2 of one cycle (A1) overlaps with T1 of next cycle (A2). The $\overline{IDLE}$ input has no effect on pipelined cycles.

The Data Bus is Tri-Stated during T2 of read bus cycles and idle T-states following a read cycle. For write bus cycles, valid data is driven on the Data Bus during T2 and on the following idle states. The Swordfish does not start a write bus cycle before all previous read bus cycles are completed. This is done in order to avoid contention on the Data Bus. The $\overline{DRD}$ signal is asserted by the Swordfish during T2 of the read bus cycles. For write bus cycles, the Swordfish asserts $\overline{DWR0}$ and $\overline{DWR1}$ during T2 until the end of T2. For cacheable data read bus cycles, the Swordfish also samples the CIIN input at the end of T2.

7.5.3.2.4 Pipelined Bus With Interleaved Memory Enabled

The pipelined bus timing (interleaved memory support enabled) for basic read and write bus cycles with no wait states are shown on Figure 7-19. When pipelined bus is enabled (interleaved memory support enabled), the Swordfish asserts ADS0 to indicate the beginning of a bus cycle accessing memory bank 0, and ADS1 to indicate the beginning of a bus cycle accessing memory bank 1. For both read and write bus cycles, the Swordfish asserts ADS0 or ADS1 during the first half of T1. During T1 the Swordfish drives the Address bus, as well as control signals for ST0-ST3, $\overline{BE0\text{-}BE7}$, $\overline{DDIN}$, $\overline{PAGE}$, and U/$\overline{S}$. For cacheable read cycles, the Swordfish also drives $\overline{CASEC}$.

At the end of T2 the Swordfish checks if $\overline{RDY}$ is asserted (low) and $\overline{WAIT}$ is not asserted (low). If these conditions are true, the current bus cycle is completed. Unlike the sequential bus, the pipelined bus allows different T-states of concurrently executing bus cycles to overlap. In Figure 7-19, for instance, T2 of one cycle (A1) overlaps with T1 of next cycle (A2). The $\overline{IDLE}$ input has no effect on pipelined cycles.

The Data Bus is Tri-Stated during T2 of read bus cycles and idle T-states following a read cycle. For write bus cycles, valid data is driven on the Data Bus during T2 and on the following idle states. The Swordfish does not start a write bus cycle before all previous read bus cycles are completed. This is done in order to avoid contention on the Data Bus. The $\overline{DRD}$ and $\overline{DSEL}$ signals are asserted by the Swordfish during T2 of the read bus cycles, $\overline{DSEL}$ indicates which memory bank is selected. During T2 of write bus cycles, the Swordfish asserts $\overline{DWR0}$ if write to memory bank 0 or $\overline{DWR1}$ if write to memory bank 1. For cacheable read bus cycles, the Swordfish also samples the CIIN input at the end of T2.

7.5.3.3 Bus Cycle Extension

The basic read and write bus cycles described above can be extended to support longer access times by adding T2w wait states. Two of the Swordfish inputs can be used to extend the bus cycles: $\overline{WAIT}$ and $\overline{RDY}$. $\overline{WAIT}$ can be used to extend the bus cycle by a single CLK cycle, while $\overline{RDY}$ can be used to extend the bus cycle as long as is needed. The $\overline{WAIT}$ input is sampled by the Swordfish at the end of the T2 state. The Swordfish also samples $\overline{RDY}$ at the end of T2 and at the end of each T2w state (if any). If SWORDFISH ARCHITECTURE SPECIFICATION        Rev. 2.0, February 1990 either WAIT is asserted (high), or $\overline{RDY}$ is not asserted (high), then the bus cycle is extended by adding one T2w wait state. The $\overline{RDY}$ input is sampled at the end of each T2w wait state, and if it is not asserted (high), the bus cycle is extended by a T2w for another clock. Figure 7-20 shows the extension of read and write bus cycles for a sequential bus. Figure 7-21 shows the extension of read and write bus cycles for a pipelined bus with no interleaved memory support.

7.5.3.4 Interlocked Bus Cycles

The Swordfish supports indivisible read-modify-write operations by asserting $\overline{ILO}$ during consecutive read and write bus cycles (see Figure 7-22). The interlocked bus cycles are always sequential bus cycles (even if pipeline bus is enabled). They are preceded and followed by two idle T-states. The $\overline{ILO}$ signal is asserted (low) from the idle T-state preceding the read cycle until the second idle T-state following the end of the write bus cycle (including any retry for the write bus cycle). No other bus cycles can occur between the read and write bus cycles, but idle T-states can occur.

Interlocked bus cycles are important for shared-memory multiprocessor systems. The Swordfish uses an interlocked bus cycle for data references while executing the MBITI instructions, during which a single byte in memory is read and written.

7.5.3.5 Access Sequences for Variable Bus Widths

The Swordfish bus is tuned to operate with memory and peripheral devices matching the Swordfish's default bus width (64-bit or 32-bit, as configured during Reset). The Swordfish supports also lower bus widths of 8 bits 16 bits and 32 bits, at reduced efficiency. The Swordfish determines the bus width in effect for a bus cycle by using the values of BW0 and BW1 input signals that are sampled during the last T2 or T2w state (the Swordfish ignores the BW0 and BW1 input signals that are sampled before the last T2 or T2w state). The values of the BW0 and BW1 signals must not vary for locations within an aligned 16-byte block. When the sampled bus width differs from the default bus width, the bus remains idle for two CLK cycles before the next bus cycle is initiated. If pipelined bus is enabled (see Figure 7-23), a new bus cycle may be issued before the BW0 and BW1 inputs signal a different bus width. This new bus cycle is canceled by the Swordfish and retried after completing the access with the lower bus width. In the event that the canceled bus cycle addresses a peripheral device, the system must apply special handling to ensure that the bus cycle can be correctly initiated again. Refer to "Peripheral Bus Cycles" in Section 7.5.3.7 for more information.

Internally, the Swordfish uses a 64-bit memory data path. Accesses of data operands that cross quad-word boundaries are decomposed into two accesses. Operands cross quad-word boundaries if one of the following is true:

- The operand is a word or double-word that crosses an aligned double-word boundary.
- The operand is a quad-word that crosses an aligned quad-word boundary.

For detailed information on Swordfish for accesses using the Default and Non-Default bus widths see "Bus Access Sequences" in Appendix D.

7.5.3.5.1 Instruction Fetch

The Swordfish accesses memory for both sequential and non-sequential instruction fetches, which are externally distinguished by different bus status codes. For 64-bit default bus width, the Swordfish asserts (low) the $\overline{BE0}$-$\overline{BE7}$ signals for both non-sequential and sequential instruction fetches. For 32-bit bus SWORDFISH ARCHITECTURE SPECIFICATION          Rev. 2.0, February 1990 width, the Swordfish asserts $\overline{BE0}$-$\overline{BE3}$ leaving $\overline{BE4}$-$\overline{BE7}$ high for both non-sequential and sequential instruction fetches.

For non-sequential instruction fetches the address bus presents the exact byte address of the first instruction in the sequence to be executed. For 64-bit default bus width, the Swordfish reads the aligned quad-word specified by ignoring the 3 least-significant address bits. For 32-bit default bus width, the Swordfish reads the aligned double-word specified by ignoring the 2 least-significant address bits. If the non-sequential fetch is to an even double-word address and the default bus width is 32 bits, then the Swordfish also reads the double-word at the next consecutive (odd) aligned address, using the status for non-sequential fetch.

For sequential instruction fetches, the address bus presents the address of the next aligned instruction quad-word, or the exact byte address of the next sequential instruction. The Swordfish exhibits this behavior due to the unique structure of its decoded instruction cache. Instruction entries in the cache may reside on any double-word boundary. In case an instruction is missing from the cache during sequential execution, a fetch access is generated to the external bus with the exact byte address of the missing sequential instruction. For more information on the instruction cache refer to "Instruction Cache" in Section 6.2. For a 64-bit default bus, the Swordfish reads the entire quad-word into its internal instruction buffer. If the default bus width is 32 bits and the address is quad-word aligned, the Swordfish reads the next aligned quad-word in the continuing instruction sequence by performing two bus cycles: the first bus cycle presents the even double-word address on the address bus, and the second bus cycle presents the next odd double-word address on the address bus. The Swordfish reads the two double-words to form an aligned quad-word, which is loaded into the internal instruction buffer. If the default bus width is 32 bits and the address is not quad-word aligned, the handling is identical to that described above for non-sequential instruction fetches.

7.5.3.5.2 Data Read

The Swordfish distinguishes between cacheable and non-cacheable data read accesses. Data read accesses are cacheable except when the on-chip data cache has been internally inhibited. The data cache is internally inhibited in the following ways:

1. The CFG.DC bit is 0
2. Both entries of the accessed cache set are locked
3. The access is an interlocked data read performed during MBITI instruction
4. The access is either Interrupt-Acknowledge or an End-of-Interrupt bus cycle.
5. The access is to one of the registers of the On-Chip DMA, ICU, Debug Counter or Timer
6. The access that initiated the bus cycle was LOADNI, LOADNi, or LOADNUi The data cache is externally inhibited when the CIIN input signal is asserted (high) during the last T-state (T2 or T2w) of a bus cycle (the Swordfish ignores the CIIN values sampled before the last T2 or T2w state).

The Swordfish starts a data read access by placing the exact address of the operand on the address bus. The $\overline{BE0}$-$\overline{BE7}$ signals are asserted (low) to select only the bytes required by the instruction being executed. During cacheable accesses, the Swordfish always reads all the bytes on the bus, regardless of whether or not they are needed to execute the instruction, and stores them in the data cache. The external memory must place the data on the bus regardless of the state of the $\overline{BE0}$-$\overline{BE7}$ signals.

If the data cache is either internally or externally inhibited during the access, the Swordfish ignores the bytes not selected by the $\overline{BE0}$-$\overline{BE7}$ signals.

64-Bit Default Bus Width

The entire quad-word present on the bus is read by the Swordfish. If the access is cacheable, the Swordfish uses the selected bytes to execute the instruction and places the entire quad-word into the data cache. If the access is not-cacheable, the Swordfish ignores the bytes not selected by the $\overline{BE0}$-$\overline{BE7}$ signals.

32-Bit Default Bus Width

The double-word on the less significant half of the data bus is read by the Swordfish. If the access is cacheable, the Swordfish uses the selected bytes indicated by the $\overline{BE0}$-$\overline{BE3}$ signals to execute the instruction and places the entire double-word into the data cache. If the access is not-cacheable, the Swordfish ignores the bytes not selected by the $\overline{BE0}$-$\overline{BE3}$ signals. The $\overline{BE4}$-$\overline{BE7}$ signals remain high when 32 bit default bus is selected.

If the data read is for an aligned quad-word, the Swordfish reads the entire quad-word by performing 2 bus cycles. The first cycle presents the even double-word address on the address bus, and the second bus cycle presents the next odd double-word address on the address bus. The Swordfish reads the 2 double-words to form an aligned quad-word which is used to execute the instruction. If the access is cacheable, the entire quad-word is placed in the data cache. If the access is not cacheable, the quad-word is not placed into the data cache.

7.5.3.5.3 Data Write

In a write access the Swordfish outputs the operand address and asserts only the byte enable lines needed to select the specific bytes to be written. In addition, the Swordfish duplicates the data to be written on the appropriate bytes of the data bus in order to handle 8 bit, 16 bit, and 32 bit buses (32-bit duplication needed only for 64-bit default bus).

7.5.3.6 Bus Retry

The system can assert (low) the $\overline{BRT}$ to force the Swordfish to repeat the bus cycle. During each T2 of a memory bus cycle, the Swordfish samples the $\overline{BRT}$ input. If the bus cycle is extended because the WAIT input is asserted (high) or the $\overline{RDY}$ input is not asserted (high), then the Swordfish uses the value of $\overline{BRT}$ sampled during the last T2w wait state.

When the Swordfish detects that $\overline{BRT}$ is asserted (low) at the end of a bus cycle, it cancels this bus cycle. Then, after a delay of one CLK cycle, it initiates the bus cycle again (see Figure 7-24). The Swordfish can relinquish the bus before repeating the canceled bus cycle. The Swordfish waits for $\overline{BRT}$ to become high before repeating the bus cycle or relinquishing the bus in response to $\overline{HOLD}$. If $\overline{BRT}$ is low one or more cycles after the canceled bus cycle is finished, ($\overline{RDY}$ asserted and WAIT not asserted), the Swordfish asserts the Extended Bus Retry Acknowledge signal ($\overline{XBRTA}$), and places A0 - A31, D0 through D63, CASEC, DSEL, $\overline{BE0}$-$\overline{BE7}$, $\overline{DDIN}$, $\overline{DRD}$, $\overline{DWR0}$, $\overline{DWR1}$, PAGE, U/S, and $\overline{T2}$ in Tri-State. Note that if both $\overline{IDLE}$ and $\overline{BRT}$ are asserted (low), the Swordfish Tri-States the above signals only if $\overline{BRT}$ remains asserted continuously until $\overline{IDLE}$ is deasserted (high).

If pipelined bus is enabled (see Figure 7-25), a new bus cycle may be issued before the $\overline{BRT}$ input signals a canceled bus cycle. This new bus cycle is canceled by the Swordfish and will be executed after the retried bus cycle. In the event that the canceled bus cycle addresses a peripheral device, the system must apply special handling to ensure that the bus cycle can be correctly initiated again. Refer to SWORDFISH ARCHITECTURE SPECIFICATION          Rev. 2.0, February 1990

"Peripheral Bus Cycles" in Section 7.5.3.7 for more information.

7.5.3.7 Peripheral Bus Cycles

The Swordfish reads from and writes to peripheral devices using the same bus cycles as those used for memory references. As explained in "Memory-Mapped I/O" in Section 5.3.2.1, certain peripheral devices exhibit side effects when their ports are read or written. As explained in the previous sections, the Swordfish can initiate a bus cycle that is subsequently aborted if one of several conditions is detected on a previous cycle:

1. The bus width differs from the default
2. The system asserts $\overline{BRT}$ in response to a bus cycle In any of the above cases, the aborted bus cycle is initiated again.

In order to prevent incorrect side-effects in a peripheral device, it is necessary to delay any access to the device until it can be determined that the bus cycle will not be aborted. In the event that the peripheral device is located in the region of memory dedicated for memory-mapped I/O (addresses between FF000000 (hex) and FFFFFFFF (hex), inclusive) then the Swordfish automatically delays any access to the device until all previous bus cycles have completed successfully. In the event that the peripheral device is located outside the dedicated region of memory, it is necessary for external hardware to inhibit any access to the device until all previous bus cycles have completed successfully. Access to the peripheral device must be inhibited until T2 of the previous cycle has completed without retry, or non-default bus width.

7.5.3.8 Support for Slow Devices

The system designer can add bus idle states after each sequential bus reference so the hold time and the cycle time requirements of slow peripherals can be met easily. These idle states are added as long as the $\overline{IDLE}$ signal is active and the bus access is sequential.

The Swordfish samples the $\overline{IDLE}$ pin at the last T2 of a sequential bus transaction. When not asserted (high), the Swordfish finishes the transaction. When asserted (low), the Swordfish adds idle states after the transaction as long as the $\overline{IDLE}$ input is asserted (low). When in idle state the $\overline{IDLE}$ input is not asserted (high) the Swordfish may start a new transaction on the next bus cycle. On a bus cycle where PIPEN was sampled active on T1, $\overline{IDLE}$ has no effect on T2.

During the idle state the A0-31, $\overline{DDIN}$, $\overline{BE0\text{-}BE7}$, DSEL, CASEC and U/S, signals have the same value they had on the last T2 of the last transaction. If the last bus reference was a write, the value of D0-63 is also unchanged (Figure 7-26 and Figure 7-27).

In case of a sequential bus transaction where the access is decomposed to two or more accesses (bus width is less than the operands length or some non-aligned references), the Swordfish inserts idle cycles after each access according to the $\overline{IDLE}$ pin (Figure 7-28).

If the Swordfish samples both $\overline{HOLD}$ and $\overline{IDLE}$ active, $\overline{IDLE}$ has higher priority, the $\overline{HOLD}$ request is acknowledged after $\overline{IDLE}$ is sampled not active (high).

Idle states can be added at the end of both the read and the write accesses of an interlocked cycle. In the case that IDLE states are added after the write access, The $\overline{ILO}$ signal remains active (low) until $\overline{IDLE}$ is sampled high.

SWORDFISH ARCHITECTURE SPECIFICATION       Rev. 2.0, February 1990

If both IDLE and BRT are sampled active at the end of T2 of a non-pipelined access, The Swordfish adds idle states as long as IDLE is active and only then retry the access.

7.5.3.9 Support for Dynamic Ram

The access time in systems using Static-Column or Page-Mode Dynamic RAM devices can be shortened if the system knows that consecutive transactions are to the same DRAM page. The Swordfish uses the PAGE signal to inform the system that the current access is to the same page as the last latched address. The system uses the PLAT signal to indicate to the Swordfish whether to latch the current address for future comparisons. The size of the page is set using the CFG.PS field.

When PAGE is active (low) together with an ADS signal, it indicates that this address is to the same page as the last valid latched address, and if interleaving support is active, at least on one access to the same memory bank and page as the current access PLAT was sampled active (low). Addresses are latched when the system asserts (low) the PLAT signal on the last T2 of the transaction. Whenever a new address is latched one of the bank valid bits is set to indicate a valid address in the latch. The valid bit is reset whenever the Swordfish relinquish its bus (Hold, Extended-Retry, and Reset). The reason for invalidating the address is that another bus master may perform memory references to a different page from the one the last Swordfish transaction addressed. After clearing the valid bit the Swordfish does not assert PAGE signal unless a new address is latched using the PLAT signal (see Figure 7-8 below). The valid bit is not cleared on DMA cycles issued by the on-chip DMA controller, this way the PAGE mechanism tracks both Swordfish and DMA references.

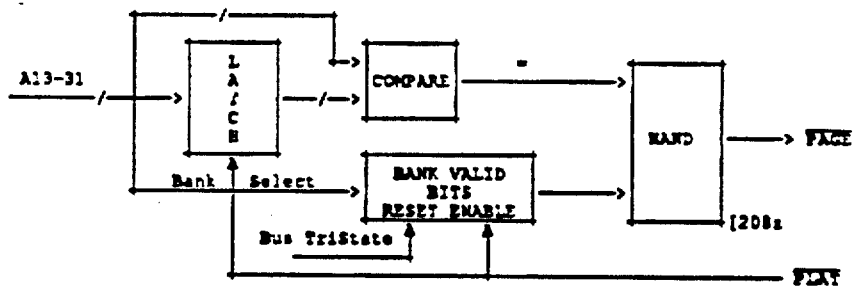

Figure 7-8. Support For Dynamic Ram Mechanism

Notes:

1. On references to non-default width bus, PAGE signal is re-evaluated for each the references to the remaining bytes, words or double-word.

2. The PAGE signal changes its value only at the beginning of T1, during idle states its value is unchanged.

7.5.3.10 On-chip DMA Bus Cycles

During on-chip DMA cycles, the Swordfish supports all of its Bus Control Inputs (i.e. BRT, IDLE, PLAT, RDY and WAIT) except for BW0, BW1, and PIPEN. All of the DMA transfers are in non-pipelined bus mode. The Swordfish asserts either DAK0 or DAK1 (low) to indicate that it performs a DMA bus cycle.

During the last T2 of a DMA data element transfer, the Swordfish samples the $\overline{EOT}$ input pin. $\overline{EOT}$ is ignored on the read access of a memory-to-memory transfer. DMA transfers are done assuming 32 bits wide bus. For the support of transactions on 64 bit busses, the Swordfish Tri-States the upper 32 bit of the data bus (D32-63) on memory-to-memory DMA cycles. A swap buffer can be used to transfer data between two 32 bit wide banks of the memory array. There is automatic cache invalidations mechanism for DMA transactions. The addresses of each DMA transaction is also sent to the Data Cache for Block Invalidation. DMA transfers to addresses between FF000000 (hex) and FFFFFFFF (hex), inclusive are not supported. DMA transfers referencing these addresses cause unpredictable results. See "Direct Memory Access Controller" in Section 9.3 for more information on DMA operation.

7.5.3.11 Accesses to the On-Chip Peripherals (Internal References)

Special bus cycles are performed during CPU accesses to the top of the address space. These cycles may be used by external logic to track Swordfish activities involving the on-chip I/O devices as well as to monitor interrupt acknowledges and internal status. These cycles are significantly different from normal bus cycles. The bus timing for Internal References are shown on Figure 7-51 and Figure 7-52.

For both read and write internal bus cycles the Swordfish asserts ADS0 and ADS1 during the first half of T1, indicating the beginning of the bus cycle. From the beginning of T1 until the completion of the bus cycle the Swordfish drives the address bus, as well as control signals for ST0-ST3, $\overline{BE0}$-$\overline{BE7}$, $\overline{DDIN}$, $\overline{PAGE}$, and U/$\overline{S}$. The Swordfish also asserts a special signal $\overline{IREF}$ to indicate that the current bus cycle is an internal one.

At the end of T1, the Swordfish performs three idle states. The data read or written to the internal registers is displayed on the data bus during the second and third idle states. The value of the $\overline{DDIN}$ signal asserted during T1 indicates whether the data displayed is of a read or a write access. Note that on Internal Accesses, $\overline{DRD}$, $\overline{T2}$, $\overline{DWR0}$ and $\overline{DWR1}$ are not asserted. The Swordfish ignores $\overline{RDY}$, $\overline{BRT}$ and WAIT inputs during Internal Accesses.

7.5.3.12 Interrupt Acknowledge Bus Cycles

The Swordfish generates two types of Interrupt Acknowledge bus cycles in response to Non-Maskable Interrupt requests and enabled Maskable Interrupt requests. The Swordfish also generates an End-of-Interrupt bus cycle while executing the EOI instruction. These bus cycles are always sequential bus cycles (even if pipelined bus is enabled). The Interrupt Acknowledge and End-of-Interrupt references always bypass the on-chip data cache. The timing for Maskable Interrupt Acknowledge and End-of-Interrupt bus cycles requests are the same as the internal bus cycles (See "Accesses to the On-Chip Peripherals" in Section 7.5.3.11); only the status differs from that in internal bus cycles that access the registers of the on-chip DMA, Timers or ICU. The timing for Non-Maskable Interrupt Acknowledge bus cycles requests are the same as the basic read cycles (See Figure 7-16); only the status differs from that in bus cycles that access memory. Refer to "Interrupts" in Section 5.4.2.1 for more information about how the Swordfish uses this kind of bus cycles.

7.6 BUS ACCESS CONTROL

The Swordfish has the capability of relinquishing its access to the bus upon request from a DMA device or another bus master. This capability is implemented with the $\overline{HOLD}$ and $\overline{HLDA}$ signals. Figure 7-29 shows the Swordfish response to $\overline{HOLD}$ for a sequential bus, while Figure 7-31 shows the same for a pipelined bus. By asserting (low) $\overline{HOLD}$, an external device requests access to the bus. On receipt (low)

SWORDFISH ARCHITECTURE SPECIFICATION        Rev. 2.0, February 1990 of $\overline{\text{HLDA}}$ from the Swordfish, the device may perform bus cycles, as the Swordfish at this point has placed A0-A31, D0-D63, CASEC, DSEL, $\overline{\text{BE0-BE7}}$, $\overline{\text{DDIN}}$, $\overline{\text{DRD}}$, $\overline{\text{DWR0}}$, $\overline{\text{DWR1}}$, $\overline{\text{PAGE}}$, U/$\overline{\text{S}}$, and $\overline{\text{T2}}$ in Tri-State. To return control of the bus to the Swordfish, the device drives $\overline{\text{HOLD}}$ high, and the Swordfish acknowledges return of the bus by driving $\overline{\text{HLDA}}$ high.

The Swordfish samples $\overline{\text{HOLD}}$ at the end of each CLK cycle. If $\overline{\text{HOLD}}$ is asserted (low) when the bus is idle between access sequences, then the bus is granted after 2 cycles. If the bus cycle has to be retried because the system asserts (low) the $\overline{\text{BRT}}$ input, the Swordfish asserts (low) $\overline{\text{HLDA}}$ and relinquishes the bus after the $\overline{\text{BRT}}$ input becomes high. The canceled bus cycle is retried after the $\overline{\text{HOLD}}$ input becomes high.

An access sequence can be composed of several bus cycles if the bus width is different from the default bus width. In response to $\overline{\text{HOLD}}$, the Swordfish asserts (low) $\overline{\text{HLDA}}$ and relinquishes the bus between bus cycles of the same access sequence. The Swordfish does not grant the bus between interlocked read and write bus cycles.

7.7 EXCEPTION REQUESTS

Several signals are used to request that the Swordfish recognizes an exception:

$\overline{\text{IR0-IR3}}$   Used to request a Vectored Interrupt
$\overline{\text{NMI}}$   Used to request a Non-Maskable Interrupt
$\overline{\text{RST}}$   Used to reset the Swordfish

7.7.1 Vectored Interrupts

The $\overline{\text{IR0-IR3}}$ signals are used to request a Vectored Interrupt. $\overline{\text{IR0-IR3}}$ can be asynchronous to the Swordfish's timing; the Swordfish internally synchronizes the request. Nevertheless, if $\overline{\text{IR0-IR3}}$ meet the required set-up and hold times listed in the "Swordfish Device Specification Book", then the Swordfish recognizes the request deterministically. The Swordfish samples the $\overline{\text{IR0-IR3}}$ inputs on every bus clock, beginning with the first clock after $\overline{\text{CBE}}$ is deactivated. The internal synchronization circuitry compares two consecutive samples of the $\overline{\text{IR0-IR3}}$. An interrupt request that is held constant for two consecutive samples is considered valid. The sampled value of $\overline{\text{IR0-IR3}}$ indicates a request for an interrupt at the encoded priority. When all of $\overline{\text{IR0-IR3}}$ are high, then no interrupt is requested. The Swordfish recognizes an interrupt request when the priority of the request exceeds the highest priority in-service interrupt, and maskable interrupts are enabled. Refer to "Maskable Interrupts" in Section 5.4.2.1.2 for more information. The priority of the interrupts is:

| $\overline{\text{IR0-IR3}}$ | Interrupt Level | Priority |
|---|---|---|
| LLLL | INT15 | Highest |
| LLLH | INT14 | |
| • | • | |
| • | • | |
| • | • | |
| HHHL | INT1 | Lowest |
| HHHH | No Interrupt | |

The four prioritized interrupt inputs can be used to implement 15-level ICU with an external encoder. Note that these inputs allow four distinct interrupts instead of an encoder.

SWORDFISH ARCHITECTURE SPECIFICATION          Rev. 2.0, February 1990

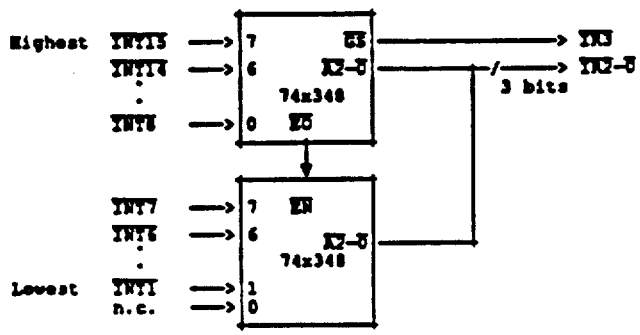

Figure 7-9. 15-level prioritized interrupts using two 74x348

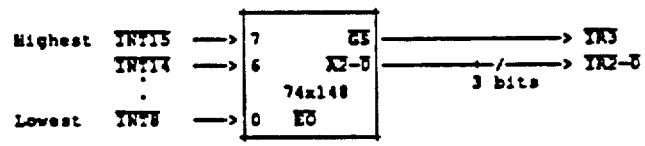

Figure 7-10. 8-level prioritized interrupts using one 74x148 or 74x348

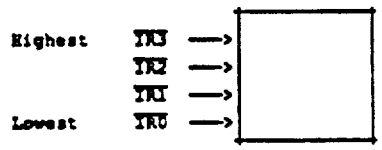

Figure 7-11. Four Non-Encoded Interrupt Lines

7.7.2 Non-Maskable Interrupt Requests

The $\overline{\text{NMI}}$ signal is edge-sensitive; a high-to-low transition on $\overline{\text{NMI}}$ requests a Non-Maskable Interrupt. $\overline{\text{NMI}}$ can be asynchronous to the Swordfish's timing; the Swordfish internally synchronizes the request. Nevertheless, if $\overline{\text{NMI}}$ meets the required setup and hold times listed in the "Swordfish Device Specification Book", then the Swordfish recognizes the request deterministically. The Swordfish samples the $\overline{\text{NMI}}$ line on every bus clock, beginning with the first clock after $\overline{\text{CBE}}$ becomes high.

SWORDFISH ARCHITECTURE SPECIFICATION          Rev. 2.0, February 1990

7.7.3 Reset Request

The RST signal is level sensitive; the Swordfish samples RST synchronously on the rising edge of CLK; a low level on RST forces the Swordfish into a Reset state and requests a Reset exception. In order to reset the Swordfish (inclusive the clock synchronization), RST must be held low for at least 500 uSec. At power-on RST must be held low for at least 500 usec after Vcc, CLK and FFRQ has stabilized. While in Reset state, the Swordfish Tri-States the A0-A31, D0-D63, CASEC, DSEL, SDIO, BE0-BE7, DDIN, DRD, DWR0, DWR1, PAGE, U/S, and T2 pins. The DCLK is held high during the reset sequence. DCLK starts to toggle at least two cycles before the rising edge of CBE. At the end of the Reset, all the bus control signals are in their inactive state. The state of all other output signals is unpredictable.

7.8 CACHE INVALIDATION REQUESTS

The contents of the on-chip instruction Cache and Data Cache can be invalidated by external requests from the system. It is possible to invalidate a single block of the data cache, the entire data cache or the entire instruction cache.

When the INVDC input is asserted (low) by the system, the input signal INVBLK indicates whether the invalidation applies to a single block (16 bytes) of the data cache or the entire data cache. The input signal INVIC requests invalidation of the entire instruction cache.

The system can request invalidation of the entire data cache or instruction cache at any time. Invalidation of an individual block in the data cache can only be requested while the Swordfish has relinquished the address bus in response to HOLD, or Extended Bus Retry (see Figure 7-25, Figure 7-29 and Figure 7-31). When invalidation of an individual block in the data cache is requested, the Swordfish reads the block's address from the address bus, and searches for the presence of the block in the on-chip data cache. If the block is found, then the block is invalidated. The Swordfish can respond to cache invalidation requests at a rate of one per CLK cycle. The INVIC, INVDC, and INVBLK signals are all sampled synchronously by the Swordfish on the rising edge of CLK.

During interlocked bus cycles, the Swordfish allows invalidation of individual blocks in the data cache by relinquishing the address bus in response to extended bus retry.

7.9 INTERNAL STATUS

The Swordfish provides information on the system interface concerning its internal activity. The U/S signal indicates the Address Space for a memory reference.

The PFSA signal is asserted (low) for a full Swordfish clock cycle (1/2 CLK cycle for system bus operating at half-frequency) when pipeline A of the Swordfish completes executing a new instruction. The PFSB signal is asserted (low) for a full Swordfish clock cycle when pipeline B of the Swordfish completes executing a new instruction.

The BP signal is asserted (low) along with PFSA or PFSB for one Swordfish clock cycle when the Swordfish detects an address-compare or PC-match condition while executing an instruction that is completed. BP is also asserted, but without PFSA or PFSB when the Swordfish detects an address-compare condition while processing an exception (see Figure 7-53 and Figure 7-54).

While processing a Trap, the Swordfish displays the vector value for the Trap by using an internal write access to address FFFFFC00 (hex) (see "Accesses to the On-Chip Peripherals" in Section 7.5.3.11 for details on Internal References). The vector value is displayed on the lower bits of the data bus. This

SWORDFISH ARCHITECTURE SPECIFICATION     Rev. 2.0, February 1990

Information can be used by external hardware to detect that a Trap has been recognized, or by ISE equipment to trace sequence of instruction execution. Note that this status is not displayed during a Vectored Interrupt and Non-Maskable Interrupt processing. Interrupts can be monitored using the Interrupt-Acknowledge bus cycles.

When the Swordfish executes an instruction that can alter its operating modes or the contents of the on-chip instruction cache or data cache, it displays both the opcode and the operand value by using one or two internal reference write cycles. This information can be used to monitor the contents of the on-chip instruction cache and data cache. The instructions for which such information is displayed are LPR (on CFG, FSR or PSR), CINV and RETX. First, The Swordfish performs an internal write access to address FFFFFC10 (hex) while displaying the opcode on bits 0 through 6 of the data bus and the destination register number, in case of an LPR instruction, on bits 7 through 11. Next, in case of a CINV instruction, the options field is displayed on the lower bits of the data bus while accessing address FFFFFC20 (hex). In case of an LPR instruction, the double-word operand value is displayed on the lower bits of the data bus while accessing address FFFFFC20 (hex). The following operand value is displayed:

1. New PSR value for LPR (on PSR)
2. New CFG value for LPR (on CFG)
3. New FSR value for LPR (on FSR)

7.10 TIMER INTERFACE

The Timer has 2 interface pins TA and TB. TB is an input pin, while TA is an I/O. The minimal pulse width on both inputs is 4 CLK cycles low time, and 4 CLK cycles high time. Upon reset TA is in input mode.

Note
When the TA pin is in input mode (Input Capture Mode and Idle), the user must apply a valid input to the pin (either a high or a low value). This can be done using a pull-up resistor.

7.11 TESTING FUNCTIONS

7.11.1 Chip Self-Test

The Swordfish is provided with a Built-In Self-Test (BIST) mechanism, allowing the Swordfish to test itself and report a pass/fail condition to the system. The self-test is executed immediately after the $\overline{RST}$ input becomes high. The $\overline{TST}$ input, sampled by the Swordfish on the last rising edge of CLK before $\overline{RST}$ is sampled high, allows the system designer to enable or disable the chip self-test. If $\overline{TST}$ is sampled low, the Swordfish executes the self-test and signals the pass or fail result on the $\overline{ERR}$ output. If the test fails, $\overline{ERR}$ is driven low, the status remains at 0011, and the Swordfish does not complete Reset. Otherwise, if the test passes, the Swordfish completes Reset and begins the Memory Test. The Swordfish signals the self-test execution by issuing the special status 0011 (bus idle because of self-test).

When the Swordfish passes the self test it performs the Memory Test as follows:

- Read a double-word from memory location 8 (8 hex), and compare it to 55555555 (hex).
- Read a double-word from memory location 12 (C hex), and compare it to AAAAAAAA (hex).
- If both compares succeed then pass the test, otherwise fail.
- In case the test fails the Swordfish sends status 0011, asserts $\overline{ERR}$ (low), and halts.

- In case the test passes the Swordfish begins executing the instruction at Address 0.

The BIST of the Swordfish is done in two parts. During the first part the Swordfish tests itself (internal test), and in the second part it tests the memory (memory test). $\overline{HOLD}$ requests are not acknowledged during the first part. If $\overline{HOLD}$ is requested before the read cycles of the memory test, it is acknowledged before those cycles take place. This allows external down-loading of code in a ROM-less system that needs the BIST (see Figure 7-43 The read cycles of the memory test are the same as any other read cycle (the status is 1010 - Data Transfer).

If $\overline{TST}$ is sampled high, the Swordfish services the Reset directly, without executing the self-test first. Duration of the self-test is less than 5,000,000 CLK cycles.

7.11.2 Bus Self-Test

The Swordfish output pads provide a feedback path (input buffer) allowing the output to be fed back into the Swordfish (see Figure 7-12). With few exceptions, the Swordfish's output buffers are controlled by the $\overline{SHDW}$ input. When $\overline{SHDW}$ is not asserted (high), the output buffer is enabled and the error logic continuously checks the correctness of the output. This circuit detects bus output problems (defect output buffer, stuck output) and signals them by asserting (low) the Swordfish's $\overline{ERR}$ output.

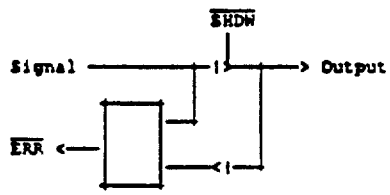

Figure 7-12. Bus Self-Test

7.12 SHADOW MODE

The Swordfish can operate in Shadow-mode for detecting faults in a "Master" Swordfish. The Master-Swordfish receives input signals from the target system and drives output signals. The Shadow-Swordfish receives input signals from the target system, but does not drive output signals to the target system. Instead, the Shadow-Swordfish compares its output signals with those of the Master-Swordfish on each clock. The shadow-Swordfish does not perform a comparison of its own signals with the master-Swordfish's signals in case the master's signals are tri-stated. If the Shadow-Swordfish detects a mismatch, it asserts (low) its $\overline{ERR}$ signal, and continues to assert (low) $\overline{ERR}$ until the Swordfish is reset. The Shadow-Swordfish and Master-Swordfish must have their clocks synchronized, as explained in "Clocking" in Section 7.2.

Master-mode is enabled when the ISE input is sampled low and the $\overline{SHDW}$ input is high. For correct Master-mode operation, ISE must be held low and $\overline{SHDW}$ must be held high continuously throughout Reset and thereafter. Shadow-mode is enabled when both ISE and $\overline{SHDW}$ inputs are low. For correct Shadow-mode operation, both ISE and $\overline{SHDW}$ must be held low continuously throughout Reset and thereafter.

SWORDFISH ARCHITECTURE SPECIFICATION        Rev. 2.0, February 1990

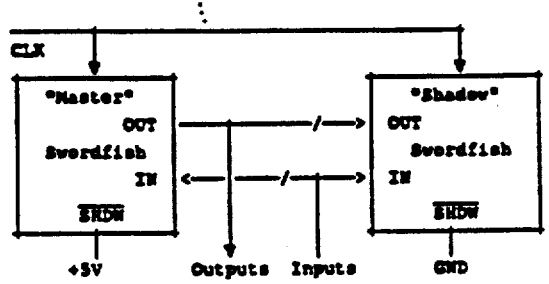

Figure 7-13. Shadow Mode

Note:
Signals that are synchronized internally by the Swordfish, must meet the setup and hold times listed in the "Swordfish Device Specification Book" for a proper Master-Shadow synchronization. The signals are: $\overline{IR0}$-$\overline{IR3}$, $\overline{NMI}$ $\overline{STALL}$, SCLK, TB, TA and $\overline{RST}$.

7.13 IN-SYSTEM EMULATION (ISE) MODE

The Swordfish provides a special mode of operation for ISE equipment to trace the sequence of instruction execution. ISE-mode is enabled when the ISE and the $\overline{SHDW}$ input signals are high. For correct ISE-mode operation, both ISE and and $\overline{SHDW}$ pins must be held high continuously throughout power-on Reset and thereafter.

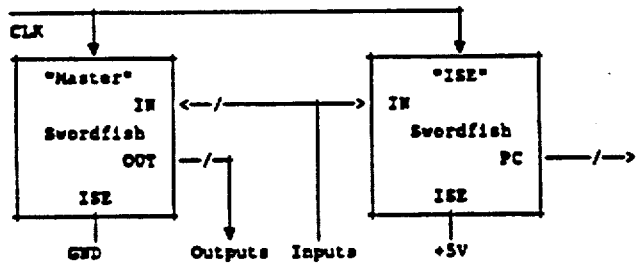

Figure 7-14. ISE Mode

While in the ISE mode the ISE-Swordfish drives 30 output signals to display the 30 most significant bits of the current instruction address (PC2-31) to the ISE equipment (see Figure ). The specific signals used for displaying the PC are summarized in the following table.

SWORDFISH ARCHITECTURE SPECIFICATION        Rev. 2.0, February 1990

| PC | Displayed on pin | PC | Displayed on pin | PC | Displayed on pin | PC | Displayed on pin |
|---|---|---|---|---|---|---|---|
| PC2 | A0 | PC10 | CASEC | PC18 | $\overline{BE5}$ | PC26 | $\overline{HLDA}$ |
| PC3 | A1 | PC11 | $\overline{DAK0}$ | PC19 | $\overline{BE6}$ | PC27 | $\overline{ILO}$ |
| PC4 | A2 | PC12 | $\overline{DAK1}$ | PC20 | $\overline{BE7}$ | PC28 | $\overline{ERR}$ |
| PC5 | A3 | PC13 | $\overline{BE0}$ | PC21 | $\overline{DDIN}$ | PC29 | $\overline{BP}$ |
| PC6 | ST0 | PC14 | $\overline{BE1}$ | PC22 | T2 | PC30 | $\overline{PFSA}$ |
| PC7 | ST1 | PC15 | $\overline{BE2}$ | PC23 | $\overline{DRD}$ | PC31 | $\overline{PFSB}$ |
| PC8 | ST2 | PC16 | $\overline{BE3}$ | PC24 | $\overline{DWR0}$ | | |
| PC9 | ST3 | PC17 | $\overline{BE4}$ | PC25 | $\overline{DWR1}$ | | |

TABLE 7-2. ISE-Swordfish PC display pins

Notes:

1. Address pins A0-3 are used as outputs for PC display in the ISE-Swordfish. These pins are not Tri-Stated during HOLD and Extended-Retry cycles and should not be driven by the system.
2. Signals that are synchronized internally by the Swordfish, must meet the setup and hold times listed in the "Swordfish Device Specification Book" for a proper ISE-Swordfish operation. The signals are: $\overline{IR0}$-$\overline{IR3}$, $\overline{NMI}$ $\overline{STALL}$, SCLK, TB, TA, and $\overline{RST}$.

7.14 SERIAL LINK

The Swordfish bus provides a serial interface that allows an ISE equipment to halt it and load or store internal Swordfish registers using a serial protocol. Figure 8-5 presents a possible configuration of the Swordfish and ISE interface.

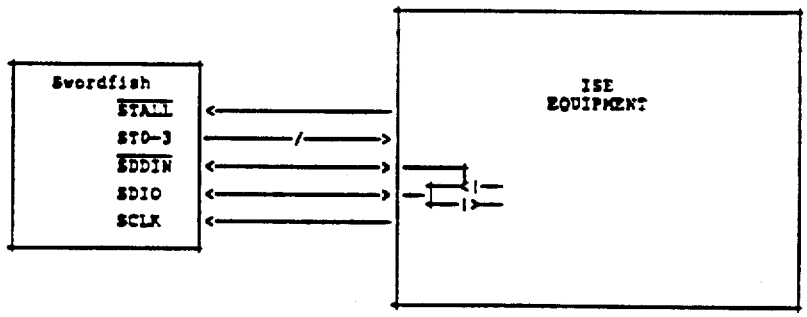

Figure 7-15. Serial link between Swordfish and the ISE equipment

When the $\overline{STALL}$ input signal is activated (by the ISE), the Swordfish completes executing the current instruction or processing the current exception. It then enters a special Freeze mode (in which the value of ST0-3 pins is 0010). The ISE should activate the $\overline{STALL}$ input at least until the Freeze mode is detected on the ST0-3 pins. Figure 7-44 shows a timing diagram for STALL activation.

During Freeze mode, the Swordfish displays the contents of the registers one bit at a time on the SDIO pin. While displaying the registers the $\overline{SDDIN}$ signal is not asserted (high). All the Swordfish and the on-chip peripheral registers are sent through the SDIO pin. The register order is as follows: PSR, R0, R1, R2, R3, R4, R5, R6, R7, R8, R9, R10, R11, R12, R13, R14, R15, R16, R17, R18, R19, R20, R21, R22,

SWORDFISH ARCHITECTURE SPECIFICATION  Rev. 2.0, February 1990

R23, R24, R25, R26, R27, R28, R29, R30, C0, SP, PC, CFG, INTBASE, reserved, DCR, reserved, CAR, AMR, BPC0, BPC1, FSR, FTRL, FTRH, F0, F1, F2, F3, F4, F5, F6, F7, F8, F9, F10, F11, F12, F13, F14, F15, F16, F17, F18, F19, F20, F21, F22, F23, F24, F25, F26, F27, F28, F29, F30, F31, T, TA, TB, TCNTL, STAT, IEREG, DSTAT, SAC0, SAR0, DAC0, DAR0, TCC0, TCR0, MODE0, CTL0, SAC1, SAR1, DAC1, DAR1, TCC1, TCR1, MODE1, CTL1, VECT, ISR, DESR, DDR. If the CFG.F bit is low, the value of registers F0 through F31 and FSR are reserved. While displaying reserved registers, the 32 data bits associated with the register have unpredictable value.

Several cycles after the display of registers through the SDIO is completed, the $\overline{SDDIN}$ signal is asserted (low) to indicate the ISE that the Swordfish is in input mode. The ISE is allowed to drive the SDIO pin only when STALL status (0010) is displayed on the ST0-3 and the $\overline{SDDIN}$ signal is active (low). In all other cases the Swordfish is driving the SDIO pin. While the Swordfish is not in STALL mode the SDIO pin is driven with a value of 0.

When the Swordfish is in serial link input mode, the ISE drives the SDIO pin with the new values of the registers 1 bit at a time. The order of modifying the registers is the same as for reading the registers. If the CFG.F bit is low, the value of registers F0 through F31 and FSR are reserved. Note that the contents of registers of the on-chip peripherals, and reserved registers can not be altered by the Serial Link (values that are sent through the SDIO pin on the time slots associated with those registers are ignored).

Upon completion of registers modifying, the Swordfish stops displaying the STALL status and begins to execute the instruction, whose address has been loaded into the PC.

The protocol for read and modify a register is the same; two leading 1 (start bits) are sent before the register's bits, then the 32 bits of the register (Most Significant Bit first), than at least one 0 (stop bits).

The ISE is provided with the SCLK pin in order to control the shifting in and out of the serial data. The SCLK input is sampled by the Swordfish on the rising edge of CLK while the Swordfish is in serial link mode. While in Freeze mode, a low to high transition detected on SCLK causes the Swordfish to shift in or out one bit. The maximal frequency on the SCLK input is CLK/40.

Figure 7-45 shows a timing diagram for a serial link output transaction. Figure 7-46 shows a timing diagram for a serial link input transaction. Figure 7-47 shows a timing diagram for transition from output to input. Figure 7-48 shows a timing diagram for the end of input. Refer to "ISE Features" in Section 8.2 for more information.

SWORDFISH ARCHITECTURE SPECIFICATION        Rev. 2.0, February 1990
7.15 TIMING DIAGRAMS
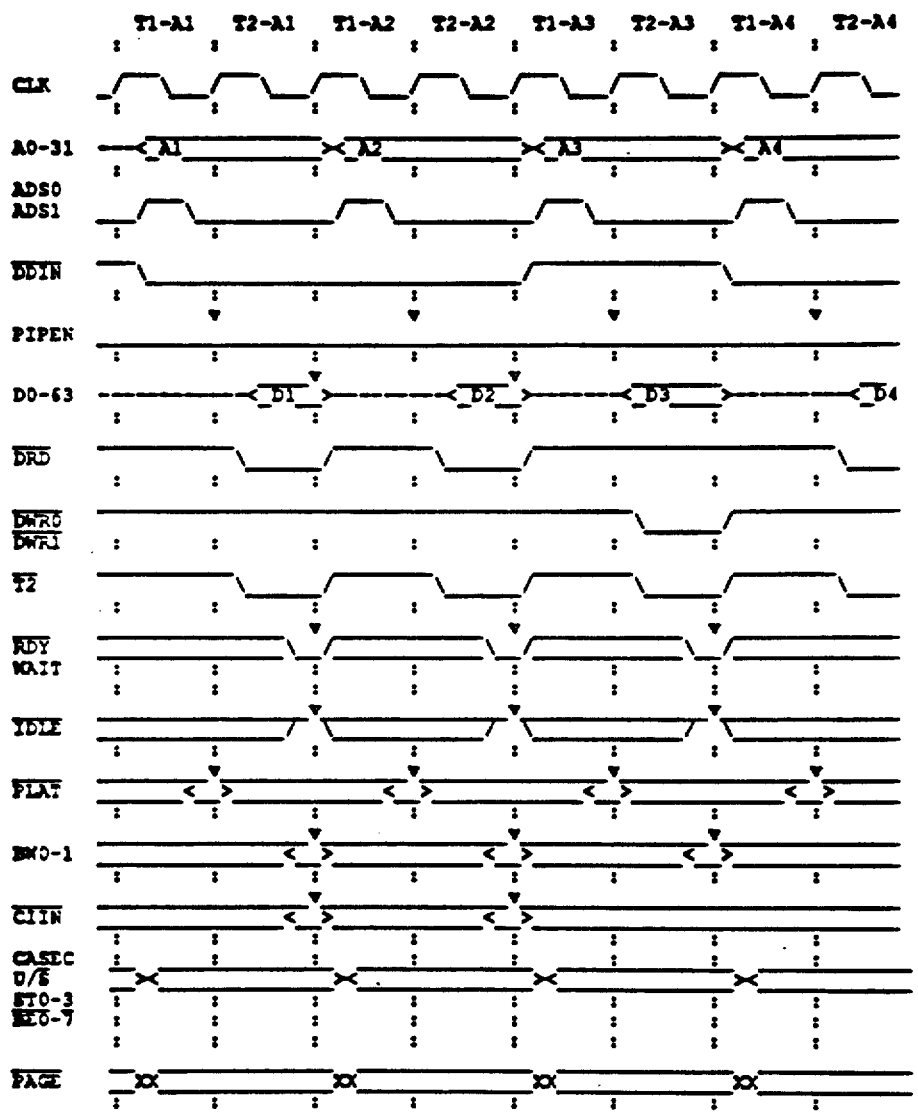
Figure 7-16. Basic Read and Write Cycles (Sequential Bus, Interleaving Support Disabled)

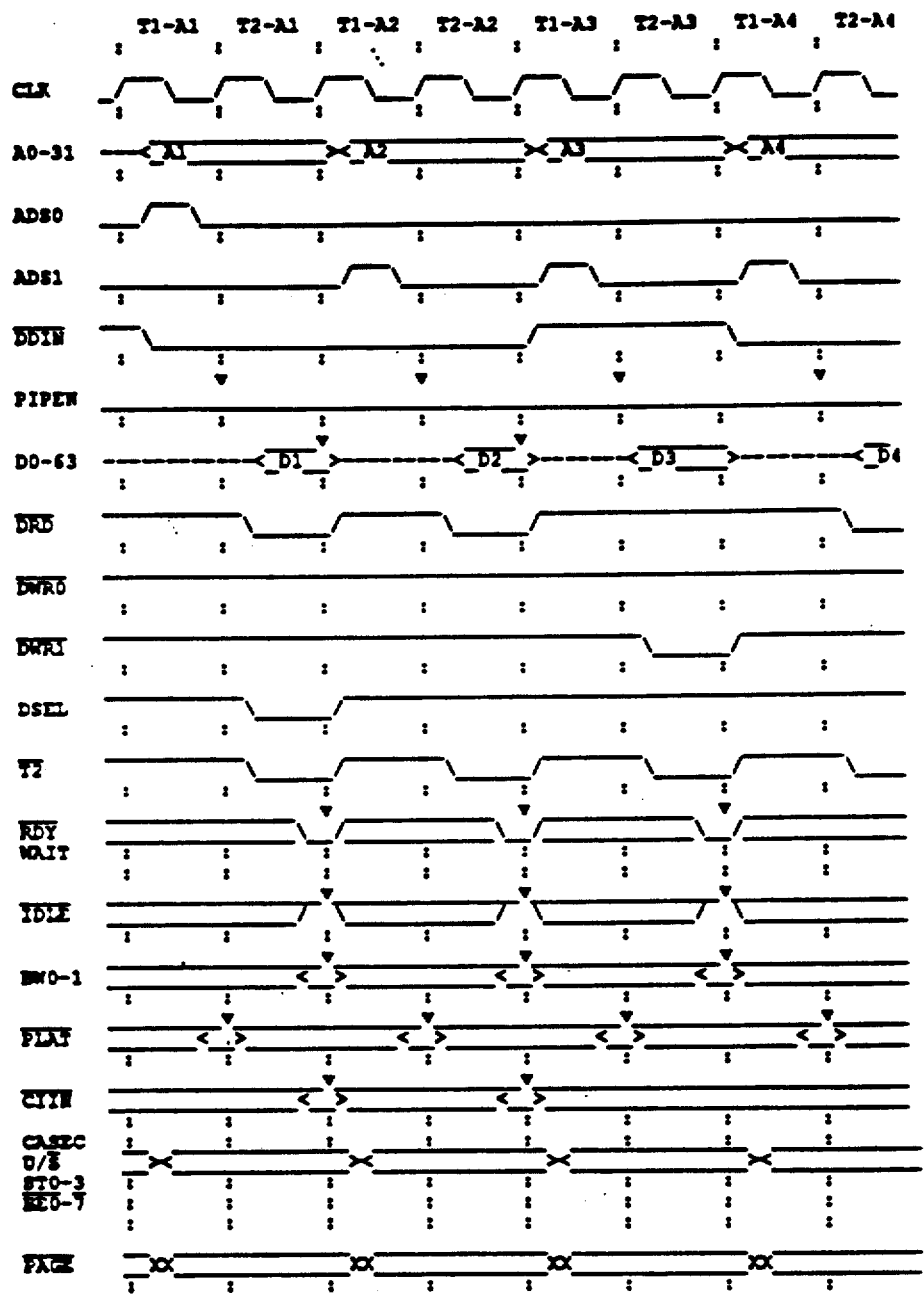
Figure 7-17. Basic Read and Write Cycles (Sequential Bus, Interleaving Support Enabled)

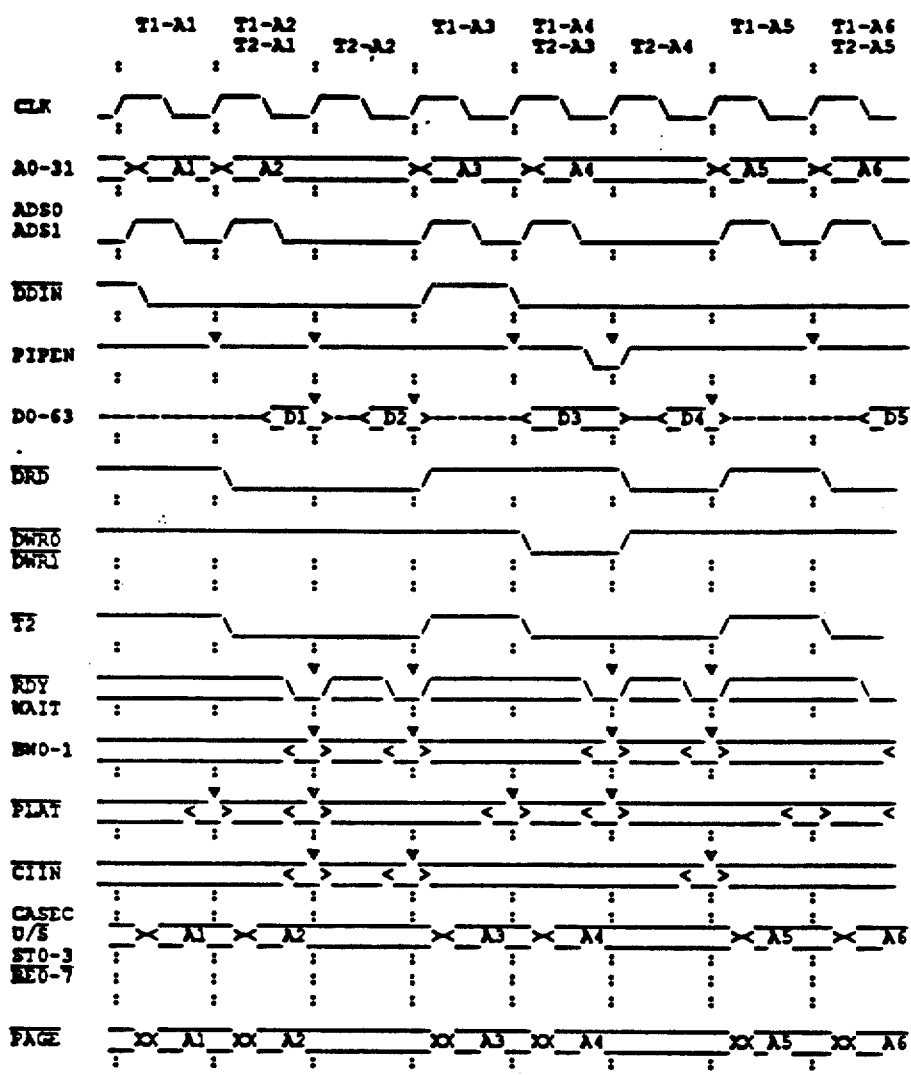
Figure 7-18. Basic Read and Write Cycles (Pipelined Bus, Interleaving Support Disabled)

SWORDFISH ARCHITECTURE SPECIFICATION	Rev. 2.0, February 1990
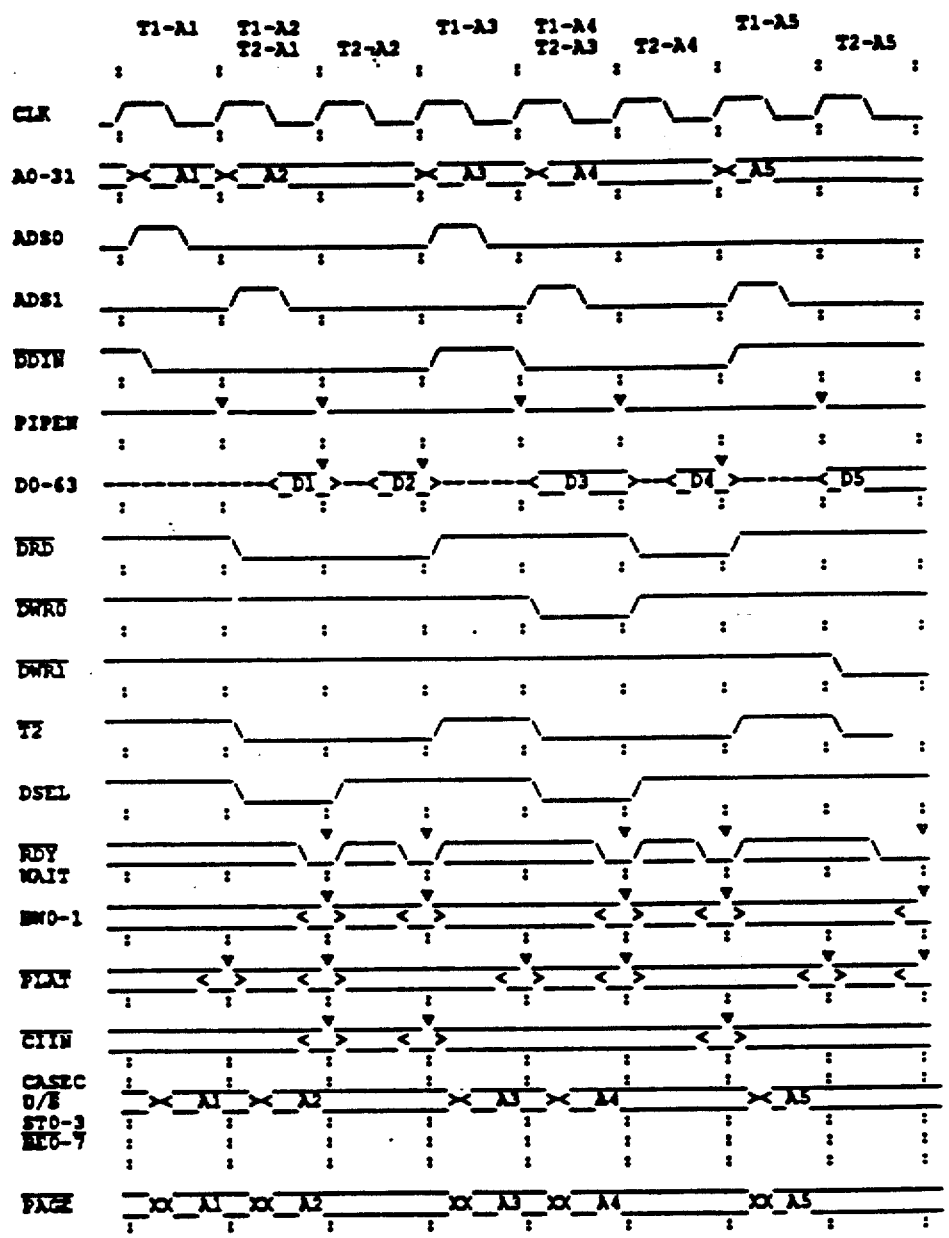
Figure 7-19. Basic Read and Write Cycles (Pipelined Bus, Interleaving Support Enabled)

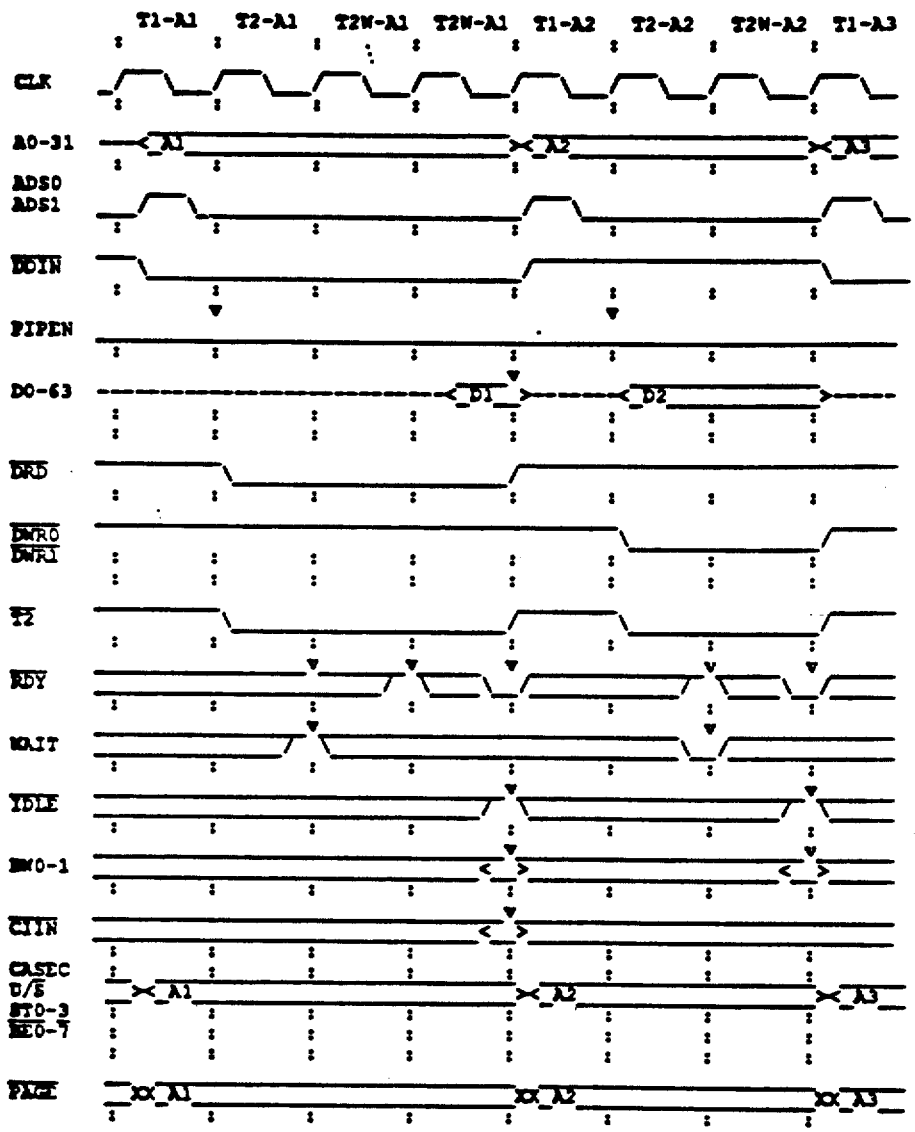
Figure 7-20. Extended Read and Write Cycles (Sequential Bus, Interleaving Support Disabled)

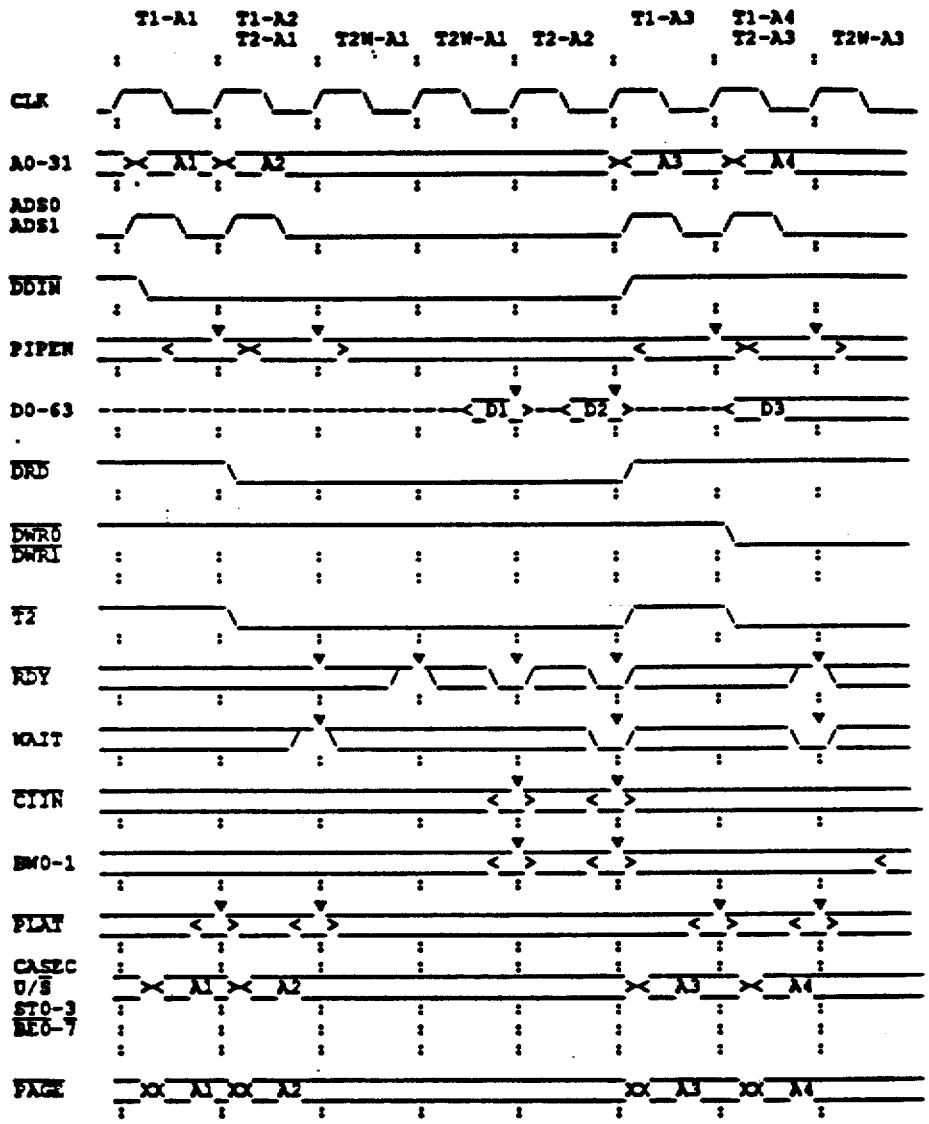
Figure 7-21. Extended Read and Write Cycles (Pipelined Bus, Interleaving Support Disabled)
The Swordfish waits for all pending reads (A1 and A2) to complete before starting a write cycle (A3).

SWORDFISH ARCHITECTURE SPECIFICATION          Rev. 2.0, February 1990
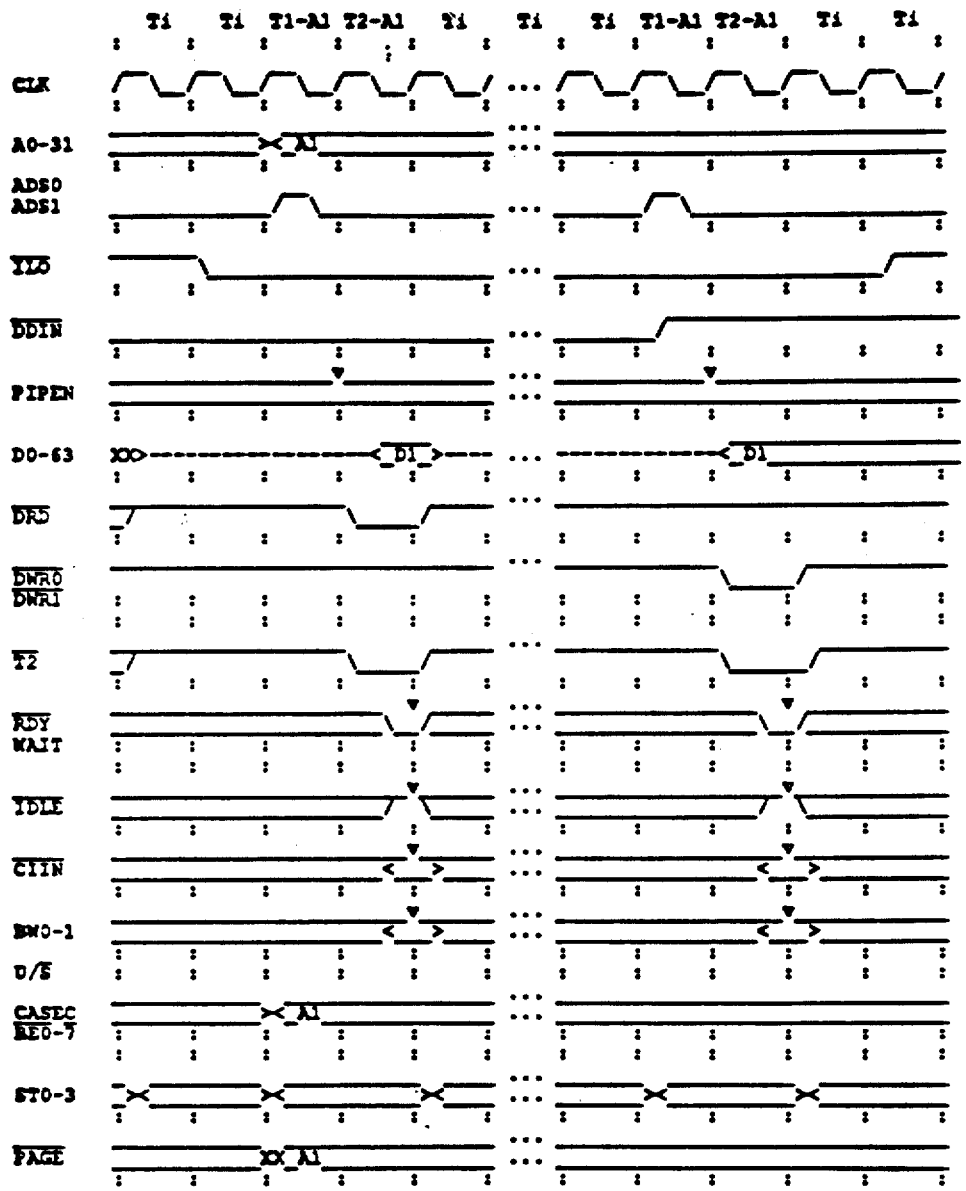
Figure 7-22. Interlocked Read and Write Cycles (Interleaving Support Disabled)
The data read by a read cycle that is interlocked is not cacheable.
There are at least two idle states between the read and the write cycles of the interlocked transaction.

SWORDFISH ARCHITECTURE SPECIFICATION          Rev. 2.0, February 1990
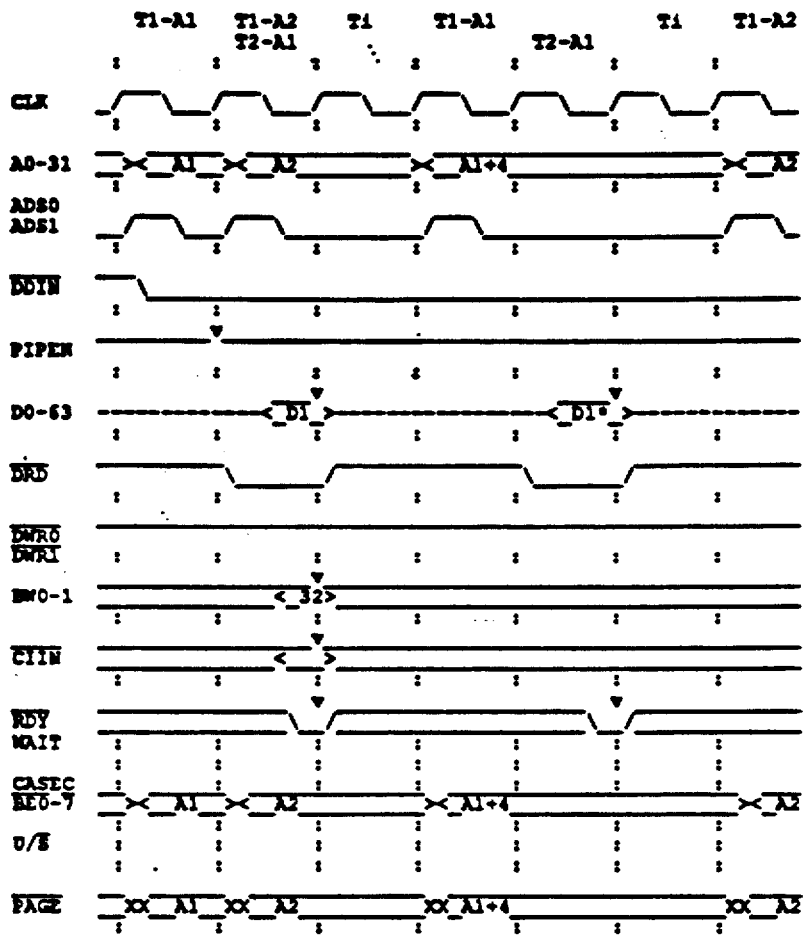
Figure 7-23. Dynamic Bus Width Change (Pipeline Bus, Interleaving Support Disabled).

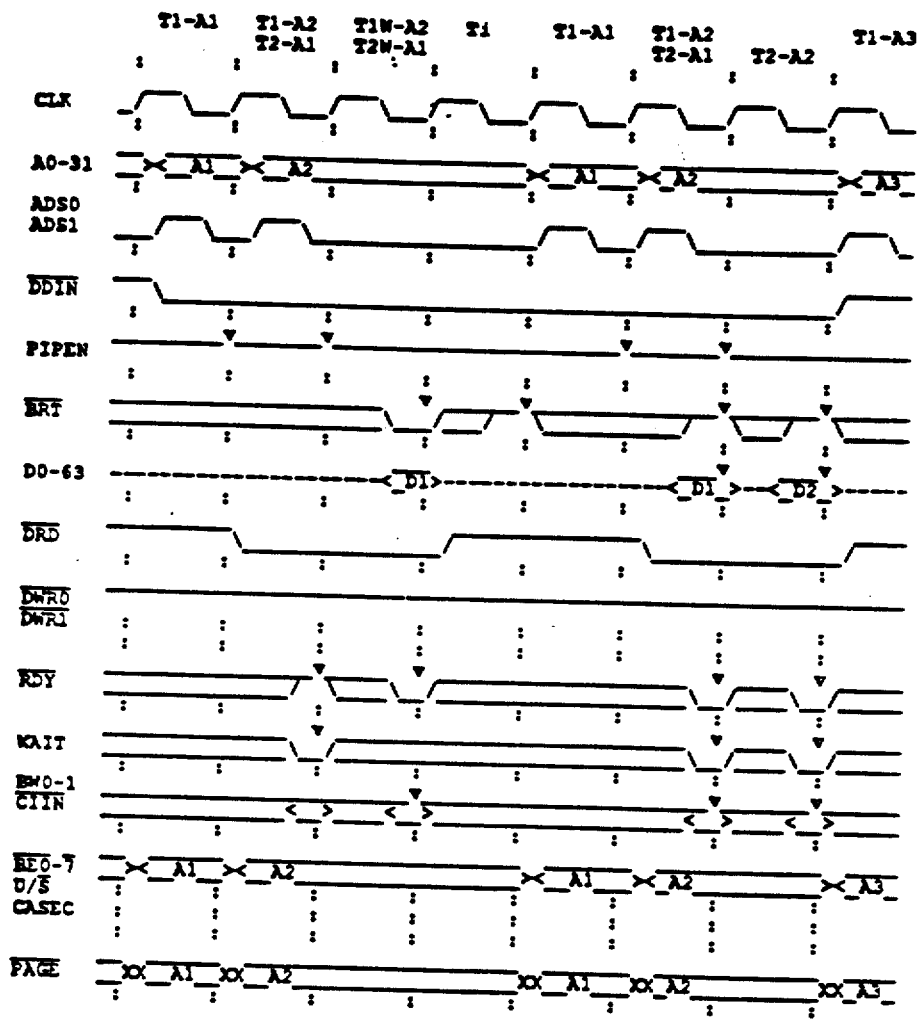
Figure 7-24. Bus Retry (Pipelined Bus, Interleaving Support Disabled)

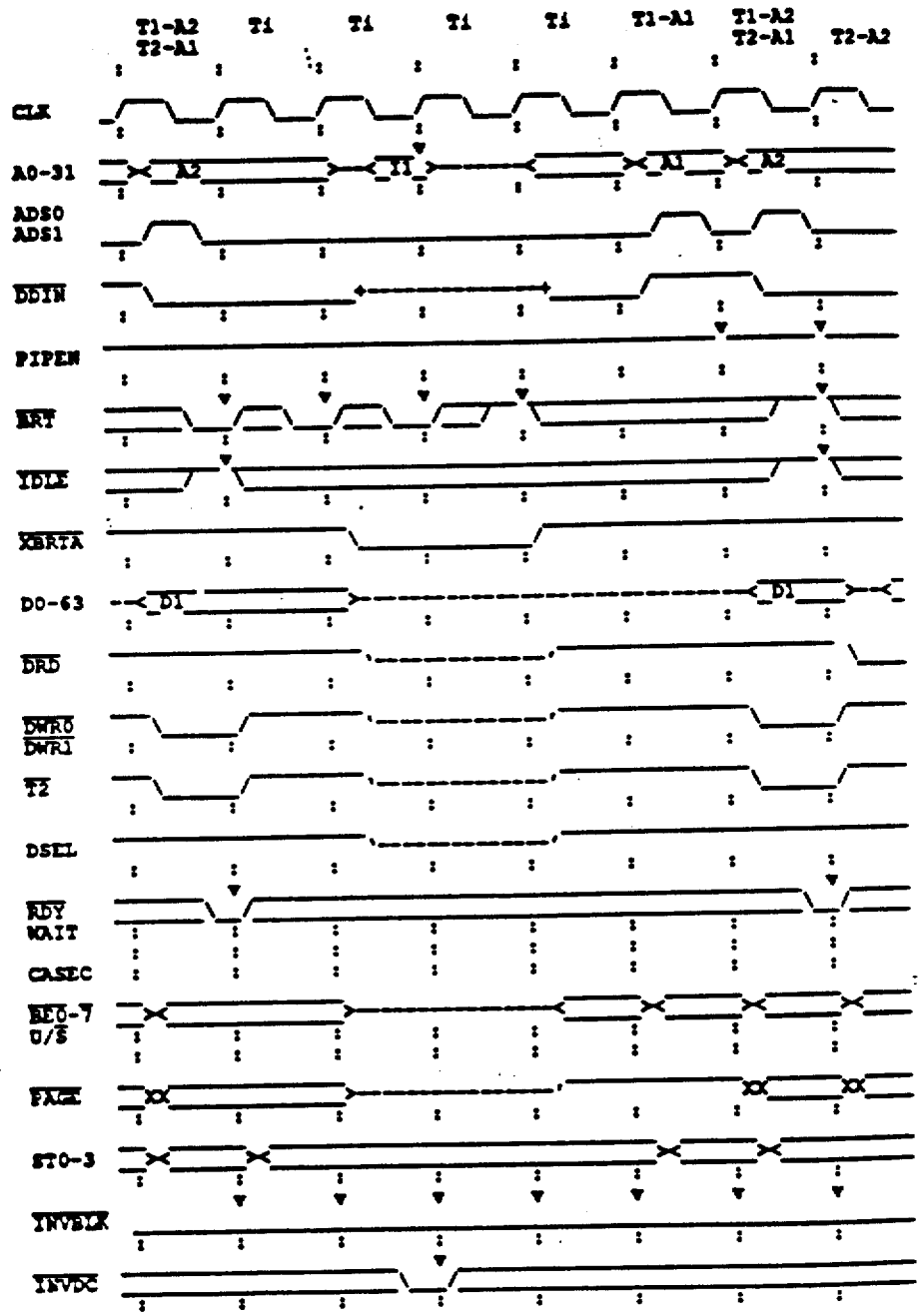
Figure 7-25. Extended Bus Retry (Pipelined Bus, Interleaving Support Disabled)
I1 is an invalidation request asserted by the system.

SWORDFISH ARCHITECTURE SPECIFICATION  Rev. 2.0, February 1990
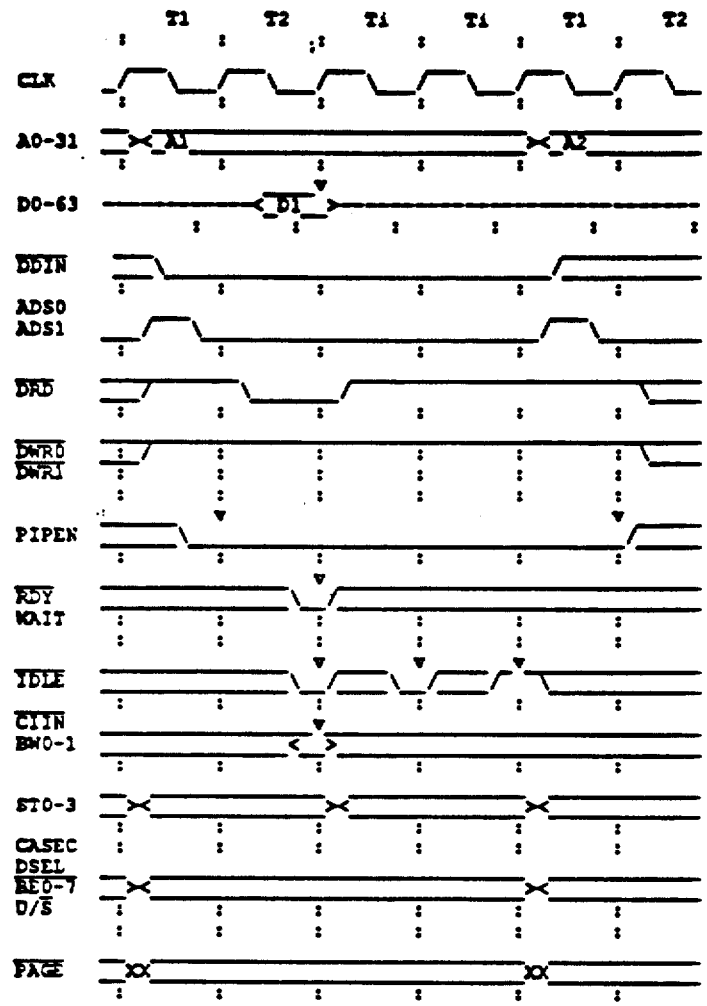
Figure 7-26. Read Cycles To Slow Device (Interleaving Support Disabled)

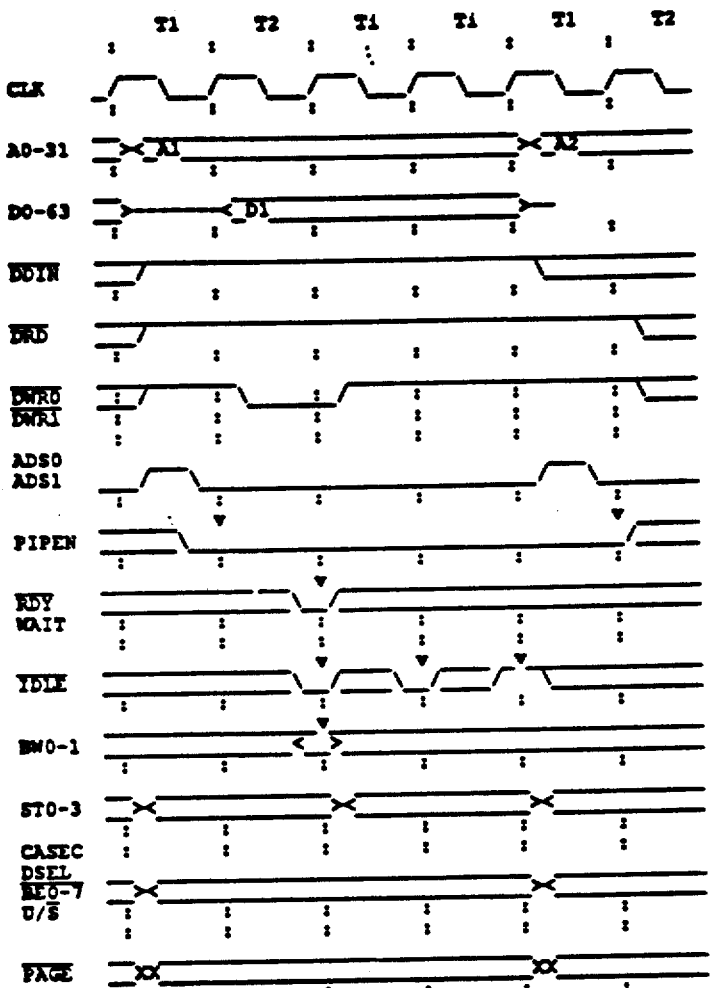
Figure 7-27. Write Cycles To Slow Device (Interleaving Support Disabled)

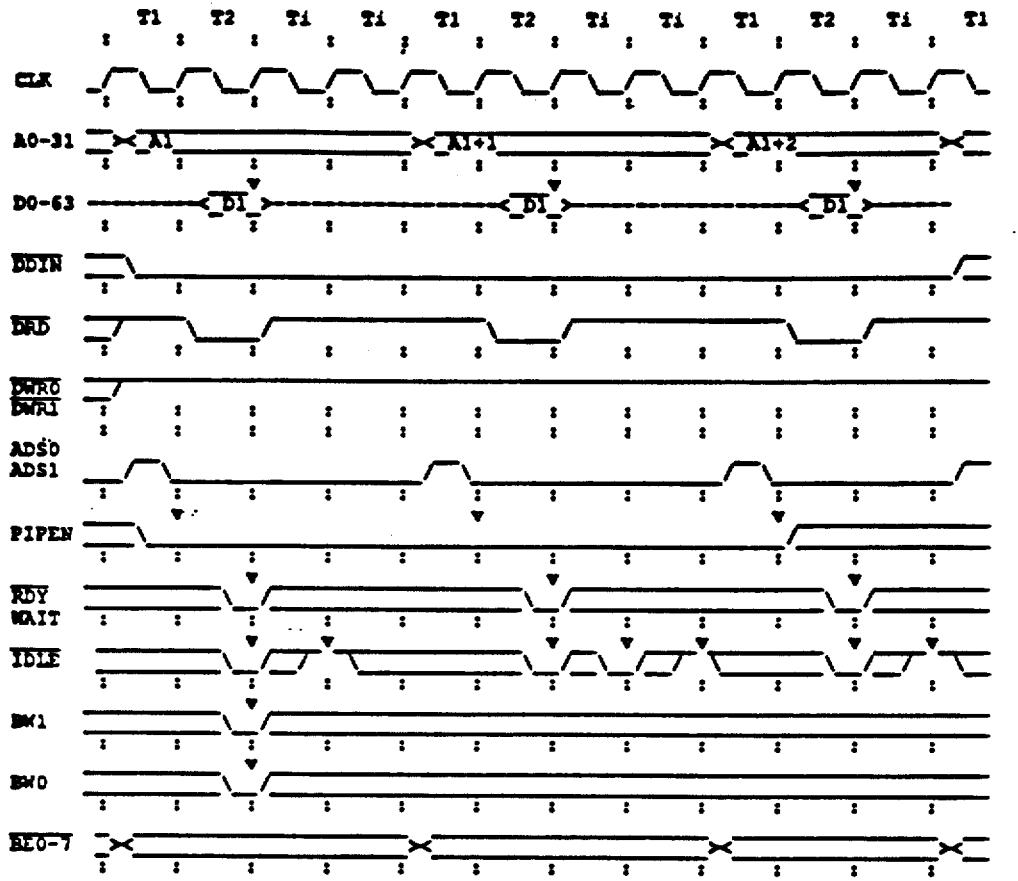
Figure 7-28. Read Cycle of an aligned Double-Word Operand To Slow Device using 8-Bit Bus Width (Interleaving Support Disabled)

SWORDFISH ARCHITECTURE SPECIFICATION          Rev. 2.0, February 1990

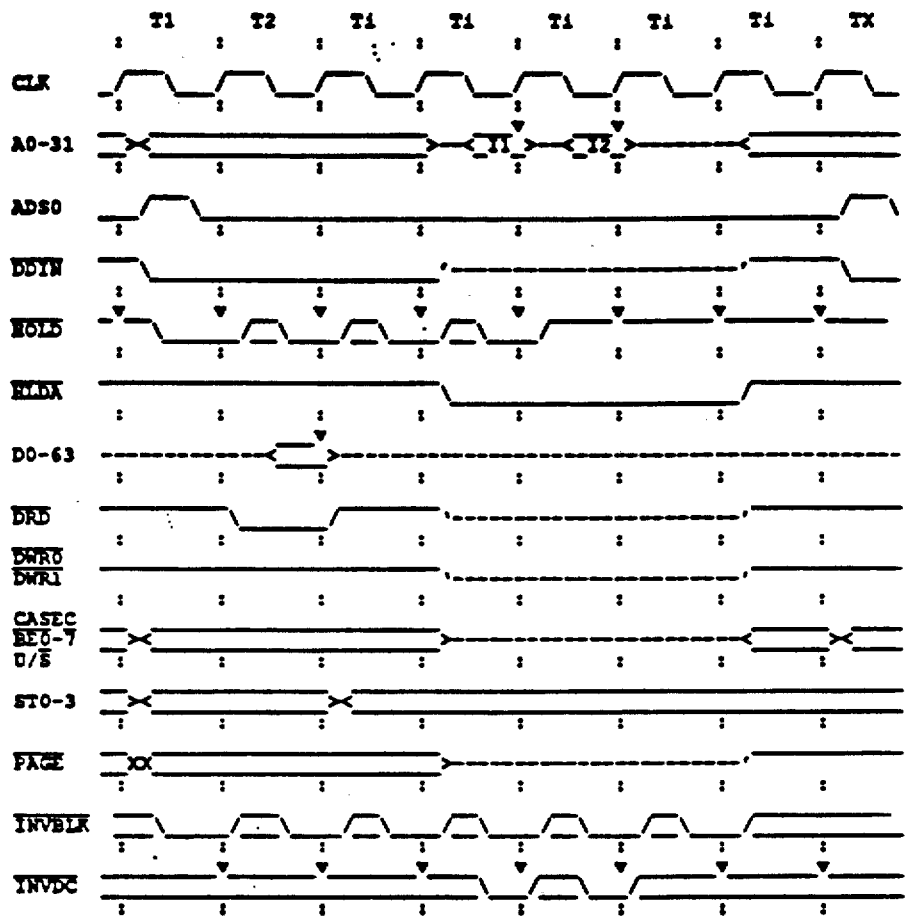

Figure 7-29. Hold Acknowledge (Sequential Bus, Interleaving Support Disabled)

Bus initially not idle. With the exception of interlocked bus cycles, HOLD is acknowledged as soon as the pending bus cycles are completed.

Address values marked with I1 and I2, are optional invalidations requested by the external system.

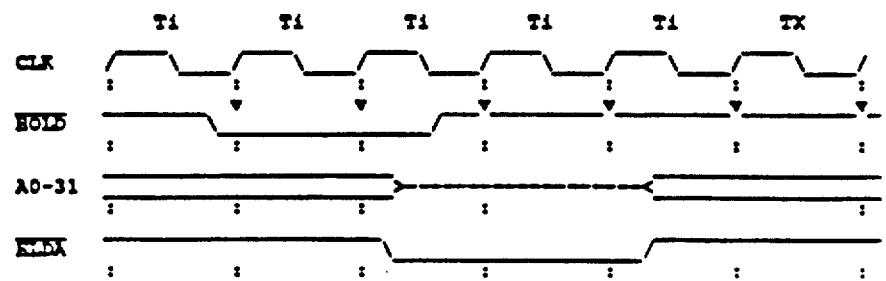

Figure 7-30. Hold Acknowledge (Bus Initially Idle).

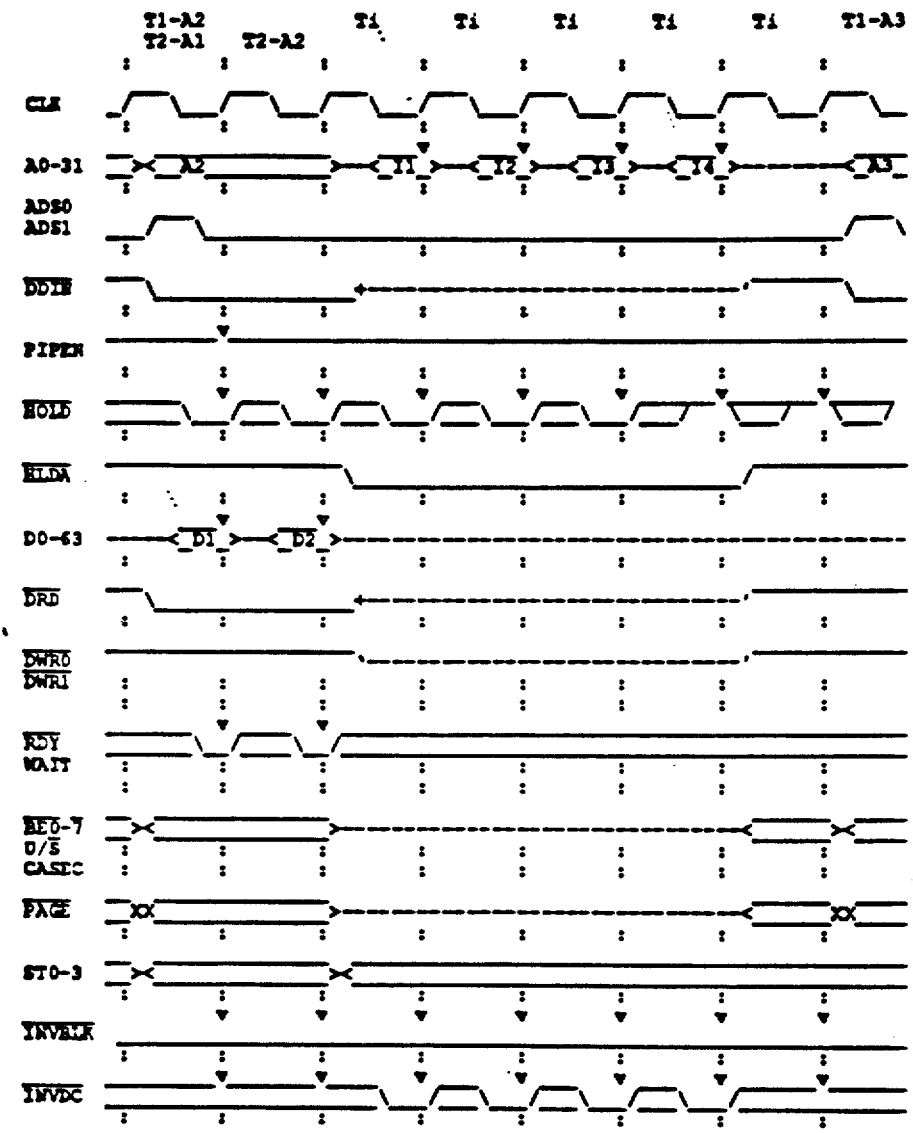
Figure 7-31. Hold Acknowledge (Pipelined Bus, Interleaving Support Disabled)
Bus initially not idle. With the exception of interlocked bus cycles, HOLD is acknowledged as soon as the pending bus cycles are completed.
Address values marked with I1 through I4, are optional invalidations requested by the external system.

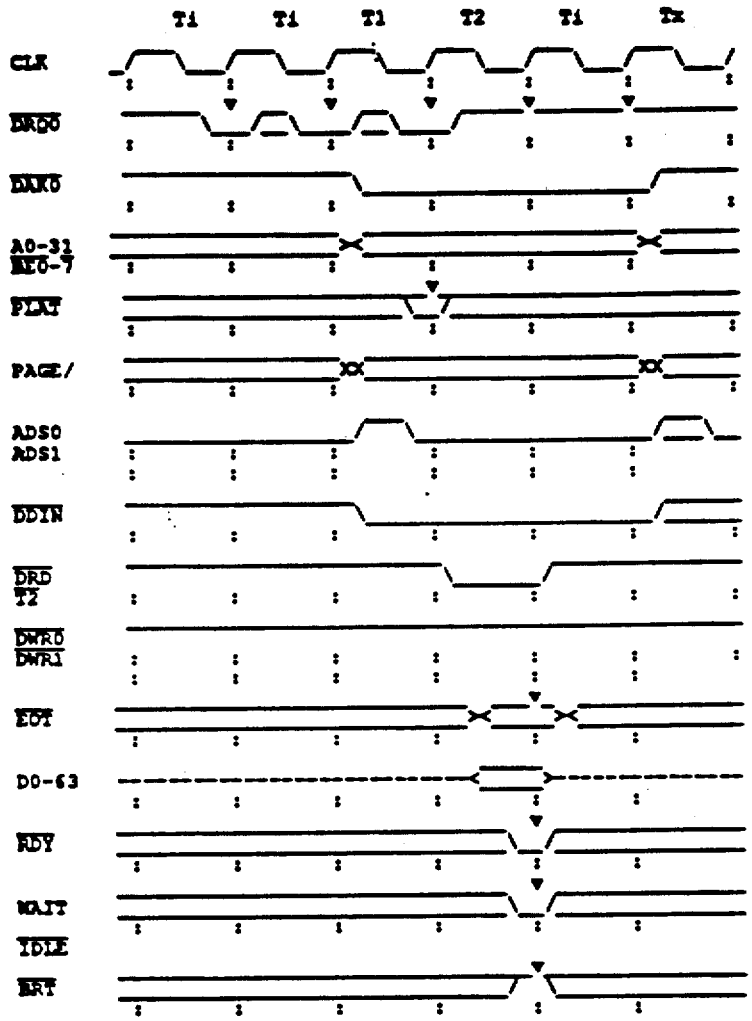
Figure 7-32. FlyBy Read DMA Cycles (Interleaving Support Disabled, Bus initially idle and no pending T1).
The CPU Tri-States D0-63 lines during the DMA cycle. The data shown in the figure is driven by the memory system.

SWORDFISH ARCHITECTURE SPECIFICATION        Rev. 2.0, February 1990
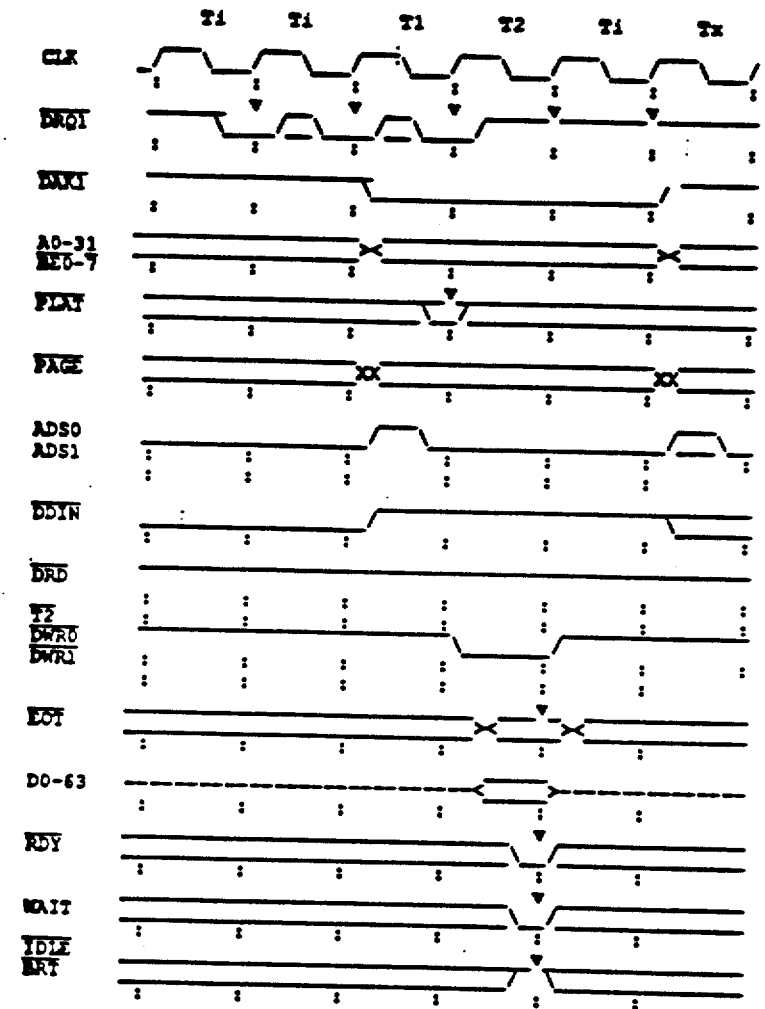
Figure 7-33. FlyBy Write DMA Cycles (Interleaving Support Disabled, Bus initially Idle, and no pending T1).
The CPU Tri-States D0-63 lines during the DMA cycle. The data shown in the figure is driven by the memory system.

SWORDFISH ARCHITECTURE SPECIFICATION        Rev. 2.0, February 1990
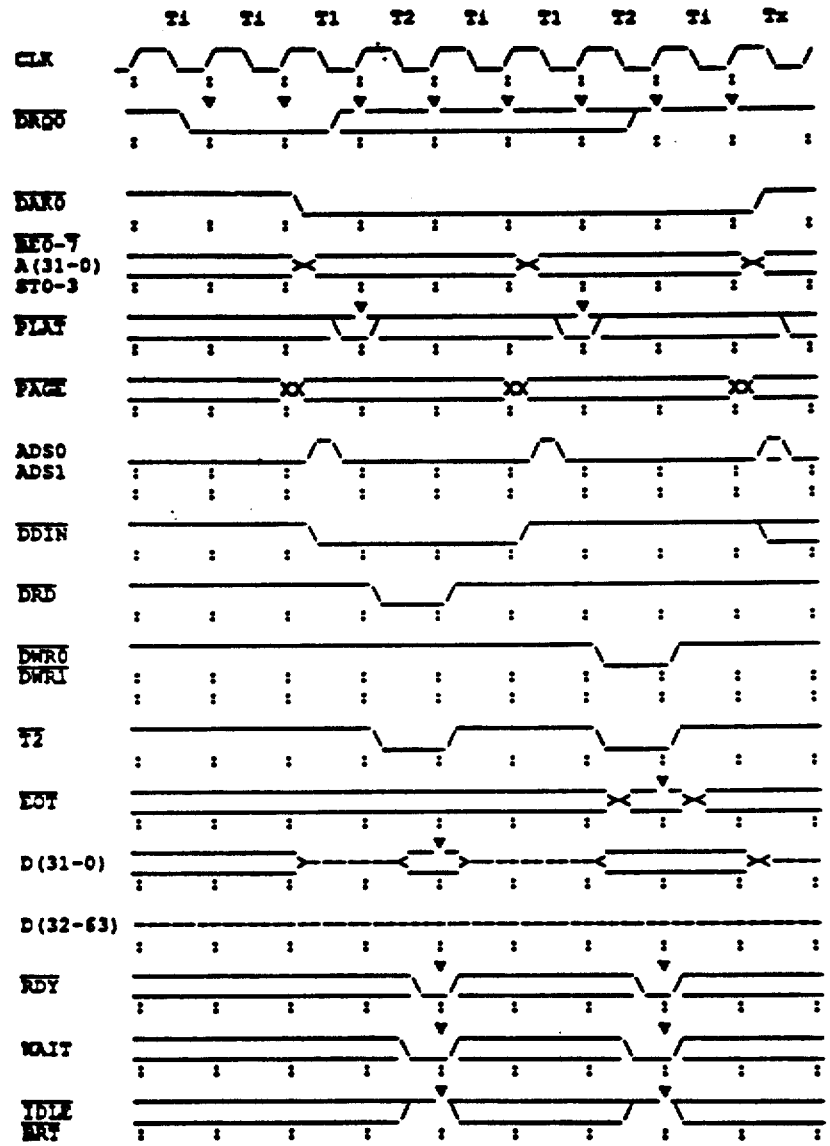
Figure 7-34. Memory to Memory DMA Cycle (Interleaving Support Disabled, Bus initially Idle, and no pending T1).

SWORDFISH ARCHITECTURE SPECIFICATION        Rev. 2.0, February 1990
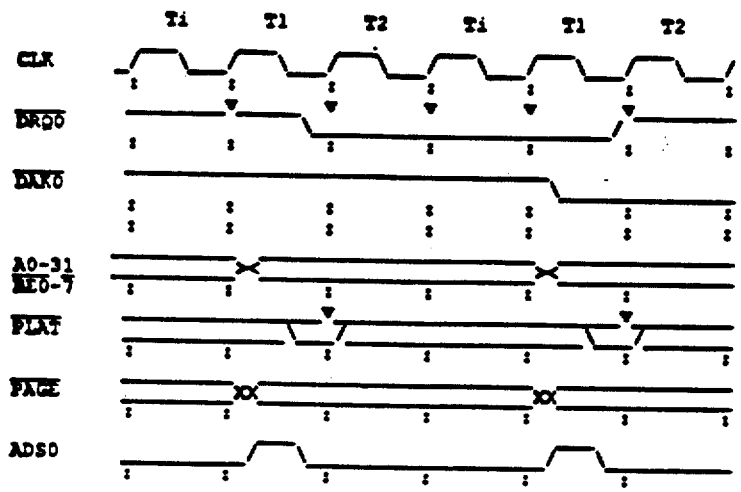
Figure 7-35. DMA Timing (Bus Initially Not Idle).
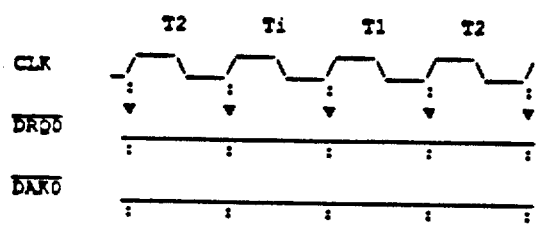
Figure 7-36. Two Successive DMA transfers on the same channel
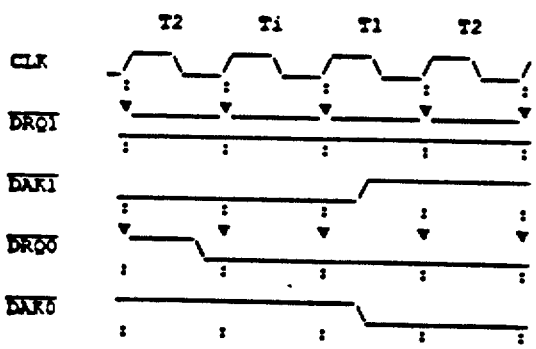
Figure 7-37. Two Successive DMA transfers on different channels (except for the case that both transfers are FlyBy writes)

SWORDFISH ARCHITECTURE SPECIFICATION          Rev. 2.0, February 1990
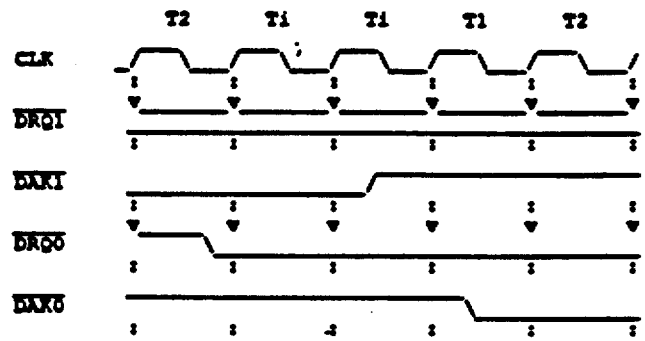
Figure 7-38. Two Successive DMA transfers on different channels (both transfers are FlyBy writes)
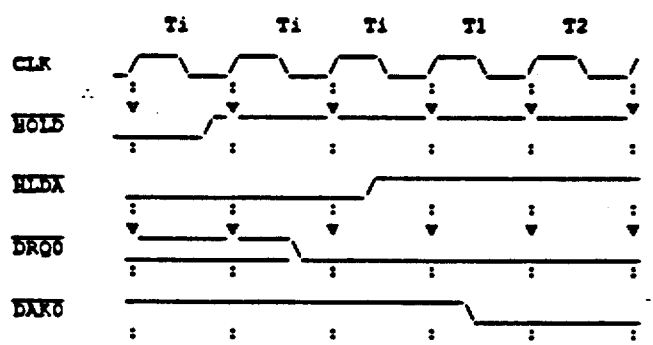
Figure 7-39. DMA request follows HOLD cycles.
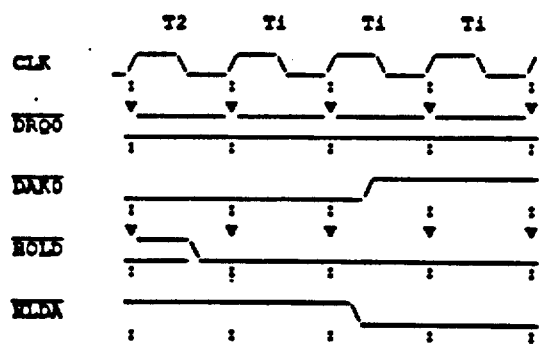
Figure 7-40. HOLD request follows DMA cycles.

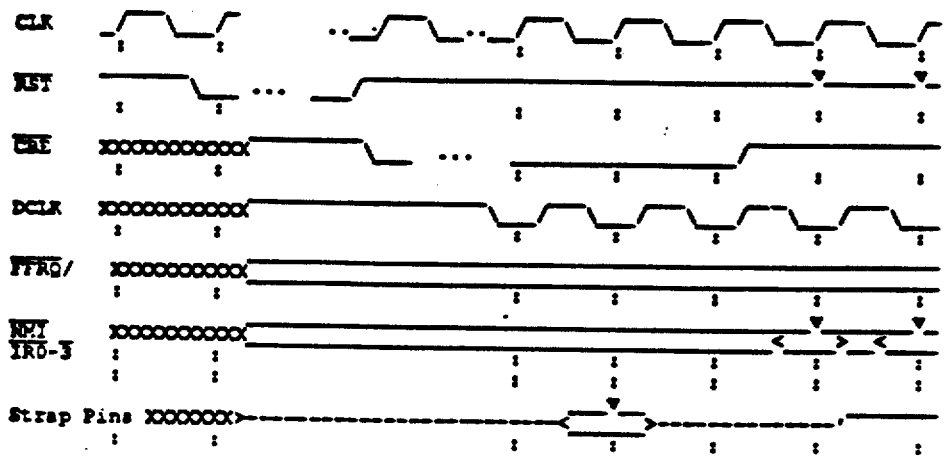

Figure 7-41. Reset

The value on the Strap Pins can be driven by a buffer in the system. This buffer should be enabled by the CBE line.

In a system with two or more SWORDFISH running in Lock-step, the RST pin should be deactivated synchronously. In a one CPU system RST can be deactivated Asynchronously.

Figure 7-42. Bus Clock Timing.

During reset time DCLK is not active, it's value is held 'high' until the on-chip PLL synchronizes. DCLK starts to toggle at least two cycles before the rising edge of CBE.

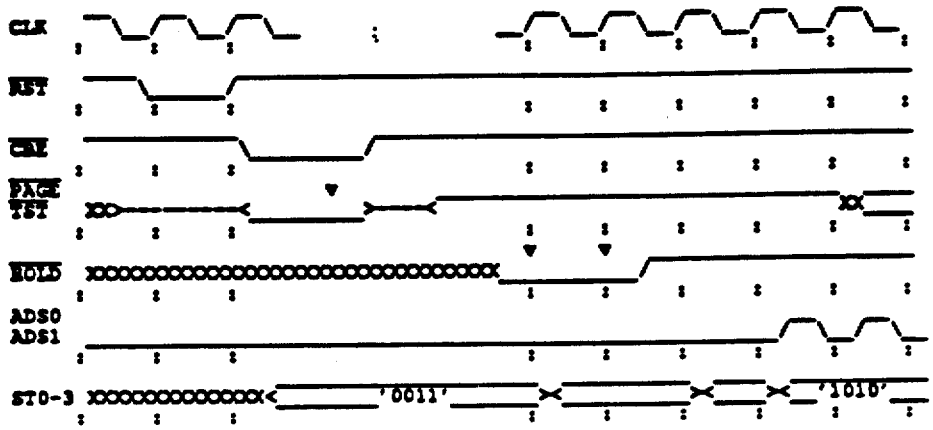
Figure 7-43. Memory Test
HOLD is not sampled until the end of the internal reset and the BIST. Hold cycles are allowed before the read cycles for memory test.
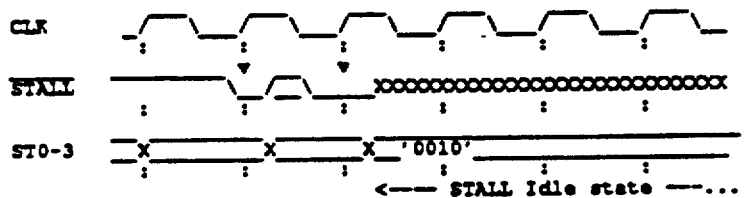
Figure 7-44. STALL activation
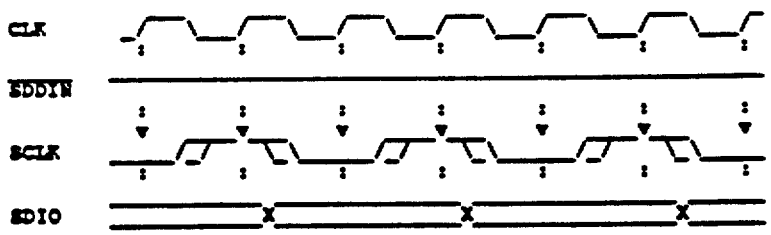
Figure 7-45. Serial Link - Output Transactions SWORDFISH ARCHITECTURE SPECIFICATION          Rev. 2.0, February 1990
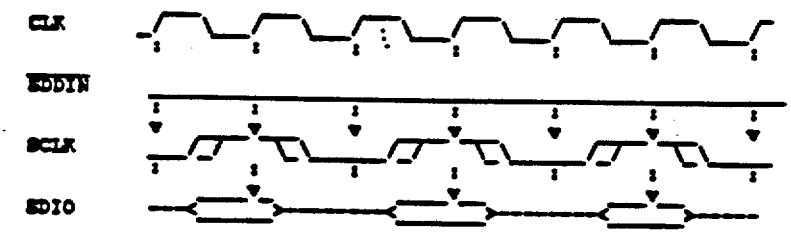
Figure 7-46. Serial Link - Input Transactions
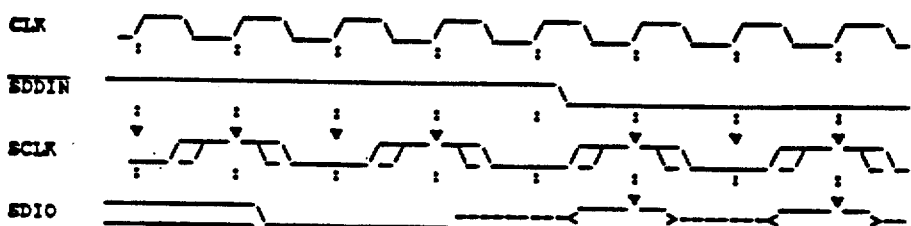
Figure 7-47. Serial Link - Transition from Output to Input
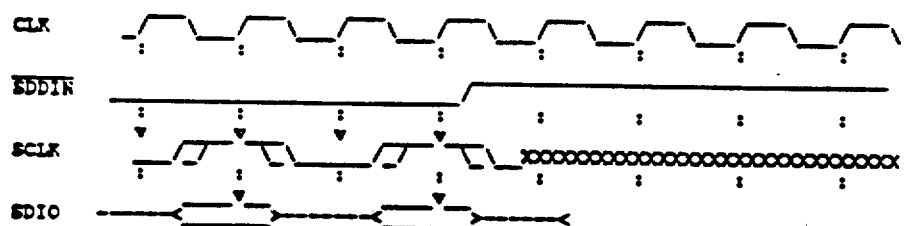
Figure 7-48. Serial Link - End of Input
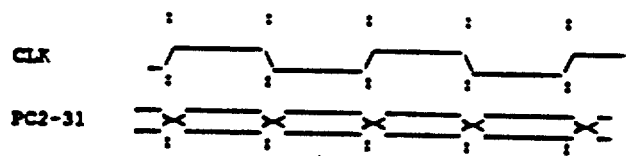
Figure 7-49. PC in ISE mode, Half-Frequency SWORDFISH ARCHITECTURE SPECIFICATION          Rev. 2.0, February 1990
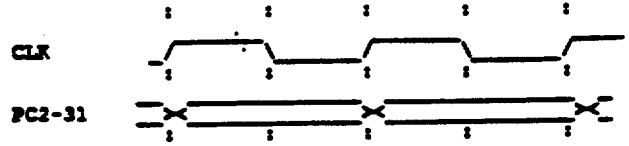
Figure 7-50. PC in ISE mode, Full-Frequency
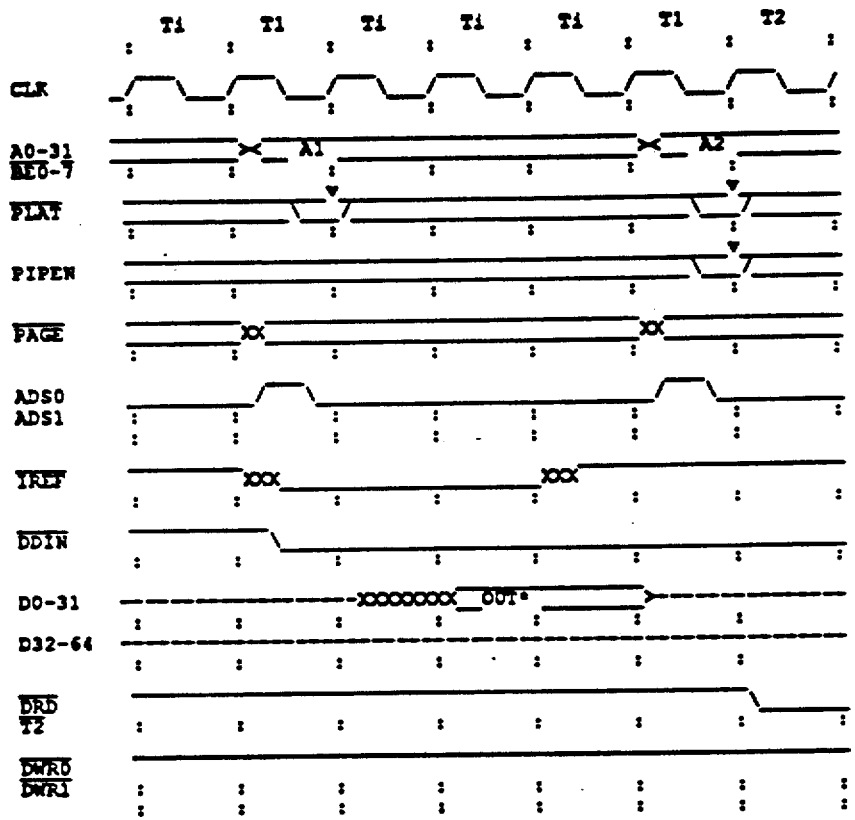
Figure 7-51. Internal Read Cycle followed by an External Read
The CPU drives the data bus in this cycle with the value of the internal register being read.

SWORDFISH ARCHITECTURE SPECIFICATION    Rev. 2.0, February 1990
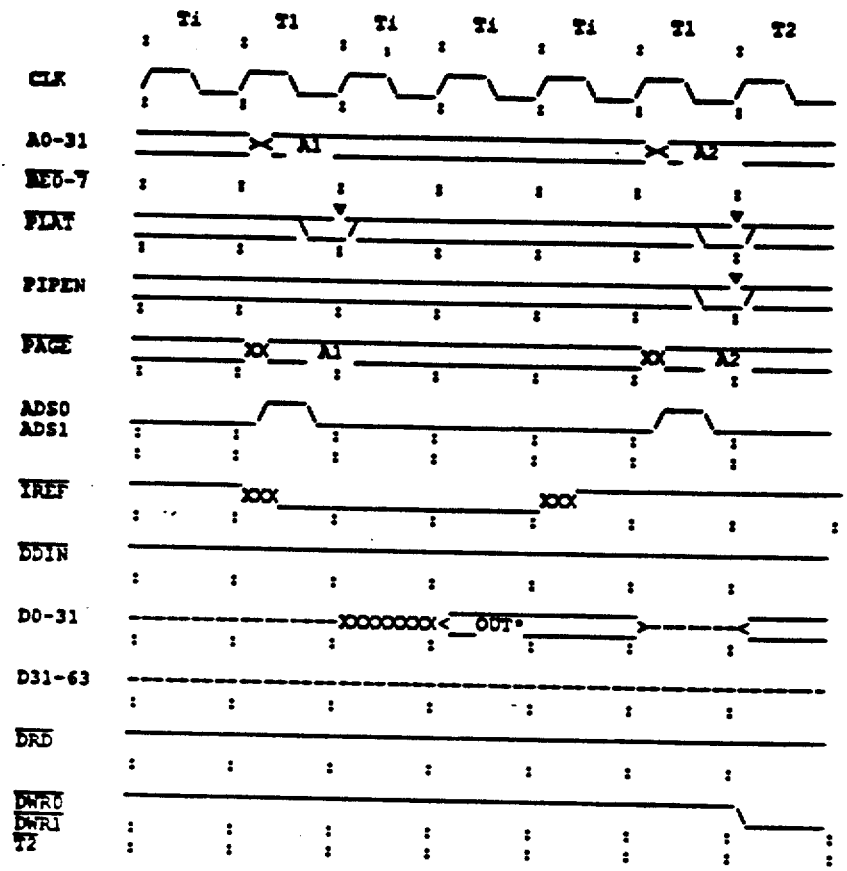
Figure 7-52. Internal Write Cycle followed by an External Write
The CPU drives the data bus in this cycle with the value of the internal register being written. $\overline{CBE}$.
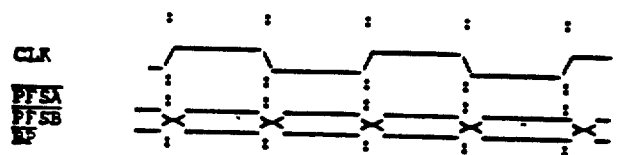
Figure 7-53. Internal Status Signals Timing in Half-Frequency Bus SWORDFISH ARCHITECTURE SPECIFICATION          Rev. 2.0, February 1990

Figure 7-54. Internal Status Signals Timing in Full-Frequency Bus

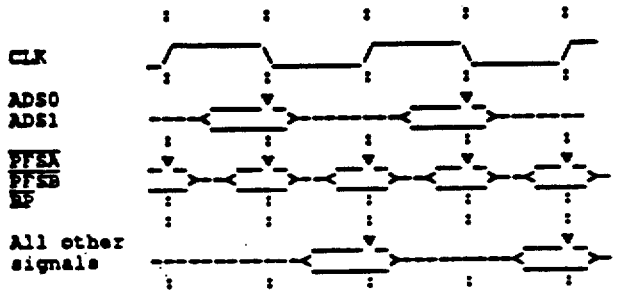

Figure 7-55. CPU in shadow mode, Half-Frequency

All the signals that are Output signals or Input/Output signals in normal mode of operation, become Input signals in Shadow mode.

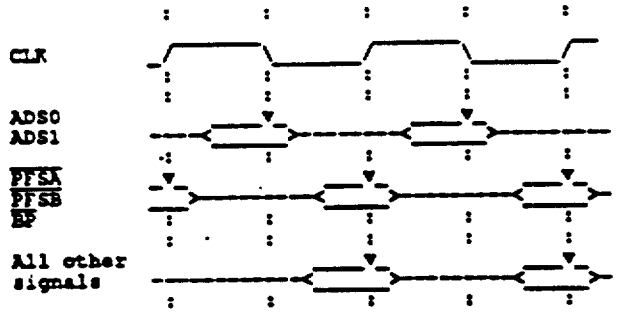

Figure 7-56. CPU in shadow mode, Full-Frequency

All the signals that are Output signals or Input/Output signals in normal mode of operation, become Input signals in Shadow mode.

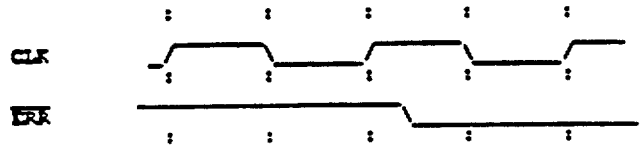

Figure 7-57. Error Detection

SWORDFISH ARCHITECTURE SPECIFICATION  Rev. 2.0, February 1990
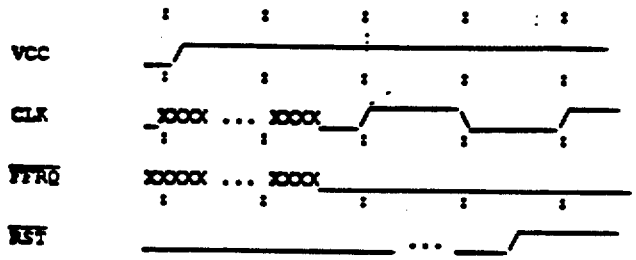
Figure 7-58. Power-On Reset
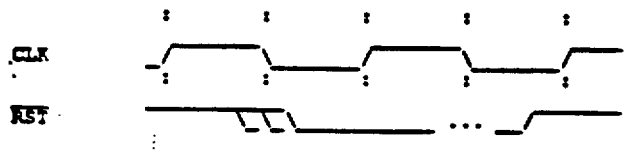
Figure 7-59. Non-Power-On Reset SWORDFISH ARCHITECTURE SPECIFICATION        Rev. 2.0, February 1990

8. DEBUGGING AND ISE SUPPORT

8.1 DEBUG FEATURES

This section describes the Swordfish features that assist the development of software debugging tools.

8.1.1 Debug Conditions

By appropriately programming the Debug Registers (DCR, BPC0, BPC1, CAR, and AMR) and the Debug Counter registers (DESR and DDR), the Swordfish can be made to recognize any of the following debug conditions:

1. Selected bytes in memory have been read or written (Address-Compare condition)
2. The PC matches one of two specified values (PC-Match condition)
3. The Debug Counter has reached a zero value An Address-Compare condition is detected when certain memory locations are either read or written. The double-word address used for the comparison is specified in the CAR and AMR. DCR.CRD and DCR.CWR separately enable the Address-Compare condition for read and write references; DCR.CAE can be used to disable the Address-Compare condition independently from the other control bits. The Swordfish examines the Address-Compare condition for all data reads and writes, Interrupt-Acknowledge and End-of-Interrupt bus cycles, and memory references for exception processing.

The PC-Match condition is detected when the address of the instruction equals the value specified in either the BPC0 or BPC1 registers. The PC-Match condition is enabled by DCR.PCE.

Detection of Address-Compare and PC-Match conditions is enabled for User and Supervisor modes by DCR.UD and DCR.SD. DCR.DEN can be used to disable detection of these two conditions independently from the other control bits.

The Swordfish checks for PC-Match and for Address-Compare conditions before executing an instruction. When the Swordfish detects a PC-Match or an Address-Compare condition before executing an instruction it asserts BP and if DCR.TR is 1, then Debug Trap (DBG) occurs, and the instruction is not executed. The cause of the Debug Trap (DBG) is indicated in the DSR.

Notes:

1. If only a single PC-Match breakpoint is needed, then BPC0 and BPC1 should be loaded with identical values.
2. If an Address-Compare condition is detected while the Swordfish is processing exceptions, a Trap (DBG) will not be activated regardless of the value of DCR.TR. In this case however, BP will be asserted, and DCR will be updated accordingly.

8.1.2 Debug Registers

The Debug Registers are accessed using the LPR and SPR instructions.

8.1.2.1 Debug Condition Register

The Debug Condition Register (DCR) enables detection of the debug conditions. The format of the DCR is shown in Figure 8-1.

SWORDFISH ARCHITECTURE SPECIFICATION  Rev. 2.0, February 1990

| 31 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Reserved | | TCE | CE | DEN | SD | UD | PCE | TR | LS | SP | SI | CAE | CRD | CWR |

Figure 8-1. Debug Control Register Format

The various fields are explained below:

CWR  Address-Compare Enable for Write references
CRD  Address-Compare Enable for Read references
CAE  Address-Compare Enable
SI   Single-Instruction Enable. This bit controls a testing feature that can aid debugging by inhibiting overlapped execution of instructions in the Swordfish pipelines. While this bit is 1, only a single instruction-pair entry can appear in the dual pipe. A new instruction entry will be allowed in the ID-stage only after the last entry has left the ST-stage. Refer to "Pipeline Organization" in Appendix C.1 for details on the Swordfish dual pipe organization. Single-instruction mode can be enabled with Load Scheduling either enabled or disabled. For normal operation this bit should be 0.
SP   Sequential-Pipeline Enable. This bit controls a testing feature that can aid debugging by inhibiting parallel execution of instructions. While this bit is 1, the dual-pipe executes each pair of instructions as two consecutive pairs: (A,IDLE) and (IDLE,B), where A and B are the instructions in slots A and B, respectively, in the original pair. For normal operation this bit should be 0.
LS   Load Scheduling disable. This bit controls a testing feature that can aid debugging by disabling the use of Load Scheduling by the Swordfish. When the Swordfish executes a load instruction while this bit is 1, then the Swordfish waits until the data is loaded to the destination register before executing any subsequent instructions. For normal operation this bit should be 0. Refer to "Data Cache Misses and Load-Scheduling" in Section C.5.1 for more information.
TR   Enable Trap (DBG) when debug condition detected
PCE  PC-Match Enable
UD   Enable Debug conditions in User-mode
SD   Enable Debug conditions in Supervisor-mode
DEN  Enable Debug conditions
CE   Debug Counter Enable, while 1, the Debug Counter is enabled.
TCE  Terminal Count Enable Trap, while 1, a Trap (DBG) occurs when counting in the Debug Counter terminates.

8.1.2.2 Debug Status Register

The Debug Status Register (DSR) indicates debug conditions that have been detected. When the Swordfish detects an enabled debug condition, it sets the corresponding bit (BPC, BCA) in the DSR to 1. When an Address-Compare condition is detected, then DSR.RD is loaded to indicate whether a read or write reference was performed. Software must clear the RD, BPC, and BCA bits in the DSR when appropriate. The format of the DSR is shown in Figure 8-2.

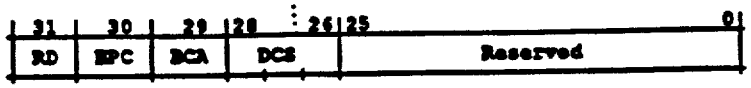

Figure 8-2. Debug Status Register

The various fields are explained below.

RD    Set when an Address-Compare condition is detected for a data read.
BPC   Set when a PC-Match condition is detected
BCA   Set when an Address-Compare condition is detected
DCS   Debug Counter Status:
    000 - Debug Counter not counting
    001 - Debug Counter active (counting)
    010 - Debug Counter has stopped counting (a PC1 match occurred)
    100 - Debug Counter has stopped counting (zero value was reached)
    110 - Debug Counter has stopped counting (zero value was reached and a PC1 match occurred)
    Otherwise - Reserved

8.1.2.3 Compare Address Register

The Compare Address Register (CAR) the address that is compared with reference addresses to detect an Address-Compare condition. Only bits for which the corresponding bit in the AMR register are cleared to 0 are compared. In case the Swordfish breaks the access into two or three aligned accesses (see "Bus Access Sequences" in Section D), the Address-Compare condition is tested for each of the accesses. On the first access, the value of the CAR is compared with the address of the operand. On the next accesses, the value of the CAR is compared with the address of the first byte in the aligned double word.

8.1.2.4 Address Mask Register

The Address Mask Register (AMR) contains separate mask bits for the address comparison. This allows detection of memory accesses to blocks of memory of up to $2^n1$ bytes long. The comparison of referenced memory addresses and the content of CAR register is restricted only to those bits in the AMR that are cleared to 0. Bit positions that are set to 1 in the AMR are not compared.

8.1.2.5 Breakpoint Program Counter Registers

The Breakpoint Program Counter registers (BPC0 and BPC1) contain the addresses that are compared with the PC contents to detect a PC-Match condition. The BPC0 and BPC1 registers are each 32 bits, however addresses loaded into this register must be double-word aligned; that is, the 2 least-significant bits of the BCP0 and BPC1 registers must be 0.

At Reset, the PC value prior to reset is saved in the BPC0 register.

SWORDFISH ARCHITECTURE SPECIFICATION          Rev. 2.0, February 1990

8.1.3 Debug Counter

The Debug Counter (DBGC) provides support for performance analysis. The DBGC is a 32-bit counter. DBGC can count a variety of events during a debug session and activate a Trap(DBG) at end of count. DBGC may count the following events (one at a time) according to the user selection:

1. Internal clock cycles
2. Instructions
3. Data Read bus cycles
4. Instruction Fetch bus cycles
5. Data Write bus cycles
6. Breakpoints (PC-Match and Address-Compare)
7. Time intervals DBGC is a down-counter. It has two operating modes. In one mode DBGC starts counting immediately after enabling DBGC, and each time zero is reached, a Trap(DBG) occurs if DCR.TCE is set. In the other mode, DBGC starts counting when PC0 match is encountered after enabling DBGC. The counting will be terminated upon Pc1 match or when DBGC reaches zero. A Trap(DBG) occurs in this mode if DCR.TCE is set when the DBGC stops.

The DBGC contains two dedicated registers: Debug Counter Event Selector Register (DESR) and Debug counter Data Register (DDR). Both registers are readable and writable as memory-mapped I/O-devices. The addresses for the DESR is FFFFF100 (hex) and the DDR is FFFFF104 (hex). Any reference to their associated memory locations is done using the bus protocol for on-chip control registers access (See "Accesses to the On-Chip Peripherals" in Section 7.5.3.11), to enable external observability. Accessing memory locations associated with these registers using other than double-word length, will cause unpredictable results.

8.1.3.1 Debug Counter Event Selector Register

The Debug Counter Event Selector Register (DESR) selects the event to be counted and the counting mode of the DBGC. The DESR has two fields MOD and EV. The EV field selects which event type will be counted by the DESR. The MOD field indicates the conditions on which the DBGC starts and terminates the count. Whenever the DBGC stops, the DESR.MOD field is set to zero, and counting can begin only after a new value is loaded into the MOD field. Upon reset the DESR is set to 0. The format of the DESR is shown in Figure 8-3.

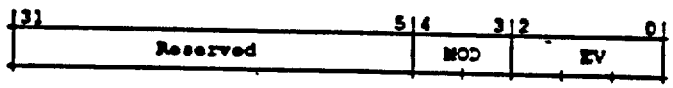

Figure 8-3. Debug Counter Event Selector Register

The various fields are explained below.

EV   Event type to be counted by the DBGC:
    000 - Internal clock cycles
    001 - Instructions
    010 - Data Read bus cycles
    011 - Instruction Fetch bus cycles SWORDFISH ARCHITECTURE SPECIFICATION          Rev. 2.0, February 1990

100 - Data Write bus cycles
       101 - PC0 match
       110 - PC1 match
       111 - Address match
MOD  DBGC operating mode:
       00 - not counting
       01 - Start counting immediately. Each time zero is reached, Trap (DBG) occurs if DCR.TCE is 1.
       10 - Start counting when a PC0 match occurs. The counting will be terminated upon PC1 match
          or when the DBGC reaches zero.
       11 - reserved

8.1.3.2 Debug Counter Data Register

The Debug Counter Data Register (DDR) is a 32-bit register. Reading DDR (using a LOAD instruction) gives the current contents of DBGC. Writing to DDR (using a STOR instruction), sets DBGC to a predefined value.

8.2 ISE FEATURES

This section describes the Swordfish features that assist in development of real-time In-System Emulation (ISE) equipment.

8.2.1 ISE Monitoring

The Swordfish provides the two signals $\overline{PFSA}$ and $\overline{PFSB}$, that are activated for one phase of a Swordfish clock cycle (1/4 CLK cycle for a system bus operating at half-frequency) upon completing an instruction in pipelines A and B, respectively. Refer to "Performance Evaluation" in Appendix C for more information about execution of instructions in the two pipelines. The signal $\overline{BP}$ is activated for one Swordfish clock cycle upon completing an instruction along with either $\overline{PFSA}$ or $\overline{PFSB}$ (or with both) when an enabled debug condition is detected while executing the instruction. When an enabled Address-Compare condition is detected while processing an exception, then $\overline{BP}$ is also activated for 1 Swordfish clock cycle, but without $\overline{PFSA}$ or $\overline{PFSB}$.

The Swordfish also displays information for use by the ISE equipment in the following events:

1. An exception other than interrupt occur.

2. An operating mode of the Swordfish is altered by executing an instruction that affects the PSR, CFG, or FSR.

3. An instruction is executed that affects the contents of the on-chip Instruction Cache or Data Cache.

Refer to "Internal Status" in Section 7.9 for more information about how this information is displayed on the system bus.

8.2.2 ISE Mode

The Swordfish provides a special mode of operation for ISE equipment to trace the sequence of instruction execution. ISE mode is enabled when the ISE signal is sampled active (high) at the end of reset and the $\overline{SHDW}$ signal is inactive (high). For correct ISE mode operation, both ISE $\overline{SHDW}$ must be

SWORDFISH ARCHITECTURE SPECIFICATION  Rev. 2.0, February 1990 held high continuously throughout power-on reset and thereafter.

The ISE mode Swordfish must operate in conjunction with a Master mode Swordfish. Master mode is enabled when the ISE is sampled inactive (low) at the end of reset and the $\overline{\text{SHDW}}$ input signal is inactive (high). For correct Master mode operation, ISE and $\overline{\text{SHDW}}$ must be held inactive continuously throughout power-on reset and thereafter. The ISE-Swordfish and Master-Swordfish must have their clocks synchronized, as explained in "Clocking" in Section 7.2.

The Master-Swordfish receives input signals from the target system and drives output signals. The ISE-Swordfish receives input signals from the target system, but does not drive output signals to the target system. Instead, the ISE-Swordfish drives 30 output signals to display the 30 most significant bits of the instruction address (PC) to the ISE equipment. Refer to "In-System Emulation (ISE) Mode" in Section 7.13 for more information.

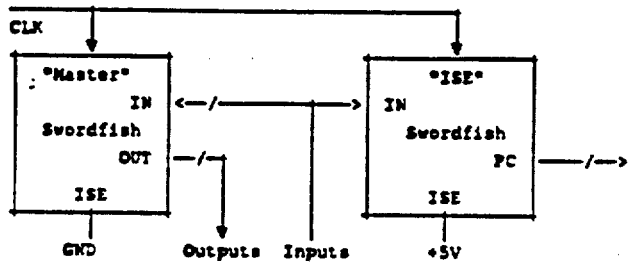

Figure 8-4. ISE Mode

The ISE equipment can determine the sequence of executed instructions by monitoring the $\overline{\text{PFSA}}$ and $\overline{\text{PFSB}}$ signals output by the Master-Swordfish and the PC value output by the ISE-Swordfish. The following interpretation is applied:

- $\overline{\text{PFSA}}$ and $\overline{\text{PFSB}}$ are both inactive: The PC is ignored.
- $\overline{\text{PFSA}}$ is inactive and $\overline{\text{PFSB}}$ is active: One instruction has been executed; its PC is displayed.
- $\overline{\text{PFSA}}$ is active and $\overline{\text{PFSB}}$ is inactive: One instruction has been executed; its PC is displayed.
- $\overline{\text{PFSA}}$ and $\overline{\text{PFSB}}$ are both active: two instructions have been executed in parallel; the address of the first instruction is displayed as PC. Consequently, the address of the second instruction can be calculated to be PC+4.

8.2.3 Serial Link

The Swordfish provides a serial link for the ISE equipment to read and update the contents of all Swordfish registers defined in the Programming Model (see "Programming Model" in Chapter 2). When the $\overline{\text{STALL}}$ input signal is activated, the Swordfish completes executing the current instruction or processing the current exception. It then enters a special Freeze mode in which the Swordfish displays the contents of all registers 1 bit at a time on the $\overline{\text{SDIO}}$ signal. The ISE-Swordfish does not drive the $\overline{\text{SDIO}}$ signal. Then, both the Master-Swordfish and ISE-Swordfish load the contents of all registers 1 bit

SWORDFISH ARCHITECTURE SPECIFICATION  Rev. 2.0, February 1990 at a time from the SDIO signal. The Master-Swordfish and ISE-Swordfish remain in Freeze mode until the all of the registers were read and updated throuh the Serial Link, at which time both CPUs begin executing the Instruction whose address has been loaded into the PC. Refer to "Serial Link" in Section 7.14 for more information about the bus signals dedicated for ISE equipment.

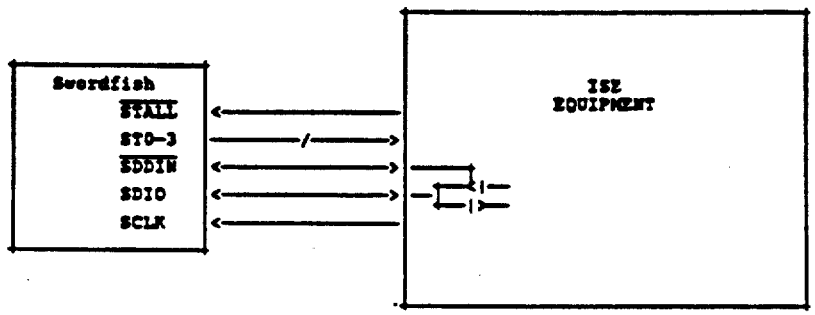

Figure 8-5. Serial link between Swordfish and the ISE equipment

SWORDFISH ARCHITECTURE SPECIFICATION          Rev. 2.0, February 1990

9. ON-CHIP PERIPHERALS

9.1 INTRODUCTION

This chapter describes the on-chip Peripherals of the Swordfish. The on-chip Interrupt Control Unit manages up to 15 levels of maskable prioritized interrupts. The on-chip Direct Memory Access Controller Unit supports 2 channels for transferring blocks of data between memory and I/O devices with minimal CPU intervention. The on-chip Timer has a 16 bit counter to support three modes of operation.

9.2 INTERRUPT CONTROL UNIT

The on-chip Interrupt Control Unit (ICU) manages up to 15 levels of maskable prioritized interrupt requests. Maskable interrupt requests are binary-encoded as 4-bit priority levels by an external Priority Encoder device, and are input to the Swordfish on the $\overline{IR0}$-$\overline{IR3}$ input pins. The ICU also supports an internal interrupt request from the DMA controller and the Timer.

The ICU keeps track of the interrupt priority levels currently in-service by the Swordfish, and transfers to the Swordfish only higher level interrupt requests. In addition, the ICU monitors the system bus and responds to Interrupt-Acknowledge and End-of-Interrupt bus cycles, by providing vector values to the Swordfish and updating its own record of in-service interrupt priority levels.

The 32000/EP family interrupt handling specification remains unchanged, except for the elimination of cascaded maskable interrupt requests and their associated bus cycles. In particular, the vector numbers are always positive, in the range 11(hex) through 1F(hex). The on-chip ICU does not interact with Non-Maskable Interrupt requests (NMI).

9.2.1 ICU Registers

The ICU contains two dedicated memory-mapped I/O registers: Interrupt Vector Register (VECT) and Interrupt In-Service Register (ISRV). The ISRV register is both readable and writable by software. The VECT register is read-only. These registers are 8 bits and 16 bits wide respectively, and must be accessed by specifying operand lengths equal to their widths. Specifying different operand lengths may cause unpredictable results. Any reference to their associated memory locations is done using the bus protocol for on-chip control registers access (see "Accesses to the On-Chip Peripherals" in Section 7.5.3.11), to enable external observability.

9.2.1.1 Interrupt Vector Register

The Interrupt Vector Register (VECT) is an 8-bit read-only register containing the current interrupt request vector number, to be used by the Swordfish in accessing the interrupt dispatch table when this request is acknowledged. This register is located at memory address FFFFFE00(hex).

| 7 | 6 | 5 | 4 | 3 | 2 | 1 | 0 |
|---|---|---|---|---|---|---|---|
| 0 | 0 | 0 | 1 | IR3 | IR2 | IR1 | IR0 |

FFFFFE00

Figure 9-1. Interrupt Vector Register Format

SWORDFISH ARCHITECTURE SPECIFICATION          Rev. 2.0, February 1990

Bits 4 through 7 contain the binary value 0001. Bits 0 through 3 contain the latest valid value sampled on the IR0-IR3 pins, representing the interrupt request priority level. These bits are encoded in positive logic, where binary value 0000 in bits 0 through 3 represents lowest priority level (no interrupt request), while the binary value 1111 represents highest priority level.

9.2.1.2 Interrupt In-Service Register

The Interrupt In-Service Register (ISRV) is a 16-bit register used by the ICU to keep track of the currently in-service interrupt priority levels. This register is located at memory address FFFFFE04(hex).

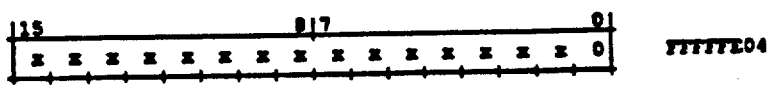

Figure 9-2. Interrupt In-Service Register Format

A value of 1 in bit position $i$ (where $1 \leq i \leq 15$), indicates that the $i$-th priority level is currently in-service. Bit position 0 is always forced to 0. Upon reset the ISRV register is cleared to 0. Note that a zero value in the ISRV register indicates that there are no in-service interrupts.

9.2.2 ICU Operation

The ICU responds to three kinds of events: (1) interrupt requests through the IR0-IR3 pins or the on-chip peripherals (DMA or Timer), (2) Interrupt-Acknowledge bus cycles on the system bus, (3) End-of-Interrupt bus cycles on the system bus. Refer to "Vectored Interrupts" in Section 7.7.1 for more information on system interface for the ICU.

9.2.2.1 Interrupt Request Processing

The ICU keeps track of the interrupt levels currently in-service by the Swordfish. These are the interrupt requests that have been acknowledged by the Swordfish but did not yet execute a corresponding End-of-Interrupt bus cycle upon executing an EOI instruction. The ICU transfers to the Swordfish only the interrupt requests whose priority level is higher than the highest interrupt priority level currently in-service. All other interrupt requests are ignored by the ICU.

The ICU samples the IR0-IR3 pins on each bus clock. To overcome metastability problems, a sampled value is considered valid only if it equals the value sampled on the previous bus cycle. The VECT register is automatically set by the ICU to reflect the state of the latest valid value sampled on IR0-IR3. A sampled high value corresponds to a 0 state of the corresponding VECT register bit. A sampled low value corresponds to a 1 value of the corresponding VECT register bit.

Interrupt requests initiated by the on-chip peripherals are transferred internally to the ICU. They are considered by the ICU only if their priority is higher than the priority level of the current external interrupt request. In this case, the ICU selects the highest priority pending internal interrupt level instead of the external one as the priority level of the current interrupt request.

SWORDFISH ARCHITECTURE SPECIFICATION          Rev. 2.0, February 1990

| VECT | Interrupt Level | Interrupt Source | Priority |
|---|---|---|---|
| 00011111 | INT15 | External Only | Highest |
| 00011110 | INT14 | External or DMA (When DMA.IEREG.DIP bit is 1) | |
| 00011101 | INT13 | External or Timer TPNDA or Timer Capture mode underflow | |
| 00011100 | INT12 | External or Timer TPNDB | |
| 00011011 | INT11 | External only | |
| 00011010 | INT10 | External only | |
| 00011001 | INT9 | External only | |
| 00011000 | INT8 | External only | |
| 00010111 | INT7 | External only | |
| 00010110 | INT6 | External or DMA (when DMA.IEREG.DIP bit is 0) | |
| 00010101 | INT5 | External only | |
| 00010100 | INT4 | External only | |
| 00010011 | INT3 | External only | |
| 00010010 | INT2 | External only | |
| 00010001 | INT1 | External only | Lowest |
| 00010000 | No Interrupt | | |

TABLE 9-2. Interrupt Levels

9.2.2.2 Interrupt-Acknowledge Processing

In response to an Interrupt-Acknowledge bus cycle, the ICU sets to 1 the ISRV bit corresponding to the priority level of the current interrupt request, as specified in the less-significant half of the VECT register. This is the maximum between the value obtained from $\overline{IR0\text{-}IR3}$ and the value of the highest priority pending internal interrupt request (DMA or Timer). The ICU then transfers the interrupt vector value to the Swordfish as data on the system bus. Note that the VECT register is not latched by the ICU even after the interrupt request is acknowledged by the Swordfish. This allows the software to examine the priority level of the current request by reading the VECT register.

For proper ICU operation, the priority level on the $\overline{IR0\text{-}IR3}$ lines must not be decreased unless one of the following condition is true:

1. The Swordfish performed an Interrupt-Acknowledge bus cycle
2. Maskable interrupts are currently disabled (PSR H flag is cleared to 0)
3. Higher or same priority interrupt is in-service Condition (1) above should be used by a requesting I/O device to determine when it is appropriate to remove the interrupt request. Conditions (2) and (3) may be used by software, for example, to remove an interrupt request by accessing the I/O device's control registers.

9.2.2.3 End-Of-Interrupt Processing

In response to an End-of-Interrupt bus cycle, the ICU clears to 0 the highest ISRV bit that is currently set to 1. The Swordfish is assumed to have returned to the next lower interrupt service routine. In addition, the ICU returns the VECT register value as data on the system bus. However, this value is not related to the priority level of the terminated interrupt routine that executed the EOI instruction.

Note that it is also possible to alter bits in the ISRV explicitly by software, for example, inside an interrupt service routine in order to reenable interrupts at the same or lower priority levels. However it is advised to use the EOI instruction for this purpose.

SWORDFISH ARCHITECTURE SPECIFICATION          Rev. 2.0, February 1990

9.3 DIRECT MEMORY ACCESS CONTROLLER

The on-chip Direct Memory Access (DMA) Controller supports 2 channels for transferring blocks of data between memory and I/O devices with minimal CPU intervention. Source and destination addresses, as well as block size and type of operation, are set up in advance by software writing to the DMA dedicated control registers. Actual transfer is managed by the DMA in response to DMA channel requests in cycle-stealing fashion.

Two types of channel ends (source or destination) are supported: (1) an I/O device (peripheral with a single data port), and (2) a memory buffer. Each channel can be independently configured to operate in either flyby mode or memory-to-memory mode. In flyby mode, one of the channel ends is implicitly an I/O device, hardwired to be selected by the DMA acknowledge signal $\overline{DAK}$ corresponding to that channel. Each data element is transferred directly from source to destination in a single bus cycle using the other end's address, without reading it into the DMA. In memory-to-memory mode (also called "flow-through"), each one of the channel ends is either an I/O device or a memory buffer. Each data element is transferred in two bus cycles by first reading it into the DMA using the source address, and then writing it out using the destination address. In memory-to-memory mode, the DMA provides support for differing source and destination bus widths.

Once a DMA channel is programmed and enabled for block transfer, the DMA responds to DMA channel requests on the corresponding $\overline{DRQ}$ pin by transferring the next data element associated with that block. A block transfer normally completes once the specified number of bytes has been transferred. Each channel is independently programmable to proceed according to one of the following operation types upon completion of block transfers: (1) Single transfer operation, (2) Double-buffer operation, or (3) Auto-initialize operation. In single transfer operation, the DMA terminates the operation as soon as the specified block transfer is complete. In double-buffer operation, an alternate set of address and count registers is prepared by software while the current block transfer is in progress, and the DMA automatically switches to use them when the current transfer is complete. In auto-initialize operation, completion of block transfers causes the DMA to repeat automatically the entire block transfer, using the original address and byte count specified for it.

In addition to normal completion of block transfer, it is possible to end it externally by activating the $\overline{EOT}$ pin during a data element transfer transaction. A block transfer can also be terminated by software by explicitly writing to the DMA control registers. The DMA can be programmed to generate an interrupt in response to various termination conditions, to allow the Swordfish to intervene and specify a new block transfer or to analyze the cause of external terminated operation.

9.3.1 DMA Registers

The DMA contains 19 dedicated control registers. All registers are 32-bit wide and are both readable and writable by software. Any reference to their associated memory locations is done using the bus protocol for on-chip control registers access (see "Accesses to the On-Chip Peripherals" in Section 7.5.3.11), to enable external observability. Accessing memory locations associated with these registers using other than double-word length, will cause unpredictable results. DAC, SAC, TCC, DSTAT, and MODE registers cannot be written into while the channel is enabled. Upon reset the DMA clears CTL0, CTL1, STAT, IEREG, MODE0, MODE1, TCC0, TCC1, TCR0 and TCR1.

SWORDFISH ARCHITECTURE SPECIFICATION			Rev. 2.0, February 1990

9.3.1.1 Channel Control Registers

Each channel has a set of eight 32-bit registers associated with it. The register and their associated addresses are shown in Figure

```
CHANNEL 0 CONTROL                    CHANNEL 1 CONTROL
|31              0|                  |31              0|
|      SAC        | FFFFF020         |      SAC        | FFFFF040
|      SAR        | FFFFF024         |      SAR        | FFFFF044
|      DAC        | FFFFF028         |      DAC        | FFFFF048
|      DAR        | FFFFF02C         |      DAR        | FFFFF04C
|      TCC        | FFFFF030         |      TCC        | FFFFF050
|      TCR        | FFFFF034         |      TCR        | FFFFF054
|      MODE       | FFFFF038         |      MODE       | FFFFF058
|      CTL        | FFFFF03C         |      CTL        | FFFFF05C
```

Figure 9-3. Channel Control Registers

The Source Address Counter (SAC), Destination Address Counter (DAC), and Transfer Complete Counter (TCC), are 32-bit counters used by the DMA to monitor the progress of the current block transfer. On each DMA request by a particular channel, the DMA transfers a single data element from that channel's source address to the destination address. The DMA then increments the source and destination addresses in case they are of the memory buffer type, and decrements TCC by the number of bytes transferred.

Note:

Specifying 0 as the next transfer count (by writing 0 to the TCR while CHANNEL ENABLE = 1 and INPUT DATA VALID = 1) may cause unpredictable results.

The Source Address Register (SAR), Destination Address Register (DAR), and Transfer Complete Register (TCR), are 32-bit registers used to store the next block transfer specification in case of an auto-initialize or double-buffer operation.

The number of bytes programmed into the TCR and TCC has to be a multiple of the smaller of the two bus widths of the MODE register. The start address of both the source and the destination blocks (the value programmed into SAC, SAR, DAC and DAR) must be a multiple of the smaller of the two bus widths of the MODE register.

The Mode Control Register (MODE) is a 32-bit register used to specify operating mode for the corresponding channel. The format of this register is shown below:

| 31      15 | 14      10 | 9 | 8 | 7 | 6 | 5 | 4 | 3 | 2 | 1       0 |
|------------|------------|---|---|---|---|---|---|---|---|-----------|
| Reserved | BLOCK LENGTH | SMODE | | SWIDTH | | DMODE | | DWIDTH | DIR | FBY/MTM | OP TYPE |

Figure 9-4. Mode Control Register Format

SWORDFISH ARCHITECTURE SPECIFICATION          Rev. 2.0, February 1990

Bits 14 through 31 are reserved. The meaning of the various fields is as follows:

| Field | Value | Description |
|---|---|---|
| OP TYPE | 00 | Auto-initialize - OFF |
| | 01 | Auto-initialize - ON |
| | 10 | (Reserved) |
| | 11 | (Reserved) |
| FBY/MTM | 0 | Flyby mode |
| | 1 | Memory-to-memory mode |
| DIR | 0 | Read cycle in flyby (the implied I/O device is a destination) |
| | 1 | Write cycle in flyby (the implied I/O device is a source) |
| DWIDTH | 00 | 8 bits destination bus width |
| | 01 | 16 bits destination bus width |
| | 10 | 32 bits destination bus width |
| | 11 | (Reserved) |
| DMODE | 0 | Destination is an I/O device (address in not incremented) |
| | 1 | Destination is a memory buffer |
| SWIDTH | 00 | 8 bits source bus width |
| | 01 | 16 bits source bus width |
| | 10 | 32 bits source bus width |
| | 11 | (Reserved) |
| SMODE | 0 | Source is an I/O device (address in not incremented) |
| | 1 | Source is a memory buffer |
| BLOCK LENGTH | | See "Bus Fairness" in Section 9.3.2.7 |

The Control Register (CTL) is a 16-bit register used for synchronization of channel operation with the programming of block transfer parameters. The format of this register is shown below:

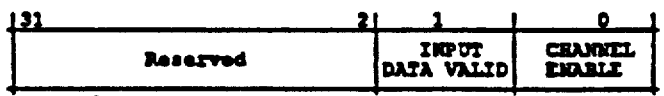

Figure 9-6. Control Register Format

Bits 2 through 31 are reserved. The meaning of the two control bits is as follows:

| Field | Value | Description |
|---|---|---|
| CHANNEL ENABLE | 0 | Channel is disabled |
| | 1 | Channel is enabled |
| INPUT DATA VALID | 0 | Next transfer specification in SAR, DAR, TCR is not valid |
| | 1 | Next transfer specification in SAR, DAR, TCR is valid |

SWORDFISH ARCHITECTURE SPECIFICATION          Rev. 2.0, February 1990

The CHANNEL ENABLE bit is cleared to 0 in the following cases (see "Channel Status Registers" in Section 9.3.1.2 for definition of STAT register fields):

- Upon reset
- Software clears it by writing to CTL register
- The STAT register EOT-field is set to 1 and is unmasked
- The STAT register OVR-field is set to 1 and is unmasked In the two last cases above (OVR and EOT), the CHANNEL ENABLE bit is forced to 0 as long as STAT register EOT-field or OVR-field are true, and cannot be set to 1 by software writing to the CTL register.

The SAR, DAR, TCR, and CTL registers can be read or written at any time. The SAC, DAC, and TCC counters can be read at any time, but written to only when the corresponding channel is not running (CTL register CHANNEL ENABLE bit is 0 or the TCC counter is 0). Otherwise, results are unpredictable.

9.3.1.2 Channel Status Registers

In addition to the channel control register, the DMA includes 3 status/control registers, which are common to both channels. These registers are used to inform the software about various conditions associated with each channel, and to enable/disable selectively interrupt generation corresponding to these conditions. The address map of these registers is shown below:

| 31 | 0 |
|---|---|
| STAT | FFFFF010 |
| IEREG | FFFFF014 |
| DSTAT | FFFFF018 |

Figure 9-6. Channel Status Registers

The format of the Status Control Register (STAT) is shown below:

| 31 | 8 | 7 | 6 | 5 | 4 | 3 | 2 | 1 | 0 |
|---|---|---|---|---|---|---|---|---|---|
| Reserved | | DMA1 RUN | DMA1 CHAN OVR | DMA1 EXT EOT | DMA1 TC | DMA0 RUN | DMA0 CHAN OVR | DMA0 EXT EOT | DMA0 TC |

Figure 9-7. Status Control Register Format

Bits 8 through 31 are reserved. The meaning of the various control bits is as follows:

TC         When set to 1, indicates channel transfer was completed due to a zero TCC count EXT EOT    When set to 1, indicates channel transfer was ended by external EOT signal CHAN OVR   When set to 1, in non auto-initialize mode, indicates current transfer is complete (TCC = 0), but next transfer specification is not valid.

RUN        When set to 1, indicates channel is active (CTL bit 0 is 1, and TCC > 0)

Writing a value to the STAT register clears to 0 the bits corresponding to the 1 bits in the written value. This facility enables software to clear some of the bits in STAT in a single atomic operation, thus ensuring consistency with DMA-initiated updates made to the STAT register while a channel is active. While the RUN bit continually indicates whether the channel is active or not, the TC, EXT EOT, and CHAN OVR bits are sticky. Once they are set in response to the corresponding condition, they remain set until explicitly cleared by software.

The RUN bit continuously reflects the status of the channel, as a function of the CHANNEL ENABLE bit of the corresponding CTL register and the value of the corresponding TCC. Hence this bit cannot be written into by software, neither via accessing the STAT register nor via accessing the DSTAT register. Upon reading STAT or DSTAT, the RUN bit reflects the status of the channel, as described above.

The Debug Status Register (DSTAT) is an alternate address for accessing the STAT register. Writing a value to the DSTAT register stores the value itself in the STAT register, in contrast to clearing bits as when writing to STAT. Setting a bit in DSTAT affects the associated interrupt and CHAN EN, according to the respective mask bits. The DSTAT register is provided for diagnostic purposes, and is not needed for normal DMA operation.

The Interrupt Enable Register (IEREG) is used to disable (mask) or enable (unmask) generation of an interrupt in response to conditions recorded in the STAT register. The format of this register is shown below:

| 31 | | 8 | 7 | 6 | 5 | 4 | 3 | 2 | 1 | 0 |
|---|---|---|---|---|---|---|---|---|---|---|
| Reserved | | | DMA1 DIP | DMA1 CHAN OVR | DMA1 EXT EOT | DMA1 TC | 0 | DMA0 CHAN OVR | DMA0 EXT EOT | DMA0 TC |

Figure 9-8. Interrupt Enable Control Register Format

DIP bit (DMA Interrupt priority level) can be programmed in order to specify whether the interrupt from the DMA has a low or high priority. When DIP = 0 interrupts from the DMA are in priority level 6 and when DIP = 1 the DMA priority level is 14.

Bits 8 through 31 are reserved, bit 3 is forced to 0. The other bits selectively enable a DMA interrupt to be generated in response to a value of 1 in the corresponding bit of the STAT register. A value of 1 in these IEREG register bits enables (unmasks) the corresponding interrupt, a value of 0 disables (masks) the corresponding interrupt.

Whenever the STAT register CHAN OVR bit is set to 1 in non auto-initialize mode, and this condition is also unmasked in the IEREG register, the CTL register CHANNEL ENABLE bit is forced to 0, and remains so until either the STAT register CHAN OVR bit is cleared or the corresponding IEREG bit is cleared. In this case, software cannot set the CHANNEL ENABLE bit by writing to the CTL register.

9.3.2 DMA Operation

9.3.2.1 DMA Requests and Bus Arbitration

A DMA channel is active whenever it is enabled (CTL register CHANNEL ENABLE bit is 1) and a nonzero block size is specified for it (TCC > 0). This condition is reflected in the corresponding RUN bit in the STAT register.

When the DMA detects a channel request signal on the corresponding DRQ pin, the DMA enters into a bus acquisition state and attempts to obtain control over the bus. Bus arbitration is done using a fixed priority scheme. An HOLD request has higher priority than any of the DMA channels. Among the DMA SWORDFISH ARCHITECTURE SPECIFICATION          Rev. 2.0, February 1990 channels, channel 0 has higher priority than channel 1. The Swordfish itself has lowest priority. Once the bus is granted in response to a DMA channel request, and no higher priority request is pending, the bus remains granted to the selected channel for a number of transfers according to a bus fairness mechanism and then the arbitration procedure is applied again (see "Bus Fairness" in Section 9.3.2.7).

When the bus is granted to a DMA channel, the DMA acknowledges this fact by asserting (low) the corresponding DAK signal. The selected channel assumes control over the bus and transfers the next data element from source to destination, according to the programmed transfer mode. All DMA initiated bus cycles conform to non-pipelined Swordfish data read and write sequences as specified in "System Interface" in Section 7. Refer to "DMA Bus Cycles" in Section 7.5.3.10 for more information on DMA controller system interface.

9.3.2.2 FlyBy Transfer

In flyby mode each data element is transferred using a single bus cycle without reading it into the DMA. This mode offers the fastest transfer rate, but the source and destination bus widths must be equal. One of the channel ends (source or destination) is an implied I/O device, the other end can be either an I/O device or a memory buffer. The implied I/O device is hardwired to be selected by the channel's DAK signal.

The DMA applies the other end's address to the generated bus cycle. This end is referred to as the addressed device. Since only a single address is required in flyby mode, this address is taken from the corresponding SAC counter, regardless of whether the addressed device is a source or a destination. The DMA generates a read or write bus cycle according to the state of the DIR bit in the MODE register corresponding to the channel. When the DIR bit is 0, the DMA performs a read bus cycle from the addressed device and the data is written to the implied I/O device. When the DIR bit is 1, the DMA performs a write bus cycle to the addressed device, where the data is obtained from the implied I/O device.

The number of bytes transferred is taken from the MODE register SWIDTH field. After the data element has been transferred, the DMA decrements the TCC counter by the number of bytes transferred. In case the addressed device is a memory buffer, as determined by the MODE register SMODE field, the DMA also increments the SAC counter address by the number of bytes transferred.

On FlyBy transfers the DMA may change the value of the DAC register thus its value is unpredictable until it is written by the users program.

9.3.2.3 Memory-to-Memory Transfer

In memory-to-memory transfer each data element is moved using two bus cycles, first reading the data into the DMA controller and then writing it out. This mode is slower than the flyby mode, but provides support for differing bus width between source and destination, and also for block transfers between two memory buffers. Each of the channel ends is an addressed device, and can be either an I/O device or a memory buffer. The DAK signal corresponding to the channel is asserted (low) during both bus cycles.

The first bus cycle is used to read the source using the SAC counter address. The number of bytes read is determined by the smaller value of the MODE register SWIDTH and DWIDTH fields. The second bus cycle is used to write the data out to the destination using the DAC counter address, using the same number of bytes as for the previous bus cycle.

After the data element has been transferred, the DMA decrements the TCC counter by the number of bytes transferred, which is the smaller of the two bus widths. The SAC and DAC counters are then incremented each by the number of bytes transferred, provided they are of the memory buffer type as determined by the SMODE and DMODE bits in the MODE register.

When one of the channel ends is an I/O device, it may be important to ensure that it is accessed only once for each data element of the device's bus width. In this case, the I/O device should be designed to have the smaller of the two bus widths, so that data elements are transferred using its bus width. When both ends are I/O devices with this property, it may be needed to design an external latching circuitry to prevent multiple accesses on the same data element for the larger bus width device.

9.3.2.4 Single Transfer Operation

This mode provides the simplest way to accomplish a single block transfer operation. The block transfer address and byte count should be first written by software to the corresponding SAC, DAC, and TCC counters, and the MODE register OP TYPE field be programmed to non auto-initialize mode. When the CTL register CHANNEL ENABLE bit is set to 1 and INPUT DATA VALID bit is set to 0, the channel becomes active and responds to DMA channel requests as described above.

When the TCC counter reaches 0, the transfer operation terminates. The DMA sets to 1 the STAT register TC and OVR bits, clears the STAT register RUN bit, and if OVR is unmasked, the CTL register CHANNEL ENABLE bit is cleared to 0. Software can be notified that the block transfer is complete by setting to 1 the IEREG register TC-bit or OVR-bit to unmask these conditions, thus causing a DMA interrupt to be generated when the STAT register TC-bit or OVR-bit is 1.

9.3.2.5 Double-Buffer Operation

This mode allows software to prepare the next block transfer specification while the current block transfer is in progress. The operation is initialized by first writing the block transfer address and byte count to the corresponding SAC, DAC, and TCC counters, and programming the MODE register OP TYPE field to non auto-initialize mode. When the CTL register CHANNEL ENABLE bit is set to 1, the channel becomes active and responds to DMA channel requests as described above.

While the current block transfer is in progress, the software can prepare the next transfer specification in the SAR, DAR, and TCR registers, and then indicate these values are valid by setting to 1 the CTL register INPUT DATA VALID bit.

When the TCC counter reaches 0, the DMA checks the value if the CTL register INPUT DATA VALID bit. If it is 1, the DMA automatically copies the SAR, DAR, and TCR values into the SAC, DAC, and TCC counters, respectively, clears to 0 the CTL register INPUT DATA VALID bit, and is ready for the next block transfer. Otherwise, if the CTL register INPUT DATA VALID is 0, the DMA sets to 1 the STAT register CHAN OVR bit clears the STAT register RUN bit, and if OVR is unmasked the CTL register CHANNEL ENABLE bit is cleared to 0.

When the TCC counter reaches 0, the DMA also sets to 1 the STAT register TC-bit. The STAT register TC-bit and CHAN OVR bits are sticky and have to be cleared explicitly by software. Software can be notified that one or both of the STAT register TC-bit and CHAN OVR bit are 1, by setting to 1 the IEREG register TC-bit and CHAN OVR bit, respectively, to unmask the appropriate condition, thus causing a DMA interrupt to be generated whenever it is true. Note that when both the STAT register CHAN OVR bit and IEREG register CHAN OVR bit are 1 in non auto-initialize mode, then the CTL register CHANNEL SWORDFISH ARCHITECTURE SPECIFICATION          Rev. 2.0, February 1990

ENABLE bit is forced to 0, and cannot be set to 1 by software writing to the CTL register.

9.3.2.6 Auto-Initialize Operation

This mode allows the DMA to fill continually the same buffer without software intervention, except for initializing the block transfer specification. The operation is initialized by first writing the block transfer address and byte count to the corresponding SAC, DAC, and TCC registers, programming the same values to the SAR, DAR and TCR registers, and programming the MODE register OP TYPE field to auto-initialize mode. When the CTL register CHANNEL ENABLE bit is set to 1, the channel becomes active and responds to DMA channel requests as described above.

When the TCC counter reaches 0, the DMA automatically copies the SAR, DAR, and TCR values into the SAC, DAC, and TCC counters, respectively, and applies the same block transfer specification again.

When the TCC counter reaches 0, the DMA also sets to 1 the STAT register TC-bit. This bit is sticky and has to be cleared explicitly by software. Software can be notified that the TCC has reached 0 by setting to 1 the IEREG register TC-bit to unmask this condition, thus causing a DMA interrupt to be generated when the STAT register TC-bit is 1.

9.3.2.7 Bus Fairness

In order to allow for a number back-to-back DMA transfers, a bus fairness mechanism exists. The user can program the BLOCK LENGTH field of the MODE register so the DMA will relinquish the bus for at least one cycle following a number of transfers (even when a request is pending in either one of the channels) according to the BLOCK LENGTH and the value of the TCC of the current channel.

| BLOCK LENGTH | Maximal Number of Transfers | | |
| --- | --- | --- | --- |
| | Byte Transfers | Word Transfers | Double-Word Transfers |
| 00000 | unlimited | unlimited | unlimited |
| 00001 | 1 | 1 | 1 |
| 00010 | 2 | 1 | 1 |
| 00100 | 4 | 2 | 1 |
| 01000 | 8 | 4 | 2 |
| 10000 | 16 | 8 | 4 |

TABLE 9-2. Maximal Number of Back-to-Back Transfers

9.3.2.8 End-of-Transfer

Activating the End-Of-Transfer ($\overline{EOT}$) pin at the end of a DMA data element transfer terminates DMA activity for the corresponding channel. The DMA sets to 1 the STAT register EXT EOT bit, and clears to 0 the CTL register CHANNEL ENABLE bit if EOT is unmasked. For EOT signal timing, refer to "DMA Bus Cycles" in Section 7.5.3.10.

This bit is sticky and has to be cleared explicitly by software. Software can be notified that the STAT register EXT EOT bit is 1, by setting to 1 the IEREG register EXT EOT bit to unmask this condition, thus causing a DMA interrupt to be generated whenever it is true.

SWORDFISH ARCHITECTURE SPECIFICATION          Rev. 2.0, February 1990

9.4 TIMER

The Swordfish has a powerful timer/counter block. The timer block consists of a 16-bit timer, T and two supporting registers, RA and RB. The timer block has two pins associated with it, TA and TB. The pin TA supports I/O required by the timer block, while the pin TB is an input to the timer block. The powerful and flexible timer allows the Swordfish to easily perform all timer functions with minimal software overhead. The timer block has three operating modes: Processor Independent PWM mode, External Event Counter mode, and Input Capture mode. While in PWM mode, the timer outputs a square wave on the TA pin, according to values specified in the TA and TB registers. The time base for counting is the operating frequency of the Swordfish bus (CLK). In External Event Counter, the timer performs the same function while using the TB input pin as the time base. The third mode is the Input Capture in which the timer measures the time between two trigger events on the TA and TB pins.

The control bits TC3, TC2, and TC1 allow selection of the different modes of operation. Refer to "Timer Interface" in Section 7.10 for more information on Timers system interface.

9.4.1 Timer Registers

The Timer contains 4 dedicated registers. All registers are 16-bits wide and are both readable and writable by software. Any reference to their associated memory locations is done using the bus protocol for on-chip control registers access (see "Accesses to the On-Chip Peripherals" in Section 7.5.3.11), to enable external observability. Accessing memory locations associated with these registers using other than word length, will cause unpredictable results. Upon reset the Timer clears TCNTL register.

| 15        0 |         |                           |
|-------------|---------|---------------------------|
| T           | FFFFF810 | Timer                    |
| TRA         | FFFFF814 | Timer AutoLoad Register A |
| TRB         | FFFFF818 | Timer AutoLoad Register B |
| TCNTL       | FFFFF81C | Timer Control Register    |

Figure 9-9. Timer Registers

9.4.1.1 Timer (T)

The T register is the Timer itself. This register holds the current count value. New values are loaded into this register through a Swordfish write access, or directly from TA and TB registers in modes 1 and 2.

9.4.1.2 Timer AutoLoad Register A (TA)

The TA register holds values to be loaded on Timer underflow while in mode 1 or 2. On mode 3 each time a trigger event is detected on the TA input, the timer value is copied into the TA register.

9.4.1.3 Timer AutoLoad Register B (TB)

The TB register holds values to be loaded on Timer underflow while in mode 1 or 2. On mode 3 each time a trigger event is detected on the TB input, the timer value is copied into the TB register.

9.4.1.4 Timer Control Register (TCNTL)

The control bits of the TCNTL register and their functions are summarized below:

```
|15      9|8 |7  |6  |5  |4  |3    |2   |1    |0   |
|Reserved |TP|TC3|TC2|TC1|TC0|TPNDA|TENA|TPNDB|TENB|
```

Figure 9-10. TCNTL Register

TENB    Timer Interrupt Enable Flag

TPNDB    Timer Interrupt Pending Flag

TENA    Timer Interrupt Enable Flag

TPNDA    Timer Interrupt Pending Flag

TC0    Timer Start/Stop control in modes 1 and 2 (processor independent PWM and External Event Counter), where 1 = Start, 0 = Stop Timer Underflow Interrupt Pending Flag in mode 3 (Input Capture)

TC1-TC3    Timer mode control bits.

| TC3 | TC2 | TC1 | Timer Mode | Interrupt A Source | Interrupt B Source | Timer Counts On |
|---|---|---|---|---|---|---|
| 0 | 0 | 0 | IDLE | | | |
| 0 | 0 | 1 | Mode 1 (PWM) | Autoreload RA | Autoreload RB | Tc |
| 0 | 1 | 0 | Mode 2 (External Event Counter) | Autoreload RA | Autoreload RB | TB |
| 1 | 0 | 0 | Mode 3 (capture) | TA or Timer Underflow | TB | Tc |

Programming TC1-TC3 to values other than specified above causes unpredictable results.

TP    Timer Prescaler control, Used only in modes 1 and 3. TP controls the frequency of the Timer clock (Tc). When low, the frequency of Tc is CLK/8. When TP is high, the frequency of Tc is CLK/4096.

9.4.2 Timer Operation

9.4.2.1 Processor Independent PWM Mode (Mode 1)

This mode allows the Swordfish to generate a PWM signal with very minimal user intervention. The user only has to define the parameters of the PWM signal (ON time and OFF time). Once begun, the timer block will continuously generate the PWM signal completely independent of the microprocessor. The user software services the timer block only when the PWM parameters require updating.

Figure 9-11. Timer waveform on PWM and External Event Counter Modes

In this mode the timer counts down at a fixed rate of Tc. Upon every underflow the timer is alternately reloaded with the contents of supporting registers RA and RB. The very first underflow of the timer causes the timer to reload from the register RA. Subsequent underflows cause the timer to be reloaded from the registers alternately beginning with the register RB. The underflows toggle the TA output pin. The underflows can be programmed to generate interrupts. The T Timer control bits, TC3, TC2, and TC1 set up the timer for PWM mode of operation.

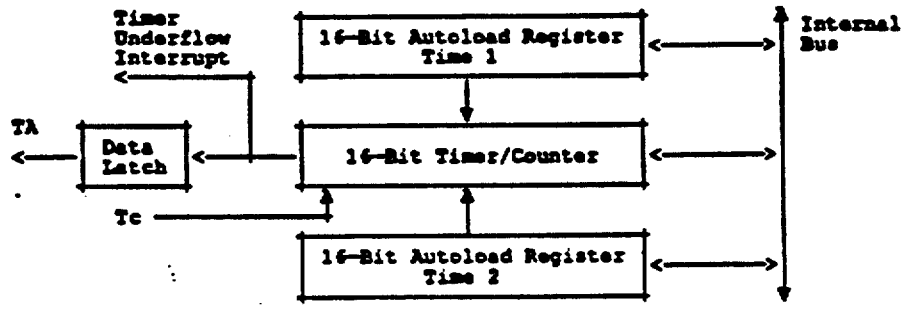

Figure 9-12. Block diagram of the timer in PWM mode operation

Underflows from the timer are alternately latched into the two pending flags, TPNDA and TPNDB. The user must reset these pending flags under software control. Two control enable flags, TENA and TENB, allow the interrupts from the timer underflow to be enabled or disabled. Setting the timer enable flag TENA will cause an interrupt when a timer underflow causes the RA to be reloaded into the timer. Setting the timer enable flag TENB will cause an interrupt when a timer underflow causes the RB to be reloaded into the timer. Resetting the timer enable flags will disable the associated interrupts.

Either or both of the timer underflow interrupts may be enabled. This gives the user the flexibility of interrupting once per PWM period on either the rising or falling edge of the PWM output. Alternatively, the user may choose to interrupt on both edges of the PWM output.

9.4.2.2 External Event Counter Mode (Mode 2)

This mode is quite similar to the processor independent PWM mode described above. The only difference is that the timer, T, is clocked by the input signal from TB pin. The timer is clocked on a rising edge from the TB pin. Note that the maximal frequency on the TB input pin is CLK/8 (see "Timer Interface" in Section 7.10 for more information).

9.4.2.3 Input Capture Mode (Mode 3)

The Swordfish can precisely measure external frequencies or time external events by placing the timer block, T in the input capture mode. In this mode, the timer T is constantly running at the fixed Tc rate. The two registers RA and RB, act as capture registers. Each register acts in conjunction with a pin. The register RA acts in conjunction with the TA pin and the register RB acts in conjunction with the TB pin. The timer value gets copied over into the register when a trigger event occurs on its corresponding pin. Trigger events are specified as a rising edge. The trigger conditions can be programmed to generate interrupts. The occurrence of the specified trigger condition on the TA and TB pins will be respectively latched into the pending flags, TPNDA and TPNDB. The control flag TENA allows the interrupt on TA to be either enabled or disabled. Setting TENA flag enables interrupts to be generated when the selected

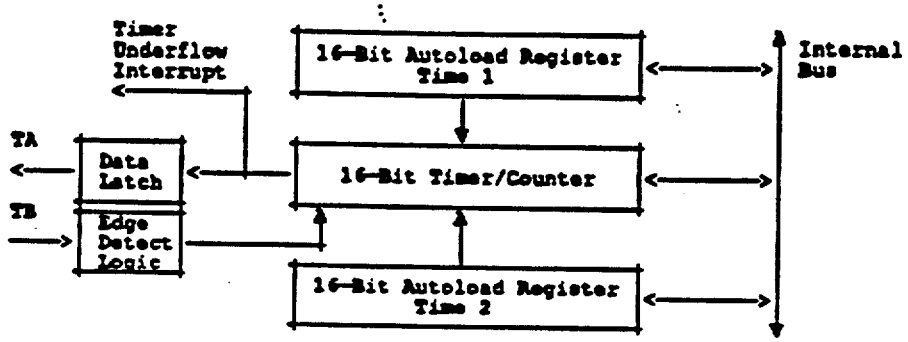

Figure 9-13. Block diagram of the timer in External Event Counter mode operation trigger condition occurs on the TA pin. Similarly, the TENB controls the interrupts from the TB pin.

Underflows from the timer can also be programmed to generate interrupts. Underflows are latched into the timer TC0 pending flag (the TC0 control bit serves as the timer underflow interrupt pending flag in the Input Capture mode). Consequently, the TC0 control bit should be reset when entering the Input Capture mode. The timer underflow interrupt is enabled with the TENA control flag. When a TA interrupt occurs in the Input Capture mode, the user must check both the TPNDA and TC0 pending flags in order to determine whether a TA input capture or a timer underflow (or both) caused the interrupt.

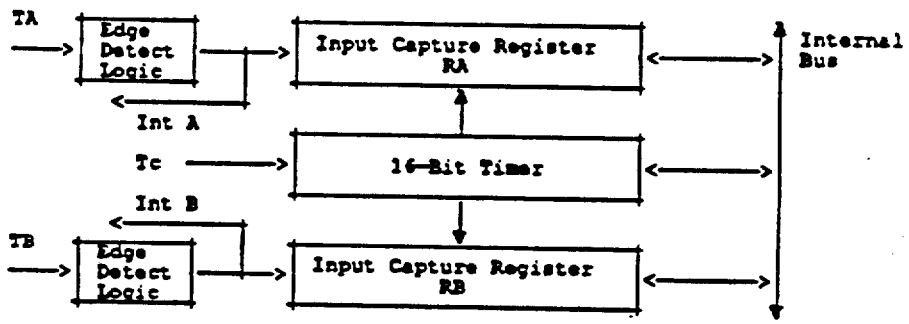

Figure 9-14. Block diagram of the timer in Input Capture mode operation

SWORDFISH ARCHITECTURE SPECIFICATION  Rev. 2.0, February 1990

A. INSTRUCTION FORMATS

This appendix contains definitions of instruction formats. Refer to "Instruction Set and Data Types" in Chapter 4 for the full encoding of each instruction. Instructions are grouped in the following tables according to the different types execution units.

Move-Type Floating-Point Instructions:

| Op-Code | Instruction | Number of Operands |
|---------|-------------|--------------------|
| 0001000 | MOVI        | 2 |
| 0001001 | LOADI       | 2 |
| 0001010 | LOADNI      | 2 |
| 0001011 | TRDF        | 2 |
| 0001100 | STORI       | 2 |
| 0001101 | TRFD        | 2 |

TABLE A-1. Move-Type Floating-Point Instruction Formats

Trap (UND) on Op-Codes 0000XXX, 000111X and 001XXXX.

Instructions Executed by the Floating-Point Unit:

| Op-Code | Instruction | Number of Operands |
|---------|-------------|--------------------|
| 0100000 | MULI   | 3 |
| 0100010 | MOVDL  | 2 |
| 0100100 | MULI   | 3 |
| 0100101 | ADDI   | 3 |
| 0100110 | MOVFL  | 2 |
| 0100111 | ROUNDI | 2 |
| 0101000 | SUBI   | 3 |
| 0101001 | DIVI   | 3 |
| 0101010 | MOVLF  | 2 |
| 0101011 | ABSI   | 2 |
| 0101100 | CMPI   | 2 |
| 0101101 | UCMPI  | 2 |
| 0101110 | NEGI   | 2 |
| 0101111 | FLOORI | 2 |
| 0110000 | MULLI  | 3 |
| 0110001 | MHHD   | 3 |
| 0110100 | MLLD   | 3 |
| 0110101 | MLHD   | 3 |
| 0110111 | TRUNCI | 2 |

TABLE A-2. Floating-Point Instruction Formats

Trap (UND) on Op-Codes 0100001, 0100011, 011001X, 0110110, and 0111XXX.

SWORDFISH ARCHITECTURE SPECIFICATION      Rev. 2.0, February 1990

Instructions Executed by the Integer Units:

| Op-Code | Instruction | Number of Operands |
|---------|-------------|--------------------|
| 1000000 | ADDi | 3 |
| 1000001 | LOADi | 2 |
| 1000010 | ADDUi | 3 |
| 1000011 | LOADNi | 2 |
| 1000100 | STORi | 2 |
| 1000110 | MOVXiD | 2 |
| 1000111 | MOVZiD | 2 |
| 1001010 | ADDCi | 3 |
| 1001011 | SUBCi | 3 |
| 1001100 | LSHi | 3 |
| 1001101 | TBIT | 2 |
| 1001110 | Scondi | 1 |
| 1001111 | ASHUi | 3 |
| 1010000 | SUBi | 3 |
| 1010001 | CMPi | 3 |
| 1010010 | SUBUi | 3 |
| 1010011 | ORi | 3 |
| 1010100 | XORi | 3 |
| 1010101 | CMPCHD | 2 |
| 1010110 | BICi | 3 |
| 1010111 | ANDi | 3 |
| 1101000 | EXCP | 1 |
| 1101001 | JUMP | 1 |
| 1101010 | Bcond | 1 |
| 1101011 | BAL | 2 |

TABLE A-3. Integer Instruction Formats

Trap (UND) on Op-Codes 1000101, 100100X, 1011XXX, 1100XXX, and 11011XX.

Special-Function Instructions:

| Op-Code | Instruction | Number of Operands | |
|---------|-------------|--------------------|--|
| 1110000 | LPR | 2 | (some forms are privileged) |
| 1110001 | MBITI | 3 | |
| 1110010 | RETX | 0 | (privileged) |
| 1110011 | SPR | 2 | (some forms are privileged) |
| 1110100 | WAIT | 0 | |
| 1110101 | EOI | 0 | |
| 1110110 | CINV | 0 | (privileged) |

TABLE A-4. Special-Function Instruction Formats

Trap (UND) on Op-Codes 1110111, and 1111XXX

SWORDFISH ARCHITECTURE SPECIFICATION      Rev. 2.0, February 1990

B.

This section was left intentionally blank

C. PERFORMANCE EVALUATION

This appendix contains information on Swordfish instruction execution timing. Because of the highly-pipelined and parallel organization of this microprocessor and the existence of on-chip caches, it is not possible to determine execution times using only a set of tables for instructions and addressing modes. Therefore, the following sections present a model of the Swordfish internal organization in sufficient detail to allow timing calculations when executing a particular code segment. Refer to the "Introduction" in Chapter 1 for an overview of considerations which led to the Swordfish design decisions, and to "Instruction Set and Data Types" in Chapter 4 for a detailed description of the Swordfish Performance-Critical instructions.

Under optimal conditions the Swordfish delivers a peak performance of 2 instructions/cycle. At 50 MHz this corresponds to 100 Million Instructions Per Second (MIPS). However, under typical workload conditions various unavoidable delays arise, such as cache misses or synchronization delays due to pipe interlocks and resource contentions. The Swordfish contains the necessary hardware to detect and resolve any of the inter-stage or inter-pipe hazards, and does not have to rely on a compiler to ensure that the code is reorganized for correct execution. National Semiconductor CTP optimizing compilers automatically reorder their generated code so that these delays are minimized.

When evaluating the performance of a specific code segment, we use the following definitions:

1. Instruction Latency: The number of cycles that pass between the time the instruction enters the pipe, until a result is written to the register file, or can be used by another instruction.

2. Instruction Throughput: The number of instructions that can enter the pipe in a certain number of cycles.

3. Program Execution time: The number of cycles that pass from the time that the first instruction execution begun, until the last instruction left the pipe. The Program Execution time is dependent of the Instructions Latency and Throughput.

C.1 PIPELINE ORGANIZATION

Every Instruction executed by the Swordfish goes through a series of stages in a pipelined manner. There is a dual-pipe consisting of two Integer Pipes, referred to as pipe-A and pipe-B, which are able to work in parallel on instruction-pairs. Pipe-A and pipe-B are not identical, the instructions that can be executed in pipe-A are subset of those that can be executed in pipe-B. In addition, there is a dedicated Floating-Point pipe, referred to as the FP-pipe, which handles floating-point operations and is described more fully in "Floating-Point Pipe Organization" in Section C.4.

Instruction fetching is handled by an Instruction Loader (IL). After the fetch the instructions are stored decoded in an Instruction Cache. The Integer dual-pipe receives decoded instruction-pairs for execution. An instruction-pair consists of two slots: A and B. The instruction in slot-A is scheduled for pipe-A, the one in slot-B is scheduled for pipe-B. Two instructions belonging to the same pair advance at the same time from one stage to the next, except the case when the instruction in slot-B is delayed in the ID stage. In this case (stall ID-B, see below), the instruction in pipe-A can advance to the following pipe stages. Note that new instructions cannot enter the pipe until the ID-stage (A and B) is free. Although the pipe-A and pipe-B instructions are executed in parallel (except the stall ID-B case), the slot-A instruction always logically precedes the corresponding slot-B instruction, and if the slot-A instruction cannot be completed due to an exception then the corresponding slot-B instruction is discarded.

SWORDFISH ARCHITECTURE SPECIFICATION          Rev. 2.0, February 1990

The Integer dual-pipe consists of the following four stages:

1. ID   Instruction Decode stage
2. EX   Execute stage
3. ME   Memory access stage
4. ST   Store result stage

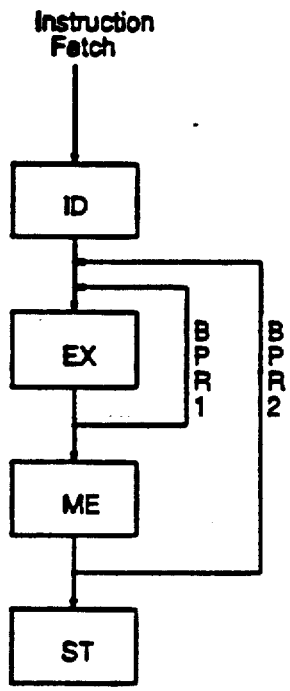

Figure C-1. Integer Pipe Structure

Figure C-1 shows the structure of a single integer pipe. An instruction is fed into the ID-stage of the pipe for which it is scheduled, where its decoding is completed and register source operands are read. In the EX-stage, the Arithmetic/Logical Unit (ALU) is activated to compute the instruction's result or compute the effective memory address for Load/Store instructions. In the ME-stage, the Data Cache is accessed by Load/Store instructions, and exception conditions are checked. In the ST-stage, results are written to the Register-File, or to the Data Cache in case of a Store instruction, and PSR flags are updated. At this stage the instruction can no longer be undone. The above pipe flow imposes instructions latency of 3 cycles. Results from the EX-stage and ME-stage can be fed back to the ID-stage, thus enabling instruction latency of 1-2 cycles in most cases, refer to "Bypass Registers Mechanism" in Section C.3.2.1 and "Load Delays" in Section C.3.2.2 for details.

In the absence of any delays, the Swordfish dual-pipe accepts a new instruction-pair every clock cycle (i.e. peak throughput of 2 instructions/cycle), and scrolls all other instructions down one stage along the pipe. The dual-pipe includes a global stalling mechanism by which any functional unit can stall the pipe if it detects a hazard condition. There are four types of stalls : an ID-stall, an ID-B stall, an EX-stall, and an

SWORDFISH ARCHITECTURE SPECIFICATION   Rev. 2.0, February 1990

ME-stall. Each stalls the corresponding stage and all stages preceding it for one more cycle. When a stage stalls it keeps the instruction currently residing in it for another cycle, and then restarts all stage activities exactly as in the non-stalled case.

The following sections contain description of most of the delays that can appear during a certain program execution. All this delays must be taken into account when evaluating the program's performance.

C.1.1 Instruction Pairing

The first step in calculating execution timing is to find out on which pipe each instruction will be executed. This is determined at run-time by the Instruction Loader (IL) when instructions are fetched from off-chip memory.

The IL decodes prefetched instructions, tries to pack them into pair entries, and presents them to the dual-pipe. If the Instruction Cache is enabled cacheable instructions (see "Instruction Cache Misses" in Section C.5.2 ) can be stored in the Instruction Cache (IC). In this case an entry containing an instruction pair or a single instruction is sent also to the IC and stored there as single cache entry. Upon IC hits, stored pairs are retrieved from the IC and presented to the dual-pipe for execution.

The IL attempts to pack instructions into pairs whenever possible. The packing of two instructions into one entry is possible only if the first one can be executed by pipe-A, and both of them are not too long (see below). If it is impossible to pack two instruction into a pair, then a single instruction is placed in slot-B. Two instructions can be paired only when all the following conditions hold:

- Both of them are Performance-Critical Core Instructions (see "Swordfish Architecture Partitioning" in Section 4.1 )
- The first instruction is executable by pipe-A (see below)
- Disp and Immediate fields in both instructions use short-encoding (short encoding for all instructions except Branchs is 11 bits, and 17 bits for Bcond and BAL).

Note:

Since the Swordfish instruction are double word aligned, the Branch displacement is actually 19 bits long. The two least significant bits are always zero, and hence are omitted.

Several instructions are restricted to run on pipe-B only. For example, because instruction-pairs in the IC are tagged by the slot-A address, it is not useful to put a branch instruction in slot-A since the corresponding slot-B instruction won't be accessible. Similarly, since there is a single arithmetic floating-point pipe, it is not possible to execute two arithmetic floating-point instructions (see "Floating-Point Pipe Organization" in Chapter C.4 ) in parallel. Restricting these instructions to a fixed pipe makes it possible to simplify considerably the dual-pipe data-path design, without hurting performance.

Following is the list of instructions that are executable by pipe-B only:

| | |
|---|---|
| Control instructions: | Bcond, BAL, BR, JUMP, EXCP. |
| Integer instructions: | MULI, MULUI, MHHD, MLHD, MLLD. |
| Floating-point instructions: | ABSI, ABSUI, ADDI, ADDUI, CMPI, CMPUI , DIVI, DIVUI, FLOORI, FLOORUI, MOVDL, MOVUDL, MOVFL, MOVUFL, MOVLF, MOVULF, MULI, MULUI, NEGI, NEGUI, ROUNDI, ROUNDUI, SUBI, SUBUI, TRUNCI, TRUNCUI, UCMPI, UCMPUI. |

SWORDFISH ARCHITECTURE SPECIFICATION   Rev. 2.0, February 1990

Special Function Instructions: CINV, EOI, LPR, MBITI, RETX, SPR, WAIT.

Pipe-B can execute any instruction. All other Performance-Critical instructions are also executable by pipe-A.

The IL starts instruction pairing upon an IC miss, in which case it begins prefetching instructions into an instruction queue. In parallel, the IL examines the next instruction not yet removed from the instruction queue, and tries to pack it according to the pairing algorithm below.

INSTRUCTION PAIRING ALGORITHM:

1. Try to fit next instruction into slot-A

1.1 If next instruction is not Performance-Critical (see "Swordfish Architecture Partitioning" in Section 4.1), then goto step 5.

1.2 Remove next instruction from the instruction queue and place it tentatively in slot-A.

1.3 If the instruction is illegal for pipe-A, OR
    the instruction has an immediate/displacement field that can't be represented in 11 bits, OR
    the instruction is not quad-word aligned,
    then goto step 4.

1.4 Otherwise, continue step 2.

2. Try to fit next instruction into slot-B

2.1 If next instruction is not Performance-Critical, OR
    next instruction has an encoded immediate/displacement field longer than 11 bits, OR
    next instruction is a branch with displacement longer than 17 bits then goto step 4.

2.2 Otherwise, remove next instruction from instruction queue, place it in slot-B, and goto step 3.

3. Construct an instruction pair entry

In this case, both slots contain valid instructions and all pairing conditions are satisfied. Issue a pair entry and goto step 1.

4. Construct a single instruction entry

In this case, slot-A contains an instruction which cannot be paired. Move this instruction to slot-B. If this instruction contains an immediate/displacement field longer than 17 bits, or it is a branch with displacement longer than 17 bit, and is not Quad-word aligned, replace it with UNDefined. Issue the entry and goto step 1.

5. Handle non Performance-Critical instructions

Remove next instruction from instruction queue, and send it to the Instruction Emulator (IE). Refer to "Instruction Emulation" in Section C.6 for more information. When finished with this instruction, goto step 1.

Note:

In order to synchronize with the pairing algorithm when analyzing a piece of code, note that branch target addresses always refer to the slot-A instruction in a pair. As a result, the pairing algorithm is always in step (1) above when examining a branch target instruction. If a branch is executed to an instruction in slot-B of an entry currently in the IC, it is possible that two copies of this instruction will be found later in the IC, in slot-A of the new entry and in slot-B of SWORDFISH ARCHITECTURE SPECIFICATION         Rev. 2.0, February 1990 the old entry.

The pairing algorithm above packs two instructions whenever they can be held in a single IC entry. However, these instructions may happen to be dependent, in which case they cannot be executed in parallel. Those dependencies are detected by the EP and the FP.

C.2 Execution Pipe Sequentialization

The EP is responsible for analyzing each pair for inter-pipe dependencies. A dependent pair is marked as "sequential", and its slot-B instruction is delayed for 1 cycle after its slot-A instruction by the dual-pipe logic. The first step taken by the EP in the ID stage is to examine each full pair and determine whether there is a potential dependency or contention between the two instructions in the pair, which prevents them from being executed in parallel. ( Sequentialization is also identified by the FP, but in slightly different conditions. See "Floating-Point Pipe Organization" in Section C.4 )

The EP recognizes an instruction-pair as "sequential" in the following cases :

- Slot-B contains one of: ADDCi, LOADi, LOADNi, LOADNUi, LOADUi, MOVi, MOVUi, Scondi, STORi, STORUi, STORi, SUBCi, TRDF, TRUDF, TRFD, TRUFD
- A register to be written by the slot-A instruction is also to be read by the slot-B instruction
- A register to be written by the slot-A instruction is also to be written by the slot-B instruction A sequential pair is treated by the dual-pipe as two consecutive pairs: (A, IDLE) and (IDLE, B), where A and B are the instructions in slots A and B, respectively, in the original pair. Because of the dual-pipe internal organization the slot-B instruction will be executed 1 cycle after the slot-A instruction, thus ensuring that inter-pipe dependency constraints are not violated. This delay should be accounted for when calculating execution timing.

EXAMPLE: The following code:

```
LOADD   0(R1),R2
SUBD    R3,R4,R0
ORD     R1,$(0),R3
ADDF    F1,F2,F2
SUBF    F3,F4,F5
ORD     R0,$(0),R5
ADDD    R5,R6,R7
ADDD    R1,R2,R3
ADDCD   R4,R7,R7
```

Will be paired and executed as:

| cycle | ID-stage (pipe-A) | | ID-stage (pipe-B) | | Comments |
|---|---|---|---|---|---|
| n:   | LOADD | 0(R1),R2    | SUBD  | R3,R4,R0   | # Executed in parallel |
| n+1: | ORD   | R1,$(0),R3  | ADDF  | F1,F2,F2   | # Executed in parallel |
| n+2: | (idle) |            | SUBF  | F3,F4,F5   | # Pipe-B restriction |
| n+3: | ORD   | R0,$(0),R5  | (idle) |           | # Sequential pair because of R5 |
| n+4: | (idle) |            | ADDD  | R5,R6,R7   | # - " - |
| n+5: | ADDD  | R1,R2,R3    | (idle) |           | # Sequential pair because of |
| n+6: | (idle) |            | ADDCD | R4,R7,R7   | #  the ADDC instruction |

SWORDFISH ARCHITECTURE SPECIFICATION        Rev. 2.0, February 1990

C.3 INTEGER PIPE STALLS

The marking of "sequential" instruction-pairs described above eliminates all sources of inter-pipe dependencies and resource contentions. However, dependencies and contentions may still arise between instructions in different stages.

C.3.1 Control Dependencies

A control dependency occurs when the address of the next instruction-pair to be fetched into the ID-stage depends on a currently executed instruction. There are two sources for control dependencies: Branches and Jumps.

Unconditional branches (BR and BAL instructions), and conditional branches (Bcond instruction) which are "taken", do not cause any delay. This is possible since the branch target address is calculated by the IL at load-time and is stored in the IC as part of the decoded instruction, i.e. the IL tries to predict the condition code status before execution. It always predicts that the condition will be true, thus the IC always attempts to fetch the next instruction-pair following a branch from this target address.

A delay does occur when a conditional branch is "not-taken". In this case the IC branch prediction is wrong, and the next instruction-pair should come from the sequential address following the Bcond instruction's address. The direction of a conditional branch is known only when the Bcond instruction is in the EX-stage. In case of a "not-taken" branch, the instruction-pair already in the ID-stage is discarded, and an additional cycle is spent on probing the IC for the instruction-pair following the Bcond instruction's address. In case of an IC hit, the overall delay for a "not-taken" Bcond instruction is 2 cycles.

When a Bcond instruction is paired with a slot-A Compare instruction (or any other instruction which modifies PSR flags), the pair can still be executed in parallel and is not marked "sequential" by the IL. This is possible due to special bypassing logic, which enables the PSR flags to be set by pipe-A and then examined by pipe-B in the same cycle. Similarly, when the Bcond instruction is executed 1 cycle after an instruction that modifies the PSR (except CMPI, CMPUI, UCMPI, UCMPUI), then the modified PSR value is available to the Bcond with no delay. The CMPI, CMPUI, UCMPI and UCMPUI instructions require 2 cycles to get a result, so in this case a following Bcond must stall for 1 cycle at the ID-stage.

The JUMP instruction introduces a control dependency since the jump target address is known only in the ID-stage after the instruction reads its register source operand. Once the register operand is read, the JUMP instruction is scrolled to the EX-stage and the dual-pipe passes the jump target address to the IC. No new instruction-pair can enter the ID-stage in that cycle since the IC is being probed for a hit on this address. In case of an IC hit, the new instruction-pair enters the ID-stage on the following cycle. The overall delay in this case is 1 cycle.

C.3.2 Data Dependencies

A data dependency occurs when the result of one instruction is used as a source operand in a subsequent instruction. Most of these cases are handled by a special bypass mechanism. This mechanism and the cases for which it is not applicable are described below.

C.3.2.1 Bypass Registers Mechanism

Since source operands are read at the ID-stage and result operands are written only at the ST-stage, a data dependency exists when an instruction in the ID-stage needs to read a register that is to be written by a previous instruction currently in the EX-stage or ME-stage.

The Swordfish dual-pipe contains a special bypass mechanism to eliminate most forms of these data dependencies. Each of the two pipes includes two bypass registers for holding temporary results, referred to as BPR1 and BPR2. In each cycle, the result to be stored in the ST-stage is taken from the BPR2 register, then BPR2 is loaded from the BPR1 register, and then BPR1 is loaded from the EX-stage result (see Figure C-1).

The dual-pipe maintains a table of the register number currently valid in each of the four bypass registers. When an instruction in the ID-stage needs to read a register source operand, this table is checked and if the register is valid in one of the bypass registers, and at greater or equal operand size, then the logically latest copy is used. Otherwise, the Register-File is read. The bypass registers mechanism reduces most instructions latency to one cycle.

EXAMPLE:

| cycle | ID-stage | | Comments |
|---|---|---|---|
| n: | LSHW | 1, R1, R3 | # Modify R3 at cycle n+1 |
| n+1: | XORD | R7, R2, R4 | # Modify R4 at cycle n+2 |
| n+2: | ADDW | R3, R4, R5 | # No delay, R3 is bypassed from BPR2 and R4 from BPR1 |

Instruction that return data at ST-stage, for example Floating point instructions, that return integer results, and integer instructions that are executed in the Floating Point Unit, do not write to the bypass registers.

The following instructions return data at the ST-stage : FLOORI, FLOORUI, MULI, MULUI, MHHD, MLHD, MLLD, ROUNDI, ROUNDUI, TRUNCI, TRUNCUI, TRFD and TRUFD.

C.3.2.2 Load Delays

The bypass registers mechanism is not applicable when using the Load instructions to load a register from memory. In these instructions, the EX-stage is used to calculate the memory effective address, and the Data Cache (DC) access is done only a cycle later in the ME-stage.

When a Load instruction is in the ID-stage, the destination register is marked "invalid" as part of the stage activities. Every instruction in the ID-stage first checks whether all its register operands are "valid" before searching the bypass register table. If one of these register is still "invalid" the instruction stalls at the ID-stage until all its operands become valid.

Assuming a DC hit, the data is available when the Load instruction is in the ME-stage. The data is fed back to the ID-stage DC bypass register and is available immediately for instructions that may be waiting for it. Thus the Load delay in case of a DC hit is 1 cycles. When the data is stored to the Register-File, the stored register is also marked "valid" again. Part of the instructions don't use the load bypass register, and they have to wait until ST-stage of the load instruction.

Therefore, when an instruction accesses a recently loaded register and the data is located in the DC, the instruction stalls in the ID-stage until the Load instruction reaches the ME-stage, in case it uses the DC bypass register. Otherwise it stalls one additional cycle before the data is available in the register file. The DC miss case is covered in "Data Cache Misses and Load-Scheduling" in Section C.5.1.

SWORDFISH ARCHITECTURE SPECIFICATION     Rev. 2.0, February 1990

The following instruction do not use the DC bypass mechanism. Those instructions wait until the register is available in the register file, i.e. until the load arrives at the ST-stage: JUMP, MHHD, MLHD, MLLD, MOVDL, MOVUDL, MULI, and MULUI.

EXAMPLE:

| cycle | ID-stage | | Comments |
|---|---|---|---|
| n: | LOADD | 4(R3),R7 | # Load operation, assuming DC hit, R7 is valid in cycle n+2 |
| n+1: | ADDD | R7,R8,R0 | # R7 used, will stall at ID-stage for 1 cycle |
| m: | LOADD | 8(R6),R9 | # Load operation, assuming DC hit R9 is valid in the register file in cycle m+3 |
| m+1: | MLLD | R9,R8,R7 | # R9 used, will stall at ID-stage for 2 cycles |

C.3.2.3 Operand Size Dependency

The bypass registers mechanism is not applicable if only part of a register is modified, as in the case of a word or byte instruction. The EX-stage result stored in the BPR1 register and moved to BPR2 in ME_stage is valid only to length equal or smaller than that specified in the instruction. This length is recorded in the bypass register table along with the register number valid in each of the bypass registers.

When an instruction in the ID-stage needs a source operand, and the required length is greater than the length valid in its copy in a bypass register, the instruction stalls at the ID-stage until the register is actually written to the Register-File from the BPR2 bypass register.

EXAMPLE:

| cycle | ID-stage | | Comments |
|---|---|---|---|
| n: | ADDB | R1,R3,R2 | # Modify lower byte of R2, rest of R2 is valid in cycle n+3 |
| n+1: | ORW | R2,8(0),R4 | # Use lower word of R2, stalls at ID-stage for 2 cycles |

C.3.3 Read-After-Write Delay

When a Load operation immediately follows a Store operation, and the DC is enabled, a contention on the DC occurs, referred to as "Read-After-Write" delay.

This delay occurs because a Store operation occupies the Data Cache (DC) for 2 cycles: one in the ME-stage for probing it, and one in the ST-stage for writing into it in case of a hit. On the other hand, a Load operation occupies the DC for only 1 cycle in the ME-stage, where the DC is both probed and read in parallel. Therefore, when a Load instruction executes 1 cycle after a Store instruction that encounters a DC hit, there is a contention on the DC and the Load must stall at the EX-stage for 1 cycle. Note that Store immediately following Store or Load cause no delay.

EXAMPLE:

| cycle | ID-stage | | Comments |
|---|---|---|---|
| n: | STORD | R0,8(R1) | # Store operation, will use DC in cycles n+2 and n+3 |
| n+1: | LOADD | 4(R3),R7 | # Load operations, will stall at ME-stage in cycle n+3 |

C.4 FLOATING-POINT PIPE ORGANIZATION

The Swordfish floating point instructions are divided into two groups:

SWORDFISH ARCHITECTURE SPECIFICATION  Rev. 2.0, February 1990

Move-type instructions : MOVI, MOVUI, TRDF, TRUDF, TRFD, TRUFD, LOADI, LOADNI, LOADUI, LOADNUI STORI and STORUI.

Arithmetic instructions : ADDI, ADDUI, ABSI, ABSUI, CMPI, CMPUI, DIVI, DIVUI, FLOORI, FLOORUI, MOVDL, MOVUDL, MOVFL, MOVUFL, MOVLF, MOVULF, MULI, MULUI, NEGI, NEGUI, ROUNDI, ROUNDUI, SUBI, SUBUI, TRUNCI, TRUNCUI, UCMPI and UCMPUI.

Arithmetic Floating-point instructions are restricted to pipe-B only, as described in "Instruction Pairing" in Section C.1.1. These instructions may still get paired with other instructions that are executable by pipe-A. From the dual-pipe viewpoint, an arithmetic floating-point instruction executes in slot-B and advances through pipe-B stages. However, actual computations are done by a separate pipeline (the FP-pipe), which advances together with the dual integer pipe in. The MULI, MLLD, MLHD, and MHHD instructions, use the FP-resources (refer to "Floating-Point Resource Contentions" in Section C.4.3 ) although they advance through the integer pipe stages.

The FP-pipe consists of five stages:

1. FID   Instruction Decode stage
2. FX1   Execute first stage
3. FX2   Execute second stage
4. FRN   Round and Normalize stage
5. FSF   Store result stage The FP-pipe includes several functional units (FP-pipe resources) that may be activated in parallel by different floating-point operations The FP-pipe resources are :

- FS   Floating-point Sum and Divide unit
- FA   Floating-point Array Multiplier unit
- FR   Round and Normalize unit Figure C-2 shows the structure of the FP-pipe. The FX1 and FX2 stages can be be overlapped, in certain conditions, by instructions using different FP-pipe resources. For example, the ADDI and MULI instructions execution can be overlapped since the first uses the FP-Sum resource, while the second uses the FP-Array Multiplier resource. Refer to "Floating-Point Resource Contentions" in Section C.4.3 for more information.

Every slot-B instruction in the ID-stage is fed also to the FID-stage in the FP-pipe. If it's a floating-point instruction, then it is handled by both the FP-pipe and pipe-B. In this case, the FID-stage is also responsible for reading floating-point register source operands. Floating-point arithmetic operations require at least 2 cycles to compute a result. The first cycle is done in the FX1-stage. The second cycle is done in the FX2-stage. Once the result is ready, the instruction moves to the FRN-stage for rounding and normalization for 1 or more cycles, depending on the data. In the FSF-stage, results are written to the floating-point Register-File. At this point the instruction can no longer be undone. Move-type floating point instruction pass through the integer pipe stages.

SWORDFISH ARCHITECTURE SPECIFICATION  Rev. 2.0, February 1990

Figure C-2. Floating-Point Pipe Structure

SWORDFISH ARCHITECTURE SPECIFICATION　　　　Rev. 2.0, February 1990

There are two types of correspondences between the FP-pipe stages, and the integer pipe stages. The first one applies when a FP-trap is impossible (see "Floating-Point No-Trap and Early-Completion Conditions" in Section C.4.4 ), and the second applies when a FP-trap is likely to occur, or the result should be transferred to the EP register file.

If the first case occurs the instruction in pipe-A can proceed independently of the pipe-B instruction, and the mapping is shown in Table C-1.

| Integer pipe stage | FP-pipe stage |
|---|---|
| ID | FID |
| EX | FX1 |
| ME | FX2 |
| ST | FRN |
|  | FSF |

TABLE C-1. Floating point and Dual Pipe Correspondence in case of No-Trap

In the second case, when a FP-trap is possible the pipe-A instruction is stalled until the arithmetic FP-instruction finishes its FX2-stage, the correspondence in this case is shown in Table C-2.

| Integer pipe stage | FP-pipe stage |
|---|---|
| ID | FID |
| EX | FX1 |
| ME | FX2 |
| ME | FRN |
| ST | FSF |

TABLE C-2. Floating point and Dual Pipe Correspondence in case of Possible Trap The FP-pipe includes an "No-Trap" logic to detect as early as possible cases in which it is certain that no FP-trap can occur for the given instruction and data (Refer to "Floating-Point No-Trap and Early-Completion Conditions" in Section C.4.4 for the details). These cases occur for most floating-point operations and can always be forced by proper disabling of the floating-point traps as determined by FSR control bits. Refer to "Floating-Point Exceptional Conditions" in Section 4.2.4.1 for full information.

When a "No-Trap" case is detected, the FP-pipe doesn't generate ME-stall and disengages the dual-pipe to accept new instructions. The instruction still needs to pass through the remaining FP-pipe stages until completion (for most instructions only FRN is left, but the DIVf and DIVUf instructions require additional cycles to compute their results and they spend them in FX2-stage), but it may only stall subsequent floating-point instructions that contend with it over the same FP-pipe resources. Refer to "Floating-Point Resource Contentions" in Section C.4.3 for details.

The FP-pipe has "early-completion" logic that identifies the cases when there is a potential FP-exception, but it is not certain.

C.4.1 Floating-Point Bypass Mechanism

The FP-pipe includes three bypasses , two arithmetic type bypasses, and a move-type bypass (see Figure C-2). In the FP-pipe, a register is read from the bypass only if the operand length is equal to the bypass length. The move-type floating point instructions write to the first arithmetic bypass, and the arithmetic floating point instructions write to the second arithmetic bypass, and to the move-type bypass.

SWORDFISH ARCHITECTURE SPECIFICATION          Rev. 2.0, February 1990

Data is written to the bypasses according to the following rules :

- LOADI, LOADNI, LOADNUI, LOADUI, TRDF and TRUDF write to the first arithmetic bypass in the ME-stage (note that the move-type instructions pass through the integer pipe stages).
- Load Scheduling writes the data to the arithmetic bypass when it returns, one cycle before it is written into the FP-register file.
- Arithmetic Floating-Point Instructions write to the second arithmetic bypass from the FRN-stage back to the FID-stage (see Figure C-2). Those instructions also write the result from the FRN-stage to the move-type bypass.

Data is read from the bypasses according to the following rules :

- The arithmetic floating point instructions read from both arithmetic bypasses during FID stage. Therefore, the result of a floating point move-type instruction in ME-stage can be read by a floating point arithmetic instruction currently in the FID stage, and the result of a floating point arithmetic instruction in FRN stage, can be read by a floating point arithmetic instruction in FID stage, parallel to the FRN-stage.
- A returned result from the Load Scheduling, can be read by an arithmetic instruction in the FID stage in the same cycle.
- The Floating-Point move-type instructions STORf, STORUf, TRFD and TRUFD read from the move-type bypass during the EX-stage. Therefore the result of a floating point arithmetic instruction in FRN-stage can be read by a move type instruction in EX-stage, parallel to the FRN stage.

EXAMPLE:

| cycle | ID-stage (pipe-A) | | ID-stage (pipe-B) | | Comments |
|---|---|---|---|---|---|
| n: | LOADL | 0(R0),L0 | (idle) | | # L0 will be ready at n+2 |
| | | | | | # in the first arithmetic bypass |
| n+1: | TRDF | R5,F5 | (idle) | | # F5 will be ready at n+3 |
| | | | | | # in the first arithmetic bypass |
| n+2: | (idle) | | ADDL | L0,L4,L2 | # L2 will be ready in n+5 in the move bypass |
| | | | | | # and in the second arithmetic bypasses |
| n+3: | MOVF | F5,F7 | (idle) | | # No stall - F5 is valid in the register file |
| | | | | | # in time for the EX stage |
| n+4: | TRFD | F7,R5 | (idle) | | # Will stall 2 cycles in EX since F7 |
| | | | | | # is not in the move bypass |

C.4.2 Floating-Point Data Dependencies

The FP detects dependencies between two instructions in the same entry. In this case the instruction in slot-A should be move-type, and the one in slot-B arithmetic type (see "Instruction Pairing" in Section C.1.1 ) A pair of floating-point instructions is marked "sequential" if :

- The number of the register to be written by the slot-A instruction and that to be read by the slot-B instruction are either equal, or equal in all bits except the least significant one.
- The number of the register to be written by the slot-A instruction and that to be written by the slot-B instruction are equal in all bits except the least significant one.

An operand size dependency occurs when an instruction uses a double-precision source operand, and a previous instruction modifies part of it as a single-precision destination operand, or vice-versa. In this case the bypass is not used, and an additional cycle is required to write the single-precision (double-precision) operand to the floating-point Register-File.

In addition the FP identifies a "Destination to Destination interlock" between move type and arithmetic type. When a move-type instruction is in EX stage, its destination register is compared with the destination registers of the arithmetic instructions in FX2 and FRN stages. If the destinations are equal then that move-type instruction is stalled in EX until the arithmetic instruction leaves the pipe. In a similar way, the destination register of an arithmetic type instruction in stage FX1 is compared with the destination register of move-type instruction in ME stage, and the arithmetic type instruction is stalled until the move-type instruction leaves the pipe.

destination register of an arithmetic instruction in FX1, or of a move-type instruction in EX is equal to a register that is about to return from Load Scheduling. In this case the move-type instruction is stalled in stage EX, and the arithmetic in stage FX1.

EXAMPLE:

| cycle | ID-stage | | Comments |
|-------|----------|--|----------|
| n:    | ADDF  | F0,F1,F2 | # F2 will be ready at n+3, L2 will be ready at n+4 |
| n+1:  | SUBL  | L2,L4,L4 | # L2 used, stalls at ID-stage for 3 cycles |
|       |       |          |   |
| m:    | ADDF  | F0,F1,F2 | # F2 will be ready at m+4 in the register file |
| m+1:  | MOVF  | F3,F2    | # Will be stalled in EX until cycle m+4 |

| cycle | ID-stage (pipe-A) | ID-stage (pipe-B) | Comments |
|-------|-------------------|-------------------|----------|
| n:    | MOVF  F1,F4       | (idle)            | # Sequential due to interlock |
| n+1:  | (idle)            | SUBF  F6,F7,F5    | # between F5 and F4 |

C.4.3 Floating-Point Resource Contentions

The FP-pipe resources may be activated in parallel by different floating-point operations in different stages. Whenever contention occurs over any of these resources, the stage with the more recent instruction is stalled until the preceding instruction finishes with the resource. The stall is done in the stage before the one that needs the resource. Note that only one instruction can reside in one FP-pipe stage.

The FS has two parts, corresponding to FX1 and FX2. The following instructions occupy each of the FS parts for 1 cycle : ADDI, ADDUI, ABSI, ABSUI, CMPI, CMPUI, MOVFL, MOVUFL, MOVLF, MOVULF, MOVDL, MOVUDL, NEGI, NEGUI, SUBI, SUBUI, TRUNCI, TRUNCUI, FLOORI, FLOORUI, ROUNDI, ROUNDUI, UCMPI, UCMPUI.

Instructions that use FS for 1 cycle in each part, has throughput of 1 instruction/cycle. The first one resides in FS in the part that corresponds to FX1, and the second in the part that corresponds to FX2 (assuming they don't delay due to other reasons, FR contention for example - see below).

The FP-Array Multiplier has two parts, one for FX1 and one for FX2. The integer multiply instructions MULI, MULUI, MHHD, MLHD, MLLD occupy each part for one cycle. The MULI and MULUI instructions occupy the FP-Array Multiplier for 2 cycles (in FX1 and FX2 stages). Therefore the integer multiply instructions have a throughput of one instruction/cycle, while the MULI instruction has a throughput of instruction / 2 cycles. A throughput of 1 FP instruction/cycle can be achieved when MULI and instruction that don't use the FA (for example ADDI instructions) are interleaved. This way the MULI instructions use the FA, and the other instructions (not MULI) use the FS, in FX1 and FX2 stages.

SWORDFISH ARCHITECTURE SPECIFICATION          Rev. 2.0, February 1990

DIVI and DIVUI instructions occupy both parts of the FS resource for 16 cycles (single-precision operands) or 31 cycles (double-precision operands). All cycles except the first are done in the FX2-stage. MULI instruction following the DIVI can proceed as far as the FX1 stage, and be stalled there. The mapping between the Dual-pipe and the FP-pipe used if "No-Trap" condition is identified is the one shown in Table C-1, thus integer instructions that start execution after the DIVI instruction, might pass it. MULI, MULUI, MLLD, MHHD, MHLD are internally mapped to the FP-pipe stages, which means they can't overtake a DIVI.

All arithmetic floating point instruction except the integer multiply instructions (that pass through the integer pipe stages) spend at least one cycle in the FRN-stage. If "Early-Completion" is not detected, then the instruction will spend two cycles in the FRN-stage. In floating point operations that require more than one rounding cycle, a contention on the FRN might occur, that will stall the instruction in stage FX2.

EXAMPLE:

| cycle | ID-stage |  | Comments |
|---|---|---|---|
| n: | MULL | L0,L4,L10 | # FA will be used for next 2 cycles |
| n+1: | MULL | L2,L6,L8 | # FA contention, stall at FID for 1 cycle |
| l: | MULD | R3,R4,R5 | # FA FX1 part used at l+1, FX2 part at l+2. |
| l+1: | MULF | F6,F7,F8 | # FA Contention, stall at FID for 1 cycle |
| l+2: |  |  | # FA both parts used at l+3,l+4. |
| l+3: | ADDF | F0,F2,F1 | # FS part FX1 used at l+4, FX2 part at l+5. |
| l+4: | ADDF | F3,F4,F5 | # FS part FX1 used at l+5, FX2 part at l+6. |
| m: | MULL | L0,L2,L4 | # FA is used at m+1, m+2 (both parts). |
| m+1: | ADDF | F10,L11,L12 | # FS is used at m+2, m+3 (one part at a time). |
| m+2: | MULL | L14,L16,L16 | # FA is used at m+3, m+4 (both parts). |
| m+3: | ADDL | L4,L18,L20 | # FS is used at m+4, m+5 (one part at a time). |

The last example demonstrates how a 1 FLOP/cycle throughput can be achieved by appropriate interleaving of addition and multiplication.

C.4.4 Floating-Point No-Trap and Early-Completion conditions

The Floating Point unit includes "No Trap" and "Early-Completion" hardware that detects operations that will certainly terminate normally, operations that will certainly cause an exception, and operations that certainly will not cause a trap. The checks are done only for arithmetic FP-instructions. Two conditions are checked, possible FP-trap (not "No-Trap"), and "Normal Completion". Both checks are done in FX1-stage. If the instruction is not "Normally Completed" than one more cycle is required by the instruction in the FRN stage. If the "No Trap" detects a possibility for a trap, it generates ME-stall (see Table C-2 in "Floating-Point Pipe Organization" in Section C.4 ). The ME-stall is dropped only when the instruction reaches the FSF-stage. In other words when "No Trap" is detected the mapping between the Dual-Pipe and the FP-pipe shown in Table C-1 is effective, otherwise the one shown in Table C-2 is effective. There are cases where the "No Trap" logic detects a possibility for a trap and yet the instruction terminates with no trap, i.e. the instruction was stalled even though it could have terminated with no stall.

Note:

In the following sections $e_{min}$ is used to denote the minimal value of the exponent, the one containing only zeros. $e_{max}$ is the maximal value of exponent, the one containing only ones. OP1 and OP2 are used to denote the first and

SWORDFISH ARCHITECTURE SPECIFICATION  Rev. 2.0, February 1990 second operand, and OPx.exp denotes the exponent field of OPx.

An additional hardware exists in the FX1 stage. This hardware generates ID-stall for one cycle in the following cases:

1. The instruction is MOVLF, MOVULF, MOVFL or MOVUFL and one of the operands is denormalized (see "Floating-Point Instructions" in Section 4.2.4).
2. The instruction is ADDI, ADDUI, SUBI, SUBUI, MULI, MULUI, DIVI or DIVUI and one of the operands is denormalized.
3. The instruction is ADDI or ADDUI, the sign bits of the operands are different, and $\max(OP1.exp, OP2.exp) \leq e_{min}+N$. $N=32$ for single-precision, $N=64$ for double-precision.
4. The instruction is SUBI or SUBUI, the sign bits of the operands are equal, and $\max(OP1.exp, OP2.exp) \leq e_{min}+N$. $N=32$ for single-precision, $N=64$ for double-precision.
5. The instruction is MULI or MULUI, and $OP1.exp+OP2.exp-Bias \leq e_{min}+1$. Where $Bias=127$ for single precision, and 1022 for double-precision (Refer to "Floating-Point Instructions" in Section 4.2.4).
6. The instruction is DIVI or DIVUI, and $OP1.exp+OP2.exp-Bias \leq e_{min}+1$. Where $Bias=127$ for single precision, and 1022 for double-precision.
7. The instruction is MOVLF or MOVULF and $OP1.exp-1023+127 \leq e_{min}+1$, where $e_{min}$ is that of single-precision.

The FPU "Early-Completion" logic detects the following conditions, these conditions are used to detect "No-Trap" or "Early-Completion":

Possible Underflow FP-Exception:

1. The instruction is ADDI or ADDUI, the sign bits of the operands are different, and $\max(OP1.exp, OP2.exp) \leq e_{min}+N$. $N=32$ for single-precision, $N=64$ for double-precision.
2. The instruction is SUBI or SUBUI, the sign bits of the operands are equal, and $\max(OP1.exp, OP2.exp) \leq e_{min}+N$. $N=32$ for single-precision, $N=64$ for double-precision.
3. The instruction is MULI or MULUI, and $OP1.exp+OP2.exp-Bias \leq e_{min}+1$. Where $Bias=127$ for single precision, and 1022 for double-precision.
4. The instruction is DIVI or DIVUI, and $OP1.exp-OP2.exp+Bias \leq e_{min}+1$. Where $Bias=127$ for single precision, and 1022 for double-precision.
5. The instruction is MOVLF or MOVULF and $OP1.exp-1023+127 \leq e_{min}+1$, where $e_{min}$ is the of single-precision.

Possible Overflow FP-Exception:

1. The instruction is ADDI or ADDUI, the sign bits of the operands are equal, and $\max(OP1.exp, OP2.exp) \geq e_{max}-1$.
2. The instruction is SUBI or SUBUI, the sign bits of the operands are different, and $\max(OP1.exp, OP2.exp) \geq e_{max}-1$.
3. The instruction is MULI or MULUI, and $OP1.exp+OP2.exp-Bias \geq e_{max}-1$. Where $Bias=127$ for single precision, and 1022 for double-precision.
4. The instruction is DIVI or DIVUI, and $OP1.exp-OP2.exp+Bias \geq e_{max}-1$. Where $Bias=127$ for single precision, and 1022 for double-precision.
5. The instruction is MOVLF and $OP1.exp-1023+127 \leq e_{max}-1$, where $e_{max}$ is of the single-precision.

SWORDFISH ARCHITECTURE SPECIFICATION          Rev. 2.0, February 1990

Possible Integer Overflow FP-Exception :

The instruction ROUNDI, ROUNDUI, TRUNCI, TRUNCUI, FLOORI or FLOORUI and the operand exponent is greater or equal to 30.

Possible Inexact Result FP-Exception :

The instruction is not ABSI, ABSUI, CMPI, CMPUI, NEGI, NEGUI, MOVFL, MOVUFL, MOVDL, MOVUDL, UCMPI and UCMPUI.

The conditions for a possible FP-trap in which ME-stall is generated, and the correspondence between the Dual-Pipe and the FP-pipe is the one in Table C-2 are :

- The instruction is not a U (unaffected) instruction, and
- The Invalid Operation trap is enabled (FSR.IVE = 0), and one of the conditions in "Invalid Operation" in Section 4.2.4.1.5 occurs.
- The Divide by Zero trap is enabled (FSR.DZE = 0) and Divide by Zero occurs.
- The Underflow FP-trap is enabled (FSR.UEN = 1) and Underflow exception is possible (see above).
- The Integer Overflow FP-trap is enabled (FSR.IOE = 0), and Integer Overflow FP-Exception is possible (see above).
- The Overflow FP-trap is enabled (FSR.OVE = 0), and Overflow FP-Exception is possible.
- The Inexact Result FP-trap is enabled (FSR.IEN = 1), and there is a possibility of an Inexact-Result FP-exception, or an Overflow FP-Exception.

"Early Completion" means that the FP instruction will definitely have a FP-Exception, or will definitely not have an FP-Exception. To define accurately the "Early-Completion" conditions, we need to define the conditions for "possible but not certain" FP-Exception.

Possible but not certain Underflow FP-Exception :

1. The instruction is ADDI or ADDUI, the sign bits of the operands are different, and $e_{min}-1 < max(OP1.exp, OP2.exp) \le e_{min}+N$. $N=32$ for single-precision, $N=64$ for double-precision.
2. The instruction is SUBI or SUBUI, the sign bits of the operands are equal, and $e_{min}-1 < max(OP1.exp, OP2.exp) \le e_{min}+N$. $N=32$ for single-precision, $N=64$ for double-precision.
3. The instruction is MULI or MULUI, and $e_{min}-1 < OP1.exp+OP2.exp-Bias \le e_{min}+1$. Where $Bias=127$ for single precision, and $1022$ for double-precision.
4. The instruction is DIVI or DIVUI, and $e_{min}-1 < OP1.exp-OP2.exp+Bias \le e_{min}+1$. Where $Bias=127$ for single precision, and $1022$ for double-precision
5. The instruction is MOVLF or MOVULF and $e_{min}-1 < OP1.exp-1023+127 \le e_{min}+1$, where $e_{min}$ is the of single-precision.

Possible but not certain Overflow FP-Exception :

1. The instruction is ADDI or ADDUI, the sign bits of the operands are equal, and $e_{max}+1 > max(OP1.exp, OP2.exp) \ge e_{max}-1$.
2. The instruction is SUBI or SUBUI, the sign bits of the operands are different, and $e_{max}+1 > max(OP1.exp, OP2.exp) \ge e_{max}-1$.

SWORDFISH ARCHITECTURE SPECIFICATION        Rev. 2.0, February 1990

3. The instruction is MULI or MULUI, and $e_{max}+1 > OP1.exp + OP2.exp - Bias \geq e_{max}-1$. Where $Bias=127$ for single precision, and $1022$ for double-precision.
4. The instruction is DIVI or DIVUI, and $e_{max}+1 > OP1.exp - OP2.exp + Bias \geq e_{max}-1$. Where $Bias=127$ for single precision, and $1022$ for double-precision.
5. The instruction is MOVLF or MOVULF and $e_{max}+1 > OP1.exp - 1023 + 127 \leq e_{max}-1$, where $e_{max}$ is of the single-precision.

Possible but not certain Integer-Overflow FP-Exception:

The instruction is ROUNDI, ROUNDUI, TRUNCI, TRUNCUI, FLOORI or FLOORUI and the operand exponent is 30 or 31.

The conditions for NOT "Normal Completion" (in which another cycle is added to the FRN stage are:

- The operation is a valid FP-operation, that enters FRN (CMPI, CMPUI, UCMPI and UCMPUI don't enter FRN).
- None of the inputs is denormalized.
- There is no Invalid-Operation or Divide-By-Zero FP-exception (detected in FID stage).
- The operation is not special arithmetic (i.e. no NaNs Infinities and zeros, see "Operation with Special Floating-Point Operands" in Section 4.2.4.2).
- One of the following conditions is true:
  1. There is a possible but not certain Underflow FP-Exception.
  2. There is a possible but not certain Overflow FP-Exception.
  3. There is a possible but not certain Integer-Overflow FP-Exception.
  4. There is a possible Inexact-Result FP-Exception, and the Inexact-Result FP-trap is enabled (FSR.IEN = 0).

C.5 STORAGE DELAYS

So far it was assumed that all instructions and data needed to execute a given code segment reside in the on-chip caches. In case of a cache miss, non-cacheable data/instruction, or cache disabled, the Swordfish generates a bus transaction to access off-chip memory. These cases introduce additional delays referred to as "storage delays".

C.5.1 Data Cache Misses and Load-Scheduling

A Data Cache (DC) miss is detected at the ME-stage when the DC is probed. The Swordfish has a Load-Scheduling (LS) mechanism, by which the dual-pipe is able to continue execution without stalling until the missing data is actually needed. If the Load instructions are scheduled sufficiently in advance of the instructions using the loaded data, then the data may reside already in the Register-File by the time it is actually needed, and no storage delays occur even though off-chip memory has been accessed.

SWORDFISH ARCHITECTURE SPECIFICATION        Rev. 2.0, February 1990

The LS process is divided into two parts:

1. LS memory access reservation
2. LS data return

The LS memory access reservation occurs when a Load instruction in the ME-stage encounters a DC miss. The DC includes dedicated logic to reserve the request in a special LS-FIFO queue and handle requests to overlapping cache entries. As long as the LS-FIFO is not full, the dual-pipe may proceed without stalling. Since the register to be loaded was marked "invalid" when the Load instruction was in the ID-stage, subsequent instructions that wish to use this register as an operand will be stalled in the ID-stage until the data arrives from off-chip memory - the LS data return. The move-type floating point instructions will be stalled in EX stage until the LS return, and the arithmetic floating point instructions will be stalled in FID stage.

While a scheduled load is in progress and a second data read miss is detected for another block to be placed in the same DC entry as the scheduled load, then the second reference is delayed until the data for the scheduled load has been read and the DC updated, i.e. the next LOAD instruction will be stalled until the data is ready. (In other words, at most 1 block can be scheduled for loading to a given cache entry, but two loads for the same block can be outstanding). This restriction applies only if the DC is enabled.

Whenever the LS-FIFO contains memory access requests it transfers them in first-in first-out order to the Bus Interface independently of the dual-pipe operation. Eventually the data arrives back and is stored in the appropriate register marking it "valid", and also in the DC if it is cacheable. LS data return may contend with other pipe activities over various resources like the DC or Register-File write ports. In this case the dual-pipe is stalled, introducing additional delays. For example, if both integer pipes need to write to the Register-File in their ST-stage while an LS data returns, then there is a pipe stall to allow the LS transaction to complete. Similarly, executing Load/Store operations while LS data return may contend with it over internal buses, or over the DC port in case of cacheable data.

The typical delay from the DC-miss until the data is back in the cache is 6 cycles, assuming half-frequency bus mode and no interference with other bus transactions and pipe operations. The LS mechanism is able to sustain a throughput of up to 2 cycles/load for cacheable data (due to contention between returning data, and DC probes) and 1 cycle/load for non-cacheable data, loaded using the LOADNi, LOADNUi, LOADNf or LOADNUf instructions.

EXAMPLE:

| cycle | ID-stage | | Comments |
|---|---|---|---|
| n: | LOADD | 0(R3),R1 | # A DC miss, won't be back until cycle n+6 |
| | | | # Instructions that do not use R1 |
| n+6: | ADDD | R1,R0,R0 | # If LS managed to return, no delay |
| m: | LOADD | 0(R0),R1 | # A DC miss, will be back in m+6 |
| m+1 | LOADD | 4(R0),R2 | # A DC miss for the same entry, will be stalled until m+6 |

C.5.2 Instruction Cache Misses

An IC miss causes the Instruction Loader (IL) to begin prefetching instructions from the missing address. A read request is sent to the Bus Interface unit, this takes 1 cycle. The Bus Interface (BI) is then able to access off-chip memory, and provide the aligned quad-word in which the missing address resides at least 4 cycles later (assuming half-frequency bus mode).

SWORDFISH ARCHITECTURE SPECIFICATION  Rev. 2.0, February 1990

The IL can execute the instruction-pairing algorithm at a throughput of 2 cycles/pair, provided all instruction bytes are in its queue. Therefore, the shortest delay for the first IC miss after a hit is 7 cycles with half frequency bus. Afterward, the 2 cycles/pair throughput is sustained by the IL. If the dual-pipe is able to execute such pairs in 1 cycle then it idles in the second cycle until the IL completes packing of the next pair.

While the IL is prefetching instructions and packing them into pairs, it checks each generated pair for a hit in the IC. If a hit is detected, the IL stops and transfers control back to the IC. Also, if the IL encounters a Bcond, BAL, BSR, or JUMP instruction, then it stops immediately after the instruction is issued and transfers control over to the IC.

The Swordfish provides a facility for locking performance-critical code segments into the IC, and thus eliminate IC miss delays. Refer to "Instruction Cache" in Section 6.2 for more information.

| Instruction | Operand | Number of Cycles | Serialization "before" | Number of LOADs | Number of STORs | Ends with JUMP | Serialization "after" |
|---|---|---|---|---|---|---|---|
| CINV | — |  |  | 0 | 0 |  |  |
| EOI | — |  |  | 1 | 0 |  |  |
| MBIT | — | 15 |  | 1 | 1 |  |  |
| RETX | — | 9 |  | 2 | 0 | Y | Y |
| SPR | UPSR | 11 | Y | 0 | 0 |  |  |
| SPR | FSR | 15 | Y | 0 | 0 |  |  |
| SPR | FTRL | 18 | Y | 0 | 0 |  |  |
| SPR | FTRH | 21 | Y | 0 | 0 |  |  |
| SPR | SP | 22 | Y | 0 | 0 |  |  |
| SPR | CFG | 22 | Y | 0 | 0 |  |  |
| SPR | INTB | 22 | Y | 0 | 0 |  |  |
| SPR | DCR | 22 | Y | 0 | 0 |  |  |
| SPR | DSR | 22 | Y | 0 | 0 |  |  |
| SPR | CAR | 22 | Y | 0 | 0 |  |  |
| SPR | AMR | 22 | Y | 0 | 0 |  |  |
| SPR | BPC0 | 22 | Y | 0 | 0 |  |  |
| SPR | BPC1 | 22 | Y | 0 | 0 |  |  |
| SPR | PSR | 22 | Y | 0 | 0 |  |  |
| LPR | SP | 27 | Y | 0 | 0 | Y | Y |
| LPR | CFG | 35 | Y | 0 | 2 | Y | Y |
| LPR | INTB | 27 | Y | 0 | 0 | Y | Y |
| LPR | DCR | 27 | Y | 0 | 0 | Y | Y |
| LPR | DSR | 27 | Y | 0 | 0 | Y | Y |
| LPR | CAR | 27 | Y | 0 | 0 | Y | Y |
| LPR | AMR | 27 | Y | 0 | 0 | Y | Y |
| LPR | BPC0 | 27 | Y | 0 | 0 | Y | Y |
| LPR | BPC1 | 27 | Y | 0 | 0 | Y | Y |
| LPR | UPSR | 8 | Y | 0 | 0 | Y | Y |
| LPR | PSR | 33 | Y | 0 | 2 | Y | Y |
| LPR | FSR | 24 | Y | 0 | 2 | Y | Y |
| LPR | FTRL | 17 | Y | 0 | 0 | Y | Y |
| LPR | FTRH | 20 | Y | 0 | 0 | Y | Y |

TABLE C-3. Special-Function Instructions timing

C.6 INSTRUCTION EMULATION

Special-Function instructions are handled by the Swordfish Instruction Emulation (IE) unit. When the Instruction Loader (IL) detects such an instruction, it sends it to the IE unit. The IE then takes over and starts issuing instruction to the dual-pipe to emulate the original instruction.

The execution time of a special-function instruction includes the following components:

- Number of emulating instructions.
- Serialization "before" time: some special function instruction causes a serialization before they start to occur, i.e. the instruction does not start before previous instructions are completed.
- Serialization "after": some special function instructions empty the pipe before end of execution.
- If the special function instruction uses LOAD, STOR or JUMP instructions in its execution sequence, the associated delay of these instructions should be added.

The following table contains the above information for the special function instructions: MBITI, RETX, SPR and LPR. Note the SPR and LPR times change according to the operands.

C.7 EXCEPTIONS

Exceptions in the Swordfish are checked for in the ME-stage. Upon exception detection, the dual-pipe discards instructions still in it but logically following the instruction causing the exception, and checks if that instruction should be completed. In case of Overflow Trap(OVF) or Trace Trap(TRC), the instruction is allowed to advance to the ST-stage and its result is stored.

The dual-pipe waits until the pipe is empty and all the requests from the LS-fifo return, and then signals the Instruction Emulation unit to start sending appropriate instruction-pairs to execute the specific exception operations. All the exception instruction sequences end with JUMP instruction, and wait for an empty pipe before finish. Table C-4 includes the exception timing, including for each exception the number of LOAD/STORs in the sequence. Refer to "Exceptions" in Chapter 5.4 for details on the different exceptions.

| Exception | Number of Cycles | Number of LOADs | Number of STORs |
|---|---|---|---|
| FPU, DBG, SVC, DVZ, FLG, BPT, OVF | 14 | 1 | 3 |
| TRC, ILL, UND | 15 | 1 | 3 |
| NMI | 16 | 3 | 3 |
| INT | 16 | 2 | 3 |

TABLE C-4. Exception Timing

C.8 SUMMARY

In order to use the information given in the previous sections efficiently, one should use the following two tables. These tables should be used to evaluate the instruction latency and throughput.

Table C-5 contains for each instruction the following information:

1. Pipe-B only instruction.

SWORDFISH ARCHITECTURE SPECIFICATION  Rev. 2.0, February 1990

2. Sequentializing when scheduled to pipe-B.

3. Use of BPR1 and BPR2 in EX and ID stages.

4. Use of the DC bypass in ID_stage (returned by load when hit in ME, and by LS when miss).

Note:

None of the floating point instructions write to the EP bypass registers, or read from the DC bypass register. The FPU is using it's own bypass mechanism (see Table C-6).

| Instruction | Both pipes | Pipe-B only | Sequentializing in pipe-B | Writes to BPR1 and BPR2 | Read from DC/LOAD bypass |
|---|---|---|---|---|---|
| ABSI |  | Y |  |  |  |
| ABSUI |  | Y |  |  |  |
| ADDCI | Y |  | Y | Y | Y |
| ADDI |  | Y |  |  |  |
| ADDUI |  | Y |  |  |  |
| ADDi | Y |  |  | Y | Y |
| ADDUi | Y |  |  | Y | Y |
| ANDi | Y |  |  | Y | Y |
| ASHUi | Y |  |  | Y | Y |
| Bcond |  | Y |  |  |  |
| BAL |  | Y |  | Y |  |
| BICi | Y |  |  | Y | Y |
| CMPCHD | Y |  |  | Y | Y |
| CMPI |  | Y |  |  |  |
| CMPUI |  | Y |  |  |  |
| CMPi | Y |  |  | Y | Y |
| DIVI |  | Y |  |  |  |
| DIVUI |  | Y |  |  |  |
| EXCP |  | Y |  |  |  |
| FLOORI |  | Y |  |  |  |
| FLOORUI |  | Y |  |  |  |
| JUMP |  | Y |  |  |  |
| LOADI | Y |  | Y |  | Y |
| LOADUI | Y |  | Y |  | Y |
| LOADi | Y |  | Y |  | Y |
| LOADNI | Y |  | Y |  | Y |
| LOADNUI | Y |  | Y |  | Y |
| LOADNi | Y |  | Y |  | Y |
| LSHi | Y |  |  | Y | Y |
| MHHD |  | Y |  |  |  |
| MHLD |  | Y |  |  |  |
| MLLD |  | Y |  |  |  |
| MOVDL |  | Y |  |  |  |
| MOVUDL |  | Y |  |  |  |
| MOVFL |  | Y |  |  |  |
| MOVUFL |  | Y |  |  |  |

TABLE C-5. Core Instructions Summary

SWORDFISH ARCHITECTURE SPECIFICATION        Rev. 2.0, February 1990

| Instruction | Both pipes | Pipe-B only | Sequentializing in pipe-B | Writes to BPR1 and BPR2 | Read from DC/LOAD bypass |
|---|---|---|---|---|---|
| MOVLF |  | Y |  |  |  |
| MOVULF |  | Y |  |  |  |
| MOVXiD | Y |  |  | Y | Y |
| MOVZiD | Y |  |  | Y | Y |
| MOVi | Y |  | Y |  |  |
| MOVUi | Y |  | Y |  |  |
| MULi |  | Y |  |  |  |
| MULUi |  | Y |  |  |  |
| MULi |  | Y |  |  |  |
| MULUi |  | Y |  |  |  |
| NEGi |  | Y |  |  |  |
| NEGUi |  | Y |  |  |  |
| ORi | Y |  |  | Y | Y |
| ROUNDi |  | Y |  |  |  |
| ROUNDUi |  | Y |  |  |  |
| Scondi | Y |  | Y | Y |  |
| STORi | Y |  | Y |  | Y |
| STORUi | Y |  | Y |  | Y |
| STORi | Y |  | Y |  | Y |
| SUBCi | Y |  | Y | Y | Y |
| SUBi |  | Y |  |  |  |
| SUBUi |  | Y |  |  |  |
| SUBi | Y |  |  | Y | Y |
| SUBUi | Y |  |  | Y | Y |
| TBIT | Y |  |  |  | Y |
| TRDF | Y |  | Y |  | Y |
| TRUDF | Y |  | Y |  | Y |
| TRFD | Y |  | Y |  |  |
| TRUFD | Y |  | Y |  |  |
| TRUNCi |  | Y |  |  |  |
| TRUNCUi |  | Y |  |  |  |
| UCMPi |  | Y |  |  |  |
| UCMPUi |  | Y |  |  |  |
| XORi | Y |  |  | Y | Y |

TABLE C-5. Core Instructions Summary (continued)

Table C-6 contains for the floating point instructions (and the integer multiply instructions) the following information:

1. The instruction type - move-type or arithmetic type (of course the integer multiplies are neither). Note that the move-type floating point instruction pass through the dual-pipe stages (ID,EX,ME and ST).

2. The operand read stage (FID for arithmetic and EX for move-type).

3. The number of cycles the instruction spends in each floating point resource. And during those cycles both parts of a certain resource are used or one at a time. If two numbers appear in the number of cycles column, one is for single precision, the other for double.

4. The bypass the instruction reads/writes to and from.

SWORDFISH ARCHITECTURE SPECIFICATION      Rev. 2.0, February 1990

| Instruction | Type | Operand read stage | Cycles in FA | Cycles in FS | Cycles in FR | Uses both parts of FA/FS | Reads from bypass | Writes to bypass |
|---|---|---|---|---|---|---|---|---|
| ABSI | Arith. | FID | 0 | 2 | 1 | No | Arith. | Arith&move |
| ABSUI | Arith. | FID | 0 | 2 | 1 | No | Arith. | Arith&move |
| ADDI | Arith. | FID | 0 | 2 | 1 | No | Arith. | Arith&move |
| ADDUI | Arith. | FID | 0 | 2 | 1 | No | Arith. | Arith&move |
| CMPI | Arith. | FID | 0 | 2 | 0 | No | Arith. | - |
| CMPUI | Arith. | FID | 0 | 2 | 0 | No | Arith. | - |
| DIVI | Arith. | FID | 0 | 16/31 | 1 | Yes | Arith. | Arith&move |
| DIVUI | Arith. | FID | 0 | 16/31 | 1 | Yes | Arith. | Arith&move |
| FLOORI | Arith. | FID | 0 | 2 | 1 | No | Arith. | - |
| FLOORUI | Arith. | FID | 0 | 2 | 1 | No | Arith. | - |
| LOADI | Move | - | - | - | - | - | - | Arith. |
| LOADNI | Move | - | - | - | - | - | - | Arith. |
| LOADNUI | Move | - | - | - | - | - | - | Arith. |
| LOADUI | Move | - | - | - | - | - | - | Arith. |
| MHHD | - | ID | 2 | 0 | 0 | No | - | - |
| MLHD | - | ID | 2 | 0 | 0 | No | - | - |
| MLLD | - | ID | 2 | 0 | 0 | No | - | Arith&move |
| MOVDL | Arith. | FID | 0 | 2 | 1 | No | - | Arith&move |
| MOVDUL | Arith. | FID | 0 | 2 | 1 | No | - | Arith&move |
| MOVFL | Arith. | FID | 0 | 2 | 1 | No | Arith. | Arith&move |
| MOVUFL | Arith. | FID | 0 | 2 | 1 | No | Arith. | Arith&move |
| MOVLF | Arith. | FID | 0 | 2 | 1 | No | Arith. | Arith&move |
| MOVULF | Arith. | FID | 0 | 2 | 1 | No | Arith. | Arith&move |
| MOVI | Move | EX | - | - | - | - | Move | - |
| MOVUI | Move | EX | - | - | - | - | Move | - |
| MULI | Arith. | FID | 2 | 0 | 1 | Yes | Arith. | Arith&move |
| MULUI | Arith. | FID | 2 | 0 | 1 | Yes | Arith. | Arith&move |
| MULI | - | ID | 2 | 0 | 0 | No | - | - |
| MULLI | - | ID | 2 | 0 | 0 | No | - | - |
| NEGI | Arith. | FID | 0 | 2 | 1 | No | Arith. | Arith&move |
| NEGUI | Arith. | FID | 0 | 2 | 1 | No | Arith. | Arith&move |
| ROUNDI | Arith. | FID | 0 | 2 | 1 | No | Arith. | - |
| ROUNDUI | Arith. | FID | 0 | 2 | 1 | No | Arith. | - |
| STORI | Move | EX | 0 | 0 | 0 | - | Move | - |
| STORUI | Move | EX | 0 | 0 | 0 | - | Move | - |
| SUBI | Arith. | FID | 0 | 2 | 1 | No | Arith. | Arith&move |
| SUBUI | Arith. | FID | 0 | 2 | 1 | No | Arith. | Arith&move |
| TROF | Move | ID | - | - | - | - | - | Arith. |
| TRUDF | Move | ID | - | - | - | - | - | Arith. |
| TRFD | Move | EX | - | - | - | - | Move | - |
| TRUFD | Move | EX | - | - | - | - | Move | - |
| TRUNCI | Arith. | FID | 0 | 2 | 1 | No | Arith. | - |
| TRUNCUI | Arith. | FID | 0 | 2 | 1 | No | Arith. | - |
| UCMPI | Arith. | FID | 0 | 2 | 0 | No | Arith. | - |
| UCMPUI | Arith. | FID | 0 | 2 | 0 | No | Arith. | - |

TABLE C-6. Core Floating-Point Instruction Summary

SWORDFISH ARCHITECTURE SPECIFICATION  Rev. 2.0, February 1990

To calculate actual execution timing for the Swordfish in the presence of pipe stalls, take the following steps:

1. Determine the run-time instruction pairing (see "Instruction Pairing" in Section C.1.1)
2. Identify dependent instruction-pairs and mark them "sequential" (see "Execution Pipe Sequentialization" in Section C.2)
3. Add delays due to control dependencies (see "Control Dependencies" in Section C.3.1)
4. Add delays due to data dependencies (see "Floating-Point Data Dependencies" in Section C.4.2)
5. Add delays due to contention of Floating-Point resources (see "Floating-Point Resource Contentions" in Section C.4.3)
6. Add delays due to special data conditions in the FP (see "Floating-Point No-Trap and Early-Completion Conditions" in Section C.4.4)
7. Add Data Cache miss delays according to the "load-scheduling" mechanism (see "Load Delays" in Section C.3.2.2 and "Data Cache Misses and Load-Scheduling" in Section C.5.1)
8. Add Instruction Cache miss delays (see "Instruction Cache Misses" in Section C.5.2)
9. Add delays due to Special-Function Instructions (see "Instruction Emulation" in Section C.6)
10. Add exception delays and interrupt latency if any (see "Exceptions" in Section C.7)

SWORDFISH ARCHITECTURE SPECIFICATION        Rev. 2.0, February 1990

D. BUS ACCESS SEQUENCES

This appendix contains information on Swordfish bus access sequences for both 64-Bit and 32-Bit default Bus widths.

D.1 ACCESS SEQUENCES FOR 64-BIT DEFAULT BUS WIDTH

D.1.1 Instruction Fetch Sequences

The Swordfish activates all byte enable signals ($\overline{BE0}$-$\overline{BE7}$) for both sequential and non-sequential fetches on 64-Bit bus. The Swordfish reads only the upper bytes within the instruction quad-word starting with the byte whose address is on the address bus. Instruction fetch sequences are summarized in tables D-1 to D-4.

64-Bit Bus Width

The Swordfish reads the entire quad-word present on the data bus into its internal instruction loader.

Example: JUMP @4

- The Swordfish performs a fetch cycle at address 4 with $\overline{BE0}$-$\overline{BE7}$ all active. Bytes 0 through 3 are ignored.
- The Swordfish may begin to pre-fetch instructions from the consecutive quad-word aligned addresses.

| No. of Bytes | Addr LSB | Bytes to be Fetched | Addr Bus | $\overline{BE0}$-$\overline{BE7}$ | Data Bus |
|---|---|---|---|---|---|
| 4 | 100 | B3 B2 B1 B0 — — — — | A | LLLLLLL | B3 B2 B1 B0 — — — — |
| 8 | 000 | B7 B6 B5 B4 B3 B2 B1 B0 | A | LLLLLLL | B7 B6 B5 B4 B3 B2 B1 B0 |

TABLE D-1. Cacheable/Non-Cacheable Instruction Fetch from 64-Bit Default Bus

32-Bit Bus Width

The double-word on the least-significant half of the data bus is read by the Swordfish. This is either the even or the odd double-word within the required instruction quad-word, as determined by address bit 2. If the instruction address selects the even double-word within the instruction quad-word, the Swordfish performs another fetch to read the other half of the quad-word.

| No. of Bytes | Addr LSB | Bytes to be Fetched | Addr Bus | $\overline{BE0}$-$\overline{BE7}$ | Data Bus |
|---|---|---|---|---|---|
| 4 | 100 | B3 B2 B1 B0 — — — — | A | LLLLLLL | — — — — B3 B2 B1 B0 |
| 8 | 000 | B7 B6 B5 B4 B3 B2 B1 B0 | A / A+4 | LLLLLLL / LLLLLLL | — — — — B3 B2 B1 B0 / — — — — B7 B6 B5 B4 |

TABLE D-2. Cacheable/Non-Cacheable Instruction Fetch from 32-Bit Bus, default is 64-Bit Example: JUMP @4

- The Swordfish performs a fetch cycle at address 4 with $\overline{BE0}$-$\overline{BE7}$ all active. Bytes 4 through 7 are read from the least-significant half of the data bus.
- The Swordfish may begin to pre-fetch instructions from the consecutive quad-word aligned addresses.

SWORDFISH ARCHITECTURE SPECIFICATION        Rev. 2.0, February 1990

16-Bit Bus Width

The instruction word on the data bus lines D0-15 is fetched. The Swordfish performs one or three more consecutive cycles to read the remaining words within the required quad-word, while keeping $\overline{BE0}$-$\overline{BE7}$ all active. The Swordfish reads only the upper words within the quad-word starting with the word at the instruction address.

Example: JUMP @4

- The Swordfish performs a fetch cycle at address 4 with $\overline{BE0}$-$\overline{BE7}$ all active. Byte 0 and 1 are read from D0 through D15.

- The Swordfish performs a second fetch cycle at address 6 with $\overline{BE0}$-$\overline{BE7}$ all active. Bytes 2 through 3 are read from D0 through D15.

- The Swordfish may begin to pre-fetch instructions from the consecutive quad-word aligned addresses.

| No. of Bytes | Addr LSB | Bytes to be Fetched | Addr Bus | $\overline{BE0}$-$\overline{BE7}$ | Data Bus |
|---|---|---|---|---|---|
| 4 | 100 | B3 B2 B1 B0 — — — — | A<br>A+2 | LLLLLLLL<br>LLLLLLLL | — — — — — — — B1 B0<br>— — — — — — — B3 B2 |
| 8 | 000 | B7 B6 B5 B4 B3 B2 B1 B0 | A<br>A+2<br>A+4<br>A+6 | LLLLLLLL<br>LLLLLLLL<br>LLLLLLLL<br>LLLLLLLL | — — — — — — — B1 B0<br>— — — — — — — B3 B2<br>— — — — — — — B5 B4<br>— — — — — — — B7 B6 |

TABLE D-3. Cacheable/Non-Cacheable Instruction Fetch from 16-Bit Bus, default is 64-Bit

8-Bit Bus Width

The instruction byte on the data bus lines D0-8 is fetched. The Swordfish performs three or seven more consecutive cycles to read the remaining bytes within the required quad-word, while keeping $\overline{BE0}$-$\overline{BE7}$ all active. The Swordfish reads only the upper bytes within the quad-word starting with the byte at the instruction address.

| No. of Bytes | Addr LSB | Bytes to be Fetched | Addr Bus | $\overline{BE0}$-$\overline{BE7}$ | Data Bus |
|---|---|---|---|---|---|
| 4 | 100 | B3 B2 B1 B0 — — — — | A<br>A+1<br>A+2<br>A+3 | LLLLLLLL<br>LLLLLLLL<br>LLLLLLLL<br>LLLLLLLL | — — — — — — — B0<br>— — — — — — — B1<br>— — — — — — — B2<br>— — — — — — — B3 |
| 8 | 000 | B7 B6 B5 B4 B3 B2 B1 B0 | A<br>A+1<br>A+2<br>A+3<br>A+4<br>A+5<br>A+6<br>A+7 | LLLLLLLL<br>LLLLLLLL<br>LLLLLLLL<br>LLLLLLLL<br>LLLLLLLL<br>LLLLLLLL<br>LLLLLLLL<br>LLLLLLLL | — — — — — — — B0<br>— — — — — — — B1<br>— — — — — — — B2<br>— — — — — — — B3<br>— — — — — — — B4<br>— — — — — — — B5<br>— — — — — — — B6<br>— — — — — — — B7 |

TABLE D-4. Cacheable/Non-Cacheable Instruction Fetch 8-Bit Bus, default is 64-Bit Example: JUMP @4

- The Swordfish performs a fetch cycle at address 4 with $\overline{BE0}$-$\overline{BE7}$ all active. Byte 0 is read from D0 through D7.

SWORDFISH ARCHITECTURE SPECIFICATION          Rev. 2.0, February 1990

- The Swordfish performs a second fetch cycle at address 5 with $\overline{BE0-BE7}$ all active. Byte 1 is read from D0 through D7.

- The Swordfish performs a third fetch cycle at address 6 with $\overline{BE0-BE7}$ all active. Byte 2 is read from D0 through D7.

- The Swordfish performs a forth fetch cycle at address 7 with $\overline{BE0-BE7}$ all active. Byte 3 is read on D0 through D7.

- The Swordfish may begin to pre-fetch instructions from the consecutive quad-word aligned addresses.

| No. of Bytes | Addr LSB | Data to be Read | Addr Bus | $\overline{BE0-BE7}$ | Data Bus |
|---|---|---|---|---|---|
| 1 | 000 | — — — — — — — B0 | A | HHHHHHHL | CA CA CA CA CA CA CA B0 |
| 1 | 001 | — — — — — — B0 — | A | HHHHHHLH | CA CA CA CA CA CA B0 CA |
| 1 | 010 | — — — — — B0 — — | A | HHHHHLHH | CA CA CA CA CA B0 CA CA |
| 1 | 011 | — — — — B0 — — — | A | HHHHLHHH | CA CA CA CA B0 CA CA CA |
| 1 | 100 | — — — B0 — — — — | A | HHHLHHHH | CA CA CA B0 CA CA CA CA |
| 1 | 101 | — — B0 — — — — — | A | HHLHHHHH | CA CA B0 CA CA CA CA CA |
| 1 | 110 | — B0 — — — — — — | A | HLHHHHHH | CA B0 CA CA CA CA CA CA |
| 1 | 111 | B0 — — — — — — — | A | LHHHHHHH | B0 CA CA CA CA CA CA CA |
| 2 | 000 | — — — — — — B1 B0 | A | HHHHHHLL | CA CA CA CA CA CA B1 B0 |
| 2 | 001 | — — — — — B1 B0 — | A | HHHHHLLH | CA CA CA CA CA B1 B0 CA |
| 2 | 010 | — — — — B1 B0 — — | A | HHHHLLHH | CA CA CA CA B1 B0 CA CA |
| 2 | 100 | — — B1 B0 — — — — | A | HHLLHHHH | CA CA B1 B0 CA CA CA CA |
| 2 | 101 | — B1 B0 — — — — — | A | HLLHHHHH | CA B1 B0 CA CA CA CA CA |
| 2 | 110 | B1 B0 — — — — — — | A | LLHHHHHH | B1 B0 CA CA CA CA CA CA |
| 3 | 000 | — — — — — B2 B1 B0 | A | HHHHHLLL | CA CA CA CA CA B2 B1 B0 |
| 3 | 001 | — — — — B2 B1 B0 — | A | HHHHLLLH | CA CA CA CA B2 B1 B0 CA |
| 3 | 100 | — B2 B1 B0 — — — — | A | HLLLHHHH | CA B2 B1 B0 CA CA CA CA |
| 3 | 101 | B2 B1 B0 — — — — — | A | LLLHHHHH | B2 B1 B0 CA CA CA CA CA |
| 4 | 000 | — — — — B3 B2 B1 B0 | A | HHHHLLLL | CA CA CA CA B3 B2 B1 B0 |
| 4 | 100 | B3 B2 B1 B0 — — — — | A | LLLLHHHH | B3 B2 B1 B0 CA CA CA CA |
| 8 | 000 | B7 B6 B5 B4 B3 B2 B1 B0 | A | LLLLLLLL | B7 B6 B5 B4 B3 B2 B1 B0 |

TABLE D-5. Cacheable/Non-Cacheable Data Reads from 64-Bit Default Bus

Note

A 'C' on the data bus refers to cacheable reads and indicates that the byte is placed in the Data Cache.
An 'I' refers to non-cacheable reads and indicates that the byte is ignored.

D.1.2 Data Read Sequences

The Swordfish starts a data read access by placing the exact address of the operand on the address bus. The byte enable lines are activated to select only the bytes required by the instruction being executed. This prevents spurious accesses to peripheral devices that might be sensitive to read accesses, such as those which exhibit the characteristic of destructive reading. During cacheable accesses the Swordfish always reads all the bytes in the quad-word (or double-word, according to the bus width) whether or not they are needed to execute the instruction, and stores them into the data cache. The external memory, in this case, must place the data on the bus regardless of the state of the byte enable signals. If the needed data an aligned quad-word then all of the bytes are read. If the needed data is a double-word or less the Swordfish reads the whole double word only when the bus width is 64-

SWORDFISH ARCHITECTURE SPECIFICATION        Rev. 2.0, February 1990

Bit. When the bus width is less than 64-Bit and the needed data is a double-word or less, the Swordfish reads all the bytes in the aligned double word.

| No. of Bytes | Addr LSB | Data to be Read | Addr Bus | BE0-BE7 Cache | BE0-BE7 Non Cache | Data Bus |
|---|---|---|---|---|---|---|
| 1 | 000 | — — — — — — — B0 | A | HHHHHHHL | HHHHHHHL | — — — — CA CA CA B0 |
| 1 | 001 | — — — — — — B0 — | A | HHHHHHLH | HHHHHHLH | — — — — CA CA B0 CA |
| 1 | 010 | — — — — — B0 — — | A | HHHHHLHH | HHHHHLHH | — — — — CA B0 CA CA |
| 1 | 011 | — — — — B0 — — — | A | HHHHLHHH | HHHHLHHH | — — — — B0 CA CA CA |
| 1 | 100 | — — — B0 — — — — | A | HHHLHHHH | HHHLHHHH | — — — — CA CA CA B0 |
| 1 | 101 | — — B0 — — — — — | A | HHLHHHHH | HHLHHHHH | — — — — CA CA B0 CA |
| 1 | 110 | — B0 — — — — — — | A | HLHHHHHH | HLHHHHHH | — — — — CA B0 CA CA |
| 1 | 111 | B0 — — — — — — — | A | LHHHHHHH | LHHHHHHH | — — — — B0 CA CA CA |
| 2 | 000 | — — — — — — B1 B0 | A | HHHHHHLL | HHHHHHLL | — — — — CA CA B1 B0 |
| 2 | 001 | — — — — — B1 B0 — | A | HHHHHLLH | HHHHHLLH | — — — — CA B1 B0 CA |
| 2 | 010 | — — — — B1 B0 — — | A | HHHHLLHH | HHHHLLHH | — — — — B1 B0 CA CA |
| 2 | 100 | — — B1 B0 — — — — | A | HHLLHHHH | HHLLHHHH | — — — — CA CA B1 B0 |
| 2 | 101 | — B1 B0 — — — — — | A | HLLHHHHH | HLLHHHHH | — — — — CA B1 B0 CA |
| 2 | 110 | B1 B0 — — — — — — | A | LLHHHHHH | LLHHHHHH | — — — — B1 B0 CA CA |
| 3 | 000 | — — — — — B2 B1 B0 | A | HHHHHLLL | HHHHHLLL | — — — — CA B2 B1 B0 |
| 3 | 001 | — — — — B2 B1 B0 — | A | HHHHLLLH | HHHHLLLH | — — — — B2 B1 B0 CA |
| 3 | 100 | — B2 B1 B0 — — — — | A | HLLLHHHH | HLLLHHHH | — — — — CA B2 B1 B0 |
| 3 | 101 | B2 B1 B0 — — — — — | A | LLLHHHHH | LLLHHHHH | — — — — B2 B1 B0 CA |
| 4 | 000 | — — — — B3 B2 B1 B0 | A | HHHHLLLL | HHHHLLLL | — — — — B3 B2 B1 B0 |
| 4 | 100 | B3 B2 B1 B0 — — — — | A | LLLLHHHH | LLLLHHHH | — — — — B3 B2 B1 B0 |
| 8 | 000 | B7 B6 B5 B4 B3 B2 B1 B0 | A / A+4 | LLLLLLLL / LLLLLLLL | LLLLLLLL / LLLLHHHH | — — — — B3 B2 B1 B0 / — — — — B7 B6 B5 B4 |

TABLE D-6. Cacheable/Non-Cacheable Data Reads from 32-Bit Bus, default is 64-Bit If the Data Cache is either internally or externally disabled (through CIIN) during the access, the Swordfish ignores the bytes not selected by the BE0-BE7 signals. Data read sequences are summarized in tables D-5 through D-8.

64-Bit Bus Width

The Swordfish reads the entire quad-word present on the data bus.

- Example: MOVW @5, R0

- The Swordfish performs a read cycle at address 5 while keeping BE5 and BE6 active.
- If the access is not-cacheable, bytes 0-4 and 7 are ignored.
- If the access is cacheable, bytes 0 through 7 are read and stored in the internal Data Cache.

32-Bit Bus Width

The double-word on the least-significant half of the data bus is read by the Swordfish. The Swordfish will perform another double word read cycle with if an aligned quad-word is needed.

If the access is cacheable and the the needed data is an aligned quad-word, the entire quad-word is read and stored into the cache.

If the access is cacheable and the needed data is a double-word or less, all the bytes in the double-word are read and stored into the cache.

SWORDFISH ARCHITECTURE SPECIFICATION          Rev. 2.0, February 1990

If the access the access is not cacheable, the Swordfish ignores the bytes not selected by $\overline{BE0}$-$\overline{BE7}$. In this case, the Swordfish will only perform access cycles needed to read the selected bytes.

Example: MOVW @5, R0

- The Swordfish performs a read cycle at address 5 while keeping $\overline{BE5}$ and $\overline{BE6}$ active.
- If the access is not-cacheable, bytes 0 and 3 are ignored.
- If the access is cacheable, bytes 0 through 3 are read and stored in the Internal Data Cache.

| No. of Bytes | Addr LSB | Data to be Read | Addr Bus | $\overline{BE0}$-$\overline{BE7}$ Cache | $\overline{BE0}$-$\overline{BE7}$ Non Cache | Data Bus |
|---|---|---|---|---|---|---|
| 1 | 000 | ———————B0 | A / A+2 | HHHHHHHL / LLLLLLLL | HHHHHHHL | ——————CA B0 / ——————C C |
| 1 | 001 | ——————B0— | A / A+1 | HHHHHHLH / LLLLLLLL | HHHHHHLH | ——————B0 CA / ——————C C |
| 1 | 010 | —————B0—— | A / A-2 | HHHHHLHH / LLLLLLLL | HHHHHLHH | ——————CA B0 / ——————C C |
| 1 | 011 | ————B0——— | A / A-3 | HHHHLHHH / LLLLLLLL | HHHHLHHH | ——————B0 CA / ——————C C |
| 1 | 100 | ———B0———— | A / A+2 | HHHLHHHH / LLLLLLLL | HHHLHHHH | ——————CA B0 / ——————C C |
| 1 | 101 | ——B0————— | A / A+1 | HHLHHHHH / LLLLLLLL | HHLHHHHH | ——————B0 CA / ——————C C |
| 1 | 110 | —B0—————— | A / A-2 | HLHHHHHH / LLLLLLLL | HLHHHHHH | ——————CA B0 / ——————C C |
| 1 | 111 | B0——————— | A / A-3 | LHHHHHHH / LLLLLLLL | LHHHHHHH | ——————B0 CA / ——————C C |
| 2 | 000 | ——————B1 B0 | A / A+2 | HHHHHHLL / LLLLLLLL | HHHHHHLL | ——————B1 B0 / ——————C C |
| 2 | 001 | —————B1 B0— | A / A+1 | HHHHHLLH / LLLLLLLL | HHHHHLLH / HHHHHLHH | ——————B0 CA / ——————CA B1 |
| 2 | 010 | ————B1 B0—— | A / A-2 | HHHHLLHH / LLLLLLLL | HHHHLLHH | ——————B1 B0 / ——————C C |
| 2 | 100 | ——B1 B0———— | A / A+2 | HHLLHHHH / LLLLLLLL | HHLLHHHH | ——————B1 B0 / ——————C C |
| 2 | 101 | —B1 B0————— | A / A+1 | HLLHHHHH / LLLLLLLL | HLLHHHHH / HLHHHHHH | ——————B0 CA / ——————C B1 |
| 2 | 110 | B1 B0—————— | A / A-2 | LLHHHHHH / LLLLLLLL | LLHHHHHH | ——————B1 B0 / ——————C C |
| 3 | 000 | —————B2 B1 B0 | A / A+2 | HHHHHLLL / LLLLLLLL | HHHHHLLL / HHHHHLHH | ——————B1 B0 / ——————C B2 |
| 3 | 001 | ————B2 B1 B0— | A / A+1 | HHHHLLLH / LLLLLLLL | HHHHLLLH / HHHHLLHH | ——————B0 CA / ——————B2 B1 |
| 3 | 100 | —B2 B1 B0———— | A / A+2 | HLLLHHHH / LLLLLLLL | HLLLHHHH / HLHHHHHH | ——————B1 B0 / ——————C B2 |
| 3 | 101 | B2 B1 B0————— | A / A+1 | LLLHHHHH / LLLLLLLL | LLLHHHHH / LLHHHHHH | ——————B0 CA / ——————B2 B1 |
| 4 | 000 | ————B3 B2 B1 B0 | A / A+2 | HHHHLLLL / LLLLLLLL | HHHHLLLL / HHHHLLHH | ——————B1 B0 / ——————B3 B2 |
| 4 | 100 | B3 B2 B1 B0———— | A / A+2 | LLLLHHHH / LLLLLLLL | LLLLHHHH / LLHHHHHH | ——————B1 B0 / ——————B3 B2 |
| 8 | 000 | B7 B6 B5 B4 B3 B2 B1 B0 | A / A+2 / A+4 / A+6 | LLLLLLLL / LLLLLLLL / LLLLLLLL / LLLLLLLL | LLLLLLLL / LLLLLLHH / LLLLHHHH / LLHHHHHH | ——————B1 B0 / ——————B3 B2 / ——————B5 B4 / ——————B7 B6 |

TABLE D-7. Cacheable/Non-Cacheable Data Reads from 16-Bit Bus, default is 64-Bit 16-Bit Bus Width

SWORDFISH ARCHITECTURE SPECIFICATION  Rev. 2.0, February 1990

The word on the bus lines D0 through D15 is read by the Swordfish. The Swordfish can then perform up to 3 access cycles to read the remaining bytes in the quad-word.

If the access is cacheable and the needed data is an aligned quad-word, the entire quad-word is read and stored into the cache.

If the access is cacheable and the needed data is a double-word or less, all the bytes in the double-word are read in two accesses and stored into the cache.

If the access the access is not cacheable, the Swordfish ignores the bytes not selected by $\overline{BE0}$-$\overline{BE7}$. In this case, the Swordfish will only perform access cycles needed to read the selected bytes. Example: MOVB @5, R0

- The Swordfish performs a read cycle at address 5 while keeping $\overline{BE5}$ active. the byte at address 5 is read from D7-15.
- If the access is not-cacheable, byte 0 is ignored.
- If the access is cacheable, The Swordfish performs another access cycle, with $\overline{BE0}$-$\overline{BE7}$ all active, to read the word at address 6.

8-Bit Bus Width

The byte on the bus lines D0 through D7 is read by the Swordfish. The Swordfish can then perform up to 7 access cycles to read the remaining bytes in the quad word.

If the access is cacheable and the needed data is an aligned quad-word, the entire quad-word is read and stored into the cache.

If the access is cacheable and the needed data is a double-word or less, all the bytes in the double-word are read in four accesses and stored into the cache.

If the access the access is not cacheable, the Swordfish ignores the bytes not selected by $\overline{BE0}$-$\overline{BE7}$. In this case, the Swordfish will only perform access cycles needed to read the selected bytes.

Example: MOVW @5, R0

- The Swordfish performs a read cycle at address 5 while keeping $\overline{BE5}$ and $\overline{BE6}$ active. The byte at address 5 is read from D0 through D7.
- If the access is not-cacheable, the Swordfish activates $\overline{BE6}$ and reads the byte at address 6.
- If the access is cacheable, The Swordfish performs three bus cycles with $\overline{BE0}$-$\overline{BE7}$ all active, to read the bytes at addresses 6, 7 and 4.

SWORDFISH ARCHITECTURE SPECIFICATION        Rev. 2.0, February 1990

| No. of Bytes | Addr LSB | Data to be Read | Addr Bus | BE0-BE7 Cache | BE0-BE7 Non Cache | Data Bus |
|---|---|---|---|---|---|---|
| 1 | 000 | -------B0 | A<br>A+1<br>A+2<br>A+3 | HHHHHHHL<br>LLLLLLLL<br>LLLLLLLL<br>LLLLLLLL | HHHHHHHL | -------B0<br>-------C<br>-------C<br>-------C |
| 1 | 001 | -------B0-- | A<br>A+1<br>A+2<br>A-1 | HHHHHHLH<br>LLLLLLLL<br>LLLLLLLL<br>LLLLLLLL | HHHHHHLH | -------B0<br>-------C<br>-------C<br>-------C |
| 1 | 010 | -------B0--- | A<br>A+1<br>A-2<br>A-1 | HHHHHLHH<br>LLLLLLLL<br>LLLLLLLL<br>LLLLLLLL | HHHHHLHH | -------B0<br>-------C<br>-------C<br>-------C |
| 1 | 011 | ------B0---- | A<br>A-3<br>A-2<br>A-1 | HHHHLHHH<br>LLLLLLLL<br>LLLLLLLL<br>LLLLLLLL | HHHHLHHH | -------B0<br>-------C<br>-------C<br>-------C |
| 1 | 100 | ----B0------ | A<br>A+1<br>A+2<br>A+3 | HHHLHHHH<br>LLLLLLLL<br>LLLLLLLL<br>LLLLLLLL | HHHLHHHH | -------B0<br>-------C<br>-------C<br>-------C |
| 1 | 101 | ---B0------- | A<br>A+1<br>A-2<br>A-1 | HHLHHHHH<br>LLLLLLLL<br>LLLLLLLL<br>LLLLLLLL | HHLHHHHH | -------B0<br>-------C<br>-------C<br>-------C |
| 1 | 110 | --B0-------- | A<br>A+1<br>A-2<br>A-1 | HLHHHHHH<br>LLLLLLLL<br>LLLLLLLL<br>LLLLLLLL | HLHHHHHH | -------B0<br>-------C<br>-------C<br>-------C |
| 1 | 111 | B0---------- | A<br>A-3<br>A-2<br>A-1 | LHHHHHHH<br>LLLLLLLL<br>LLLLLLLL<br>LLLLLLLL | LHHHHHHH | -------B0<br>-------C<br>-------C<br>-------C |
| 2 | 000 | ------B1 B0 | A<br>A+1<br>A+2<br>A+3 | HHHHHHLL<br>LLLLLLLL<br>LLLLLLLL<br>LLLLLLLL | HHHHHHLL<br>HHHHHHLH | -------B0<br>-------B1<br>-------C<br>-------C |
| 2 | 001 | ------B1 B0-- | A<br>A+1<br>A-2<br>A-1 | HHHHHLLH<br>LLLLLLLL<br>LLLLLLLL<br>LLLLLLLL | HHHHHLLH<br>HHHHHLHH | -------B0<br>-------B1<br>-------C<br>-------C |
| 2 | 010 | -----B1 B0--- | A<br>A+1<br>A-2<br>A-1 | HHHHLLHH<br>LLLLLLLL<br>LLLLLLLL<br>LLLLLLLL | HHHHLLHH<br>HHHHLHHH | -------B0<br>-------B1<br>-------C<br>-------C |
| 2 | 100 | ---B1 B0----- | A<br>A+1<br>A+2<br>A+3 | HHLLHHHH<br>LLLLLLLL<br>LLLLLLLL<br>LLLLLLLL | HHLLHHHH<br>HHLHHHHH | -------B0<br>-------B1<br>-------C<br>-------C |
| 2 | 101 | --B1 B0------ | A<br>A+1<br>A-2<br>A-1 | HLLHHHHH<br>LLLLLLLL<br>LLLLLLLL<br>LLLLLLLL | HLLHHHHH<br>HLHHHHHH | -------B0<br>-------B1<br>-------C<br>-------C |
| 2 | 110 | B1 B0-------- | A<br>A+1<br>A-2<br>A-1 | LLHHHHHH<br>LLLLLLLL<br>LLLLLLLL<br>LLLLLLLL | LLHHHHHH<br>LHHHHHHH | -------B0<br>-------B1<br>-------C<br>-------C |
| 3 | 000 | -----B2 B1 B0 | A<br>A+1<br>A+2<br>A+3 | HHHHHLLL<br>LLLLLLLL<br>LLLLLLLL<br>LLLLLLLL | HHHHHLLL<br>HHHHHLLH<br>HHHHHLHH | -------B0<br>-------B1<br>-------B2<br>-------C |

TABLE D-8. Cacheable/Non-Cacheable Data Reads from 8-Bit Bus, default is 64-Bit

SWORDFISH ARCHITECTURE SPECIFICATION          Rev. 2.0, February 1990

| No. of Bytes | Addr LSB | Data to be Read | Addr Bus | BE0-BE7 Cache | BE0-BE7 Non Cache | Data Bus |
|---|---|---|---|---|---|---|
| 3 | 001 | — — — — B2 B1 B0 — | A<br>A+1<br>A+2<br>A-1 | HHHHLLLH<br>LLLLLLLL<br>LLLLLLLL<br>LLLLLLLL | HHHHLLLH<br>HHHHLLHH<br>HHHHLHHH<br>LLLLLLLL | — — — — — — — B0<br>— — — — — — — B1<br>— — — — — — — B2<br>— — — — — — — C |
| 3 | 100 | — B2 B1 B0 — — — — | A<br>A+1<br>A+2<br>A+3 | HLLLHHHH<br>LLLLLLLL<br>LLLLLLLL<br>LLLLLLLL | HLLLHHHH<br>HLLHHHHH<br>HLHHHHHH<br>LLLLLLLL | — — — — — — — B0<br>— — — — — — — B1<br>— — — — — — — B2<br>— — — — — — — C |
| 3 | 101 | B2 B1 B0 — — — — — | A<br>A+1<br>A+2<br>A-1 | LLLHHHHH<br>LLLLLLLL<br>LLLLLLLL<br>LLLLLLLL | LLLHHHHH<br>LLHHHHHH<br>LHHHHHHH<br>LLLLLLLL | — — — — — — — B0<br>— — — — — — — B1<br>— — — — — — — B2<br>— — — — — — — C |
| 4 | 000 | — — — — B3 B2 B1 B0 | A<br>A+1<br>A+2<br>A+3 | HHHHLLLL<br>LLLLLLLL<br>LLLLLLLL<br>LLLLLLLL | HHHHLLLL<br>HHHHLLLH<br>HHHHLLHH<br>HHHHLHHH | — — — — — — — B0<br>— — — — — — — B1<br>— — — — — — — B2<br>— — — — — — — B3 |
| 4 | 100 | B3 B2 B1 B0 — — — — | A<br>A+1<br>A+2<br>A+3 | LLLLHHHH<br>LLLLLLLL<br>LLLLLLLL<br>LLLLLLLL | LLLLHHHH<br>LLLHHHHH<br>LLHHHHHH<br>LHHHHHHH | — — — — — — — B0<br>— — — — — — — B1<br>— — — — — — — B2<br>— — — — — — — B3 |
| 8 | 000 | B7 B6 B5 B4 B3 B2 B1 B0 | A<br>A+1<br>A+2<br>A+3<br>A+4<br>A+5<br>A+6<br>A+7 | LLLLLLLL<br>LLLLLLLL<br>LLLLLLLL<br>LLLLLLLL<br>LLLLLLLL<br>LLLLLLLL<br>LLLLLLLL<br>LLLLLLLL | LLLLLLLL<br>LLLLLLLH<br>LLLLLLHH<br>LLLLLHHH<br>LLLLHHHH<br>LLLHHHHH<br>LLHHHHHH<br>LHHHHHHH | — — — — — — — B0<br>— — — — — — — B1<br>— — — — — — — B2<br>— — — — — — — B3<br>— — — — — — — B4<br>— — — — — — — B5<br>— — — — — — — B6<br>— — — — — — — B7 |

TABLE D-8. Cacheable/Non-Cacheable Data Reads from 8-Bit Bus, default is 64-Bit (continued)

D.1.3 Data Write Sequences

In a write access the Swordfish outputs the operand address and asserts only the byte enable lines needed to select the specific bytes to be written.

In addition, the Swordfish duplicates the data to be written on the appropriate bytes of the data bus in order to handle 8-Bit, 16-Bit and 32-Bit busses.

The various access sequences as well as the duplication of data are summarized in tables D-9 to D-12.

| No. of Bytes | Addr LSB | Data to be Written | Addr Bus | BE0-BE7 | Data Bus |
|---|---|---|---|---|---|
| 1 | 000 | — — — — — — — B0 | A | HHHHHHHL | — — — — — — — B0 |
| 1 | 001 | — — — — — — B0 — | A | HHHHHHLH | — — — — — — B0 B0 |
| 1 | 010 | — — — — — B0 — — | A | HHHHHLHH | — — — — — B0 — B0 |
| 1 | 011 | — — — — B0 — — — | A | HHHHLHHH | — — — — B0 — B0 B0 |
| 1 | 100 | — — — B0 — — — — | A | HHHLHHHH | — — — B0 — — — B0 |
| 1 | 101 | — — B0 — — — — — | A | HHLHHHHH | — — B0 — — — B0 B0 |
| 1 | 110 | — B0 — — — — — — | A | HLHHHHHH | — B0 — — — B0 — B0 |
| 1 | 111 | B0 — — — — — — — | A | LHHHHHHH | B0 — — — B0 — B0 B0 |
| 2 | 000 | — — — — — — B1 B0 | A | HHHHHHLL | — — — — — — B1 B0 |
| 2 | 001 | — — — — — B1 B0 — | A | HHHHHLLH | — — — — — B1 B0 B0 |
| 2 | 010 | — — — — B1 B0 — — | A | HHHHLLHH | — — — — B1 B0 B1 B0 |
| 2 | 100 | — — B1 B0 — — — — | A | HHLLHHHH | — — B1 B0 — — B1 B0 |
| 2 | 101 | — B1 B0 — — — — — | A | HLLHHHHH | — B1 B0 — — B1 B0 B0 |
| 2 | 110 | B1 B0 — — — — — — | A | LLHHHHHH | B1 B0 — — B1 B0 B1 B0 |
| 3 | 000 | — — — — — B2 B1 B0 | A | HHHHHLLL | — — — — — B2 B1 B0 |
| 3 | 001 | — — — — B2 B1 B0 — | A | HHHHLLLH | — — — — B2 B1 B0 B0 |
| 3 | 100 | — B2 B1 B0 — — — — | A | HLLLHHHH | — B2 B1 B0 — B2 B1 B0 |
| 3 | 101 | B2 B1 B0 — — — — — | A | LLLHHHHH | B2 B1 B0 — B2 B1 B0 B0 |
| 4 | 000 | — — — — B3 B2 B1 B0 | A | HHHHLLLL | — — — — B3 B2 B1 B0 |
| 4 | 100 | B3 B2 B1 B0 — — — — | A | LLLLHHHH | B3 B2 B1 B0 B3 B2 B1 B0 |
| 8 | 000 | B7 B6 B5 B4 B3 B2 B1 B0 | A | LLLLLLLL | B7 B6 B5 B4 B3 B2 B1 B0 |

TABLE D-9. Cacheable/Non-Cacheable Data Writes to 64-Bit Default Bus

Note

Bytes on the data bus marked with — are undefined.

| No. of Bytes | Addr LSB | Data to be Written | Addr Bus | BE0-BE7 | Data Bus |
|---|---|---|---|---|---|
| 1 | 000 | — — — — — — — B0 | A | HHHHHHHL | — — — — — — — B0 |
| 1 | 001 | — — — — — — B0 — | A | HHHHHHLH | — — — — — — B0 B0 |
| 1 | 010 | — — — — — B0 — — | A | HHHHHLHH | — — — — — B0 — B0 |
| 1 | 011 | — — — — B0 — — — | A | HHHHLHHH | — — — — B0 — B0 B0 |
| 1 | 100 | — — — B0 — — — — | A | HHHLHHHH | — — — B0 — — — B0 |
| 1 | 101 | — — B0 — — — — — | A | HHLHHHHH | — — B0 — — — B0 B0 |
| 1 | 110 | — B0 — — — — — — | A | HLHHHHHH | — B0 — — — B0 — B0 |
| 1 | 111 | B0 — — — — — — — | A | LHHHHHHH | B0 — — — B0 — B0 B0 |
| 2 | 000 | — — — — — — B1 B0 | A | HHHHHHLL | — — — — — — B1 B0 |
| 2 | 001 | — — — — — B1 B0 — | A | HHHHHLLH | — — — — — B1 B0 B0 |
| 2 | 010 | — — — — B1 B0 — — | A | HHHHLLHH | — — — — B1 B0 B1 B0 |
| 2 | 100 | — — B1 B0 — — — — | A | HHLLHHHH | — — B1 B0 — — B1 B0 |
| 2 | 101 | — B1 B0 — — — — — | A | HLLHHHHH | — B1 B0 — — B1 B0 B0 |
| 2 | 110 | B1 B0 — — — — — — | A | LLHHHHHH | B1 B0 — — B1 B0 B1 B0 |
| 3 | 000 | — — — — — B2 B1 B0 | A | HHHHHLLL | — — — — — B2 B1 B0 |
| 3 | 001 | — — — — B2 B1 B0 — | A | HHHHLLLH | — — — — B2 B1 B0 B0 |
| 3 | 100 | — B2 B1 B0 — — — — | A | HLLLHHHH | — B2 B1 B0 — B2 B1 B0 |
| 3 | 101 | B2 B1 B0 — — — — — | A | LLLHHHHH | B2 B1 B0 — B2 B1 B0 B0 |
| 4 | 000 | — — — — B3 B2 B1 B0 | A | HHHHLLLL | — — — — B3 B2 B1 B0 |
| 4 | 100 | B3 B2 B1 B0 — — — — | A | LLLLHHHH | B3 B2 B1 B0 B3 B2 B1 B0 |
| 8 | 000 | B7 B6 B5 B4 B3 B2 B1 B0 | A A+4 | LLLLLLLL LLLLHHHH | B7 B6 B5 B4 B3 B2 B1 B0 — — — — B7 B6 B5 B4 |

TABLE D-10. Cacheable/Non-Cacheable Data Writes to 32-Bit Bus, default is 64-Bit

64-Bit Bus Width

The Swordfish performs only one access cycle to write the selected bytes within the addressed quad-word.

Example: MOVB R0, @6

- The Swordfish duplicates byte 6 of the data bus into bytes 2 and 0. Then it performs a write cycle at address 6 with $\overline{BE6}$ active.

| No. of Bytes | Addr LSB | Data to be Written | Addr Bus | BE0-BE7 | Data Bus |
|---|---|---|---|---|---|
| 1 | 000 | — — — — — — — B0 | A | HHHHHHHL | — — — — — — — B0 |
| 1 | 001 | — — — — — — B0 — | A | HHHHHHLH | — — — — — — B0 B0 |
| 1 | 010 | — — — — — B0 — — | A | HHHHHLHH | — — — — — B0 — B0 |
| 1 | 011 | — — — — B0 — — — | A | HHHHLHHH | — — — — B0 — B0 B0 |
| 1 | 100 | — — — B0 — — — — | A | HHHLHHHH | — — — B0 — — — B0 |
| 1 | 101 | — — B0 — — — — — | A | HHLHHHHH | — — B0 — — — B0 B0 |
| 1 | 110 | — B0 — — — — — — | A | HLHHHHHH | — B0 — — — B0 — B0 |
| 1 | 111 | B0 — — — — — — — | A | LHHHHHHH | B0 — — — B0 — B0 B0 |
| 2 | 000 | — — — — — — B1 B0 | A | HHHHHHLL | — — — — — — B1 B0 |
| 2 | 001 | — — — — — B1 B0 — | A<br>A+1 | HHHHHLLH<br>HHHHHLHH | — — — — — B1 B0 B0<br>— — — — — — — B1 |
| 2 | 010 | — — — — B1 B0 — — | A | HHHHLLHH | — — — — B1 B0 B1 B0 |
| 2 | 100 | — — B1 B0 — — — — | A | HHLLHHHH | — — B1 B0 — — B1 B0 |
| 2 | 101 | — B1 B0 — — — — — | A<br>A+1 | HLLHHHHH<br>HLHHHHHH | — B1 B0 — — B1 B0 B0<br>— — — — — — — B1 |
| 2 | 110 | B1 B0 — — — — — — | A | LLHHHHHH | B1 B0 — — B1 B0 B1 B0 |
| 3 | 000 | — — — — — B2 B1 B0 | A<br>A+2 | HHHHHLLL<br>HHHHHLHH | — — — — — B2 B1 B0<br>— — — — — — — B2 |
| 3 | 001 | — — — — B2 B1 B0 — | A<br>A+1 | HHHHLLLH<br>HHHHLLHH | — — — — B2 B1 B0 B0<br>— — — — — — B2 B1 |
| 3 | 100 | — B2 B1 B0 — — — — | A<br>A+2 | HLLLHHHH<br>HLHHHHHH | — B2 B1 B0 — B2 B1 B0<br>— — — — — — — B2 |
| 3 | 101 | B2 B1 B0 — — — — — | A<br>A+1 | LLLHHHHH<br>LLHHHHHH | B2 B1 B0 — B2 B1 B0 B0<br>— — — — — — B2 B1 |
| 4 | 000 | — — — — B3 B2 B1 B0 | A<br>A+2 | HHHHLLLL<br>HHHHLLHH | — — — — B3 B2 B1 B0<br>— — — — — — B3 B2 |
| 4 | 100 | B3 B2 B1 B0 — — — — | A<br>A+2 | LLLLHHHH<br>LLHHHHHH | B3 B2 B1 B0 B3 B2 B1 B0<br>— — — — — — B3 B2 |
| 8 | 000 | B7 B6 B5 B4 B3 B2 B1 B0 | A<br>A+2<br>A+4<br>A+6 | LLLLLLLL<br>LLLLLLHH<br>LLLLHHHH<br>LLHHHHHH | B7 B6 B5 B4 B3 B2 B1 B0<br>— — — — — — B3 B2<br>— — — — — — B5 B4<br>— — — — — — B7 B6 |

TABLE D-11. Cacheable/Non-Cacheable Data Writes to 16-Bit Bus, default is 64-Bit SWORDFISH ARCHITECTURE SPECIFICATION        Rev. 2.0, February 1990

| No. of Bytes | Addr LSB | Data to be Written | Addr Bus | BE0-BE7 | Data Bus |
|---|---|---|---|---|---|
| 1 | 000 | — — — — — — — B0 | A | HHHHHHHL | — — — — — — — B0 |
| 1 | 001 | — — — — — — B0 — | A | HHHHHHLH | — — — — — — B0 B0 |
| 1 | 010 | — — — — — B0 — — | A | HHHHHLHH | — — — — — B0 — B0 B0 |
| 1 | 011 | — — — — B0 — — — | A | HHHHLHHH | — — — — B0 — — B0 |
| 1 | 100 | — — — B0 — — — — | A | HHHLHHHH | — — — B0 — — — B0 |
| 1 | 101 | — — B0 — — — — — | A | HHLHHHHH | — — B0 — — — B0 B0 |
| 1 | 110 | — B0 — — — — — — | A | HLHHHHHH | — B0 — — — B0 — B0 |
| 1 | 111 | B0 — — — — — — — | A | LHHHHHHH | B0 — — — B0 — B0 B0 |
| 2 | 000 | — — — — — — B1 B0 | A<br>A+1 | HHHHHHLL<br>HHHHHHLH | — — — — — — B1 B0<br>— — — — — — — B1 |
| 2 | 001 | — — — — — B1 B0 — | A<br>A+1 | HHHHHLLH<br>HHHHHLHH | — — — — — B1 B0 B0<br>— — — — — — — B1 |
| 2 | 010 | — — — — B1 B0 — — | A<br>A+1 | HHHHLLHH<br>HHHHLHHH | — — — — B1 B0 B1 B0<br>— — — — — — — B1 |
| 2 | 100 | — — B1 B0 — — — — | A<br>A+1 | HHLLHHHH<br>HHLHHHHH | — — B1 B0 — — B1 B0<br>— — — — — — — B1 |
| 2 | 101 | — B1 B0 — — — — — | A<br>A+1 | HLLHHHHH<br>HLHHHHHH | — B1 B0 — — B1 B0 B0<br>— — — — — — — B1 |
| 2 | 110 | B1 B0 — — — — — — | A<br>A+1 | LLHHHHHH<br>LHHHHHHH | B1 B0 — — B1 B0 B1 B0<br>— — — — — — — B1 |
| 3 | 000 | — — — — — B2 B1 B0 | A<br>A+1<br>A+2 | HHHHHLLL<br>HHHHHLLH<br>HHHHHLHH | — — — — — B2 B1 B0<br>— — — — — — — B1<br>— — — — — — — B2 |
| 3 | 001 | — — — — B2 B1 B0 — | A<br>A+1<br>A+2 | HHHHLLLH<br>HHHHLLHH<br>HHHHLHHH | — — — — B2 B1 B0 B0<br>— — — — — — — B1<br>— — — — — — — B2 |
| 3 | 100 | — B2 B1 B0 — — — — | A<br>A+1<br>A+2 | HLLLHHHH<br>HLLHHHHH<br>HLHHHHHH | — B2 B1 B0 — B2 B1 B0<br>— — — — — — — B1<br>— — — — — — — B2 |
| 3 | 101 | B2 B1 B0 — — — — — | A<br>A+1<br>A+2 | LLLHHHHH<br>LLHHHHHH<br>LHHHHHHH | B2 B1 B0 — B2 B1 B0 B0<br>— — — — — — — B1<br>— — — — — — — B2 |
| 4 | 000 | — — — — B3 B2 B1 B0 | A<br>A+1<br>A+2<br>A+3 | HHHHLLLL<br>HHHHLLLH<br>HHHHLLHH<br>HHHHLHHH | — — — — B3 B2 B1 B0<br>— — — — — — — B1<br>— — — — — — — B2<br>— — — — — — — B3 |
| 4 | 100 | B3 B2 B1 B0 — — — — | A<br>A+1<br>A+2<br>A+3 | LLLLHHHH<br>LLLHHHHH<br>LLHHHHHH<br>LHHHHHHH | B3 B2 B1 B0 B3 B2 B1 B0<br>— — — — — — — B1<br>— — — — — — — B2<br>— — — — — — — B3 |
| 8 | 000 | B7 B6 B5 B4 B3 B2 B1 B0 | A<br>A+1<br>A+2<br>A+3<br>A+4<br>A+5<br>A+6<br>A+7 | LLLLLLLL<br>LLLLLLLH<br>LLLLLLHH<br>LLLLLHHH<br>LLLLHHHH<br>LLLHHHHH<br>LLHHHHHH<br>LHHHHHHH | B7 B6 B5 B4 B3 B2 B1 B0<br>— — — — — — — B1<br>— — — — — — — B2<br>— — — — — — — B3<br>— — — — — — — B4<br>— — — — — — — B5<br>— — — — — — — B6<br>— — — — — — — B7 |

TABLE D-12. Cacheable/Non-Cacheable Data Writes to 8-Bit Bus, default is 64-Bit

32-Bit Bus Width

Up to two access cycles are needed to complete the write operation.

Example: MOVW R0, @5

- The Swordfish duplicates byte 5 of the data bus into bytes 1 and 0. It duplicates byte 6 of the data bus into byte 2. Then it performs a write cycle at address 5 with $\overline{BE5}$ and $\overline{BE6}$ active.

SWORDFISH ARCHITECTURE SPECIFICATION    Rev. 2.0, February 1990

16-Bit Bus Width

Up to four access cycles are needed to complete the write operation.

Example: MOVW R0, @5

- The Swordfish duplicates byte 5 of the data bus into bytes 1 and 0. It duplicates byte 6 of the data bus into byte 2. Then it performs a write cycle at address 5 with $\overline{BE5}$ and $\overline{BE6}$ active.

- A write at address 6 is then performed with $\overline{BE6}$ active and the original byte 2 of the data bus is placed on byte 0.

8-Bit Bus Width

Up to eight access cycles are needed to complete the write operation.

Example: MOVB R0, @7

- The Swordfish duplicates byte 7 of the data bus into bytes 3, 1 and 0. Then it performs a write cycle at address 7 with $\overline{BE7}$ active.

D.2 ACCESS SEQUENCES FOR 32-BIT DEFAULT BUS WIDTH

D.2.1 Instruction Fetch Sequences

The Swordfish always activates the four byte enable signals ($\overline{BE0}$-$\overline{BE3}$) for both sequential and non-sequential fetches. $\overline{BE4}$-$\overline{BE7}$ remain are not asserted (high) in 32-Bit default bus. The Swordfish reads only the upper bytes within the instruction quad-word starting with the byte whose address is on the address bus. Instruction fetch sequences are summarized in tables D-13 to D-15.

32-Bit Bus Width

The Swordfish reads the entire double-word present on pins D0-31 of the data bus.

Example:

Example: JUMP @4

- The Swordfish performs a fetch cycle at address 4 with $\overline{BE0}$-$\overline{BE3}$ all active. Bytes 4 - 7 are read from the least-significant half of the data bus.

- The Swordfish may begin to pre-fetch instructions from the consecutive double-word aligned addresses.

| No. of Bytes | Addr LSB | Bytes to be Fetched | Addr Bus | $\overline{BE0}$-$\overline{BE7}$ | Data Bus |
|---|---|---|---|---|---|
| 4 | 00 | B3 B2 B1 B0 | A | HHHHLLLL | — — — — B3 B2 B1 B0 |

TABLE D-13. Cacheable/Non-Cacheable Instruction Fetch from 32-Bit Bus, default is 32-Bit

16-Bit Bus Width

The word on the 16 less-significant pins of the data bus is read by the Swordfish. This is the even word within the required instruction double-word. The Swordfish performs another fetch to read the other half of the double-word, while keeping $\overline{BE0}$-$\overline{BE3}$ all active. The Swordfish reads only the upper bytes within the double-word starting with the byte at the instruction address.

Example: JUMP @4

- The Swordfish performs a fetch cycle at address 4 with BE0-BE3 all active. Bytes 0 and 1 are read from D7 through D15.

- The Swordfish performs a second fetch cycle at address 6 with BE0-BE3 all active. Bytes 2 through 3 are read from D0 through D15.

- The Swordfish may begin to pre-fetch instructions from the consecutive double-word aligned addresses.

| No. of Bytes | Addr LSB | Bytes to be Fetched | Addr Bus | BE0-BE7 | Data Bus |
|---|---|---|---|---|---|
| 4 | 00 | B3 B2 B1 B0 | A | HHHHLLLL | — — — — — — B1 B0 |
|   |    |             | A+2 | HHHHLLLL | — — — — — — B3 B2 |

TABLE D-14. Cacheable/Non-Cacheable Instruction Fetch from 16-Bit Bus, default is 32-Bit

8-Bit Bus Width

The instruction byte on the data bus lines D0-8 is fetched. The Swordfish performs three more consecutive cycles to read the remaining words within the required double-word, while keeping BE0-BE3 all active. The Swordfish reads only the upper bytes within the double-word starting with the byte at the instruction address.

Example: JUMP @4

- The Swordfish performs a fetch cycle at address 4 with BE0-BE3 all active. Byte 0 is read from D0 through D7.

- The Swordfish performs a second fetch cycle at address 5 with BE0-BE3 all active. Byte 1 is read from D0 through D7.

- The Swordfish performs a third fetch cycle at address 6 with BE0-BE3 all active. Byte 2 is read from D0-7.

- The Swordfish performs a forth fetch cycle at address 7 with BE0-BE3 all active. Byte 3 is read from D0-7.

- The Swordfish may begin to pre-fetch instructions from the consecutive double-word aligned addresses.

| No. of Bytes | Addr LSB | Bytes to be Fetched | Addr Bus | BE0-BE7 | Data Bus |
|---|---|---|---|---|---|
| 4 | 00 | B3 B2 B1 B0 | A | HHHHLLLL | — — — — — — — B0 |
|   |    |             | A+1 | HHHHLLLL | — — — — — — — B1 |
|   |    |             | A+2 | HHHHLLLL | — — — — — — — B2 |
|   |    |             | A+3 | HHHHLLLL | — — — — — — — B3 |

TABLE D-15. Cacheable/Non-Cacheable Instruction Fetch 8-Bit Bus, default is 32-Bit

D.2.2 Data Read Sequences

The Swordfish starts a data read access by placing the exact address of the operand on the address bus. The byte enable lines are activated to select only the bytes required by the instruction being executed. This prevents spurious accesses to peripheral devices that might be sensitive to read accesses, such as those which exhibit the characteristic of destructive reading. During cacheable SWORDFISH ARCHITECTURE SPECIFICATION          Rev. 2.0, February 1990 accesses the Swordfish always reads all the bytes in the double-word whether or not they are needed to execute the instruction, and stores them into the Data Cache. The external memory, in this case, must place the data on the bus regardless of the state of the byte enable signals.

| No. of Bytes | Addr LSB | Data to be Read | Addr Bus | BE0-BE7 Cache | BE0-BE7 Non Cache | Data Bus |
|---|---|---|---|---|---|---|
| 1 | 00 | — — — B0 | A | HHHHHHHL | HHHHHHHL | — — — — CI CI CI B0 |
| 1 | 01 | — — B0 — | A | HHHHHHLH | HHHHHHLH | — — — — CI CI B0 CI |
| 1 | 10 | — B0 — — | A | HHHHHLHH | HHHHHLHH | — — — — CI B0 CI CI |
| 1 | 11 | B0 — — — | A | HHHHLHHH | HHHHLHHH | — — — — B0 CI CI CI |
| 2 | 00 | — — B1 B0 | A | HHHHHHLL | HHHHHHLL | — — — — CI CI B1 B0 |
| 2 | 01 | — B1 B0 — | A | HHHHHLLH | HHHHHLLH | — — — — CI B1 B0 CI |
| 2 | 10 | B1 B0 — — | A | HHHHLLHH | HHHHLLHH | — — — — B1 B0 CI CI |
| 3 | 00 | — B2 B1 B0 | A | HHHHHLLL | HHHHHLLL | — — — — CI B2 B1 B0 |
| 3 | 01 | B2 B1 B0 — | A | HHHHLLLH | HHHHLLLH | — — — — B2 B1 B0 CI |
| 4 | 00 | B3 B2 B1 B0 | A | HHHHLLLL | HHHHLLLL | — — — — B3 B2 B1 B0 |

TABLE D-16. Cacheable/Non-Cacheable Data Reads from 32-Bit Bus, default is 32-Bit

Note

A "C" on the data bus refers to cacheable reads and indicates that the byte is placed in the Data Cache.
An "I" refers to non-cacheable reads and indicates that the byte is ignored.

| No. of Bytes | Addr LSB | Data to be Read | Addr Bus | BE0-BE7 Cache | BE0-BE7 Non Cache | Data Bus |
|---|---|---|---|---|---|---|
| 1 | 00 | — — — B0 | A<br>A+2 | HHHHHHHL<br>HHHHLLLL | HHHHHHHL | — — — — — — CI B0<br>— — — — — — C C |
| 1 | 01 | — — B0 — | A<br>A+1 | HHHHHHLH<br>HHHHLLLL | HHHHHHLH | — — — — — — B0 CI<br>— — — — — — C C |
| 1 | 10 | — B0 — — | A<br>A-2 | HHHHHLHH<br>HHHHLLLL | HHHHHLHH | — — — — — — CI B0<br>— — — — — — C C |
| 1 | 11 | B0 — — — | A<br>A-3 | HHHHLHHH<br>HHHHLLLL | HHHHLHHH | — — — — — — B0 CI<br>— — — — — — C C |
| 2 | 00 | — — B1 B0 | A<br>A+2 | HHHHHHLL<br>HHHHLLLL | HHHHHHLL | — — — — — — B1 B0<br>— — — — — — C C |
| 2 | 01 | — B1 B0 — | A<br>A+1 | HHHHHLLH<br>HHHHLLLL | HHHHHLLH<br>HHHHHLHH | — — — — — — B0 CI<br>— — — — — — CI B1 |
| 2 | 10 | B1 B0 — — | A<br>A-2 | HHHHLLHH<br>HHHHLLLL | HHHHLLHH | — — — — — — B1 B0<br>— — — — — — C C |
| 3 | 00 | — B2 B1 B0 | A<br>A+2 | HHHHHLLL<br>HHHHLLLL | HHHHHLLL<br>HHHHHLHH | — — — — — — B1 B0<br>— — — — — — C B2 |
| 3 | 01 | B2 B1 B0 — | A<br>A+1 | HHHHLLLH<br>HHHHLLLL | HHHHLLLH<br>HHHHLLHH | — — — — — — B0 CI<br>— — — — — — B2 B1 |
| 4 | 00 | B3 B2 B1 B0 | A<br>A+2 | HHHHLLLL<br>HHHHLLLL | HHHHLLLL<br>HHHHLLHH | — — — — — — B1 B0<br>— — — — — — B3 B2 |

TABLE D-17. Cacheable/Non-Cacheable Data Reads from 16-Bit Bus, default is 32-Bit If the Data Cache is either internally or externally disabled (through CIIN) during the access, the Swordfish ignores the bytes not selected by the BE0-BE3 signals. Data read sequences are summarized in tables D-16 to D-18.

32-Bit Bus Width

SWORDFISH ARCHITECTURE SPECIFICATION  Rev. 2.0, February 1990

The double-word on the least-significant half of the data bus is read by the Swordfish. If the access is cacheable the data is stored into the Data Cache.

If the access the access is not cacheable, the Swordfish ignores the bytes not selected by $\overline{BE0}$-$\overline{BE3}$.

Example: MOVW @5, R0

- The Swordfish performs a read cycle at address 5 while keeping $\overline{BE1}$ and $\overline{BE2}$ active.
- If the access is not-cacheable, bytes 0 and 3 are ignored.
- If the access is cacheable, bytes 0 through 3 are read and stored in the internal Data Cache.

| No. of Bytes | Addr LSB | Data to be Read | Addr Bus | $\overline{BE0}$-$\overline{BE7}$ Cache | Non Cache | Data Bus |
|---|---|---|---|---|---|---|
| 1 | 00 | ---B0 | A<br>A+1<br>A+2<br>A+3 | HHHHHHHL<br>HHHHLLLL<br>HHHHLLLL<br>HHHHLLLL | HHHHHHHL | ————————B0<br>————————C<br>————————C<br>————————C |
| 1 | 01 | --B0- | A<br>A+1<br>A+2<br>A-1 | HHHHHHLH<br>HHHHLLLL<br>HHHHLLLL<br>HHHHLLLL | HHHHHHLH | ————————B0<br>————————C<br>————————C<br>————————C |
| 1 | 10 | -B0-- | A<br>A+1<br>A-2<br>A-1 | HHHHHLHH<br>HHHHLLLL<br>HHHHLLLL<br>HHHHLLLL | HHHHHLHH | ————————B0<br>————————C<br>————————C<br>————————C |
| 1 | 11 | B0--- | A<br>A-3<br>A-2<br>A-1 | HHHHLHHH<br>HHHHLLLL<br>HHHHLLLL<br>HHHHLLLL | HHHHLHHH | ————————B0<br>————————C<br>————————C<br>————————C |
| 2 | 00 | --B1B0 | A<br>A+1<br>A+2<br>A+3 | HHHHHHLL<br>HHHHLLLL<br>HHHHLLLL<br>HHHHLLLL | HHHHHHLL<br>HHHHHHLH | ————————B0<br>————————B1<br>————————C<br>————————C |
| 2 | 01 | -B1B0- | A<br>A+1<br>A+2<br>A-1 | HHHHHLLH<br>HHHHLLLL<br>HHHHLLLL<br>HHHHLLLL | HHHHHLLH<br>HHHHHLHH | ————————B0<br>————————B1<br>————————C<br>————————C |
| 2 | 10 | B1B0-- | A<br>A+1<br>A-2<br>A-1 | HHHHLLHH<br>HHHHLLLL<br>HHHHLLLL<br>HHHHLLLL | HHHHLLHH<br>HHHHLHHH | ————————B0<br>————————B1<br>————————C<br>————————C |
| 3 | 00 | -B2B1B0 | A<br>A+1<br>A+2<br>A+3 | HHHHHLLL<br>HHHHLLLL<br>HHHHLLLL<br>HHHHLLLL | HHHHHLLL<br>HHHHHLLH<br>HHHHHLHH | ————————B0<br>————————B1<br>————————B2<br>————————C |
| 3 | 01 | B2B1B0- | A<br>A+1<br>A+2<br>A-1 | HHHHLLLH<br>HHHHLLLL<br>HHHHLLLL<br>HHHHLLLL | HHHHLLLH<br>HHHHLLHH<br>HHHHLHHH | ————————B0<br>————————B1<br>————————B2<br>————————C |
| 4 | 00 | B3B2B1B0 | A<br>A+1<br>A+2<br>A+3 | HHHHLLLL<br>HHHHLLLL<br>HHHHLLLL<br>HHHHLLLL | HHHHLLLL<br>HHHHLLLH<br>HHHHLLHH<br>HHHHLHHH | ————————B0<br>————————B1<br>————————B2<br>————————B3 |

TABLE D-18. Cacheable/Non-Cacheable Data Reads from 8-Bit Bus, default is 32-Bit

16-Bit Bus Width

The word on the bus lines D0 through 15 is read by the Swordfish. The Swordfish can then perform another cycles to read the remaining bytes in the double-word.

SWORDFISH ARCHITECTURE SPECIFICATION     Rev. 2.0, February 1990

If the access is cacheable all the bytes in the double-word are read in two accesses and stored into the cache.

If the access the access is not cacheable, the Swordfish ignores the bytes not selected by $\overline{BE0}$-$\overline{BE3}$. In this case, the Swordfish will only perform access cycles needed to read the selected bytes.

Example: MOVB @5, R0

- The Swordfish performs a read cycle at address 5 while keeping $\overline{BE1}$ active. the byte at address 5 is read from D7 through D15.
- If the access is not-cacheable, byte 0 is ignored.
- If the access is cacheable, The Swordfish performs another access cycle, with $\overline{BE0}$-$\overline{BE3}$ all active, to read the word at address 6.

8-Bit Bus Width

The byte on the bus lines D0 through D7 is read by the Swordfish. The Swordfish can then perform up to 3 access cycles to read the remaining bytes in the double-word.

If the access is cacheable all the bytes in the double-word are read in four accesses and stored into the cache.

If the access the access is not cacheable, the Swordfish will only perform access cycles needed to read the selected bytes.

Example: MOVW @5, R0

- The Swordfish performs a read cycle at address 5 while keeping $\overline{BE1}$ and $\overline{BE2}$ active. the byte at address 5 is read from D0 through D7.
- If the access is not-cacheable, the Swordfish activates $\overline{BE2}$ and reads the byte at address 6.
- If the access is cacheable, The Swordfish performs three bus cycles with $\overline{BE0}$-$\overline{BE3}$ all active, to read the bytes at addresses 6, 7 and 4.

D.2.3 Data Write Sequences

In a write access the Swordfish outputs the operand address and asserts only the byte enable lines needed to select the specific bytes to be written. In addition, the Swordfish duplicates the data to be written on the appropriate bytes of the data bus in order to handle 8-Bit and 16-Bit busses.

The various access sequences as well as the duplication of data are summarized in tables D-19 to D-21.

32-Bit Bus Width

The Swordfish performs only one access cycle to write the selected bytes within the addressed double-word.

Example: MOVB R0, @6

- The Swordfish duplicates byte 2 of the data bus into byte 0 and performs a write cycle at address 6 with $\overline{BE2}$ active.

SWORDFISH ARCHITECTURE SPECIFICATION　　　Rev. 2.0, February 1990

| No. of Bytes | Addr LSB | Data to be Written | Addr Bus | BE0-BE7 | Data Bus |
|---|---|---|---|---|---|
| 1 | 00 | ---B0 | A | HHHHHHHL | -------B0 |
| 1 | 01 | --B0- | A | HHHHHHLH | ------B0 B0 |
| 1 | 10 | -B0-- | A | HHHHHLHH | -----B0--B0 |
| 1 | 11 | B0--- | A | HHHHLHHH | ----B0--B0 B0 |
| 2 | 00 | --B1 B0 | A | HHHHHHLL | ------B1 B0 |
| 2 | 01 | -B1 B0- | A | HHHHHLLH | -----B1 B0 B0 |
| 2 | 10 | B1 B0-- | A | HHHHLLHH | ----B1 B0 B1 B0 |
| 3 | 00 | -B2 B1 B0 | A | HHHHHLLL | -----B2 B1 B0 |
| 3 | 01 | B2 B1 B0- | A | HHHHLLLH | ----B2 B1 B0 B0 |
| 4 | 00 | B3 B2 B1 B0 | A | HHHHLLLL | ----B3 B2 B1 B0 |

TABLE D-19. Cacheable/Non-Cacheable Data Writes to 32-Bit Bus, default is 32-Bit

Note

Bytes on the data bus marked with — are undefined.

16-Bit Bus Width

Up to two access cycles are needed to complete the write operation.

Example: MOVW R0, @5

- The Swordfish duplicates byte 1 of the data bus into byte 0 and performs a write cycle at address 5 with $\overline{BE1}$ and $\overline{BE2}$ active.

- A write at address 6 is then performed with $\overline{BE2}$ active and the original byte 2 of the data bus is placed on byte 0.

| No. of Bytes | Addr LSB | Data to be Written | Addr Bus | BE0-BE7 | Data Bus |
|---|---|---|---|---|---|
| 1 | 00 | ---B0 | A | HHHHHHHL | -------B0 |
| 1 | 01 | --B0- | A | HHHHHHLH | ------B0 B0 |
| 1 | 10 | -B0-- | A | HHHHHLHH | -----B0--B0 |
| 1 | 11 | B0--- | A | HHHHLHHH | ----B0--B0 B0 |
| 2 | 00 | --B1 B0 | A | HHHHHHLL | ------B1 B0 |
| 2 | 01 | -B1 B0- | A / A+1 | HHHHHLLH / HHHHHLHH | -----B1 B0 B0 / -------B1 |
| 2 | 10 | B1 B0-- | A | HHHHLLHH | ----B1 B0 B1 B0 |
| 3 | 00 | -B2 B1 B0 | A / A+2 | HHHHHLLL / HHHHHLHH | -----B2 B1 B0 / -------B2 |
| 3 | 01 | B2 B1 B0- | A / A+1 | HHHHLLLH / HHHHHLHH | ----B2 B1 B0 B0 / ------B2 B1 |
| 4 | 00 | B3 B2 B1 B0 | A / A+2 | HHHHLLLL / HHHHLLHH | ----B3 B2 B1 B0 / -----B3 B2 |

TABLE D-20. Cacheable/Non-Cacheable Data Writes to 16-Bit Bus, default is 32-Bit

8-Bit Bus Width

Up to four access cycles are needed to complete the write operation.

Example: MOVB R0, @7

- The Swordfish duplicates byte 3 of the data bus into bytes 1 and 0. Then it performs a write cycle at address 7 with $\overline{BE3}$ active.

SWORDFISH ARCHITECTURE SPECIFICATION        Rev. 2.0, February 1990

| No. of Bytes | Addr LSB | Data to be Written | Addr Bus | BE0-BE7 | Data Bus |
|---|---|---|---|---|---|
| 1 | 00 | — — — B0 | A | HHHHHHHL | — — — — — — — B0 |
| 1 | 01 | — — B0 — | A | HHHHHHLH | — — — — — — B0 B0 |
| 1 | 10 | — B0 — — | A | HHHHHLHH | — — — — — B0 — B0 |
| 1 | 11 | B0 — — — | A | HHHHLHHH | — — — — B0 — B0 B0 |
| 2 | 00 | — — B1 B0 | A | HHHHHHLL | — — — — — — B1 B0 |
|   |    |          | A+1 | HHHHHHLH | — — — — — — — B1 |
| 2 | 01 | — B1 B0 — | A | HHHHHLLH | — — — — — B1 B0 B0 |
|   |    |          | A+1 | HHHHHLHH | — — — — — — — B1 |
| 2 | 10 | B1 B0 — — | A | HHHHLLHH | — — — — B1 B0 B1 B0 |
|   |    |          | A+1 | HHHHLHHH | — — — — — — — B1 |
| 3 | 00 | — B2 B1 B0 | A | HHHHHLLL | — — — — — B2 B1 B0 |
|   |    |          | A+1 | HHHHHLLH | — — — — — — — B1 |
|   |    |          | A+2 | HHHHHLHH | — — — — — — — B2 |
| 3 | 01 | B2 B1 B0 — | A | HHHHLLLH | — — — — B2 B1 B0 B0 |
|   |    |          | A+1 | HHHHHLLH | — — — — — — — B1 |
|   |    |          | A+2 | HHHHHLHH | — — — — — — — B2 |
| 4 | 00 | B3 B2 B1 B0 | A | HHHHLLLL | — — — — B3 B2 B1 B0 |
|   |    |          | A+1 | HHHHLLLH | — — — — — — — B1 |
|   |    |          | A+2 | HHHHLLHH | — — — — — — — B2 |
|   |    |          | A+3 | HHHHLHHH | — — — — — — — B3 |

TABLE D-21. Cacheable/Non-Cacheable Data Writes to 8-Bit Bus, default is 32-Bit

SWORDFISH ARCHITECTURE SPECIFICATION          Rev. 2.0, February 1990

E. ENGINEERING PINS

This appendix contains information on Swordfish pins that will be available only on the Engineering version of the device.

E.1 INPUT SIGNALS

CFG0-CFG1    The Swordfish supports the capability to operate with only half the IC. This capability offers the opportunity to increase yield in manufacturing the microprocessor by providing components with a partially functional IC for special-purpose applications that can perform effectively with a smaller IC. The IC configuration is selected by the values sampled at Reset on the signals CFG0-CFG1. It is possible to select configurations with the full IC operating or with only half of the IC. When only half of the IC is operating, then 128 sets of 2 entries each are available. The set to search for an instruction fetch is selected by bits 3 through 9 of the instruction's address. For operating with half the IC, the cache can be configured to use either the lower 128 sets or the upper 128 sets of the total 256 sets. The encoding of CFG0-CFG1 is according to the following:

| CFG1 | CFG0 | Configuration |
|------|------|---------------|
| Low  | Low  | Reserved      |
| Low  | High | Lower Half IC |
| High | Low  | Upper Half IC |
| High | High | Full IC       |

FPF    Floating Point Unit Functional. When asserted (high), indicates that the on-chip FPU is operational, and FPU instructions can be executed according to the value written by software into the CFG.F bit. When not asserted (low), the Swordfish assumes that the on-chip FPU is not functional and the CFG.F bit is forced to zero.

ICOBS    Instruction Cache Observability Mode Enable. This pin when asserted (low), causes the Swordfish to enter the IC Observability Mode. In this mode the full contents of the IC are displayed on the address and data buses. Note that when this display finishes, the state of the Swordfish is unpredictable.

PLLF    The PLLF input is used to control the PLL operation. When asserted (high) the on-chip PLL generates PHI1 and PHI2. When not asserted (low) the PLL is bypassed. In this case CLK input is used as an oscillator input and its frequency has to be 2 * Bus Frequency for Full frequency operation or 4 * Bus Frequency for Half frequency operation. The value PLLF must be stable from Power Up Reset and there after.

E.2 OUTPUT SIGNALS

BUS    This pin is asserted (high) by the Swordfish during self-test for a single internal clock cycle each time an error is detected in the lower 32 bits of the internal data bus.

DC    This pin is asserted (high) by the Swordfish during self-test for a single internal clock cycle each time an error is detected in one of the DC entries.

IC    This pin is asserted (high) by the Swordfish during self-test for a single internal clock cycle each time an error is detected in one of the IC entries.

SWORDFISH ARCHITECTURE SPECIFICATION  Rev. 2.0, February 1990

ROM   This pin is asserted (high) by the Swordfish during self-test for a single internal clock cycle each time an error is detected in one of the Emulation ROM entries.

What is claimed is:

1. A processor that processes information, the processor comprising:
   (a) an internal storage element comprising a plurality of storage locations for storing information to be processed by the processor;
   (b) means for replacing information stored in the internal storage element with information retrieved from an external memory; and
   (c) means for locking selected individual independent storage locations in the internal storage element to prevent replacement of information stored in the selected individual independent storage locations.

2. A microprocessor that executes instructions and processes data, the microprocessor comprising:
   (a) an instruction cache comprising a plurality of storage locations for storing instruction entries that include instructions to be executed by the microprocessor;
   (b) means for replacing instruction entries stored in the instruction cache with instruction entries retrieved from an external memory; and
   (c) means for locking selected individual independent storage locations in the instruction cache to prevent replacement of instruction entries stored in the selected individual independent storage locations.

3. A microprocessor as in claim 2 wherein the means for locking selected individual independent storage locations in the instruction cache comprises a configuration register that enables and disables various operating modes of the selected individual independent storage locations in the instruction cache.

4. A microprocessor as in claim 3 wherein the configuration register includes means for storing a bit that controls whether a storage location which receives an instruction entry retrieved from external memory is locked.

5. A microprocessor as in claim 2 wherein each instruction entry stored in the instruction cache includes a bit that indicates whether the storage location in which the instruction entry is stored is locked.

6. A microprocessor as in claim 2 and further including means for invalidating instruction entries stored in unlocked storage locations.

7. A microprocessor as in claim 2 and further including means for invalidating all instruction entries stored in the instruction cache, including instruction entries stored in the selected storage locations.

8. A microprocessor as in claim 2 and further including means for locking a selected individual independent storage location without the microprocessor executing the instruction included in the instruction entry stored in the selected individual independent storage location.

9. A microprocessor that executes instructions and process data, the microprocessor comprising:
   (a) a data cache comprising a plurality of storage locations for storing data entries that include data to be processed by the microprocessor;
   (b) means for replacing data entries stored in the data cache with data entries retrieved from an external memory; and
   (c) means for locking selected individual independent storage locations in the data cache to prevent replacement of data entries stored in the selected individual independent storage locations.

10. A microprocessor as in claim 9 wherein the means for locking selected individual independent storage locations in the data cache comprises a configuration register that enables or disable various operating modes for the microprocessor, including the locking of the selected individual independent storage locations in the data cache.

11. A microprocessor as in claim 10 wherein the configuration register includes means for storing a bit that controls whether a storage location which receives a data entry retrieved from external memory is locked.

12. A microprocessor as in claim 9 wherein each data entry stored in the data cache includes a bit that indicates whether the storage location in which the data entry is stored is locked.

13. A microprocessor as in claim 9 and further including means for invalidating data entries stored in unlocked storage locations.

14. A microprocessor as in claim 9 and further including means for invalidating all data entries stored in the data cache, including data entries stored in the selected individual independent storage locations.

15. A method of protecting information entries processed by a data processing system, the method comprising:
   (a) storing information entries to be processed by the data processing system in an internal storage element comprising a plurality of information entry storage locations;
   (b) replacing information entries stored in the internal storage element with information entries retrieved from an external memory; and
   (c) locking selected individual independent storage locations in the internal storage element to prevent replacement of information entries stored in the selected individual independent storage locations.

16. A method of protecting instructions executed by a microprocessor that executes instructions and processes data, the method comprising:
   (a) storing instruction entries that include instructions to be executed by the microprocessor in an instruction cache comprising a plurality of instruction entry storage locations;
   (b) replacing instruction entries stored in the instruction cache with instructions entries retrieved from an external memory; and
   (c) locking a selected individual independent instruction entry storage location to prevent replacement of the instruction entry stored in the selected individual independent instruction entry storage location.

17. A method as in claim 16 and including the further step of invalidating instruction entries stored in unlocked instruction entry storage locations.

18. A method as in claim 16 and including the further step of invalidating all instruction entries in the instruction cache.

19. A method as in claim 16 wherein the step of locking the selected instruction entry storage location comprises locking the selected instruction entry storage location without the microprocessor executing the instruction included in the instruction entry stored in the selected individual independent instruction entry storage location.

20. A method of protecting data processed by a microprocessor that executes instructions and processes data, the method comprising:

(a) storing data entries that include data to be processed by the microprocessor in a data cache comprising a plurality of data entry storage locations;

(b) replacing data entries stored in the data cache with data entries retrieved from an external memory; and (c) locking an selected individual independent data entry storage location to prevent replacement of data entry stored in the selected individual independent data entry storage location.

21. A method as in claim 20 and including the further step of invalidating data entries stored in unlocked data entry storage locations.

22. A method as in claim 20 and including the further step of invalidating all data entries in the data cache.

* * * * *

UNITED STATES PATENT AND TRADEMARK OFFICE
CERTIFICATE OF CORRECTION

PATENT NO. : 5,249,286

DATED : September 28, 1993

INVENTOR(S) : Donald B. Alpert, Oved Oz, Gideon Intrater, Reuven Marko and Alon Shacham It is certified that error appears in the above-identified patent and that said Letters Patent is hereby corrected as shown below:

On title page, item [54] and col. 1, line 1, after

"Locking" insert --Individual--.

In Col. 424, line 8, delete "disable" and replace with

--disables--.

Signed and Sealed this

Twenty-second Day of March, 1994

Attest:

BRUCE LEHMAN

*Attesting Officer*   *Commissioner of Patents and Trademarks*